US012787040B2

(12) United States Patent
Li et al.

(10) Patent No.: US 12,787,040 B2
(45) Date of Patent: Nov. 3, 2026

(54) TECHNIQUES FOR SIDELINK CONTROL CONNECTION WITH CARRIER AGGREGATION

(71) Applicant: QUALCOMM INCORPORATED, San Diego, CA (US)

(72) Inventors: Qing Li, Princeton Junction, NJ (US); Gavin Bernard Horn, La Jolla, CA (US); Peng Cheng, Beijing (CN); Hong Cheng, Basking Ridge, NJ (US); Ozcan Ozturk, San Diego, CA (US); Dan Vassilovski, Del Mar, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/251,360

(22) PCT Filed: Jan. 1, 2021

(86) PCT No.: PCT/CN2021/070053

§ 371 (c)(1),
(2) Date: May 1, 2023

(87) PCT Pub. No.: WO2022/141614

PCT Pub. Date: Jul. 7, 2022

(65) Prior Publication Data

US 2024/0032076 A1 Jan. 25, 2024

(51) Int. Cl.

| | |
|---|---|
| ***H04W 72/40*** | (2023.01) |
| ***H04W 72/0453*** | (2023.01) |
| ***H04W 72/25*** | (2023.01) |

(52) U.S. Cl.

CPC ....... *H04W 72/40* (2023.01); *H04W 72/0453* (2013.01); *H04W 72/25* (2023.01)

(58) Field of Classification Search

CPC .. H04W 72/0453; H04W 72/25; H04W 72/40
See application file for complete search history.

(56) References Cited

U.S. PATENT DOCUMENTS

| | | | |
|---|---|---|---|
| 10,349,442 | B2 | 7/2019 | Baghel et al. |
| 10,721,787 | B2 | 7/2020 | Chen et al. |

(Continued)

FOREIGN PATENT DOCUMENTS

| | | | |
|---|---|---|---|
| CN | 101772179 | A | 7/2010 |
| CN | 109565867 | A | 4/2019 |

(Continued)

OTHER PUBLICATIONS

3GPP TS 36.300 V16.4.0: "3rd Generation Partnership Project, Technical Specification Group Radio Access Network, Evolved Universal Terrestrial Radio Access (E-UTRA) and Evolved Universal Terrestrial Radio Access Network (E-UTRAN), Overall description; Stage 2 (Release 16)", 3rd Generation Partnership Project, Mobile Competence Centre, 650, Route Des Lucioles, F-06921, Sophia-Antipolis Cedex, France, Dec. 23, 2020, XP051967116, 391 Pages, Section 23.14.1.1.

(Continued)

*Primary Examiner* — Kevin M Cunningham
(74) *Attorney, Agent, or Firm* — Holland & Hart LLP/QUALCOMM Incorporated

(57) ABSTRACT

Methods, systems, and devices for wireless communications are described. A user equipment (UE) may support carrier aggregation for a sidelink control connection, such as a PC5 or radio resource control (RRC) connection with another UE. The sidelink control connection may support at least two sidelink control carriers, such as an anchor sidelink carrier, a secondary or selected sidelink carrier, a secondary anchor sidelink carrier that may be configured for fallback or duplication, among others. The sidelink control connection may be monitored for radio link failure and a secondary (Continued)

700 sidelink carrier may be used. Other sidelink carriers may be configured for the sidelink control connection as channel conditions change.

18 Claims, 37 Drawing Sheets

(56) References Cited

U.S. PATENT DOCUMENTS

| | | | | |
|---|---|---|---|---|
| 2020/0205166 | A1* | 6/2020 | Huang | H04W 68/005 |
| 2020/0236600 | A1* | 7/2020 | Hong | H04W 72/52 |
| 2020/0267729 | A1 | 8/2020 | Kim et al. | |
| 2020/0351975 | A1 | 11/2020 | Tseng et al. | |
| 2020/0383100 | A1 | 12/2020 | Yu et al. | |
| 2020/0413397 | A1 | 12/2020 | Blasco Serrano et al. | |
| 2021/0314112 | A1* | 10/2021 | Balasubramanian | H04L 5/0076 |
| 2022/0039096 | A1* | 2/2022 | Wang | H04L 5/0092 |
| 2022/0104209 | A1* | 3/2022 | Lee | H04W 72/542 |
| 2022/0141824 | A1* | 5/2022 | Bao | H04W 72/0453 370/329 |

FOREIGN PATENT DOCUMENTS

| | | | |
|---|---|---|---|
| CN | 110312228 | A | 10/2019 |
| CN | 111727575 | A | 9/2020 |
| KR | 20200040904 | A | 4/2020 |
| KR | 20200078354 | A | 7/2020 |
| KR | 20200090549 | A | 7/2020 |
| WO | WO-2018031180 | | 2/2018 |
| WO | WO-2019168311 | A1 | 9/2019 |
| WO | WO-2020035142 | A1 | 2/2020 |

OTHER PUBLICATIONS

Supplementary European Search Report—EP21912397—Search Authority—Berlin—Aug. 13, 2024 (2100993EP).

Huawei, et al., "Correction on V2X Sidelink Communication in TS 36.300", 3GPP Draft, 3GPP TSG-RAN WG2 Meeting #104, 36300_CR1199R2_(REL-15)_R2-1816470_Correction on V2X Sidelink Communication in TS 36.300, 3rd Generation Partnership Project (3GPP), Mobile Competence Centre, 650, Route Des Lucioles, F-, vol. RAN WG2, no. Spokane, USA, Oct. 12, 2018-Oct. 16, 2018, Dec. 9, 2018 (Dec. 9, 2018), XP051553727, 12 Pages, p. 1, the whole document.

International Search Report and Written Opinion—PCT/CN2021/070053—ISA/EPO—Sep. 29, 2021 (2100993WO1).

ITRI: "Discussion on Carrier Selection Based on CBR", 3GPP TSG-RAN WG2 #101-Bis, R2-1804368, Sanya, China, Apr. 16-20, 2018, Apr. 3, 2018, the whole document, 3 Pages.

ZTE Corporation: "Miscellaneous Corrections for Sidelink in 36.300", 3GPP TSG-RAN WG2 Meeting #93bis, R2-162511, Dubrovnik, Croatia, Apr. 11-15, 2016, Apr. 1, 2016 (Apr. 1, 2016) the whole document.

Xenakis A., et al., "A Cross-Layer-Aware FDD/TDD Carrier Aggregation Framework for LTE-A Networks", Wireless Personal Communications, vol. 99, No. 2, Mar. 2018, pp. 1015-1033.

Zhe W., et al., "Research on sidelink and resource allocation technology in NR-V2X", Telecom Engineering Technics and Standardization, Mar. 28, 2020, pp. 41-45.

ZTE: "Discussion on PC5 carrier aggregation", 3GPP TSG-RAN WG2 Meeting #99, R2-1708509, Berlin, Germany, Aug. 21-25, 2017, Aug. 11, 2017, 6 Pages.

* cited by examiner

3500

TECHNIQUES FOR SIDELINK CONTROL CONNECTION WITH CARRIER AGGREGATION

CROSS REFERENCE

The present Application is a 371 national stage filing of International PCT Application No. PCT/CN2021/070053 by LI et al. entitled "TECHNIQUES FOR SIDELINK CONTROL CONNECTION WITH CARRIER AGGREGATION," filed Jan. 1, 2021, which is assigned to the assignee hereof, and which is expressly incorporated by reference in its entirety herein.

FIELD OF DISCLOSURE

The following relates to wireless communications systems, including techniques for sidelink control connection with carrier aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support sidelink communications. For example, some wireless communications systems may support direct communications between two or more wireless devices, such as two or more UEs.

SUMMARY

The described techniques relate to improved methods, systems, devices, and apparatuses that support. Generally, the described techniques provide for carrier aggregation in sidelink communications. In some aspects, the described techniques provide for carrier aggregation for control signals (e.g., PC5 radio resource control (RRC) interface).

In an example, the described techniques provide for establishing (reestablishing) a sidelink control connection (e.g., PC5 RRC connection) using a sidelink carrier (also referred to herein as a sidelink carrier component). In some aspects, the described techniques support monitoring the sidelink control connection over the sidelink carrier.

For example, a first user equipment (UE) may establish (reestablish) a sidelink control connection (e.g., PC5 RRC connection) with a second UE using a sidelink carrier. The sidelink control connection may support carrier aggregation.

The first UE may select the sidelink carrier from a set of candidate sidelink carriers common to both first UE and second UE, based on measured channel parameters (e.g., channel busy ratio (CBR)) of the candidate sidelink carriers. For example, the first UE may select the sidelink carrier based on the based on the measured channel parameters satisfying a threshold.

The first UE may transmit, to the second UE, a sidelink message indicating the selected sidelink carrier. In an example, the first UE may transmit the sidelink message using the selected sidelink carrier. In some aspects, a base station may select the sidelink carrier based on the measured channel parameters, and the base station may transmit, to the first UE, a configuration message indicating the selected sidelink carrier. The first UE (or the base station) may set (e.g., configure) the sidelink carrier as a sidelink anchor carrier (also referred to herein as a sidelink anchor carrier component) for the sidelink control connection. In some aspects, the first UE (or the base station) may set (e.g., configure) the sidelink carrier as a sidelink anchor carrier for control plane messaging.

In another example, the described techniques provide for improving reliability of a established (reestablished) sidelink control connection (e.g., PC5 RRC connection). In some aspects, the described techniques support establishing (reestablishing) or maintaining the sidelink control connection (e.g., PC5 RRC connection) using a primary sidelink anchor carrier or using a secondary sidelink anchor carrier.

For example, a first UE may establish (reestablish) or maintain a sidelink control connection (e.g., PC5 RRC connection) with a second UE using a primary sidelink anchor carrier. The sidelink control connection may support carrier aggregation. The first UE may further support the sidelink control connection using a secondary sidelink anchor carrier. For example, the first UE may further support reconfiguration of the sidelink control connection. For example, the first UE may further support activation of the sidelink control connection by media access control (MAC) control element (MAC-CE) (e.g., updated or new content). In some aspects, the first UE may use the secondary sidelink anchor carrier as a fallback for the primary sidelink anchor carrier, for example, if the primary sidelink anchor carrier's measurements fail to satisfy a set of criteria. In some aspects, the first UE may use the secondary sidelink anchor carrier as a duplication of the primary sidelink anchor carrier with the same packet repeated on the secondary sidelink anchor carrier, for example, if the primary sidelink anchor carrier's measurements fail to satisfy the set of criteria. The first UE may select the sidelink anchor carriers (e.g., primary sidelink anchor carrier, secondary sidelink anchor carrier) based on channel parameters associated with the sidelink anchor carriers. For example, the first UE may select the sidelink anchor carriers (e.g., primary sidelink anchor carrier, secondary sidelink anchor carrier) based on a channel busy ratio (CBR) or a reference signal received power (RSRP).

In some other examples, the described techniques provide for monitoring and recovery of an established (reestablished) sidelink control connection (e.g., PC5 RRC connection) while avoiding sidelink radio link failure (RLF).

For example, a first UE may establish (reestablish) or maintain a sidelink control connection (e.g., PC5 RRC connection) with a second UE using a sidelink anchor carrier. The first UE may measure, over a monitoring window, channel parameters (e.g., CBR, RSRP, RSSI, etc.) of the sidelink anchor carrier or candidate sidelink carriers. The first UE may select a second sidelink anchor carrier (e.g., from the candidate sidelink carriers) for the sidelink control connection. In an example, the first UE may switch to the second sidelink anchor carrier for the sidelink control connection, without releasing and establishing (reestablishing) radio bearers (e.g., sidelink signal radio bearers (SRBs), sidelink data radio bearers (DRBs).

In some aspects, refraining from releasing or reestablishing radio bearers may prevent or mitigate occurrences of sidelink radio link failure (RLF) (e.g., a failure by the first UE or the second UE to maintain a connection over PC5 connection). The first UE may transmit a sidelink message (e.g., a radio resource control (RRC) message or a MAC-CE to the second UE for configuring or activating the second sidelink anchor carrier for the sidelink control connection. In some examples, the second UE may transmit, to the first UE, a message which may be an RRC response message accepting the second sidelink anchor carrier or a message rejecting the second sidelink anchor carrier or an acknowledgement (ACK) or a negative acknowledgement (NACK) to the MAC-CE.

A method for wireless communication at a first UE is described. The method may include receiving a first sidelink message from a second UE, the first sidelink message indicating a first set of candidate sidelink carriers of the second UE, measuring one or more channel parameters of at least one candidate sidelink carrier of the first set of candidate sidelink carriers, determining at least one sidelink carrier of the first set of candidate sidelink carriers based on the measured one or more channel parameters, the at least one sidelink carrier for establishing a sidelink control connection that supports carrier aggregation using multiple sidelink carriers, transmitting, to the second UE, a second sidelink message indicating or activating the at least one sidelink carrier for establishing the sidelink control connection, and establishing the sidelink control connection between the first UE and the second UE using the at least one sidelink carrier based on the second sidelink message.

An apparatus for wireless communication at a first UE is described. The apparatus may include a processor, memory in electronic communication with the processor, and instructions stored in the memory. The instructions may be executable by the processor to cause the apparatus to receive a first sidelink message from a second UE, the first sidelink message indicating a first set of candidate sidelink carriers of the second UE, measure one or more channel parameters of at least one candidate sidelink carrier of the first set of candidate sidelink carriers, determine at least one sidelink carrier of the first set of candidate sidelink carriers based on the measured one or more channel parameters, the at least one sidelink carrier for establishing a sidelink control connection that supports carrier aggregation using multiple sidelink carriers, transmit, to the second UE, a second sidelink message indicating or activating the at least one sidelink carrier for establishing the sidelink control connection, and establish the sidelink control connection between the first UE and the second UE using the at least one sidelink carrier based on the second sidelink message.

Another apparatus for wireless communication at a first UE is described. The apparatus may include means for receiving a first sidelink message from a second UE, the first sidelink message indicating a first set of candidate sidelink carriers of the second UE, means for measuring one or more channel parameters of at least one candidate sidelink carrier of the first set of candidate sidelink carriers, means for determining at least one sidelink carrier of the first set of candidate sidelink carriers based on the measured one or more channel parameters, the at least one sidelink carrier for establishing a sidelink control connection that supports carrier aggregation using multiple sidelink carriers, means for transmitting, to the second UE, a second sidelink message indicating or activating the at least one sidelink carrier for establishing the sidelink control connection, and means for establishing the sidelink control connection between the first UE and the second UE using the at least one sidelink carrier based on the second sidelink message.

A non-transitory computer-readable medium storing code for wireless communication at a first UE is described. The code may include instructions executable by a processor to receive a first sidelink message from a second UE, the first sidelink message indicating a first set of candidate sidelink carriers of the second UE, measure one or more channel parameters of at least one candidate sidelink carrier of the first set of candidate sidelink carriers, determine at least one sidelink carrier of the first set of candidate sidelink carriers based on the measured one or more channel parameters, the at least one sidelink carrier for establishing a sidelink control connection that supports carrier aggregation using multiple sidelink carriers, transmit, to the second UE, a second sidelink message indicating or activating the at least one sidelink carrier for establishing the sidelink control connection, and establish the sidelink control connection between the first UE and the second UE using the at least one sidelink carrier based on the second sidelink message.

In some examples of the method, apparatuses, and non-transitory computer-readable medium described herein, the second sidelink message indicates the at least one sidelink carrier as the sidelink anchor carrier.

Some examples of the method, apparatuses, and non-transitory computer-readable medium described herein may further include operations, features, means, or instructions for mapping a logic channel for sidelink control messaging to the sidelink anchor carrier and transmitting a sidelink control message on the sidelink anchor carrier.

Some examples of the method, apparatuses, and non-transitory computer-readable medium described herein may further include operations, features, means, or instructions for mapping the logic channel for sidelink control messaging to the at least one sidelink carrier and transmitting a sidelink control message on the at least one sidelink carrier.

Some examples of the method, apparatuses, and non-transitory computer-readable medium described herein may further include operations, features, means, or instructions for configuring the first UE with an initial sidelink carrier for sidelink messaging between the first UE and the second UE before establishing the sidelink control connection.

In some examples of the method, apparatuses, and non-transitory computer-readable medium described herein, the initial sidelink carrier includes a configured sidelink carrier, a pre-configured sidelink carrier, or a default sidelink carrier.

In some examples of the method, apparatuses, and non-transitory computer-readable medium described herein, measuring the one or more channel parameters of the at least one candidate sidelink carrier may include operations, features, means, or instructions for determining the at least one candidate sidelink carrier from a first set of common candidate sidelink carriers, the first set of common candidate sidelink carriers including one or more carriers common to the first set of candidate sidelink carriers and a second set of candidate sidelink carriers of the first UE.

Some examples of the method, apparatuses, and non-transitory computer-readable medium described herein may further include operations, features, means, or instructions for measuring each of the first set of common candidate sidelink carriers based on a priority associated with the first set of common candidate sidelink carriers.

Some examples of the method, apparatuses, and non-transitory computer-readable medium described herein may further include operations, features, means, or instructions for selecting the at least one sidelink carrier based on the one or more channel parameters satisfying a threshold.

In some examples of the method, apparatuses, and non-transitory computer-readable medium described herein, measuring the one or more channel parameters of the at least one candidate sidelink carrier may include operations, features, means, or instructions for measuring a CBR of the at least one candidate sidelink carrier.

Some examples of the method, apparatuses, and non-transitory computer-readable medium described herein may further include operations, features, means, or instructions for selecting the at least one sidelink carrier based on the measured one or more channel parameters of the at least one candidate sidelink carrier satisfying a threshold.

In some examples of the method, apparatuses, and non-transitory computer-readable medium described herein, transmitting the second sidelink message may include operations, features, means, or instructions for transmitting the second sidelink message over a configured sidelink carrier, a pre-configured sidelink carrier, or a default sidelink carrier.

Some examples of the method, apparatuses, and non-transitory computer-readable medium described herein may further include operations, features, means, or instructions for configuring the at least one sidelink carrier as a sidelink anchor carrier for the sidelink control connection based on the second sidelink message and communicating one or more additional sidelink control messages with the second UE using the sidelink anchor carrier.

Some examples of the method, apparatuses, and non-transitory computer-readable medium described herein may further include operations, features, means, or instructions for receiving, from the second UE, a third sidelink message indicating at least a second sidelink carrier determined by the second UE for the sidelink control connection and transmitting, to the second UE, a reconfiguration message for mapping the sidelink control connection between the first UE and the second UE to at least the second sidelink carrier as a second sidelink anchor carrier based on receiving the third sidelink message.

Some examples of the method, apparatuses, and non-transitory computer-readable medium described herein may further include operations, features, means, or instructions for communicating one or more additional sidelink control messages with the second UE using the second sidelink anchor carrier after mapping the sidelink control connection to the second sidelink anchor carrier.

In some examples of the method, apparatuses, and non-transitory computer-readable medium described herein, transmitting the second sidelink message may include operations, features, means, or instructions for transmitting the second sidelink message using the at least one sidelink carrier.

Some examples of the method, apparatuses, and non-transitory computer-readable medium described herein may further include operations, features, means, or instructions for configuring a second set of candidate sidelink carriers for the first UE, determining the at least one candidate sidelink carrier from a second set of common candidate sidelink carriers, the second set of common candidate sidelink carriers including one or more carrier common to the first set of candidate sidelink carriers and the second set of candidate sidelink carriers, transmitting a sidelink information message to a base station, the sidelink information message indicating the measured one or more channel parameters, the second set of common candidate sidelink carriers, or both, and receiving, from the base station, a configuration message indicating the sidelink carrier for establishing the sidelink control connection, where the configuration message indicates a configuration of the sidelink carrier as a sidelink anchor carrier.

In some examples of the method, apparatuses, and non-transitory computer-readable medium described herein, the at least one sidelink carrier includes a primary sidelink anchor carrier and a secondary sidelink anchor carrier for the sidelink control connection based on the second sidelink message and the second sidelink message indicates a configuration of the at least one sidelink carrier for establishing the sidelink carrier as a primary sidelink anchor carrier and a secondary sidelink anchor carrier, the second sidelink message including a RRC message or a MAC-CE.

A method for wireless communication at a second UE is described. The method may include transmitting a first sidelink message to a first UE, the first sidelink message indicating a first set of candidate sidelink carriers of the second UE for a sidelink control connection that supports carrier aggregation using multiple sidelink carriers, receiving, from the first UE, a second sidelink message indicating or activating at least one sidelink carrier of the first set of candidate sidelink carriers for establishing the sidelink control connection, and establishing the sidelink control connection between the first UE and the second UE using the at least one sidelink carrier based on the second sidelink message.

An apparatus for wireless communication at a second UE is described. The apparatus may include a processor, memory in electronic communication with the processor, and instructions stored in the memory. The instructions may be executable by the processor to cause the apparatus to transmit a first sidelink message to a first UE, the first sidelink message indicating a first set of candidate sidelink carriers of the second UE for a sidelink control connection that supports carrier aggregation using multiple sidelink carriers, receive, from the first UE, a second sidelink message indicating or activating at least one sidelink carrier of the first set of candidate sidelink carriers for establishing the sidelink control connection, and establish the sidelink control connection between the first UE and the second UE using the at least one sidelink carrier based on the second sidelink message.

Another apparatus for wireless communication at a second UE is described. The apparatus may include means for transmitting a first sidelink message to a first UE, the first sidelink message indicating a first set of candidate sidelink carriers of the second UE for a sidelink control connection that supports carrier aggregation using multiple sidelink carriers, means for receiving, from the first UE, a second sidelink message indicating or activating at least one sidelink carrier of the first set of candidate sidelink carriers for establishing the sidelink control connection, and means for establishing the sidelink control connection between the first UE and the second UE using the at least one sidelink carrier based on the second sidelink message.

A non-transitory computer-readable medium storing code for wireless communication at a second UE is described. The code may include instructions executable by a processor to transmit a first sidelink message to a first UE, the first sidelink message indicating a first set of candidate sidelink carriers of the second UE for a sidelink control connection that supports carrier aggregation using multiple sidelink carriers, receive, from the first UE, a second sidelink message indicating or activating at least one sidelink carrier of the first set of candidate sidelink carriers for establishing the sidelink control connection, and establish the sidelink control connection between the first UE and the second UE using the at least one sidelink carrier based on the second sidelink message.

In some examples of the method, apparatuses, and non-transitory computer-readable medium described herein, the second sidelink message indicates a configuration of the at least one sidelink carrier for establishing the sidelink carrier as a sidelink anchor carrier and the method, apparatuses, and non-transitory computer-readable medium may include further operations, features, means, or instructions for configuring the at least one sidelink carrier as the sidelink anchor carrier for the sidelink control connection based on the second sidelink message.

Some examples of the method, apparatuses, and non-transitory computer-readable medium described herein may further include operations, features, means, or instructions for receiving a sidelink control message using a logic channel for sidelink control messaging based on a mapping of the logic channel to the sidelink anchor carrier.

Some examples of the method, apparatuses, and non-transitory computer-readable medium described herein may further include operations, features, means, or instructions for receiving a sidelink control message using the logic channel for sidelink control messaging based on a mapping of the logic channel to the at least one sidelink carrier.

Some examples of the method, apparatuses, and non-transitory computer-readable medium described herein may further include operations, features, means, or instructions for configuring the second UE with an initial sidelink carrier for sidelink control messaging between the first UE and the second UE.

In some examples of the method, apparatuses, and non-transitory computer-readable medium described herein, the initial sidelink carrier includes a configured sidelink carrier, a pre-configured sidelink carrier, or a default sidelink carrier.

In some examples of the method, apparatuses, and non-transitory computer-readable medium described herein, the at least one sidelink carrier may be in a joint set of candidate sidelink carriers determined based on the first set of candidate sidelink carriers and a second set of candidate sidelink carriers of the first UE, and the at least one sidelink carrier may be common to the first set of candidate sidelink carriers and the second set of candidate sidelink carriers.

In some examples of the method, apparatuses, and non-transitory computer-readable medium described herein, the second sidelink message indicates the at least one sidelink carrier for establishing the sidelink control connection, the at least one sidelink carrier including a set of sidelink anchor carriers for establishing the sidelink control connection.

Some examples of the method, apparatuses, and non-transitory computer-readable medium described herein may further include operations, features, means, or instructions for receiving the second sidelink message over a configured sidelink carrier, a pre-configured sidelink carrier, or a default sidelink carrier.

Some examples of the method, apparatuses, and non-transitory computer-readable medium described herein may further include operations, features, means, or instructions for configuring the at least one sidelink carrier as a sidelink anchor carrier for the sidelink control connection based on the second sidelink message and communicating one or more additional sidelink control messages with the first UE using the sidelink anchor carrier.

Some examples of the method, apparatuses, and non-transitory computer-readable medium described herein may further include operations, features, means, or instructions for measuring one or more channel parameters of at least one candidate sidelink carrier of the first set of candidate sidelink carriers of the second UE, selecting at least a second sidelink carrier for reconfiguring the sidelink control connection based on the one or more channel parameters satisfying a threshold, transmitting, to the first UE, a third sidelink message indicating the at least the second sidelink carrier, and receiving, from the first UE, a reconfiguration message for reconfiguring the sidelink control connection between the first UE and the second UE using the at least the second sidelink carrier as a second sidelink anchor carrier based on transmitting the second sidelink control message.

Some examples of the method, apparatuses, and non-transitory computer-readable medium described herein may further include operations, features, means, or instructions for communicating one or more additional sidelink control messages with the second UE using the second sidelink anchor carrier after reconfiguring the sidelink control connection.

A method for wireless communication at a base station is described. The method may include receiving a sidelink UE information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE, selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers, and transmitting, to the first UE, a configuration message indicating the at least one sidelink carrier selected for the sidelink control connection between the first UE and the second UE or a MAC-CE activating the at least one sidelink carrier.

An apparatus for wireless communication at a base station is described. The apparatus may include a processor, memory in electronic communication with the processor, and instructions stored in the memory. The instructions may be executable by the processor to cause the apparatus to receive a sidelink UE information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE, select at least one sidelink carrier of the set of common candidate sidelink carriers for a sidelink control connection between the first UE and a second UE based on the one or more measured channel parameters, the sidelink control connection supporting carrier aggregation having multiple sidelink carriers, and transmit, to the first UE, a configuration message indicating the at least one sidelink carrier selected for the sidelink control connection between the first UE and the second UE or a MAC-CE activating the at least one sidelink carrier.

Another apparatus for wireless communication at a base station is described. The apparatus may include means for receiving a sidelink UE information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE, means for selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers, and means for transmitting, to the first UE, a configuration message indicating the at least one sidelink carrier selected for the sidelink control connection between the first UE and the second UE or a MAC-CE activating the at least one sidelink carrier.

A non-transitory computer-readable medium storing code for wireless communication at a base station is described. The code may include instructions executable by a processor to receive a sidelink UE information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE, select at least one sidelink carrier of the set of common candidate sidelink carriers for a sidelink control connection between the first UE and a second UE based on the one or more measured channel parameters, the sidelink control connection supporting carrier aggregation having multiple sidelink carriers, and transmit, to the first UE, a configuration message indicating the at least one sidelink carrier selected for the sidelink control connection between the first UE and the second UE or a MAC-CE activating the at least one sidelink carrier.

Some examples of the method, apparatuses, and non-transitory computer-readable medium described herein may further include operations, features, means, or instructions for configuring the at least one sidelink carrier as a sidelink anchor carrier for the sidelink control connection based on the sidelink information message, where the configuration message indicates a configuration of the sidelink carrier for establishing the sidelink carrier as the sidelink anchor carrier.

In some examples of the method, apparatuses, and non-transitory computer-readable medium described herein, the configuration message indicates a set of sidelink carriers of the set of common candidate sidelink carriers for establishing the sidelink control connection, the second sidelink message including a MAC-CE.

A method for wireless communication at a first UE is described. The method may include establishing a sidelink control connection between the first UE and a second UE using a first sidelink anchor carrier for the sidelink control connection, the sidelink control connection supporting carrier aggregation using multiple sidelink carriers including the first sidelink anchor carrier, identifying one or more channel parameters of one or more candidate sidelink carriers for the sidelink control connection, and transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier.

An apparatus for wireless communication at a first UE is described. The apparatus may include a processor, memory in electronic communication with the processor, and instructions stored in the memory. The instructions may be executable by the processor to cause the apparatus to establish a sidelink control connection between the first UE and a second UE using a first sidelink anchor carrier for the sidelink control connection, the sidelink control connection supporting carrier aggregation using multiple sidelink carriers including the first sidelink anchor carrier, identify one or more channel parameters of one or more candidate sidelink carriers for the sidelink control connection, and transmit, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier.

Another apparatus for wireless communication at a first UE is described. The apparatus may include means for establishing a sidelink control connection between the first UE and a second UE using a first sidelink anchor carrier for the sidelink control connection, the sidelink control connection supporting carrier aggregation using multiple sidelink carriers including the first sidelink anchor carrier, means for identifying one or more channel parameters of one or more candidate sidelink carriers for the sidelink control connection, and means for transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier.

A non-transitory computer-readable medium storing code for wireless communication at a first UE is described. The code may include instructions executable by a processor to establish a sidelink control connection between the first UE and a second UE using a first sidelink anchor carrier for the sidelink control connection, the sidelink control connection supporting carrier aggregation using multiple sidelink carriers including the first sidelink anchor carrier, identify one or more channel parameters of one or more candidate sidelink carriers for the sidelink control connection, and transmit, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier.

Some examples of the method, apparatuses, and non-transitory computer-readable medium described herein may further include operations, features, means, or instructions for transmitting a second sidelink control message or a second sidelink MAC-CE to the second UE over the second sidelink anchor carrier, the second sidelink control message indicating an updated set of candidate sidelink carriers at the first UE or the second sidelink MAC-CE activating the updated set of candidate sidelink carriers at the first UE, the updated set of candidate sidelink carriers including at least one of the one or more candidate sidelink carriers and reconfiguring the sidelink control connection between the first UE and the second UE using the second sidelink anchor carrier based on the second sidelink control message.

Some examples of the method, apparatuses, and non-transitory computer-readable medium described herein may further include operations, features, means, or instructions for receiving a reconfiguration complete message from the second UE over the second sidelink anchor carrier, the reconfiguration complete message indicating a second updated set of candidate sidelink carriers at the second UE and reconfiguring the sidelink control connection between the first UE and the second UE using the second sidelink anchor carrier based on the reconfiguration complete message.

Some examples of the method, apparatuses, and non-transitory computer-readable medium described herein may further include operations, features, means, or instructions for receiving a second sidelink control message or a second sidelink MAC-CE from the second UE over the first sidelink anchor carrier, the second sidelink control message indicating an updated set of candidate sidelink carriers at the second UE or the second sidelink MAC-CE activating the updated set of candidate sidelink carriers and reconfiguring the sidelink control connection between the first UE and the second UE using the second sidelink anchor carrier, based on receiving the second sidelink control message.

Some examples of the method, apparatuses, and non-transitory computer-readable medium described herein may further include operations, features, means, or instructions for transmitting a reconfiguration message to the second UE over the second sidelink anchor carrier, the reconfiguration message indicating a second updated set of candidate sidelink carriers at the first UE and reconfiguring the sidelink control connection between the first UE and the second UE using the second sidelink anchor carrier based on transmitting the reconfiguration message.

In some examples of the method, apparatuses, and non-transitory computer-readable medium described herein, configuring the sidelink carrier of the one or more candidate sidelink carriers as the second sidelink anchor carrier for the sidelink control connection may include operations, features, means, or instructions for mapping a logical channel for sidelink control messaging to both the first sidelink anchor carrier and the second sidelink anchor carrier.

In some examples of the method, apparatuses, and non-transitory computer-readable medium described herein, configuring the sidelink carrier of the one or more candidate sidelink carriers as the second sidelink anchor carrier for the sidelink control connection may include operations, features, means, or instructions for mapping a sidelink broadcast control channel or a sidelink common control channel for sidelink control messaging to both the first sidelink anchor carrier and the second sidelink anchor carrier.

Some examples of the method, apparatuses, and non-transitory computer-readable medium described herein may further include operations, features, means, or instructions for receiving an RRC message or a MAC-CE that activates or deactivates a configuration for the second sidelink anchor carrier as one of fallback of the first sidelink anchor carrier or duplication of the first sidelink anchor carrier.

Some examples of the method, apparatuses, and non-transitory computer-readable medium described herein may further include operations, features, means, or instructions for determining a radio link failure associated with the first sidelink anchor carrier, transmitting or receiving a second sidelink control message or a second sidelink MAC-CE based on determining the radio link failure, the second sidelink control message indicating an updated set of candidate sidelink carriers or the second sidelink MAC-CE activating the updated set of candidate sidelink carriers, and reconfiguring the sidelink control connection between the first UE and the second UE using the second sidelink anchor carrier, based on the radio link failure, the second sidelink control message, or both.

In some examples of the method, apparatuses, and non-transitory computer-readable medium described herein, transmitting the sidelink control message may include operations, features, means, or instructions for broadcasting the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

In some examples of the method, apparatuses, and non-transitory computer-readable medium described herein, transmitting the sidelink control message may include operations, features, means, or instructions for broadcasting the sidelink control message over a sidelink data channel mapped to the first sidelink anchor carrier, where the sidelink control message includes a set of SIBs.

Some examples of the method, apparatuses, and non-transitory computer-readable medium described herein may further include operations, features, means, or instructions for determining a mapping between a logic channel for a sidelink broadcast control channel and the first sidelink anchor carrier, where transmitting the sidelink control message may be based on the mapping.

Some examples of the method, apparatuses, and non-transitory computer-readable medium described herein may further include operations, features, means, or instructions for measuring a set of channel parameters associated with a set of candidate sidelink carriers for the sidelink control connection and determining the first sidelink anchor carrier from the set of candidate sidelink carriers based on one or more of the set of channel parameters satisfying a threshold.

Some examples of the method, apparatuses, and non-transitory computer-readable medium described herein may further include operations, features, means, or instructions for determining the sidelink carrier of the one or more candidate sidelink carriers as the second sidelink anchor carrier based on one or more the one or more channel parameters satisfying a threshold.

A method for wireless communication at a second UE is described. The method may include establishing a sidelink control connection between a first UE and the second UE using a first sidelink anchor carrier for the sidelink control connection, the sidelink control connection supporting carrier aggregation using multiple sidelink carriers including the first sidelink anchor carrier and receiving, from the first UE, a sidelink control message for configuring a sidelink carrier of one or more candidate sidelink carriers as a second sidelink anchor carrier for the sidelink control connection or a sidelink MAC-CE for activating the sidelink carrier as the second sidelink anchor carrier, the second sidelink anchor carrier configured for fallback of the first sidelink anchor carrier or duplication of the first sidelink anchor carrier.

An apparatus for wireless communication at a second UE is described. The apparatus may include a processor, memory in electronic communication with the processor, and instructions stored in the memory. The instructions may be executable by the processor to cause the apparatus to establish a sidelink control connection between a first UE and the second UE using a first sidelink anchor carrier for the sidelink control connection, the sidelink control connection supporting carrier aggregation using multiple sidelink carriers including the first sidelink anchor carrier and receive, from the first UE, a sidelink control message for configuring a sidelink carrier of one or more candidate sidelink carriers as a second sidelink anchor carrier for the sidelink control connection or a sidelink MAC-CE for activating the sidelink carrier as the second sidelink anchor carrier, the second sidelink anchor carrier configured for fallback of the first sidelink anchor carrier or duplication of the first sidelink anchor carrier.

Another apparatus for wireless communication at a second UE is described. The apparatus may include means for establishing a sidelink control connection between a first UE and the second UE using a first sidelink anchor carrier for the sidelink control connection, the sidelink control connection supporting carrier aggregation using multiple sidelink carriers including the first sidelink anchor carrier and means for receiving, from the first UE, a sidelink control message for configuring a sidelink carrier of one or more candidate sidelink carriers as a second sidelink anchor carrier for the sidelink control connection or a sidelink MAC-CE for activating the sidelink carrier as the second sidelink anchor carrier, the second sidelink anchor carrier configured for fallback of the first sidelink anchor carrier or duplication of the first sidelink anchor carrier.

A non-transitory computer-readable medium storing code for wireless communication at a second UE is described. The code may include instructions executable by a processor to establish a sidelink control connection between a first UE and the second UE using a first sidelink anchor carrier for the sidelink control connection, the sidelink control connection supporting carrier aggregation using multiple sidelink carriers including the first sidelink anchor carrier and receive, from the first UE, a sidelink control message for configuring a sidelink carrier of one or more candidate sidelink carriers as a second sidelink anchor carrier for the sidelink control connection or a sidelink MAC-CE for activating the sidelink carrier as the second sidelink anchor carrier, the second sidelink anchor carrier configured for fallback of the first sidelink anchor carrier or duplication of the first sidelink anchor carrier.

Some examples of the method, apparatuses, and non-transitory computer-readable medium described herein may further include operations, features, means, or instructions for receiving a second sidelink control message from the first UE over the second sidelink anchor carrier, the second sidelink control message indicating an updated set of candidate sidelink carriers at the first UE, the updated set of candidate sidelink carriers including at least one of the one or more candidate sidelink carriers and reconfiguring the sidelink control connection between the first UE and the second UE using the second sidelink anchor carrier based on the second sidelink control message.

Some examples of the method, apparatuses, and non-transitory computer-readable medium described herein may further include operations, features, means, or instructions for transmitting a reconfiguration complete message the first UE over the second sidelink anchor carrier, the reconfiguration complete message indicating a second updated set of candidate sidelink carriers at the second UE and reconfiguring the sidelink control connection between the first UE and the second UE using the second sidelink anchor carrier based on the reconfiguration complete message.

Some examples of the method, apparatuses, and non-transitory computer-readable medium described herein may further include operations, features, means, or instructions for transmitting a second sidelink control message the first UE over the first sidelink anchor carrier, the second sidelink control message indicating an updated set of candidate sidelink carriers at the second UE and reconfiguring the sidelink control connection between the first UE and the second UE using the second sidelink anchor carrier, based on transmitting the second sidelink control message, the sidelink control connection supporting carrier aggregation using multiple sidelink carriers including the second sidelink anchor carrier.

Some examples of the method, apparatuses, and non-transitory computer-readable medium described herein may further include operations, features, means, or instructions for receiving a reconfiguration message from the first UE over the second sidelink anchor carrier, the reconfiguration message indicating a second updated set of candidate sidelink carriers at the first UE and reconfiguring the sidelink control connection between the first UE and the second UE using the second sidelink anchor carrier, based on receiving the reconfiguration message.

Some examples of the method, apparatuses, and non-transitory computer-readable medium described herein may further include operations, features, means, or instructions for configuring the sidelink carrier of the one or more candidate sidelink carriers as the second sidelink anchor carrier for the sidelink control connection and mapping a logical channel for sidelink control messaging to both the first sidelink anchor carrier and the second sidelink anchor carrier.

Some examples of the method, apparatuses, and non-transitory computer-readable medium described herein may further include operations, features, means, or instructions for configuring the sidelink carrier of the one or more candidate sidelink carriers as the second sidelink anchor carrier for the sidelink control connection and mapping a sidelink broadcast control channel or a sidelink common control channel for sidelink control messaging to both the first sidelink anchor carrier and the second sidelink anchor carrier.

Some examples of the method, apparatuses, and non-transitory computer-readable medium described herein may further include operations, features, means, or instructions for transmitting an RRC message or a MAC-CE that activates or deactivates a configuration for the second sidelink anchor carrier as one of fallback of the first sidelink anchor carrier or duplication of the first sidelink anchor carrier.

Some examples of the method, apparatuses, and non-transitory computer-readable medium described herein may further include operations, features, means, or instructions for transmitting or receiving a second sidelink control message indicating an updated set of candidate sidelink carriers and reconfiguring the sidelink control connection between the first UE and the second UE using the second sidelink anchor carrier, based on the second sidelink control message.

In some examples of the method, apparatuses, and non-transitory computer-readable medium described herein, receiving the sidelink control message may include operations, features, means, or instructions for receiving the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

In some examples of the method, apparatuses, and non-transitory computer-readable medium described herein, receiving the sidelink control message may include operations, features, means, or instructions for receiving the sidelink control message over a sidelink data channel mapped to the first sidelink anchor carrier, where the sidelink control message includes a set of SIBs.

Some examples of the method, apparatuses, and non-transitory computer-readable medium described herein may further include operations, features, means, or instructions for determining the sidelink carrier of the one or more candidate sidelink carriers as the second sidelink anchor carrier based on one or more channel parameters satisfying a threshold.

Some examples of the method, apparatuses, and non-transitory computer-readable medium described herein may further include operations, features, means, or instructions for measuring one or more channel parameters of the first sidelink anchor carrier, determining to reconfigure the sidelink control connection between the first UE and the second UE using the second sidelink anchor carrier based on the one or more channel parameters of the first sidelink anchor carrier satisfying a threshold, transmitting, to the first UE, a sidelink reconfiguration message for reconfiguring the sidelink carrier of the one or more candidate sidelink carriers as the second sidelink anchor carrier for the sidelink control connection or a sidelink MAC-CE for activating the sidelink carrier as the second sidelink anchor carrier, based on the one or more channel parameters, and reconfiguring the sidelink control connection between the first UE and the second UE using the second sidelink anchor carrier based on the sidelink reconfiguration message.

In some examples of the method, apparatuses, and non-transitory computer-readable medium described herein, the sidelink control message for configuring the sidelink carrier may be received based on a measurement of one or more channel parameters.

A method for wireless communication at a first UE is described. The method may include establishing a sidelink control connection between the first UE and a second UE using a sidelink anchor carrier for the sidelink control connection, the sidelink control connection supporting carrier aggregation using multiple sidelink carriers including the sidelink anchor carrier, identifying a monitoring window for measuring the sidelink anchor carrier, a set of candidate sidelink carriers, or a combination thereof, measuring, within the monitoring window, one or more channel parameters of the sidelink anchor carrier, the set of candidate sidelink carriers, or a combination thereof, selecting, based on the one or more channel parameters, a sidelink carrier of the set of candidate sidelink carriers for the sidelink control connection, where a measured parameter associated with the sidelink carrier satisfies a threshold, and transmitting, to the second UE, a sidelink control message for configuring the sidelink carrier for the sidelink control connection between the first UE and the second UE or a sidelink MAC-CE for activating the sidelink carrier for the sidelink control connection.

An apparatus for wireless communication at a first UE is described. The apparatus may include a processor, memory in electronic communication with the processor, and instructions stored in the memory. The instructions may be executable by the processor to cause the apparatus to establish a sidelink control connection between the first UE and a second UE using a sidelink anchor carrier for the sidelink control connection, the sidelink control connection supporting carrier aggregation using multiple sidelink carriers including the sidelink anchor carrier, identify a monitoring window for measuring the sidelink anchor carrier, a set of candidate sidelink carriers, or a combination thereof, measure, within the monitoring window, one or more channel parameters of the sidelink anchor carrier, the set of candidate sidelink carriers, or a combination thereof, select, based on the one or more channel parameters, a sidelink carrier of the set of candidate sidelink carriers for the sidelink control connection, where a measured parameter associated with the sidelink carrier satisfies a threshold, and transmit, to the second UE, a sidelink control message for configuring the sidelink carrier for the sidelink control connection between the first UE and the second UE or a sidelink MAC-CE for activating the sidelink carrier for the sidelink control connection.

Another apparatus for wireless communication at a first UE is described. The apparatus may include means for establishing a sidelink control connection between the first UE and a second UE using a sidelink anchor carrier for the sidelink control connection, the sidelink control connection supporting carrier aggregation using multiple sidelink carriers including the sidelink anchor carrier, means for identifying a monitoring window for measuring the sidelink anchor carrier, a set of candidate sidelink carriers, or a combination thereof, means for measuring, within the monitoring window, one or more channel parameters of the sidelink anchor carrier, the set of candidate sidelink carriers, or a combination thereof, means for selecting, based on the one or more channel parameters, a sidelink carrier of the set of candidate sidelink carriers for the sidelink control connection, where a measured parameter associated with the sidelink carrier satisfies a threshold, and means for transmitting, to the second UE, a sidelink control message for configuring the sidelink carrier for the sidelink control connection between the first UE and the second UE or a sidelink MAC-CE for activating the sidelink carrier for the sidelink control connection.

A non-transitory computer-readable medium storing code for wireless communication at a first UE is described. The code may include instructions executable by a processor to establish a sidelink control connection between the first UE and a second UE using a sidelink anchor carrier for the sidelink control connection, the sidelink control connection supporting carrier aggregation using multiple sidelink carriers including the sidelink anchor carrier, identify a monitoring window for measuring the sidelink anchor carrier, a set of candidate sidelink carriers, or a combination thereof, measure, within the monitoring window, one or more channel parameters of the sidelink anchor carrier, the set of candidate sidelink carriers, or a combination thereof, select, based on the one or more channel parameters, a sidelink carrier of the set of candidate sidelink carriers for the sidelink control connection, where a measured parameter associated with the sidelink carrier satisfies a threshold, and transmit, to the second UE, a sidelink control message for configuring the sidelink carrier for the sidelink control connection between the first UE and the second UE or a sidelink MAC-CE for activating the sidelink carrier for the sidelink control connection.

Some examples of the method, apparatuses, and non-transitory computer-readable medium described herein may further include operations, features, means, or instructions for configuring the sidelink carrier as a second sidelink anchor carrier for the sidelink control connection between the first UE and the second UE based on the selecting and reconfiguring the sidelink control connection between the first UE and a second UE using the second sidelink anchor carrier.

In some examples of the method, apparatuses, and non-transitory computer-readable medium described herein, measuring the one or more channel parameters of the sidelink anchor carrier, the set of candidate sidelink carriers, or the combination thereof may include operations, features, means, or instructions for measuring a CBR of the sidelink anchor carrier, the set of candidate sidelink carriers, or the combination thereof, where the sidelink carrier for the sidelink control connection may be selected based on the measured CBR associated with the sidelink anchor carrier satisfying a CBR threshold.

Some examples of the method, apparatuses, and non-transitory computer-readable medium described herein may further include operations, features, means, or instructions for configuring the sidelink carrier as a second sidelink carrier for the sidelink control connection between the first UE and the second UE based on the selecting and reconfiguring the sidelink control connection between the first UE and a second UE using the second sidelink carrier.

A method for wireless communication at a second UE is described. The method may include establishing a sidelink control connection between a first UE and the second UE using a sidelink anchor carrier for the sidelink control connection, the sidelink control connection supporting carrier aggregation using multiple sidelink carriers including the sidelink anchor carrier, identifying a monitoring window for measuring the sidelink anchor carrier, a set of candidate sidelink carriers, or a combination thereof, measuring, within the monitoring window, one or more channel parameters of the sidelink anchor carrier, the set of candidate sidelink carriers, or a combination thereof, and receiving, from the first UE, a sidelink control message for configuring a sidelink carrier for the sidelink control connection between the first UE and the second UE or a sidelink MAC-CE for activating the sidelink carrier for the sidelink control connection.

An apparatus for wireless communication at a second UE is described. The apparatus may include a processor, memory in electronic communication with the processor, and instructions stored in the memory. The instructions may be executable by the processor to cause the apparatus to establish a sidelink control connection between a first UE and the second UE using a sidelink anchor carrier for the sidelink control connection, the sidelink control connection supporting carrier aggregation using multiple sidelink carriers including the sidelink anchor carrier, identify a monitoring window for measuring the sidelink anchor carrier, a set of candidate sidelink carriers, or a combination thereof, measure, within the monitoring window, one or more channel parameters of the sidelink anchor carrier, the set of candidate sidelink carriers, or a combination thereof, and receive, from the first UE, a sidelink control message for configuring a sidelink carrier for the sidelink control connection between the first UE and the second UE or a sidelink MAC-CE for activating the sidelink carrier for the sidelink control connection.

Another apparatus for wireless communication at a second UE is described. The apparatus may include means for establishing a sidelink control connection between a first UE and the second UE using a sidelink anchor carrier for the sidelink control connection, the sidelink control connection supporting carrier aggregation using multiple sidelink carriers including the sidelink anchor carrier, means for identifying a monitoring window for measuring the sidelink anchor carrier, a set of candidate sidelink carriers, or a combination thereof, means for measuring, within the monitoring window, one or more channel parameters of the sidelink anchor carrier, the set of candidate sidelink carriers, or a combination thereof, and means for receiving, from the first UE, a sidelink control message for configuring a sidelink carrier for the sidelink control connection between the first UE and the second UE or a sidelink MAC-CE for activating the sidelink carrier for the sidelink control connection.

A non-transitory computer-readable medium storing code for wireless communication at a second UE is described. The code may include instructions executable by a processor to establish a sidelink control connection between a first UE and the second UE using a sidelink anchor carrier for the sidelink control connection, the sidelink control connection supporting carrier aggregation using multiple sidelink carriers including the sidelink anchor carrier, identify a monitoring window for measuring the sidelink anchor carrier, a set of candidate sidelink carriers, or a combination thereof, measure, within the monitoring window, one or more channel parameters of the sidelink anchor carrier, the set of candidate sidelink carriers, or a combination thereof, and receive, from the first UE, a sidelink control message for configuring a sidelink carrier for the sidelink control connection between the first UE and the second UE or a sidelink MAC-CE for activating the sidelink carrier for the sidelink control connection.

Some examples of the method, apparatuses, and non-transitory computer-readable medium described herein may further include operations, features, means, or instructions for configuring the sidelink carrier as a second sidelink anchor carrier for the sidelink control connection between the first UE and the second UE based on the sidelink control message and reconfiguring the sidelink control connection between the first UE and a second UE using the second sidelink anchor carrier.

Some examples of the method, apparatuses, and non-transitory computer-readable medium described herein may further include operations, features, means, or instructions for configuring the sidelink carrier as a second sidelink carrier for the sidelink control connection between the first UE and the second UE based on the sidelink control message and reconfiguring the sidelink control connection between the first UE and a second UE using the second sidelink carrier.

Some examples of the method, apparatuses, and non-transitory computer-readable medium described herein may further include operations, features, means, or instructions for transmitting, to the first UE, a reconfiguration complete message confirming the configuring of the sidelink carrier for the sidelink control connection.

Some examples of the method, apparatuses, and non-transitory computer-readable medium described herein may further include operations, features, means, or instructions for transmitting, to the first UE, a reconfiguration denied message rejecting the configuring of the sidelink carrier for the sidelink control connection, the reconfiguration denied message including a second set of candidate sidelink carriers for the sidelink control connection between the first UE and the second UE.

DETAILED DESCRIPTION

Figure 1:
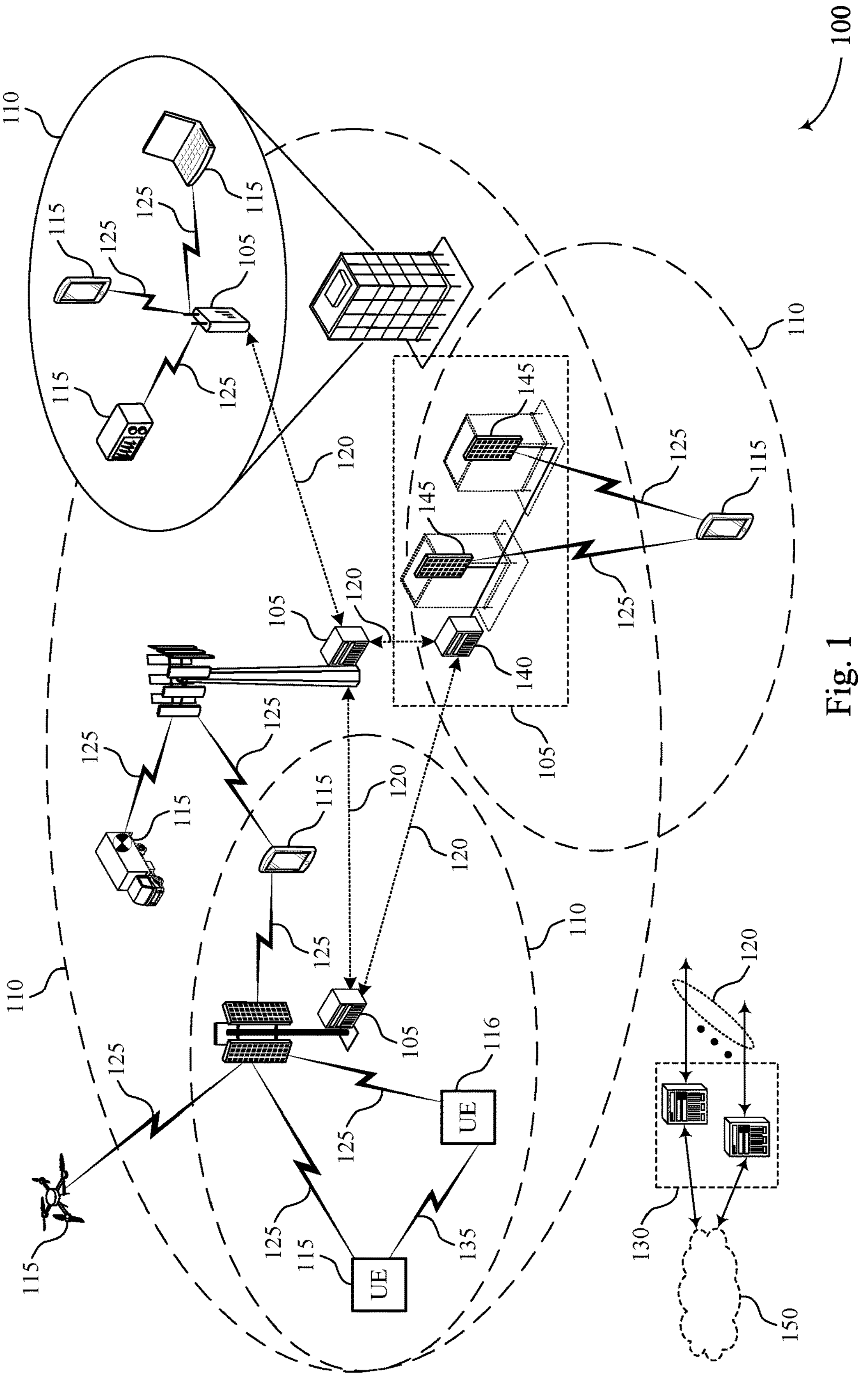
FIG. 1 illustrates an example of a wireless communications system that supports techniques for sidelink control connection with carrier aggregation in accordance with aspects of the present disclosure.

Some wireless communications systems may support sidelink communications. Sidelink communications may allow direct communication between two or more user equipment (UEs). It is noted that while various examples provided herein are discussed for UE sidelink devices, such sidelink techniques may be used for any type of wireless devices that use sidelink communications. For example, a sidelink may support one or more of device-to-device (D2D) communication, vehicle-to-vehicle (V2V) communication, vehicle-to-everything (V2X) communication, and the like.

Some wireless communications system may support carrier aggregation in sidelink communications. Carrier aggregation may support higher data rates and flexibility, for example, using different available sidelink carrier frequencies. However, although some wireless communications system may support carrier aggregation for communicating sidelink data, techniques supportive of carrier aggregation for sidelink control signals (e.g., PC5 RRC connections) are desired. The described techniques support carrier aggregation for control signals (e.g., PC5 radio resource control (RRC) interface).

In some wireless communications systems, carrier aggregation may be supported for V2X sidelink communications (e.g., using 4G or LTE technologies). For example, for a V2X sidelink communication, one independent HARQ entity may be used per carrier used for the V2X sidelink communication. Each transport block associated with the V2X sidelink communication, and potential HARQ retransmissions thereof, may be mapped to a single carrier. In some cases, multiple transport blocks may be transmitted in parallel on different carriers, which may provide increases in throughput.

For sidelink carrier aggregation in resource allocation mode 3, using a dynamic grant may be managed (e.g., by a base station) similar to carrier aggregation on a Uu interface by including a carrier indication field (CIF) in downlink control information (DCI) from the base station. For sidelink carrier aggregation in resource allocation mode 4, a UE may use a sensing procedure to select resources independently for each carrier. In some cases, for a sidelink process, the same carrier is used for all transport blocks at least until the process triggers carrier reselection.

However, in some cases, carrier aggregation may not yet be supported for V2X sidelink communications using other communication technologies (e.g., using NR technologies).

In sidelink communications, a sidelink control connection (e.g., PC5 RRC connection) may provide a logical connection supportive of V2X unicast communications (e.g., using NR technology) between a set of UEs. In some systems, for the AS protocol stack for the control plane in the PC5 interface, PC5 RRC signaling may support communication or indication of an AS layer configuration. The AS layer configuration may include parameters to be aligned between a transmitting UE and a receiving UE. In some cases, when the AS layer configuration fails, an explicit failure message or a timer-based indication may be communicated to a peer UE to indicate the failure.

Sidelink communications may support capability signaling via a PC5 RRC connection. For example, a UE may indicate respective UE capability to another UE via a PC5 RRC connection. For example, the UE may send a capability enquiry message to the other UE. In an example, the capability enquiry message may include a request for capability information associated with the other UE. In some examples, the capability enquiry message may include or exclude the capability information of the requesting UE.

Additionally, sidelink communications may support sidelink radio link monitoring (RLM) and radio link failure (RLF). For example, sidelink RLM/RLF may be supported for unicast sidelink communications (e.g., using NR technology). For example, a PC5 RRC connection supportive of sidelink communications may be established between a UE and another UE. In an example, the UE may detect a PC5 RLF and declare the radio link RLF (e.g., radio link RLF declaration) on PC5. Based on the declaration, the UE may release the PC5 RRC connection and transmit an indication to upper layer. In some examples, for RRC connected UEs, the UE may inform the network via sidelink UE information based on detecting a PC5 RLF.

However, in some cases, a sidelink control connection (e.g., PC5 RRC connection) may not yet be supported for V2X unicast communications using other communication technologies (e.g., using 4G or LTE).

In some aspects, sidelink carrier aggregation for sidelink communications (e.g., using NR technologies) may provide increased data rates. For example, sidelink carrier aggregation for sidelink communications (e.g., using NR technologies) may support increased data rates (e.g., 3 Gbps) associated with service requirements defined for V2X and commercial use applications. For example, some sidelink communications (e.g., NR V2X) supportive of a single sidelink carrier may benefit from increased data rates on a sidelink connection.

In some aspects, sidelink carrier aggregation for sidelink communications (e.g., using NR technologies) may provide additional carrier frequencies and operation scenarios, which may support increased flexibility for operations in a sidelink spectrum (e.g., using NR technologies). For example, sidelink carrier aggregation (e.g., using NR technologies) may provide for increased flexibility and capability with respect to service-to-carrier mapping and combinations of sidelink carriers in licensed frequency spectrum bands and intelligent transportation systems (ITS) carriers. In some examples, sidelink carrier aggregation (e.g., using NR technologies) may support frequency spectrum bands such as FR2 (e.g., above 24.250~52.6 GHz, millimeter wave (mmW)) in addition to FR1 (e.g., below 7.225 GHz). Carrier aggregation in sidelink communications (e.g., using NR technologies) may support higher data rates and operation flexibility using different available sidelink carrier frequencies.

In some cases, some sidelink communications involving static carrier component configurations or service-to-carrier mapping based configurations may not support some QoS performance requirements such as reliability and latency. For example, a higher data rate may rely on opportunistic aggregation of all available carriers (including a set of carrier components having a higher diversity compared to some carrier aggregation techniques). In some aspects, such aggregation may include operating with carriers in the mmW frequency spectrum bands or carriers in the unlicensed frequency spectrum bands. For example, flexible management of carrier component may provide support for aperiodic traffic with more dynamic requirements. In some cases, using carrier aggregation, a UE may address power considerations with widely aggregated carriers, for example, by adjusting the quantity of aggregated carrier components based on data traffic of a service (e.g., when sending video or image files associated with emergency services or driving trajectories).

In some cases, as the incorporation of higher bands (e.g., FR2 or mmW) or unlicensed in sidelink communications where the channel conditions have become more dynamic. Techniques for increasing dynamic control with more available carrier components and different carrier combinations (e.g., actual carrier components aggregated vs. carrier components selected) may be beneficial to sidelink communications. In some cases, as the number of available services and carriers has increased, the available service-to-carrier mappings has increased. A UE participating in different applications or services may benefit from techniques for adapting more dynamically to the different applications or services (e.g., different operations). For example, aggregation techniques using a variety of carrier components may support Ultra-Reliable Low Latency Communication (URLLC) for applications or services (e.g., for vehicle automation or industrial Internet of Things (IoT) devices).

As described, to support more dynamic carrier aggregation (e.g., using NR technologies), cooperation by a UE via sidelink control connections (e.g., PC5 RRC connection) is desired.

In accordance with various aspects of the present disclosure, the described techniques provide for establishing (reestablishing) or maintaining a sidelink control connection (e.g., PC5 RRC connection) using a sidelink carrier (also referred to herein as a sidelink carrier component). In some aspects, the described techniques support monitoring the sidelink control connection over the sidelink carrier.

For example, a device (e.g., a UE) may establish (reestablish) or maintain a sidelink control connection (e.g., PC5 RRC connection) with another device (e.g., a UE) using a sidelink carrier. The sidelink control connection may support carrier aggregation. The device may select the sidelink carrier from a set of candidate sidelink carriers common to both the device and the other device, based on measured channel parameters (e.g., channel busy ratio (CBR)) of the candidate sidelink carriers. For example, the device may select the sidelink carrier based on a measured channel parameter of the sidelink carrier satisfying a threshold. In an example, the device select the sidelink carrier based on the CBR of the sidelink carrier being less than a CBR threshold.

The device may transmit, to the other device, a sidelink message. In an example, the sidelink message may be a PC5 RRC message indicating the selected sidelink carrier. In another example, the sidelink message may be a PC5 MAC-CE activating the selected sidelink carrier. In an example, the device may transmit the sidelink message using an initial sidelink carrier In another example, the device may transmit the sidelink message using the selected sidelink carrier. In some aspects, the base station 315 may select the sidelink carrier based on the measured channel parameters (e.g., as received from the device). In an example, the base station may transmit, to the device, a RRC message indicating the selected sidelink carrier or a MAC-CE activating the selected sidelink carrier. The device (or the base station) may set the sidelink carrier as a sidelink anchor carrier (also referred to herein as a sidelink anchor carrier component) for the sidelink control connection. Example aspects of establishing (reestablishing) or maintaining a sidelink control connection (e.g., PC5 RRC connection) using a sidelink carrier and monitoring the same are described herein.

In accordance with various aspects of the present disclosure, the described techniques provide for improving reliability of an established sidelink control connection (e.g., PC5 RRC connection). In some aspects, the described techniques support establishing the sidelink control connection (e.g., PC5 RRC connection) using a primary sidelink anchor carrier and reconfiguring the sidelink control connection (e.g., PC5 RRC connection) using a secondary sidelink anchor carrier.

For example, the device may establish (reestablish) or maintain a sidelink control connection (e.g., PC5 RRC connection) with the other device using a primary sidelink anchor carrier. The sidelink control connection may support carrier aggregation. The device may remap (e.g., reconfigure) the sidelink control connection using a secondary sidelink anchor carrier. In some aspects, the device may map (e.g., configure) the secondary sidelink anchor carrier as a fallback for or a duplication of the first sidelink anchor carrier. The device may select the sidelink anchor carriers (e.g., primary sidelink anchor carrier, secondary sidelink anchor carrier) based on channel parameters associated with the sidelink anchor carriers. For example, the device may select the sidelink anchor carriers (e.g., primary sidelink anchor carrier, secondary sidelink anchor carrier) based on a channel busy ratio (CBR) or a reference signal received power (RSRP) or a received signal strength indication (RSSI). In some examples, the device may measure the CBR, the RSRP, or the RSSI over a monitoring window. Example aspects of establishing (reestablishing) or maintaining the sidelink control connection (e.g., PC5 RRC connection) using a primary sidelink anchor carrier and mapping (e.g., configuring) the sidelink control connection (e.g., PC5 RRC connection) to a secondary sidelink anchor carrier are described herein.

In accordance with various aspects of the present disclosure, the described techniques provide for monitoring and recovery of an established sidelink control connection (e.g., PC5 RRC connection) while avoiding sidelink radio link failure (RLF) (i.e., PC5 RLF).

For example, the device may establish (reestablish) or maintain a sidelink control connection (e.g., PC5 RRC connection) with the other device using a first sidelink anchor carrier. The device may measure, over a monitoring window, channel parameters (e.g., CBR, RSRP, RSSI, etc.) of or other feedback (e.g., acknowledgement (ACK) or negative acknowledgement (NACK), channel state information (CSI) report, etc.) on the sidelink anchor carrier or candidate sidelink carriers. The device may use a second sidelink anchor carrier (e.g., from the candidate sidelink carriers) for the sidelink control connection. In an example, the device may map the second sidelink anchor carrier for the sidelink control connection, without releasing and reestablishing radio bearers (e.g., sidelink signal radio bearers (SRBs), sidelink data radio bearers (DRBs).

In some aspects, refraining from releasing or reestablishing radio bearers may prevent or mitigate occurrences of PC5 RLF (e.g., a failure by the device or the other device to establish (reestablish) a connection to another device). The device may transmit a first sidelink message to the other device, which may be a PC5 RRC message for configuring the second sidelink anchor carrier for the sidelink control connection or a PC5 MAC-CE to activate the second sidelink anchor carrier for the sidelink control connection. In some examples, the other device may transmit, to the device, a second message, which may be a PC5 RRC message to respond the PC5 RRC message or an ACK or NACK to the PC5 MAC-CE carried in the first message, accepting or rejecting the second sidelink anchor carrier. Example aspects of monitoring and recovery of an established (reestablished) sidelink control connection (e.g., PC5 RRC connection) while avoiding PC5 RLF are described herein.

Aspects of the subject matter described herein may be implemented to realize one or more advantages. In some aspects, the described techniques may provide for dynamic carrier aggregation with a reliable sidelink control connection (e.g., PC5 RRC connection) between devices, which may support improvements in spectral efficiency and reliability (e.g., in the FR1 and FR2 frequency spectrum bands), among other advantages. For example, FR2 frequency spectrum bands may utilize relatively narrower beams providing a higher bandwidth and increased throughput, but may be affected by increased attenuation and signal blocking. Carrier aggregation for the sidelink control connection (e.g., PC5 RRC connection) may provide improved reliability and connectivity for the sidelink control messaging. In some other aspects, the described techniques for monitoring and recovery of an established sidelink control connection (e.g., PC5 RRC connection), while avoiding PC5 RLF, may provide for decreasing signaling overhead, improving reliability, increased connection efficiency, and reduced latency, among other advantages. For example, by avoiding PC5 RLF, delays associated with establishing the sidelink control connection (e.g., PC5 RRC connection) may be reduced. As such, supported techniques may include improved sidelink operations and, in some examples, may promote sidelink efficiencies, among other benefits.

Aspects of the disclosure are initially described in the context of a wireless communications system. Examples of processes and signaling exchanges that support techniques for sidelink control connection with carrier aggregation are then described. Aspects of the disclosure are further illustrated by and described with reference to apparatus diagrams, system diagrams, and flowcharts that relate to techniques for sidelink control connection with carrier aggregation.

FIG. 1 illustrates an example of a wireless communications system 100 that supports techniques for sidelink control connection with carrier aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, a vehicle, or a pedestrian UE. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink carrier components and one or more uplink carrier components according to a carrier aggregation configuration. The UE 115 may be configured with multiple sidelink carrier components according to a carrier aggregation configuration. Carrier aggregation may be used with both frequency division duplexing (FDD) and time division duplexing (TDD) carrier components.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple carrier components.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a direct communication link 135 (e.g., using a peer-to-peer (P2P) or device-to-device (D2D) protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the direct communication link 135 may be an example of a communication channel, such as a sidelink communication channel, between vehicles or between vehicle and everything (e.g., between UE 115 and UE 116, where UE 115 and UE 116 may be inside or outside of the coverage area 110 of the base station 105). In some examples, vehicles may communicate using vehicle-to-everything (V2X) communications, vehicle-to-vehicle (V2V) communications, vehicle-to-pedestrian (V2P) communications, pedestrian-to-vehicle (P2V) communications or some combination of these. The V2X communications may be broadcast, groupcast, or unicast on a communication link 135 (e.g., where the communication link 135 is a PC5 link). A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, or between a UE 115 and the UE 116, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with carrier components operating in a licensed band (e.g., LAA). Operations in unlicensed spectrum may include downlink transmissions, uplink transmissions, P2P transmissions, V2X transmissions, or D2D transmissions, among other examples. Another example is V2X transmissions on intelligent transport system (ITS) band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. The UEs 115 and base stations 105 may support HARQ on sidelink for unicast or groupcast communications between a transmitting UE 115 and receiving UEs 115.

In accordance with various aspects of the present disclosure, the described techniques provide for establishing a sidelink control connection (e.g., PC5 RRC connection) using a sidelink carrier (also referred to herein as a sidelink carrier component). In some aspects, the described techniques support monitoring the sidelink control connection over the sidelink carrier.

For example, the UE 115 may establish (reestablish) and/or a sidelink control connection (e.g., PC5 RRC connection) with a UE 116 using a sidelink carrier, where UE 115 or UE 116 may be inside or outside of the coverage area 110 of the base station 105. The UE 116 may be an example of the UE 115. The sidelink control connection may support carrier aggregation. The UE 115 may select the sidelink carrier from a set of candidate sidelink carriers common to both UE 115 and UE 116, based on measured channel parameters (e.g., channel busy ratio (CBR)) of the candidate sidelink carriers. For example, the UE 115 may select the sidelink carrier based on a measured channel parameter of the sidelink carrier satisfying a threshold. In an example, the UE 115 select the sidelink carrier based on the CBR, RSRP, or RSSI of the sidelink carrier being less than a threshold.

The UE 115 may transmit, to the UE 116, a first sidelink message which may be a PC5 RRC message indicating the selected sidelink carrier or a PC5 MAC-CE activating the selected sidelink carrier. In an example, the UE 115 may transmit the first sidelink control message using an initial or default sidelink carrier or using the selected sidelink carrier. In some aspects, the base station 105 may select the sidelink carrier based on the measured channel parameters (e.g., as received from the UE 115). In an example, the base station 105 may transmit, to the UE 115, a configuration message indicating the selected sidelink carrier or a MAC-CE activating the selected sidelink carrier. The UE may use the selected sidelink carrier for the sidelink control connection. In an example, the base station 105 may transmit, to the UE 115, a configuration message indicating the selected sidelink carrier as a sidelink anchor carrier (also referred to herein as a sidelink anchor carrier component) or a MAC-CE activating the selected sidelink carrier as a sidelink anchor carrier. The UE 115 may set (e.g., configure) the sidelink carrier as a sidelink anchor carrier for the sidelink control connection. In an example, the UE 115 may forward or relay the received configuration message or MAC-CE from the base station 105 to another UE(s) 115 which may be out of the coverage area 110. Example aspects of establishing (reestablishing) and/or maintaining a sidelink control connection (e.g., PC5 RRC connection) using a sidelink carrier and monitoring the same are described with reference to FIGS. 4 through 7.

In accordance with various aspects of the present disclosure, the described techniques provide for improving reliability of an established sidelink control connection (e.g., PC5 RRC connection). In some aspects, the described techniques support establishing (reestablishing) or maintaining the sidelink control connection (e.g., PC5 RRC connection) using a primary sidelink anchor carrier and using a secondary sidelink anchor carrier.

For example, the UE 115 may establish (reestablish) or maintain a sidelink control connection (e.g., PC5 RRC connection) with the UE 116 using a primary sidelink anchor carrier. The sidelink control connection may support carrier aggregation. The UE 115 may map the sidelink control connection using a secondary sidelink anchor carrier. In some aspects, the UE 115 may use the secondary sidelink anchor carrier as a fallback for the first sidelink anchor carrier to replace the first sidelink anchor carrier or a duplication of the first sidelink anchor carrier to repeat transmissions on the first sidelink anchor carrier. The UE 115 may select the sidelink anchor carriers (e.g., primary sidelink anchor carrier, secondary sidelink anchor carrier) based on channel parameters associated with the sidelink anchor carriers. For example, the UE 115 may select the sidelink anchor carriers (e.g., primary sidelink anchor carrier, secondary sidelink anchor carrier) based on a channel busy ratio (CBR) or a reference signal received power (RSRP) or a received signal strength indicator (RSSI). In some examples, the UE 115 may measure the CBR, the RSRP, or the RSSI over a monitoring window. Example aspects of establishing (reestablishing) or maintaining the sidelink control connection (e.g., PC5 RRC connection) using a primary sidelink anchor carrier and using a secondary sidelink anchor carrier are described with reference to FIG. 8.

In accordance with various aspects of the present disclosure, the described techniques provide for monitoring and recovery of an established (reestablished) sidelink control connection (e.g., PC5 RRC connection) while avoiding radio link failure (RLF).

For example, the UE 115 may establish (reestablish) or maintain a sidelink control connection (e.g., PC5 RRC connection) with the UE 116 using a first sidelink anchor carrier. The UE 115 may measure, over a monitoring window, channel parameters (e.g., CBR, RSRP, RSSI, etc.) of the sidelink anchor carrier or candidate sidelink carriers. The UE 115 may use (e.g., configure) a second sidelink anchor carrier (e.g., from the candidate sidelink carriers) for the sidelink control connection. In an example, the UE 115 may switch to (e.g., configure) the second sidelink anchor carrier for the sidelink control connection, without releasing and reestablishing radio bearers (e.g., sidelink signal radio bearers (SRBs), sidelink data radio bearers (DRBs).

In some aspects, refraining from releasing or reestablishing radio bearers may prevent or mitigate occurrences of PC5 RLF (e.g., a failure by the UE 115 or the UE 116 to establish (reestablish) or maintain a connection to the other UE). The UE 115 may transmit a first sidelink message which may be a PC5 RRC message to the UE 116 for configuring the second sidelink anchor carrier for the sidelink control connection or a PC5 MAC-CE to the UE 116 for activating the second sidelink anchor carrier for the sidelink control connection. In some examples, the UE 116 may transmit, to the UE 115, a second message which may be a PC5 RRC response message accepting or rejecting the second sidelink anchor carrier or an ACK or NACK to the PC5 MAC-CE. Example aspects of monitoring and recovery of an established sidelink control connection (e.g., PC5 RRC connection) while avoiding PC5 RLF are described with reference to FIGS. 9 and 10.

Figure 2:
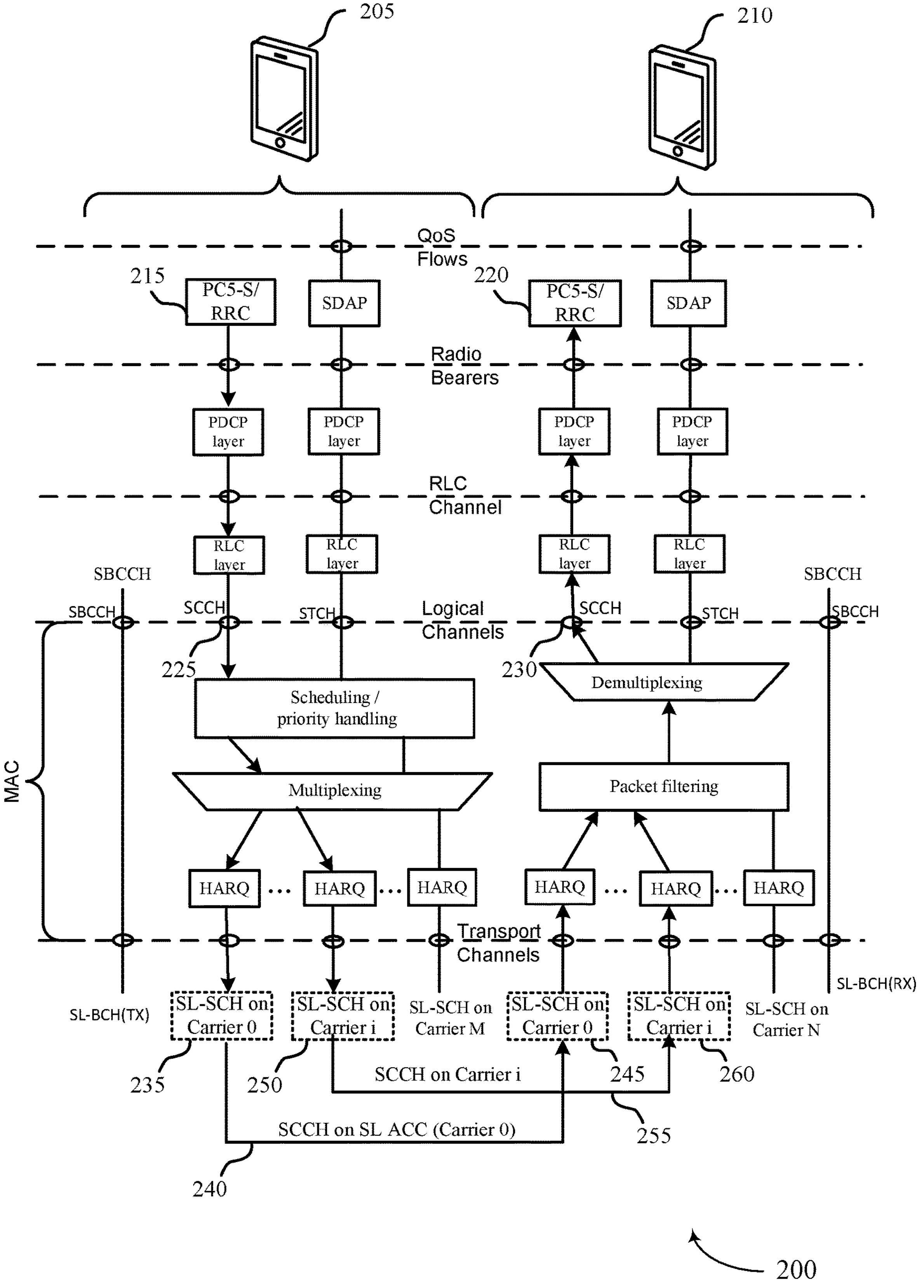
FIG. 2 illustrates an example of a wireless communications system that supports techniques for sidelink control connection with carrier aggregation in accordance with aspects of the present disclosure.

FIG. 2 illustrates an example protocol stack of a wireless communications system 200 that supports techniques for sidelink control connection with carrier aggregation in accordance with aspects of the present disclosure. In some examples, the wireless communications system 200 may implement aspects of wireless communication system 100 described with reference to FIGS. 1 and 2. The wireless communications system 200 may include a UE 205 and a UE 210. The UE 205 may be an example of a UE 115 (or a UE 116) described with reference to FIG. 1. The UE 210 may be an example of the UE 116 (or another UE 115) described with reference to FIG. 1. UE 115 or UE 116 may be inside or outside a coverage area 110 of a base station 105. In the example of the wireless communications system 200, the UE 205 may be a transmitting UE, and the UE 210 may be a receiving UE. Additionally, or alternatively, the UE 205 may be a receiving UE, and the UE 210 may be a transmitting UE.

Example aspects of message exchanges between the UE 205 and the UE210 for establishing, reestablishing, or maintaining a sidelink control connection using a carrier (or carriers) are described herein. For example, the described techniques provide for establishing a sidelink control connection (e.g., PC5 RRC connection) using a sidelink carrier (also referred to herein as a sidelink carrier component). Example aspects of information exchanges between the UE 205 and the UE210 over a sidelink control connection are also described. The described techniques support monitoring the sidelink control connection over the sidelink carrier.

In the wireless communications system 200, the UE 205 and the 210 may communicate using respective service data adaptation protocol (SDAP) layers, packet data convergence protocol (PDCP) layers, radio link control (RLC) layers, and medium access control (MAC) layers. The SDAP layer may provide mapping between a QoS flow and a data radio bearer. In some cases, the SDAP layers may mark QoS flow identifiers (QFI) in both downlink and uplink packets. The PDCP layer may provide services to the control plane and user plane upper layers. For example, the PDCP layers may provide, to the user plane upper layers, services such as the transfer of user plane data, the transfer of control plane data, header compression, ciphering, and integrity protection. To the control plane, the PDCP layers may provide services such as sequence numbering, ciphering, integrity protection, transfer of control plane data, duplicate detection, and duplication of PDCP PDUs.

The RLC layer may provide services such as the transfer of upper layer PDUs, sequence numbering, error correction through ARQ, segmentation and re-segmentation, reassembly of SDUs, discarding of RLC SDUs, and RLC re-establishment. The MAC layer may provide services such as mapping between logical channels and transport channels, multiplexing of MAC SDUs belonging to one or different logical channels into transport blocks (TBs) delivered to the physical layer on transport channels, demultiplexing of MAC SDUs belonging to one or different logical channels from TBs delivered from the physical layer on transport channels, scheduling information reporting, error correction through HARQ, priority handling between the UE 205 and the UE 210 (e.g., by dynamic scheduling), priority handling between logical channels of a UE (e.g., UE 205, UE 210), and padding. At the MAC layer, each HARQ entities may correspond to a respective carriers.

In the wireless communications system 200, sidelink carrier aggregation may be enabled (e.g., through control signaling from a base station 105 (as shown in FIG. 1)) for the UE 205 and the UE 210. The UE 205 and the UE 210 may establish (reestablish) or maintain a sidelink control connection (e.g., PC5 RRC connection) using one or multiple sidelink carriers (e.g., Carrier i, Carrier 0). The sidelink carriers may support (e.g., transport, carry) message exchanges between the UE 205 and the UE 210 for establishing, reestablishing, or maintaining a sidelink control connection (e.g., using messages such as PC5-S or RRCReconfigurationSidelink, etc.) such as PC5-S/RRC 215 and PC5-S/RRC 220. The sidelink carriers may support sidelink information exchanges (e.g., using messages such as RRCReconfigurationSidelink, UECapabilityEquirySidelink, UE CapabilityInformationSidelink, MeasurementReportSidelink, etc.) between the UE 205 and the UE 210.

In some examples, the PC5 RRC connection and message exchanges between UEs may be transmitted on sidelink anchor carriers (also referred to herein as sidelink anchor carrier components (SACCs)). For example, a logical channel (e.g., sidelink control channel (SCCH) 225, SCCH 230) for a PC5 RRC message may be mapped to a sidelink anchor carrier (e.g., carrier 0). In some aspects, the sidelink anchor carrier (e.g., carrier 0) may be a FR1 carrier (carrier component) configured for FR1 and FR2 or mmW inter-band sidelink carrier aggregation. In some other aspects, the sidelink anchor carrier (e.g., carrier 0) may be a licensed carrier (carrier component) configured for licensed or unlicensed inter-band sidelink aggregation. In an example, the UE 205 may transmit (and the UE 210 may receive) a PC5 RRC message over respective transport channels (e.g., SL-SCH 235, SL-SCH 245, as shown at 240).

In some other examples, the PC5 RRC connection and message exchanges between UEs may be transmitted on dynamically selected sidelink carrier components (also referred to herein as sidelink carrier components (SCCs). For example, a logical channel SCCH (e.g., SCCH 225, SCCH 230) for a PC5 RRC message may be mapped to a dynamically selected sidelink carrier (e.g., carrier i). In some aspects, the sidelink carrier (e.g., carrier i) may be dynamically selected for FR2 or mmW intra-band sidelink carrier aggregation. In some other aspects, the sidelink carrier (e.g., carrier i) may be dynamically selected for unlicensed intra-band sidelink aggregation. In an example, the UE 205 may transmit (and the UE 210 may receive) a PC5 RRC message over respective transport channels (e.g., SL-SCH 250, SL-SCH 260, as shown at 255).

Figure 3:
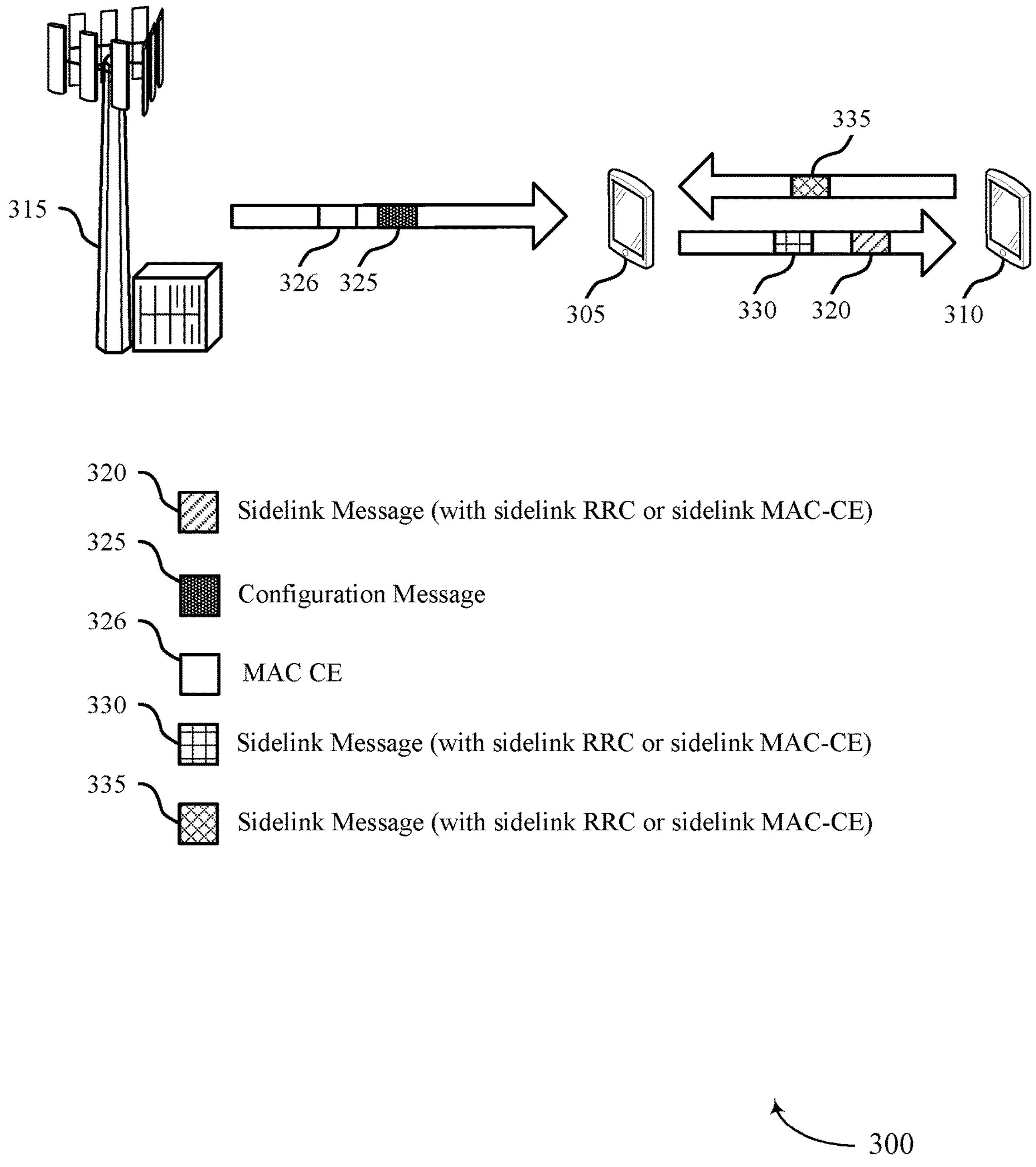
FIG. 3 illustrates an example of a wireless communications system that supports techniques for sidelink control connection with carrier aggregation in accordance with aspects of the present disclosure.

FIG. 3 illustrates an example of a wireless communications system 300 that supports techniques for sidelink control connection with carrier aggregation in accordance with aspects of the present disclosure. In some examples, wireless communications system 300 may implement aspects of wireless communication system 100 or wireless communications system 200 described with reference to FIGS. 1 and 2. The wireless communications system 300 may include a UE 305, a UE 310, and a base station 315. The UE 305 may be an example of a UE 115 described with reference to FIG. 1 or the UE 205 described with reference to FIG. 2. The UE 310 may be an example of a UE 115 or UE 116 described with reference to FIG. 1 or the UE 210 described with reference to FIG. 2. The base station 315 may be an example of a base station 105 described with reference to FIG. 1.

In some cases, the wireless communications system 300 may utilize control signaling to schedule resources for the UE 305 and the UE 310 to perform sidelink communications. Additionally or alternatively, the UE 305 and the UE 310 may utilize shared information to enhance scheduling, inter-UE coordination, and communications flexibility. In some examples, the UE 305 and the UE 310 may communicate with each other (e.g., within a V2X system, a D2D system, and the like) and may employ sidelink transmissions to save power, reduce latency, and ensure reliable communications.

The wireless communications system 300 may support both access links and sidelinks for communications between one or more communication devices. An access link may refer to a communication link between a UE (e.g., UE 305, UE 310) and the base station 315. A sidelink may refer to any direct communication link between similar wireless devices (e.g., a communication link between the UE 305 and the UE 310, or a backhaul communication link between the base station 315 and another base station). It is noted that while various examples provided herein are discussed for sidelink devices, such sidelink techniques may be used for any type of wireless devices that use sidelink communications. For instance, some examples of sidelink communications may be D2D communication, V2V communication, V2X communication and the like. The wireless communications system 300 may support one or more of D2D communications, V2X or V2V communications, message relaying, discovery signaling, beacon signaling, or other signals transmitted over-the-air from one UE to one or more other UEs.

In some examples, the UE 305 and the UE 310 may communicate with each other via a sidelink connection. In some examples, sidelink communications may be utilized in different ways depending on an associated random access technology (RAT). For example, NR V2X communication may be utilized for platooning and sensor sharing, whereas LTE V2X communication may be utilized for basic safety messages (BSMs).

In accordance with various aspects of the present disclosure, the described techniques provide for establishing (reestablishing) or maintaining a sidelink control connection (e.g., PC5 RRC connection) using a sidelink carrier (also referred to herein as a sidelink carrier component). In some aspects, the described techniques support monitoring the sidelink control connection over the sidelink carrier.

For example, the UE 305 may establish (reestablish) or maintain a sidelink control connection (e.g., PC5 RRC connection) with the UE 310 using a sidelink carrier. The sidelink control connection may support carrier aggregation. The UE 305 may select the sidelink carrier from a set of candidate sidelink carriers common to both UE 305 and UE 310, based on measured channel parameters (e.g., channel busy ratio (CBR)) of the candidate sidelink carriers. For example, the UE 305 may select the sidelink carrier based on a measured channel parameter of the sidelink carrier satisfying a threshold. In an example, the UE 305 select the sidelink carrier based on the CBR, RSRP, RSSI, etc. of the sidelink carrier being less than a threshold.

The UE 305 may transmit, to the UE 310, a sidelink message 320. In an example, the sidelink message 320 may be a PC5 RRC message indicating the selected sidelink carrier. In another example, the sidelink message 320 may be a PC5 MAC-CE activating the selected sidelink carrier. In an example, the UE 305 may transmit the sidelink message 320 using an initial or default sidelink carrier preconfigured by a higher layer. In another example, the selected sidelink carrier may be configured, and the UE 305 may transmit the sidelink message 320 using the selected sidelink carrier. In some aspects, the base station 315 may select the sidelink carrier based on the measured channel parameters associated with the set of candidate sidelink carriers common to both UE 305 and UE 310 (e.g., as received from the UE 305). In an example, the base station 315 may transmit, to the UE 305, a PC5 RRC configuration message 325 indicating the selected sidelink carrier or a PC5 MAC-CE activating the selected sidelink carrier. The UE 305 may use the selected sidelink carrier for the sidelink control connection. In an example, the base station 315 may transmit, to the UE 305, a PC5 RRC configuration message 325 indicating the selected sidelink carrier as a sidelink anchor carrier (also referred to herein as a sidelink anchor carrier component). In an example, the base station 315 may transmit, to the UE 305, a PC5 MAC-CE 326 activating the selected sidelink carrier as a sidelink anchor carrier. The UE 305 may use the sidelink anchor carrier for the sidelink control connection. Example aspects of establishing (reestablishing) or maintaining a sidelink control connection (e.g., PC5 RRC connection) using a selected sidelink carrier or a sidelink anchor carrier and monitoring the same are described with reference to FIGS. 4 through 7.

In accordance with various aspects of the present disclosure, the described techniques provide for improving reliability of an established sidelink control connection (e.g., PC5 RRC connection). In some aspects, the described techniques support establishing (reestablishing) or maintaining the sidelink control connection (e.g., PC5 RRC connection) using a primary sidelink anchor carrier and using a secondary sidelink anchor carrier.

For example, the UE 305 may establish (reestablish) and maintain a sidelink control connection (e.g., PC5 RRC connection) with the UE 310 using a primary sidelink anchor carrier. The sidelink control connection may support carrier aggregation. The UE 305 may set the sidelink control connection on a secondary sidelink anchor carrier. In some aspects, the UE 305 may use the secondary sidelink anchor carrier as a fallback for the primary sidelink anchor carrier to replace the primary sidelink anchor carrier. In some aspects, the UE 305 may use the secondary sidelink anchor carrier as a duplication of the primary sidelink anchor carrier to repeat transmissions on the primary sidelink anchor carrier. The UE 305 may select the sidelink anchor carriers (e.g., primary sidelink anchor carrier, secondary sidelink anchor carrier) based on channel parameters associated with the sidelink anchor carriers. For example, the UE 305 may select the sidelink anchor carriers (e.g., primary sidelink anchor carrier, secondary sidelink anchor carrier) based on a channel busy ratio (CBR), a reference signal received power (RSRP), or a received signal strength indictor (RSSI). In some examples, the UE 305 may measure the CBR, the RSRP, or the RSSI over a monitoring window. Example aspects of establishing (reestablishing) or maintaining the sidelink control connection (e.g., PC5 RRC connection) using a primary sidelink anchor carrier and using a secondary sidelink anchor carrier are described with reference to FIG. 8.

In accordance with various aspects of the present disclosure, the described techniques provide for monitoring and recovery of an established sidelink control connection (e.g., PC5 RRC connection) while avoiding radio link failure (RLF).

For example, the UE 305 may establish (reestablish) or maintain a sidelink control connection (e.g., PC5 RRC connection) with the UE 310 using a first sidelink anchor carrier. The UE 305 may measure, over a monitoring window, channel parameters (e.g., CBR, RSRP, RSSI, etc.) of the sidelink anchor carrier or candidate sidelink carriers. The UE 305 may select (e.g., configure) a second sidelink anchor carrier (e.g., from the candidate sidelink carriers) based on the measurements for the sidelink control connection. In an example, the UE 305 may switch to (e.g., configure) the second sidelink anchor carrier for the sidelink control connection, without releasing and reestablishing radio bearers (e.g., sidelink signal radio bearers (SL SRBs), sidelink data radio bearers (SL DRBs).

In some aspects, refraining from releasing or reestablishing radio bearers may prevent or mitigate occurrences of PC5 RLF (e.g., a failure by the UE 305 or the UE 310 to establish (reestablish) or maintain a connection to the other UE). The UE 305 may transmit a sidelink message 330 to the UE 310. The sidelink message 330 may be a PC5 RRC message for configuring the second sidelink anchor carrier for the sidelink control connection or a PC5 MAC-CE for activating the second sidelink anchor carrier for the sidelink control connection. In some examples, the UE 310 may transmit, to the UE 305, a message 335 (e.g., a PC5 RRC response message) accepting or rejecting the second sidelink anchor carrier or a ACK or NACK to the sidelink message 330 (e.g., where the sidelink message 330 is a PC5 MAC-CE). Example aspects of monitoring and recovery of an established (reestablished) sidelink control connection (e.g., PC5 RRC connection) while avoiding PC5 RLF are described with reference to FIGS. 9 and 10.

Figure 4:
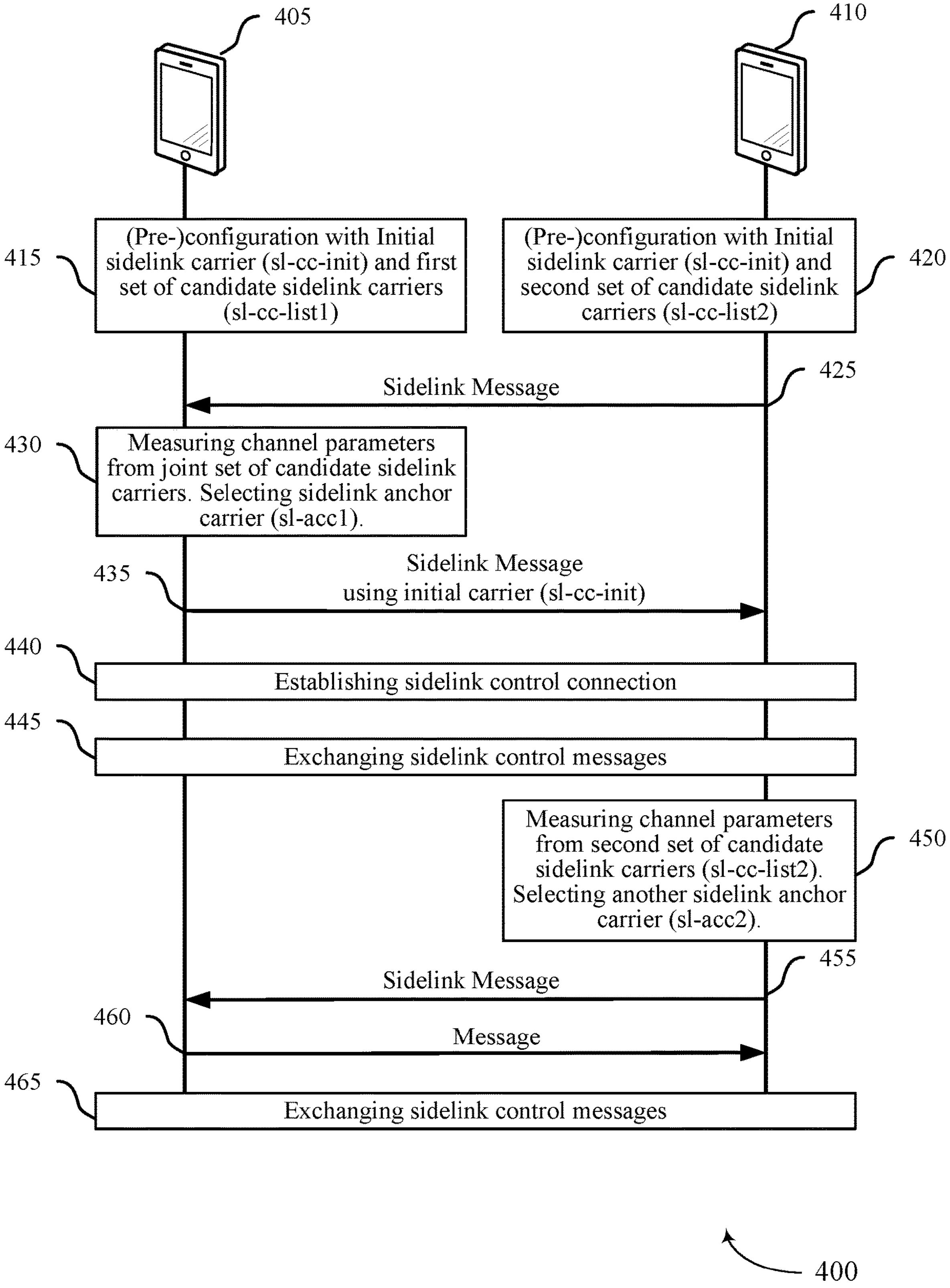
FIGS. 4 through 13 illustrate example process flows that support techniques for sidelink control connection with carrier aggregation in accordance with aspects of the present disclosure.

FIG. 4 illustrates an example of a process flow 400 that supports (re-)configuring or (re-)activating a sidelink anchor carrier for establishing (reestablishing) or maintaining a sidelink control connection (e.g., PC5 RRC connection) in accordance with aspects of the present disclosure. In some examples, process flow 400 may implement aspects of wireless communications systems 100, 200, or 300 described with reference to FIGS. 1 through 3. Process flow 400 may be implemented by a UE 405 and UE 410, which may be examples of a UE 115 described with reference to FIG. 1. The UE 405 may be an example of a UE 115 or UE 116 described with reference to FIG. 1, the UE 205 described with reference to FIG. 2, or the UE 305 described with reference to FIG. 3. The UE 410 may be an example of the UE 116 (or another UE 115) described with reference to FIG. 1, the UE 210 described with reference to FIG. 2, or the UE 310 described with reference to FIG. 3.

Process flow 400 illustrates an example of establishing (reestablishing) or maintaining a sidelink control connection (e.g., PC5 RRC connection) using a sidelink carrier (also referred to herein as a sidelink carrier component) selected based on measurements. Process flow 400 may support reestablishing or maintaining a sidelink control connection (e.g., PC5 RRC connection) using the sidelink carrier. In an example, the sidelink carrier may be set as a sidelink anchor carrier. In some aspects, the sidelink anchor carrier(s) may be indicated using a preconfigured or configured initial sidelink carrier. In some other aspects, the sidelink anchor carrier(s) may be indicated using a preconfigured or configured default sidelink carrier.

In some examples, a sidelink anchor carrier may be a FR1 carrier for FR1 and FR2 inter-band sidelink carrier aggregation. In another example, a sidelink anchor carrier may be a carrier associated with a licensed radio frequency spectrum band for inter-band sidelink carrier aggregation between licensed radio frequency spectrum bands and unlicensed radio frequency spectrum bands. In some aspects, the process flow 400 may illustrate an example of establishing a sidelink control connection (e.g., PC5 RRC connection) for at least unicast sidelink transmissions.

In the following description of the process flow 400, the operations between the UE 405 and the UE 410 may be transmitted in a different order than the order shown, or the operations performed by the UE 405 and the UE 410 may be performed in different orders or at different times. Certain operations may also be left out of the process flow 400, or other operations may be added to the process flow 400. It is to be understood that while the UE 405 and the UE 410 are shown performing a number of the operations of process flow 400, any wireless device may perform the operations shown.

In accordance with various aspects of the present disclosure, at 415, the UE 405 may be preconfigured by higher layer or configured by a base station with an initial sidelink carrier or carrier component (e.g., sl-cc-init) for initial sidelink messaging between the UE 405 and the UE 410. In some aspects, the UE 405 may be preconfigured or configured with a default sidelink carrier component (e.g., sl-cc-default) for sidelink messaging between the UE 405 and the UE 410. In some examples, the UE 405 may be preconfigured or configured with a first set of candidate sidelink carrier components (e.g., a sidelink carrier component list, sl-cc-list1) that supports carrier aggregation using multiple sidelink carriers. In an example, candidate sidelink carrier components within the first set of candidate sidelink carriers (e.g., sl-cc-list1) may be arranged or listed according to respective priorities of the candidate sidelink carriers (e.g., according to a priority order).

At 420, the UE 410 may be preconfigured by higher layer or configured by a base station with the initial sidelink carrier or carrier component (e.g., sl-cc-init) for initial sidelink messaging between the UE 405 and the UE 410. In some aspects, the UE 410 may be preconfigured or configured with the default sidelink carrier (e.g., sl-cc-default) for sidelink messaging between the UE 405 and the UE 410. In some examples, the UE 410 may be preconfigured or configured with a second set of candidate sidelink carrier components (e.g., a sidelink carrier component list, sl-cc-list2). In an example, candidate sidelink carriers within the second set of candidate sidelink carriers (e.g., sl-cc-list2) may be arranged or listed according to respective priorities of the candidate sidelink carriers (e.g., according to a priority order).

In some examples, the first set of candidate sidelink carriers (e.g., sl-cc-list1) (pre-) configured for the UE 405 and the second set of candidate sidelink carriers (e.g., sl-cc-list2) (pre-)configured for the UE 410 may each include FR1 carriers (also referred to herein as FR1 carrier components) and FR2 or mmW carriers (also referred to herein as FR2 or mmW carrier components). In some aspects, the FR1 carriers may be listed in a priority location preceding the FR2 carriers. In an example, the FR1 carriers may be listed in a priority order, and the FR2 carriers may be listed in a priority order.

In some examples, the first set of candidate sidelink carriers (e.g., sl-cc-list1) configured for the UE 405 and the second set of candidate sidelink carriers (e.g., sl-cc-list2) configured for the UE 410 may each include licensed carriers (e.g., carriers associated with licensed radio frequency spectrum bands) and unlicensed carriers (e.g., carriers associated with unlicensed radio frequency spectrum bands). In some aspects, the licensed carriers may be listed in a priority location preceding the unlicensed carriers. In an example, the licensed carriers may be listed in a priority order and the unlicensed carriers may be listed in a priority order, where the licensed carriers have higher priorities than the unlicensed carriers.

In some aspects, the initial sidelink carrier (e.g., sl-cc-init), the default sidelink carrier (e.g., sl-cc-default), the first set of candidate sidelink carriers (e.g., sl-cc-list1) configured for the UE 405, or the second set of candidate sidelink carriers (e.g., sl-cc-list2) configured for the UE 410 may be configured by a base station (e.g., the base station 315 (as shown in FIG. 3).

In some examples, the first set of candidate sidelink carriers (e.g., sl-cc-list1) configured for the UE 405 may include the initial sidelink carrier (e.g., sl-cc-init) or the default sidelink carrier (e.g., sl-cc-default). In some other examples, the first set of candidate sidelink carriers (e.g., sl-cc-list1) configured for the UE 405 may exclude the initial sidelink carrier (e.g., sl-cc-init) or the default sidelink carrier (e.g., sl-cc-default). In an example, the initial sidelink carrier (e.g., sl-cc-init) may be a first candidate sidelink carrier (e.g., 'sl-cc0') in first the set of candidate sidelink carriers (e.g., sl-cc-list1) configured for the UE 405. In an example, the default sidelink carrier (e.g., sl-cc-default) may be the first candidate sidelink carrier (e.g., sl-cc0) in the first set of candidate sidelink carriers (e.g., sl-cc-list1) configured for the UE 405.

In some examples, the second set of candidate sidelink carriers (e.g., sl-cc-list2) configured for the UE 410 may include the initial sidelink carrier (e.g., sl-cc-init) or the default sidelink carrier (e.g., sl-cc-default). In some other examples, the second set of candidate sidelink carriers (e.g., sl-cc-list2) configured for the UE 410 may exclude the initial sidelink carrier (e.g., sl-cc-init) or the default sidelink carrier (e.g., sl-cc-default). In an example, the initial sidelink carrier (e.g., sl-cc-init) may be a first candidate sidelink carrier (e.g., 'sl-cc0') in the second set of candidate sidelink carriers (e.g., sl-cc-list2) configured for the UE 410. In an example, the default sidelink carrier (e.g., sl-cc-default) may be the first candidate sidelink carrier (e.g., sl-cc0) in the second set of candidate sidelink carriers (e.g., sl-cc-list2) configured for the UE 410.

At 425, the UE 405 may receive a sidelink message from the UE 410. The sidelink message may indicate the second set of candidate sidelink carriers (e.g., sl-cc-list2) configured for the UE 410. In some aspects, the sidelink message may be, for example, a discovery message or an announcement message (e.g., a broadcast message). In an example, the UE 405 may determine a subset of candidate sidelink carriers from the first set of candidate sidelink carriers (e.g., sl-cc-list1) and the second set of candidate sidelink carriers (e.g., sl-cc-list2). For example, the subset of candidate sidelink carriers may be a joint set of candidate sidelink carriers common to the first set of candidate sidelink carriers (e.g., sl-cc-list1) and the second set of candidate sidelink carriers (e.g., sl-cc-list2).

At 430, the UE 405 may measure channel parameters (e.g., CBR, RSRP, RSSI, etc.) of one or more candidate sidelink carriers of the joint set of candidate sidelink carriers. In an example, the UE 405 may measure channel parameters (e.g., CBR, RSRP, RSSI, etc.) of candidate sidelink carriers of the joint set of candidate sidelink carriers. In an example, the UE 405 may measure the channel parameters (e.g., CBR, RSRP, RSSI, etc.) based on respective priorities of the candidate sidelink carriers. For example, the UE 405 may measure the channel parameters (e.g., CBR, RSRP, RSSI, etc.) according to a priority order of the candidate sidelink carriers.

Additionally, at 430, the UE 405 may select, from the joint set of candidate sidelink carriers, a sidelink carrier for which a measured channel parameter (e.g., CBR, RSRP, RSSI, etc.) is below a threshold (e.g., sl-acc-threshold). In some aspects, the UE 405 may select multiple sidelink carriers for which a respective measured channel parameter (e.g., CBR, RSRP, RSSI, etc.) is below the threshold. In an example, the UE 405 may set the selected sidelink carrier (or carriers) as a sidelink anchor carrier (e.g., sl-acc1) (or sidelink anchor carriers) for establishing (reestablishing) or maintaining a sidelink control connection (e.g., PC5 RRC connection) between the UE 405 and the UE 410.

At 435, the UE 405 may transmit, to the UE 410, a sidelink message which may be a PC5 RRC message indicating a sidelink carrier for establishing (reestablishing) or maintaining the sidelink control connection. In some examples, the sidelink message may be a PC5 MAC-CE activating a sidelink carrier for establishing (reestablishing) or maintaining the sidelink control connection. In an example, the sidelink message may indicate or activate the sidelink anchor carrier (e.g., sl-acc1) selected by the UE 405. In some aspects, the UE 405 may transmit the sidelink message using the initial sidelink carrier (e.g., sl-cc-init) (pre-) configured for initial sidelink messaging between the UE 405 and the UE 410. The UE 410 may monitor and receive (e.g., detect) the sidelink message using the initial sidelink carrier (e.g., 'sl-cc-init'). In an example, the UE 405 may transmit the sidelink message using a public or shared sidelink signal radio bearer (SL SRB). For example, the UE 405 may transmit a sidelink message which may be a PC5 RRC message (e.g., unprotected PC5-S message before the PC5-S security has been established) to the UE 410 using SL SRB0 (e.g., using a common control channel (CCCH) or SCCH logical channel), or transmit a sidelink message which may be a PC5 MAC-CE carried on a physical sidelink shared channel (PSSCH), prior to the protected or secured PC5 control connection established.

In some aspects, the UE 405 may map a logic channel (e.g., SCCH 225 or SCCH 230 (as shown in FIG. 2)) for sidelink control messaging to the sidelink anchor carrier (e.g., 'sl-acc1'). In an example, at 430, the UE 405 may transmit the sidelink control message using the logic channel based on the mapping. In some aspects, the sidelink anchor carrier (e.g., 'sl-acc1') may be a FR1 carrier (or carrier component) configured for FR1 and FR2 inter-band sidelink carrier aggregation. In some other aspects, the sidelink anchor carrier (e.g., 'sl-acc1') may be a licensed carrier (carrier component) configured for licensed or unlicensed inter-band sidelink aggregation.

At 440, the UE 405 may establish (reestablish) the sidelink control connection between the UE 405 and the UE 410. For example, UE 405 may establish (reestablish) the sidelink control connection with Access-Stratum (AS) security with integrity protection and ciphering of PC5 signaling (e.g., SL-SRB2 and SL-SRB3) and PC5 link with user data (e.g., SL-DRBs) between the UE 405 and the UE 410 using the sidelink anchor carrier (e.g., 'sl-acc1') selected by the UE 405.

At 445, the UE 405 and the UE 410 may communicate (e.g., exchange) sidelink control messages using protected PC5 signaling radio bearers (e.g., SL SRB3) and exchange data packet using user data radio bearers (e.g., SL DRBs) via the PC5 control connection or PC5 link. For example, the UE 405 and the UE 410 may communicate (e.g., exchange) additional sidelink control messages using the sidelink anchor carrier (e.g., sl-acc1) via protected PC5 signaling radio bearers (e.g., SL SRB3).

In some aspects, the UE 405 or the UE 410 may remap the sidelink control connection (e.g., PC5 RRC connection) established (reestablished) between the UE 405 and the UE 410 using a different sidelink carrier (e.g., a different sidelink anchor carrier). For example, at 450, the UE 410 may measure channel parameters (e.g., CBR, RSRP, RSSI, etc.) of candidate sidelink carriers of the second set of candidate sidelink carriers (e.g., sl-cc-list2). In an example, the UE 410 may measure the channel parameters (e.g., CBR, RSRP, RSSI, etc.) based on respective priorities of the candidate sidelink carriers. For example, the UE 410 may measure the channel parameters (e.g., CBR, RSRP, RSSI, etc.) according to a priority order of the candidate sidelink carriers.

Additionally, at 450, the UE 410 may select a sidelink carrier based on the measurements of the joint set of candidate sidelink carriers which may be indicated by UE 405 at 435 or at 445. Additionally, at 450, the UE 410 may select a sidelink carrier based on the measurements of candidate sidelink carriers selected from the second set of candidate sidelink carriers (e.g., sl-cc-list2), where the candidate sidelink carrier may be common with the first set of candidate sidelink carriers (e.g., sl-cc-list1). In some examples, the first set of candidate sidelink carriers may be indicated by UE 405 via a prior sidelink message, for example, via a discovery or announcement message or a sidelink message at 435 or 445. For example, the UE 410 may select a sidelink carrier for which a measured channel parameter (e.g., CBR, RSRP, RSSI, etc.) is below a threshold (e.g., sl-acc-threshold). In some aspects, the UE 410 may select multiple sidelink carriers for which a respective measured channel parameter (e.g., CBR, RSRP, RSSI, etc.) is below the threshold. In an example, the UE 405 may set the sidelink carrier (or carriers) as a second sidelink anchor carrier (e.g., sl-acc2) for maintaining the sidelink control connection (e.g., PC5 RRC connection) established (reestablished) between the UE 405 and the UE 410.

At 455, the UE 410 may transmit a second sidelink message (e.g., protected sidelink RRC message RRCReconfigurationSidelink or MAC-CE) indicating the second sidelink anchor carrier (e.g., sl-acc2). In some aspects, the UE 410 may transmit the second sidelink message (e.g., RRCReconfigurationSidelink or MAC-CE) using the current sidelink anchor carrier (e.g., sl-acc1). In some aspects, the UE 410 may transmit the second sidelink message (e.g., RRCReconfigurationSidelink or MAC-CE) using the second sidelink anchor carrier (e.g., sl-acc2).

In some examples, at 460, the UE 405 may transmit a PC5 RRC message (e.g., RRCReconfigurationCompleteSidelink) to respond the PC5 RRC message or an ACK or NACK to the PC5 MAC-CE at 455 for confirming the second sidelink anchor carrier (e.g., sl-acc2) used for the sidelink control connection (e.g., PC5 RRC connection) between the UE 405 and the UE 410. In an example, the UE 405 may transmit the side message (e.g., RRCReconfiguration-CompleteSidelink or ACK/NACK) using the second sidelink anchor carrier (e.g., sl-acc2). The UE 405 and the UE 410 may remap the sidelink control connection using the second sidelink anchor carrier (e.g., sl-acc2).

At 465, the UE 405 and the UE 410 may communicate (e.g., exchange) sidelink control messages. For example, the UE 405 and the UE 410 may communicate (e.g., exchange) additional sidelink control messages using the second sidelink anchor carrier (e.g., sl-acc2).

Figure 5:
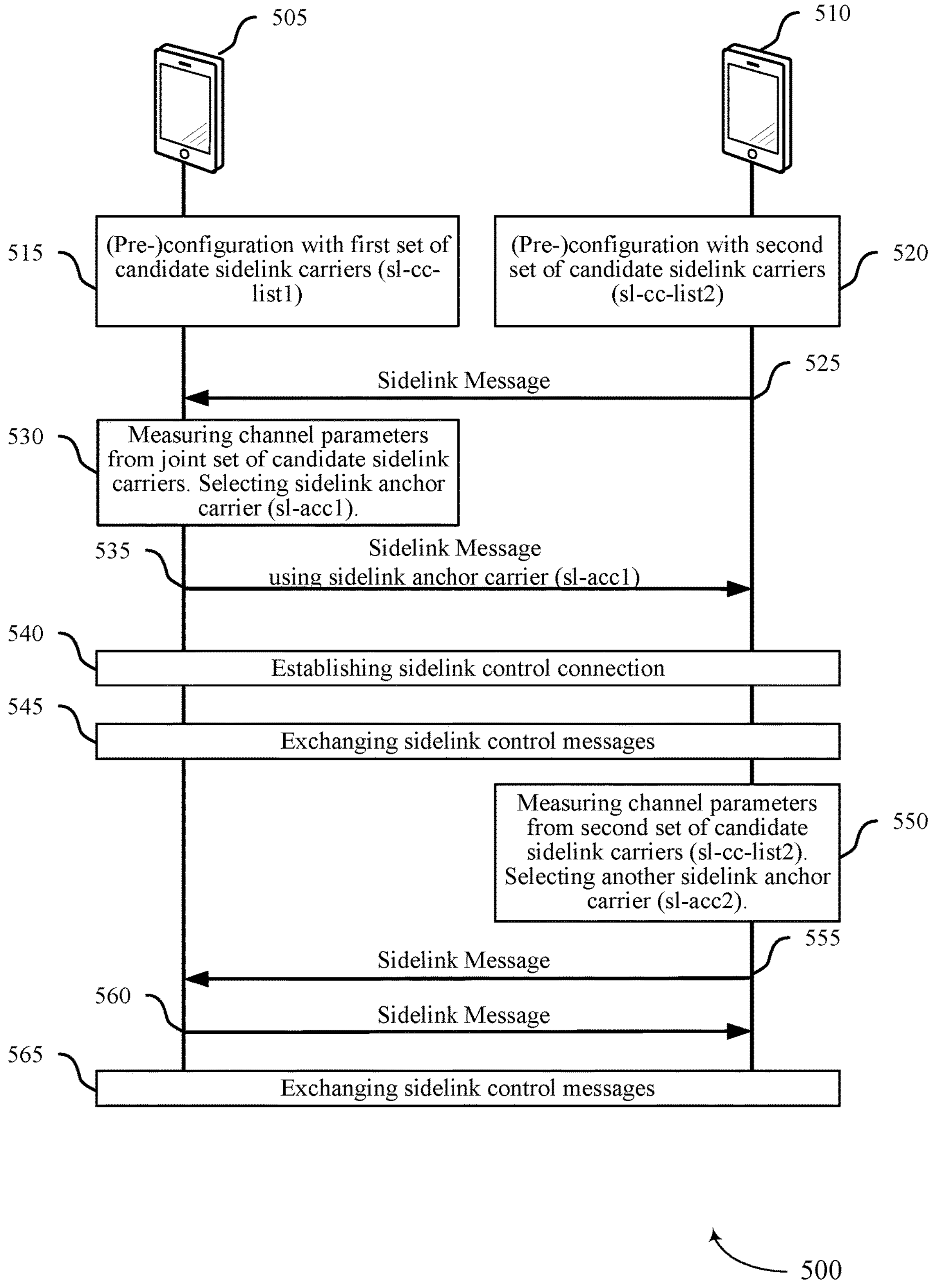

FIG. 5 illustrates another example of a process flow 500 that supports (re-) configuring or (re-)activating a sidelink anchor carrier for establishing (reestablishing) or maintaining a sidelink control connection (e.g., PC5 RRC connection) in accordance with aspects of the present disclosure. In some examples, process flow 500 may implement aspects of wireless communications systems 100, 200, or 300, or process flow 400 described with reference to FIGS. 1 through 4. Process flow 500 may be implemented by a UE 505 and UE 510, which may be examples of a UE 115 described with reference to FIG. 1. The UE 505 may be an example of a UE 115 described with reference to FIG. 1, the UE 205 described with reference to FIG. 2, the UE 305 described with reference to FIG. 3, or the UE 405 described with reference to FIG. 4. The UE 510 may be an example of the UE 116 (or another UE 115) described with reference to FIG. 1, the UE 210 described with reference to FIG. 2, the UE 310 described with reference to FIG. 3, or the UE 410 described with reference to FIG. 4.

Process flow 500 illustrates an example of establishing a sidelink control connection (e.g., PC5 RRC connection) via sidelink anchor carriers. In some aspects, a selected sidelink anchor carrier may be indicated using the selected sidelink anchor carrier.

In the following description of the process flow 500, the operations between the UE 505 and the UE 510 may be transmitted in a different order than the order shown, or the operations performed by the UE 505 and the UE 510 may be performed in different orders or at different times. Certain operations may also be left out of the process flow 500, or other operations may be added to the process flow 500. It is to be understood that while the UE 505 and the UE 510 are shown performing a number of the operations of process flow 500, any wireless device may perform the operations shown.

In accordance with various aspects of the present disclosure, at 515, the UE 505 may be preconfigured by higher layer or configured by a base station with a first set of candidate sidelink carriers (e.g., a sidelink carrier component list, sl-cc-list1) that supports carrier aggregation using multiple sidelink carriers. In an example, candidate sidelink carriers within the first set of candidate sidelink carriers (e.g., sl-cc-list1) may be arranged or listed according to respective priorities of the candidate sidelink carriers (e.g., according to a priority order).

At 520, the UE 510 may be preconfigured by higher layer or configured by a base station with a second set of candidate sidelink carriers (e.g., a sidelink carrier component list, sl-cc-list2). In an example, candidate sidelink carriers within the second set of candidate sidelink carriers (e.g., sl-cc-list2) may be arranged or listed according to respective priorities of the candidate sidelink carriers (e.g., according to a priority order).

In some examples, the first set of candidate sidelink carriers (e.g., sl-cc-list1) configured for the UE 505 and the second set of candidate sidelink carriers (e.g., sl-cc-list2) configured for the UE 510 may each include FR1 carriers (also referred to herein as FR1 carrier components) and FR2 carriers (also referred to herein as FR2 carrier components). In some aspects, the FR1 carriers may be listed in a priority location preceding the FR2 carriers. In an example, the FR1 carriers may be listed in a priority order, and the FR2 carriers may be listed in a priority order.

In some examples, the first set of candidate sidelink carriers (e.g., sl-cc-list1) configured for the UE 505 and the second set of candidate sidelink carriers (e.g., sl-cc-list2) configured for the UE 510 may each include licensed carriers (e.g., carriers associated with licensed radio frequency spectrum bands) and unlicensed carriers (e.g., carriers associated with unlicensed radio frequency spectrum bands). In some aspects, the licensed carriers may be listed in a priority location preceding the unlicensed carriers. In an example, the licensed carriers may be listed in a priority order, and the unlicensed carriers may be listed in a priority order.

In some aspects, the first set of candidate sidelink carriers (e.g., sl-cc-list1) configured for the UE 505 or the second set of candidate sidelink carriers (e.g., sl-cc-list2) configured for the UE 510 may be configured by a base station (e.g., the base station 315 (as shown in FIG. 3)).

At 525, the UE 505 may receive a sidelink message from the UE 510. The sidelink message may indicate the second set of candidate sidelink carriers (e.g., sl-cc-list2) configured for the UE 510. In some aspects, the sidelink message may be, for example, a discovery message or an announcement message (e.g., a broadcast message). In an example, the UE 505 may determine a subset of candidate sidelink carriers from the first set of candidate sidelink carriers (e.g., sl-cc-list1) and the second set of candidate sidelink carriers (e.g., sl-cc-list2). For example, the subset of candidate sidelink carriers may be a joint set of candidate sidelink carriers common to the first set of candidate sidelink carriers (e.g., sl-cc-list1) and the second set of candidate sidelink carriers (e.g., sl-cc-list2).

At 530, the UE 505 may measure channel parameters (e.g., CBR, RSRP, RSSI, etc.) of one or more candidate sidelink carriers of the joint set of candidate sidelink carriers. In an example, the UE 505 may measure channel parameters (e.g., CBR, RSRP, RSSI, etc.) of candidate sidelink carriers of the joint set of candidate sidelink carriers. In an example, the UE 505 may measure the channel parameters (e.g., CBR, RSRP, RSSI, etc.) based on respective priorities of the candidate sidelink carriers. For example, the UE 505 may measure the channel parameters (e.g., CBR, RSRP, RSSI, etc.) according to a priority order of the candidate sidelink carriers.

Additionally, at 530, the UE 505 may select, from the joint set of candidate sidelink carriers, a sidelink carrier for which a measured channel parameter (e.g., CBR, RSRP, RSSI, etc.) is below a threshold (e.g., sl-acc-threshold). In some aspects, the UE 505 may select multiple sidelink carriers for which a respective measured channel parameter (e.g., CBR, RSRP, RSSI, etc.) is below the threshold. In an example, the UE 505 may set the selected sidelink carrier (or carriers) as a sidelink anchor carrier (e.g., sl-acc1) (or sidelink anchor carriers) for establishing (reestablishing) or maintaining a sidelink control connection (e.g., PC5 RRC connection) between the UE 505 and the UE 510.

At 535, the UE 505 may transmit, to the UE 510, a sidelink message. In some examples, the sidelink message may be a PC5 RRC message indicating a sidelink carrier for establishing (reestablishing) or maintaining the sidelink control connection. In some examples, the sidelink message may be a PC5 MAC-CE activating a sidelink carrier for establishing (reestablishing) or maintaining the sidelink control connection. In an example, the sidelink message may indicate or activate the sidelink anchor carrier (e.g., sl-acc1) selected by the UE 505. In some aspects, the UE 505 may transmit the sidelink message using the sidelink anchor carrier (e.g., sl-acc1). In some examples, the sidelink message may also indicate the first set of candidate sidelink carriers (e.g., sl-cc-list1).

The UE 510 may monitor the second set of candidate sidelink carriers (e.g., sl-cc-list2) and receive (e.g., detect) the sidelink control message using the sidelink anchor carrier (e.g., sl-acc1). In an example, the UE 505 may transmit the sidelink control message using a public or shared sidelink SRB. For example, the UE 505 may transmit a sidelink message which may be an RRC message (e.g., unprotected PC5-S message before the PC5-S security has been established) to the UE 510 using SL SRB0 (e.g., using a CCCH logical channel or SCCH) or transmit a sidelink message (e.g., a sidelink MAC-CE carried on a physical sidelink shared channel (PSSCH)), prior to the protected or secured PC5 control connection established.

At 540, the UE 505 may establish (reestablish) the sidelink control connection between the UE 505 and the UE 510. For example, UE 505 may establish (reestablish) the sidelink control connection with Access-Stratum (AS) security with integrity protection and ciphering of PC5 signaling (e.g., SL-SRB2 and SL-SRB3) and PC5 link with user data (e.g., SL-DRBs) between the UE 505 and the UE 510 using the sidelink anchor carrier (e.g., 'sl-acc1') selected by the UE 505.

At 545, the UE 505 and the UE 510 may communicate (e.g., exchange) sidelink control messages using protected PC5 signaling radio bearers (e.g., SL SRB3) and exchange data packet using user data radio bearers (e.g., SL DRBs) via the PC5 control connection or PC5 link. For example, the UE 505 and the UE 510 may communicate (e.g., exchange) additional sidelink control messages using the sidelink anchor carrier (e.g., sl-acc1) via protected PC5 signaling radio bearers (e.g., SL SRB3).

In some aspects, the UE 505 or the UE 510 may remap (e.g., reconfigure) the sidelink control connection (e.g., PC5 RRC connection) established (reestablished) between the UE 505 and the UE 510 using a different sidelink carrier (e.g., a different sidelink anchor carrier). For example, at 550, the UE 510 may measure channel parameters (e.g., CBR, RSRP, RSSI, etc.) of candidate sidelink carriers of the second set of candidate sidelink carriers (e.g., sl-cc-list2). In an example, the UE 510 may measure the channel parameters (e.g., CBR, RSRP, RSSI, etc.) based on respective priorities of the candidate sidelink carriers. For example, the UE 510 may measure the channel parameters (e.g., CBR, RSRP, RSSI, etc.) according to a priority order of the candidate sidelink carriers.

Additionally, at 550, the UE 510 may select a sidelink carrier based on the measurements of the joint set of candidate sidelink carriers which may be indicated by UE 505 at 535 or at 545. In some examples, the UE 510 may select a sidelink carrier based on the measurements of candidate sidelink carriers selected from the second set of candidate sidelink carriers (e.g., sl-cc-list2), where the candidate sidelink carriers may be common with the first set of candidate sidelink carriers (e.g., sl-cc-list1). In an example, the first set of candidate sidelink carriers may be indicated by UE 505 via a prior sidelink message, for example, a discovery or announcement message or a sidelink message at 535 or 545. For example, the UE 510 may select a sidelink carrier for which a measured channel parameter (e.g., CBR, RSRP, RSSI, etc.) is below a threshold (e.g., sl-acc-threshold). In some aspects, the UE 510 may select multiple sidelink carriers for which a respective measured channel parameter (e.g., CBR, RSRP, RSSI, etc.) is below a threshold. In an example, the UE 505 may set the sidelink carrier (or carriers) as a second sidelink anchor carrier (e.g., sl-acc2) for maintaining the sidelink control connection (e.g., PC5 RRC connection) between the UE 505 and the UE 510.

At 555, the UE 510 may transmit a second sidelink message (e.g., protected sidelink RRC message RRCReconfigurationSidelink or MAC-CE) indicating the second sidelink anchor carrier (e.g., sl-acc2). In some aspects, the UE 510 may transmit the second sidelink message (e.g., RRCReconfigurationSidelink or MAC-CE) using the current sidelink anchor carrier (e.g., sl-acc1). In some aspects, the UE 510 may transmit the second sidelink control message (e.g., RRCReconfigurationSidelink) using the second sidelink anchor carrier (e.g., sl-acc2).

In some examples, at 560, the UE 505 may transmit a PC5 RRC message (e.g., RRCReconfigurationCompleteSidelink) to respond the PC5 RRC message or an ACK or NACK to the PC5 MAC-CE at 555 for confirming the second sidelink anchor carrier (e.g., sl-acc2) used for the sidelink control connection (e.g., PC5 RRC connection) between the UE 505 and the UE 510. In an example, the UE 505 may transmit the sidelink message (e.g., RRCReconfiguration-CompleteSidelink or ACK/NACK) using the second sidelink anchor carrier (e.g., sl-acc2). The UE 505 and the UE 510 may remap the sidelink control connection using the second sidelink anchor carrier (e.g., sl-acc2).

At 565, the UE 505 and the UE 510 may communicate (e.g., exchange) sidelink control messages. For example, the UE 505 and the UE 510 may communicate (e.g., exchange) additional sidelink control messages using the second sidelink anchor carrier (e.g., sl-acc2) illustrates an example of a process flow 500 that supports techniques for sidelink control connection with carrier aggregation in accordance with aspects of the present disclosure.

Figure 6:
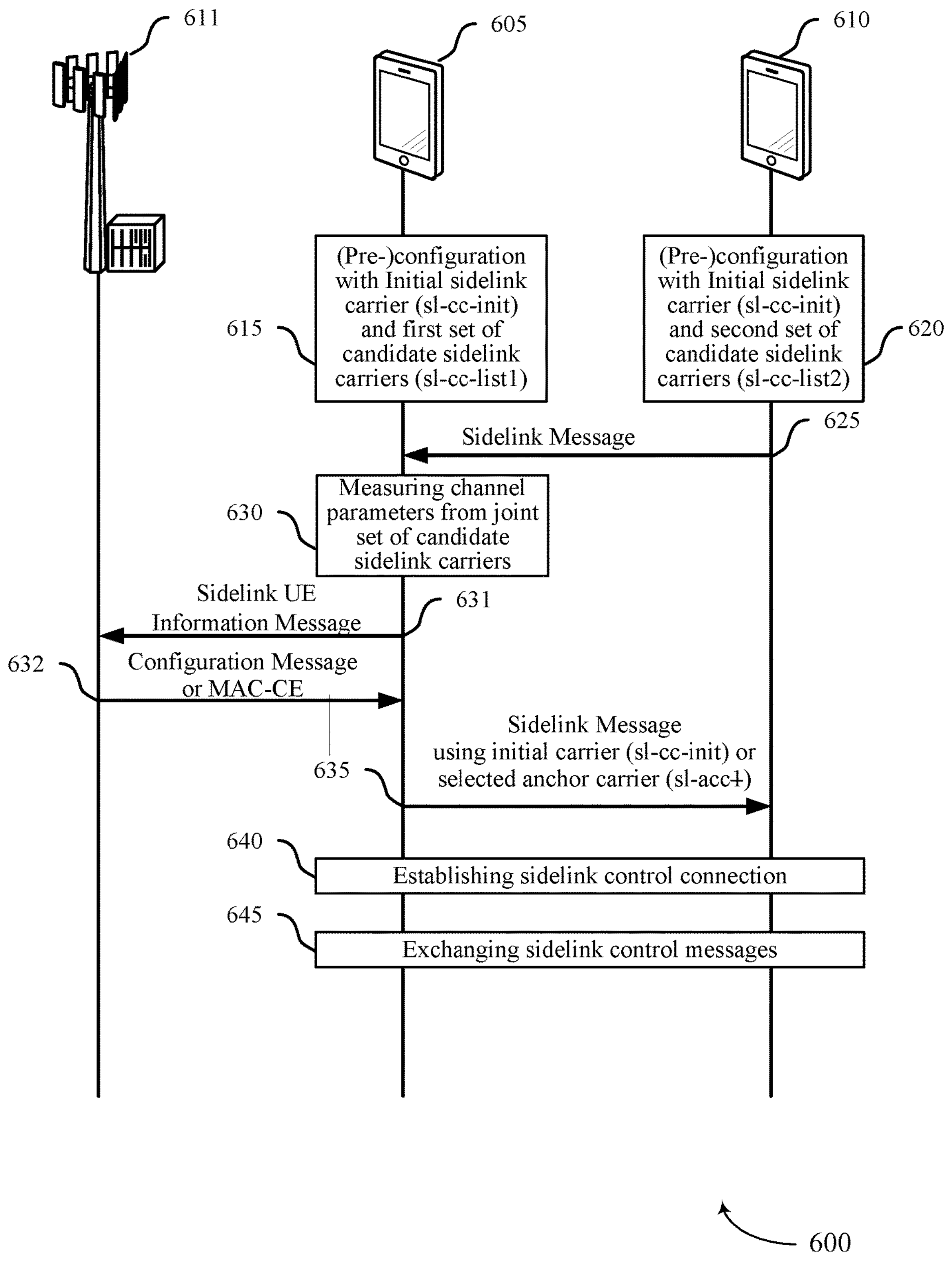

FIG. 6 illustrates an example of a process flow 600 that supports techniques for sidelink control connection with carrier aggregation in accordance with aspects of the present disclosure. In some examples, process flow 600 may implement aspects of wireless communications systems 100 through 300, process flow 400, or process flow 500 described with reference to FIGS. 1 through 5. Process flow 600 may be implemented by a UE 605 and UE 610, which may be examples of a UE 115 described with reference to FIG. 1, and a base station 611, which may be an example of a base station 105 described with reference to FIG. 1.

The UE 605 may be an example of a UE 115 described with reference to FIG. 1, the UE 205 described with reference to FIG. 2, the UE 305 described with reference to FIG. 3, the UE 405 described with reference to FIG. 4, or the UE 505 described with reference to FIG. 5. The UE 610 may be an example of the UE 116 (or another UE 115) described with reference to FIG. 1, the UE 210 described with reference to FIG. 2, the UE 310 described with reference to FIG. 3, the UE 410 described with reference to FIG. 4, or the UE 510 described with reference to FIG. 5.

Process flow 600 illustrates an example of establishing (reestablishing) or maintaining a sidelink control connection (e.g., PC5 RRC connection) via sidelink anchor carriers selected by a base station. In some aspects, the sidelink anchor carriers may be indicated using a preconfigured or configured initial sidelink carrier or a preconfigured or configured default sidelink carrier. In some examples, the sidelink anchor carriers may be a FR1 carrier for FR1 and FR2 inter-band sidelink carrier aggregation. In another example, the sidelink anchor carriers may be a carrier associated with a licensed radio frequency spectrum band for inter-band sidelink carrier aggregation between licensed radio frequency spectrum bands and unlicensed radio frequency spectrum bands. In some aspects, the process flow 600 may illustrate an example of establishing a sidelink control connection (e.g., PC5 RRC connection) for at least unicast sidelink transmissions.

In the following description of the process flow 600, the operations between the UE 605 and the UE 610 may be transmitted in a different order than the order shown, or the operations performed by the UE 605 and the UE 610 may be performed in different orders or at different times. Certain operations may also be left out of the process flow 600, or other operations may be added to the process flow 600. It is to be understood that while the UE 605 and the UE 610 are shown performing a number of the operations of process flow 600, any wireless device may perform the operations shown.

In accordance with various aspects of the present disclosure, at 615, the UE 605 may be preconfigured by higher layer or configured by a base station with an initial sidelink carrier or carrier component (e.g., sl-cc-init) for initial sidelink messaging between the UE 605 and the UE 610. In some aspects, the UE 605 may be preconfigured or configured with a default sidelink carrier or carrier component (e.g., sl-cc-default) for sidelink messaging between the UE 605 and the UE 610. In some examples, the UE 605 may be preconfigured or configured with a first set of candidate sidelink carriers (e.g., a sidelink carrier component list, sl-cc-list1) that supports carrier aggregation using multiple sidelink carriers. In an example, candidate sidelink carriers within the first set of candidate sidelink carriers (e.g., sl-cc-list1) may be arranged or listed according to respective priorities of the candidate sidelink carriers (e.g., according to a priority order).

At 620, the UE 610 may be preconfigured by higher layer or configured by a base station with the initial sidelink carrier or carrier component (e.g., sl-cc-init) for initial sidelink messaging between the UE 605 and the UE 610. In some aspects, the UE 610 may be preconfigured or configured with the default sidelink carrier or carrier component (e.g., sl-cc-default) for sidelink messaging between the UE 605 and the UE 610. In some examples, the UE 610 may be preconfigured or configured with a second set of candidate sidelink carriers (e.g., a sidelink carrier component list, sl-cc-list2). In an example, candidate sidelink carriers within the second set of candidate sidelink carriers (e.g., sl-cc-list2) may be arranged or listed according to respective priorities of the candidate sidelink carriers (e.g., according to a priority order).

In some aspects, the initial sidelink carrier (e.g., sl-cc-init), the default sidelink carrier (e.g., sl-cc-default), the first set of candidate sidelink carriers (e.g., sl-cc-list1) configured for the UE 605, or the second set of candidate sidelink carriers (e.g., sl-cc-list2) configured for the UE 610 may be configured by the base station 611. The initial sidelink carrier (e.g., sl-cc-init), the default sidelink carrier (e.g., sl-cc-default), the first set of candidate sidelink carriers (e.g., sl-cc-list1) configured for the UE 605, and the second set of candidate sidelink carriers (e.g., sl-cc-list2) configured for the UE 610 may include aspects of the initial sidelink carrier (e.g., sl-cc-init), the default sidelink carrier (e.g., sl-cc-default), the first set of candidate sidelink carriers (e.g., sl-cc-list1), and the second set of candidate sidelink carriers as described with reference to FIG. 4. Repeated descriptions of example aspects thereof are omitted.

At 625, the UE 605 may receive a sidelink message from the UE 610. The sidelink message may indicate the second set of candidate sidelink carriers (e.g., sl-cc-list2) configured for the UE 610. In some aspects, the sidelink message may be, for example, a discovery message or an announcement message (e.g., a broadcast message). In an example, the UE 605 may determine a subset of candidate sidelink carriers from the first set of candidate sidelink carriers (e.g., sl-cc-list1) and the second set of candidate sidelink carriers (e.g., sl-cc-list2). For example, the subset of candidate sidelink carriers may be a joint set of candidate sidelink carriers common to the first set of candidate sidelink carriers (e.g., sl-cc-list1) and the second set of candidate sidelink carriers (e.g., sl-cc-list2).

At 630, the UE 605 may measure channel parameters (e.g., CBR, RSRP, RSSI, etc.) of one or more candidate sidelink carriers of the joint set of candidate sidelink carriers. In an example, the UE 605 may measure channel parameters (e.g., CBR, RSRP, RSSI, etc.) of candidate sidelink carriers of the joint set of candidate sidelink carriers. In an example, the UE 605 may measure the channel parameters (e.g., CBR, RSRP, RSSI, etc.) based on respective priorities of the candidate sidelink carriers. For example, the UE 605 may measure the channel parameters (e.g., CBR, RSRP, RSSI, etc.) according to a priority order of the candidate sidelink carriers.

At 631, the UE 605 may transmit a sidelink UE information message (e.g., SidelinkUEInformationNR) to the base station 611. The sidelink information message may indicate the joint set of candidate sidelink carriers. In some aspects, the sidelink information message may indicate the measured channel parameters (e.g., CBR, RSRP, RSSI, etc.) of the candidate sidelink carriers included in the joint set.

In an example, the base station 611 may select, from the joint set of candidate sidelink carriers, a sidelink carrier. For example, select a sidelink carrier based on the measured channel parameter (e.g., CBR, RSRP, RSSI, etc.) which may be below a threshold (e.g., sl-acc-threshold). In some aspects, the base station 611 may select multiple sidelink carriers for which a respective measured channel parameter (e.g., CBR, RSRP, RSSI, etc.) is below the threshold. In an example, the base station 611 may set the selected sidelink carrier (or carriers) as a sidelink anchor carrier (e.g., sl-acc) for establishing (reestablishing) or maintaining a sidelink control connection (e.g., PC5 RRC connection) between the UE 605 and the UE 610.

At 632, the base station 611 may transmit (and the UE 605 may receive) an RRC configuration message (e.g., RRCReconfiguration message with sl-ConfigDedicatedNR) indicating a sidelink carrier for establishing (reestablishing) or maintaining the sidelink control connection. In an example, the RRC configuration message may indicate the sidelink anchor carrier (e.g., sl-acc) selected by the base station 611. In an example, the base station 611 may transmit a MAC-CE indicating the sidelink carrier.

At 635, the UE 605 may transmit, to the UE 610, a sidelink message. In an example, the sidelink message may be a PC5 RRC message indicating the sidelink carrier for establishing (reestablishing) or maintaining the sidelink control connection. In another example, the sidelink message may be a PC5 MAC-CE activating a sidelink carrier for establishing (reestablishing) or maintaining the sidelink control connection. In an example, the sidelink message may indicate the sidelink anchor carrier (e.g., sl-acc) selected by the base station 611. In some aspects, the UE 605 may transmit the sidelink message using the initial sidelink carrier (e.g., sl-cc-init) configured for sidelink control messaging between the UE 605 and the UE 610. The UE 610 may monitor and receive (e.g., detect) the sidelink message using the initial sidelink carrier (e.g., sl-cc-init).

In another aspect, the UE 605 may transmit the sidelink message using the sidelink anchor carrier (e.g., sl-acc). The UE 610 may monitor second set of candidate sidelink carriers (e.g., sl-cc-list2) and receive (e.g., detect) the sidelink message using the sidelink anchor carrier (e.g., sl-acc). In an example, the UE 605 may transmit the sidelink message using a public or shared sidelink signal radio bearer (SL SRB). For example, the UE 605 may transmit a sidelink message which may be a PC5 RRC message (e.g., unprotected PC5-S message before the PC5-S security has been established) to the UE 610 using SL SRB0 (e.g., using a CCCH or SCCH logical channel), or transmit a sidelink message which may be a PC5 MAC-CE carried on a physical sidelink shared channel (PSSCH), prior to the protected or secured PC5 control connection established.

At 640, the UE 605 may establish (reestablish) or maintain the sidelink control connection between the UE 605 and the UE 610. For example, UE 605 may establish (reestablish) the sidelink control connection between the UE 605 and the UE 610 using the sidelink anchor carrier (e.g., 'sl-acc') selected by the base station 611.

At 645, the UE 605 and the UE 610 may communicate (e.g., exchange) sidelink control messages using protected PC5 signaling radio bearers (e.g., SL SRB3) and exchange data packet using user data radio bearers (e.g., SL DRBs) via the PC5 control connection or PC5 link. For example, the UE 605 and the UE 610 may communicate (e.g., exchange) additional sidelink control messages using the sidelink anchor carrier (e.g., sl-acc) via protected PC5 signaling radio bearers (e.g., SL SRB3).

In some aspects, the UE 605 or the UE 610 may remap the sidelink control connection (e.g., PC5 RRC connection) established (reestablished) between the UE 605 and the UE 610 using a different sidelink carrier (e.g., a different sidelink anchor carrier selected by base station 611), for example, as described with reference to process flow 400 (as shown in FIG. 4).

Figure 7:
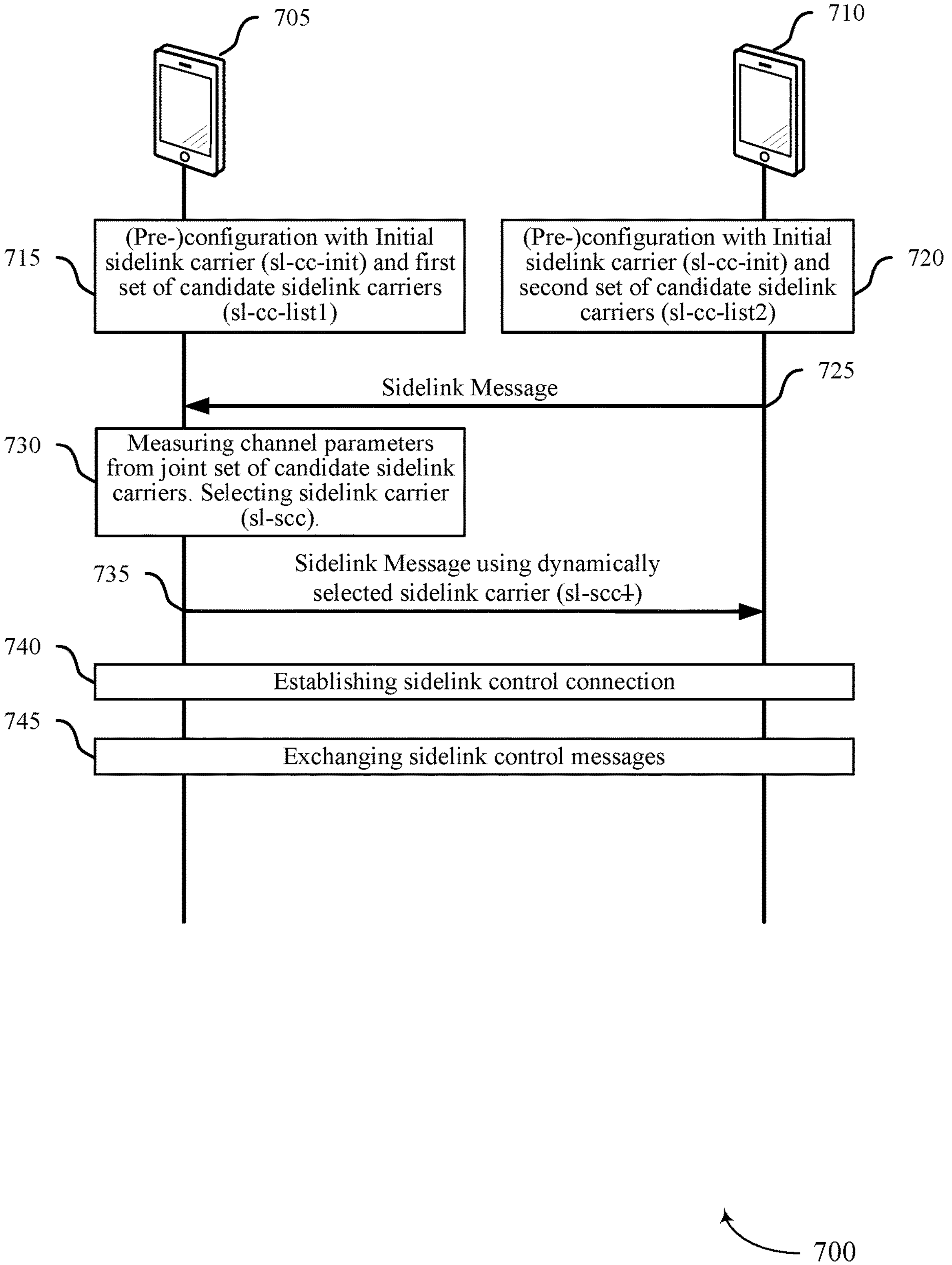

FIG. 7 illustrates an example of a process flow 700 that supports techniques for sidelink control connection with carrier aggregation in accordance with aspects of the present disclosure. In some examples, process flow 700 may implement aspects of wireless communications systems 100 through 300, process flow 400, process flow 500, or process flow 600 described with reference to FIGS. 1 through 6. Process flow 700 may be implemented by a UE 705 and UE 710, which may be examples of a UE 115 described with reference to FIG. 1. The UE 705 may be an example of a UE 115 described with reference to FIG. 1, the UE 205 described with reference to FIG. 2, the UE 305 described with reference to FIG. 3, the UE 405 described with reference to FIG. 4, the UE 505 described with reference to FIG. 5, or the UE 605 described with reference to FIG. 6. The UE 510 may be an example of the UE 116 (or another UE 115) described with reference to FIG. 1, the UE 210 described with reference to FIG. 2, the UE 310 described with reference to FIG. 3, the UE 410 described with reference to FIG. 4, the UE 510 described with reference to FIG. 5, or the UE 610 described with reference to FIG. 6.

Process flow 700 illustrates an example of establishing (reestablishing) or maintaining a sidelink control connection (e.g., PC5 RRC connection) via a dynamically selected sidelink carrier. In some aspects, the dynamically selected sidelink carriers may be indicated using a (pre-)configured initial sidelink carrier (e.g., sl-cc-init shown in FIG. 4 and FIG. 6) or using the dynamically selected sidelink carrier as shown in FIG. 7. In some examples, the dynamically selected sidelink carrier may be a FR2 or mmW carrier for intra-band sidelink carrier aggregation with FR2 or mmW carriers. In another example, the dynamically selected sidelink carrier may be a carrier associated with an unlicensed radio frequency spectrum band for intra-band sidelink carrier aggregation with unlicensed radio frequency spectrum bands.

In the following description of the process flow 700, the operations between the UE 705 and the UE 710 may be transmitted in a different order than the order shown, or the operations performed by the UE 705 and the UE 710 may be performed in different orders or at different times. Certain operations may also be left out of the process flow 700, or other operations may be added to the process flow 700. It is to be understood that while the UE 705 and the UE 710 are shown performing a number of the operations of process flow 700, any wireless device may perform the operations shown.

In accordance with various aspects of the present disclosure, at 715, the UE 705 may be preconfigured by higher layer or configured by a base station with an initial sidelink carrier or carrier component (e.g., sl-cc-init) for initial sidelink messaging between the UE 705 and the UE 710. In some examples, the UE 705 may be preconfigured or configured with a first set of candidate sidelink carriers (e.g., a sidelink carrier component list, sl-cc-list1) that supports carrier aggregation using multiple sidelink carriers. In an example, candidate sidelink carriers within the first set of candidate sidelink carriers (e.g., sl-cc-list1) may be arranged or listed according to respective priorities of the candidate sidelink carriers (e.g., according to a priority order).

At 720, the UE 710 may be preconfigured by higher layer or configured by a base station with the initial sidelink carrier (e.g., sl-cc-init) for initial sidelink messaging between the UE 705 and the UE 710. In some examples, the UE 710 may be preconfigured or configured with a second set of candidate sidelink carriers or carrier components (e.g., a sidelink carrier component list, sl-cc-list2). In an example, candidate sidelink carriers within the second set of candidate sidelink carriers (e.g., sl-cc-list2) may be arranged or listed according to respective priorities of the candidate sidelink carriers (e.g., according to a priority order).

In some aspects, the initial sidelink carrier (e.g., sl-cc-init), the first set of candidate sidelink carriers (e.g., sl-cc-list1) configured for the UE 705, or the second set of candidate sidelink carriers (e.g., sl-cc-list2) configured for the UE 710 may be configured by a base station (e.g., base station 105 described with reference to FIG. 1). The initial sidelink carrier (e.g., sl-cc-init), the first set of candidate sidelink carriers (e.g., sl-cc-list1) configured for the UE 705, and the second set of candidate sidelink carriers (e.g., sl-cc-list2) configured for the UE 710 may include aspects of the initial sidelink carrier (e.g., sl-cc-init), the first set of candidate sidelink carriers (e.g., sl-cc-list1), and the second set of candidate sidelink carriers as described with reference to FIG. 4. Repeated descriptions of example aspects thereof are omitted.

At 725, the UE 705 may receive a sidelink message from the UE 710. The sidelink message may indicate the second set of candidate sidelink carriers (e.g., sl-cc-list2) configured for the UE 710. In some aspects, the sidelink message may be, for example, a discovery message or an announcement message (e.g., a broadcast message). In an example, the UE 705 may determine a subset of candidate sidelink carriers from the first set of candidate sidelink carriers (e.g., sl-cc-list1) and the second set of candidate sidelink carriers (e.g., sl-cc-list2). For example, the subset of candidate sidelink carriers may be a joint set of candidate sidelink carriers common to the first set of candidate sidelink carriers (e.g., sl-cc-list1) and the second set of candidate sidelink carriers (e.g., sl-cc-list2).

At 730, the UE 705 may measure channel parameters (e.g., CBR, RSRP, RSSI, etc.) of one or more candidate sidelink carriers of the joint set of candidate sidelink carriers. In an example, the UE 705 may measure channel parameters (e.g., CBR, RSRP, RSSI, etc.) of candidate sidelink carriers of the joint set of candidate sidelink carriers. In an example, the UE 705 may measure the channel parameters (e.g., CBR, RSRP, RSSI, etc.) based on respective priorities of the candidate sidelink carriers. For example, the UE 705 may measure the channel parameters (e.g., CBR, RSRP, RSSI, etc.) according to a priority order of the candidate sidelink carriers.

Additionally, at 730, the UE 705 may select, from the joint set of candidate sidelink carriers, a sidelink carrier (e.g., sl-scc) for which a measured channel parameter (e.g., CBR, RSRP, RSSI, etc.) is below a threshold (e.g., sl-cc-threshold). In some aspects, the UE 705 may select multiple sidelink carriers for which a respective measured channel parameter (e.g., CBR, RSRP, RSSI, etc.) is below the threshold. In an example, the UE 705 may use the dynamically selected sidelink carrier (or carriers) for establishing or maintaining a sidelink control connection (e.g., PC5 RRC connection) between the UE 705 and the UE 710.

In some other aspects, the UE 705 may perform listen before talk (LBT) procedures (e.g., based on RSSI or energy measurement) for one or more candidate sidelink carriers of the joint set of candidate sidelink carriers. In an example, the UE 705 may conduct LBT procedures to assess the candidate sidelink carriers, based on respective priorities of the candidate sidelink carriers. For example, the first UE may assess the candidate sidelink carriers according to a priority order of the candidate sidelink carriers. In an example, based on the LBT procedures, the first UE may determine that a dynamically selected sidelink carrier or carrier component (e.g., 'sl-scc') is not in use (e.g., not in use by another network device). In an example, the first UE may use the dynamically selected sidelink carrier or carrier component (e.g., 'sl-scc') for establishing (reestablishing) or maintaining a sidelink control connection (e.g., PC5 RRC connection) between the UE 705 and the UE 710.

At 735, the UE 705 may transmit, to the UE 710, a sidelink message. In some examples, the sidelink message may be a PC5 RRC message indicating the sidelink carrier (e.g., sl-scc1) for establishing (reestablishing) or maintaining the sidelink control connection. In some other examples, the sidelink message may be a PC5 MAC-CE activating a sidelink carrier for establishing (reestablishing) or maintaining the sidelink control connection. In some aspects, the UE 705 may transmit the sidelink message using the (pre-) configured initial sidelink carrier component (e.g., sl-cc-init) or the dynamically selected sidelink carrier (e.g., sl-scc). In some examples, the sidelink message may indicate the joint set of candidate sidelink carriers. In an example, the UE 705 may transmit the sidelink message using a sidelink signal radio bearer (SL SRB). For example, the UE 705 may transmit a sidelink message which may be a PC5 RRC message (e.g., unprotected PC5-S message before the PC5-S security has been established) to the UE 710 using SL SRB0 (e.g., using a CCCH or SCCH logical channel).

In some other aspects, the UE 705 may map the logic channel (e.g., SCCH 225 or SCCH 230 (as shown in FIG. 2)) for sidelink control messaging to a candidate sidelink carrier. For example, the UE 405 may map the logic channel for sidelink control messaging to a candidate sidelink carrier included in the joint set of candidate sidelink carriers. In an example, the UE 405 may transmit the sidelink control message using the logic channel for sidelink control messaging based on the mapping. In some aspects, the candidate sidelink carrier may be a candidate sidelink carrier dynamically selected by the UE 705. In an example, the candidate sidelink carrier may be dynamically selected by the UE 705 for FR2 or unlicensed intra-band sidelink carrier aggregation.

The UE 710 may receive (e.g., detect) the sidelink control message, for example, by monitoring the initial sidelink carrier or the second set of candidate sidelink carriers (e.g., sl-cc-list2). In an example, the dynamically selected sidelink carrier (e.g., sl-scc) may be included in the second set of candidate sidelink carriers (e.g., sl-cc-list2), and the UE 710 may monitor the second set of candidate sidelink carriers (e.g., sl-cc-list2) based on a priority order associated with the second set of candidate sidelink carriers (e.g., sl-cc-list2). In an example, based on the monitoring of the second set of candidate sidelink carriers (e.g., sl-cc-list2), the UE 710 may receive (e.g., detect) the sidelink control message using the dynamically selected sidelink carrier (e.g., sl-scc).

At 740, the UE 705 may establish (reestablish) the sidelink control connection between the UE 705 and the UE 710. For example, UE 705 may establish (reestablish) the sidelink control connection with Access-Stratum (AS) security with integrity protection and ciphering of PC5 signaling (e.g., SL-SRB2 and SL-SRB3) and PC5 link with user data (e.g., SL-DRBs) between the UE 705 and the UE 710 using the dynamically selected sidelink carrier (e.g., sl-scc) selected by the UE 705.

At 745, the UE 705 and the UE 710 may communicate (e.g., exchange) sidelink control messages using protected PC5 signaling radio bearers (e.g., SL SRB3) and exchange data packet using user data radio bearers (e.g., SL DRBs) via the PC5 control connection or PC5 link. For example, the UE 705 and the UE 710 may communicate (e.g., exchange) additional sidelink control messages using the dynamically selected sidelink carrier (e.g., sl-scc)) via protected PC5 signaling radio bearers (e.g., SL SRB3).

In some aspects, the UE 705 may dynamically select a dynamically selected sidelink carrier (e.g., sl-scc) for each transmission. For example, the UE 705 may dynamically select a sidelink carrier based on variations in data traffic (e.g., of a service, of an application) or channel conditions.

Figure 8:
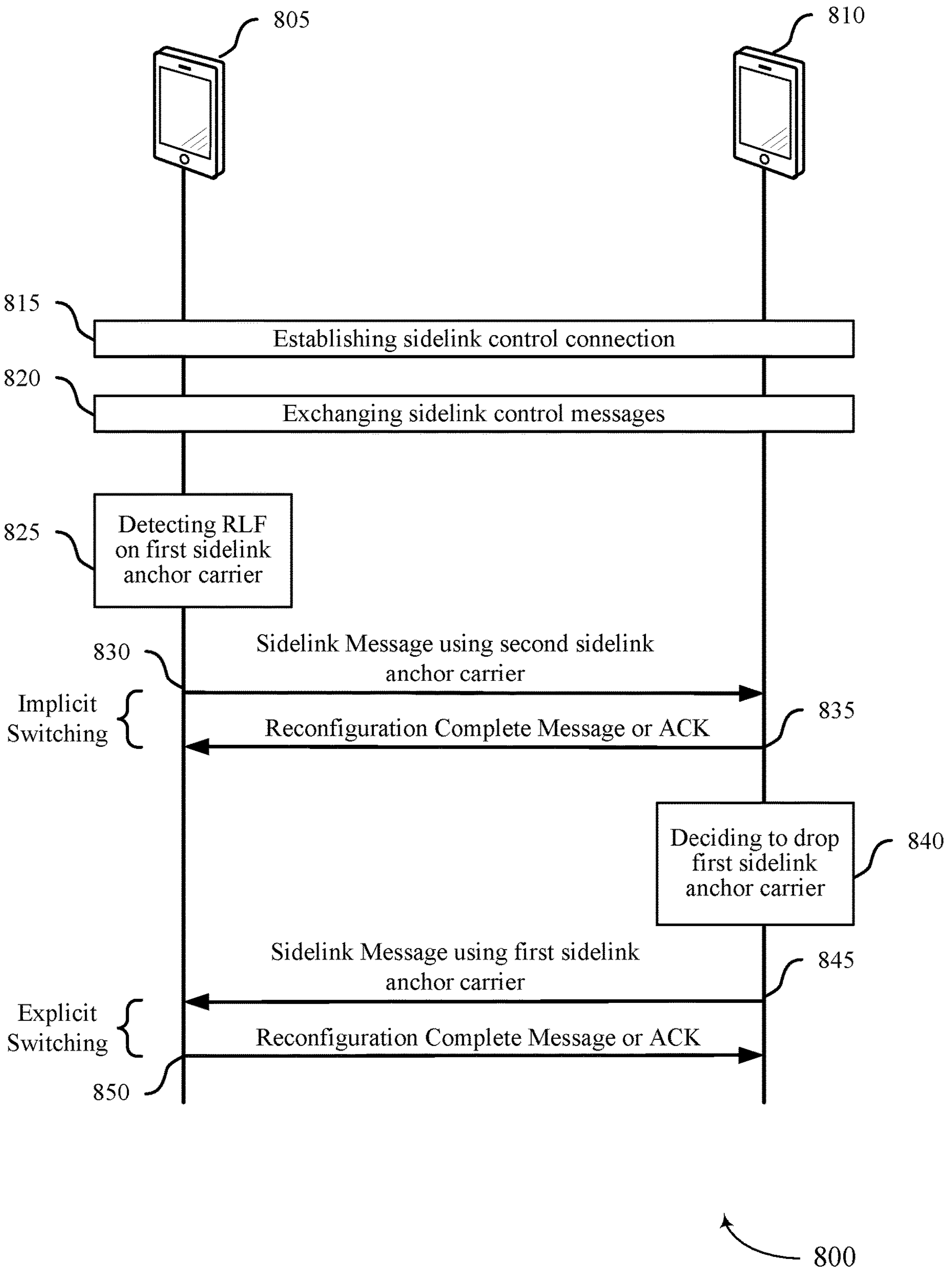

FIG. 8 illustrates an example of a process flow 800 that supports techniques for sidelink control connection with carrier aggregation in accordance with aspects of the present disclosure. In some examples, process flow 800 may implement aspects of wireless communications systems 100 through 300, process flow 400, process flow 500, process flow 600, or process flow 700 described with reference to FIGS. 1 through 7. Process flow 800 may be implemented by a UE 805 and UE 810, which may be examples of a UE 115 described with reference to FIG. 1. The UE 805 may be an example of a UE 115 described with reference to FIG. 1, the UE 205 described with reference to FIG. 2, the UE 305 described with reference to FIG. 3, the UE 405 described with reference to FIG. 4, the UE 505 described with reference to FIG. 5, the UE 605 described with reference to FIG. 6, or the UE 705 described with reference to FIG. 7. The UE 810 may be an example of the UE 116 (or another UE 115) described with reference to FIG. 1, the UE 210 described with reference to FIG. 2, the UE 310 described with reference to FIG. 3, the UE 410 described with reference to FIG. 4, the UE 510 described with reference to FIG. 5, the UE 610 described with reference to FIG. 6, or the UE 710 described with reference to FIG. 7.

Process flow 800 illustrates an example of establishing a sidelink control connection (e.g., PC5 RRC connection) using more than one sidelink anchor carrier components, for example, one as a sidelink primary anchor carrier component (PACC) or sidelink primary anchor carrier and another one as a sidelink secondary anchor carrier component (SACC) or sidelink secondary anchor carrier. The described techniques may provide for improving reliability of an established sidelink control connection (e.g., PC5 RRC connection).

In the following description of the process flow 800, the operations between the UE 805 and the UE 810 may be transmitted in a different order than the order shown, or the operations performed by the UE 805 and the UE 810 may be performed in different orders or at different times. Certain operations may also be left out of the process flow 800, or other operations may be added to the process flow 800. It is to be understood that while the UE 805 and the UE 810 are shown performing a number of the operations of process flow 800, any wireless device may perform the operations shown.

In some aspects, the UE 805 or the UE 810 may use a sidelink primary anchor carrier for a sidelink control connection (e.g., PC5 RRC connection) in the sidelink control plane. For example, the sidelink primary anchor carrier may support (e.g., carry or transport) sidelink control connection (e.g., PC5 RRC connection) (re-)establishment and maintenance. In some aspects, sidelink control connection (e.g., PC5 RRC connection) (re-)establishment may include the communication of a PC5-S security message (e.g., SL-SRB1), AS security with integrity protection and ciphering of PC5 signaling (e.g., SL-SRB2 and SL-SRB3), and user data (e.g., SL-DRBs).

In some examples, the UE 805 or the UE 810 may use the sidelink primary anchor carrier for a sidelink control connection (e.g., PC5 RRC connection) reestablishment in the sidelink control plane. For example, the primary sidelink anchor carrier may support (e.g., carry or transport) the PDCP entity of the SL-SRB1, SL-SRB2, SL-SRB3 and SL-DRBs on the sidelink control connection (e.g., PC5 RRC connection) if the change of the key is indicated by the upper layers.

In some other aspects, the UE 805 or the UE 810 may use the sidelink primary anchor carrier for a sidelink control message (e.g., PC5 RRC message) for unicast communications in the sidelink control plane. For example, the sidelink primary anchor carrier may support (e.g., carry or transport) configuration information such as RRCReconfigurationSidelink, RRCReconfigurationCompleteSidelink, and RRCReconfigurationFailureSidelink. In some examples, the sidelink primary anchor carrier may support (e.g., carry or transport) UE associated information such as UECapabilityEquirySidelink and UECapabilityInformationSidelink. In some examples, the sidelink primary anchor carrier may support (e.g., carry or transport) reporting information such as MeasurementReportSidelink.

In other aspects, the UE 805 or the UE 810 may use the sidelink primary anchor carrier for system information (e.g., PC5 RRC SIs) or a sidelink control message (e.g., PC5 RRC message) in the sidelink control plane, for example, for broadcast or groupcast communications. For example, the configuration may support a sidelink master information block (MIB) carried on a physical sidelink broadcast channel (PSBCH) (e.g., within a sidelink synchronization signal block (S-SSB)). A logic channel (e.g., a sidelink broadcast control channel (SBCCH) may be mapped to the sidelink primary anchor carrier. In some examples, the configuration may support a number of sidelink SIBs carried on a physical sidelink shared channel (PSSCH) (e.g., PC5 RRC message) via a mapping of the sidelink logic channel (e.g., sidelink common control channel (SCCCH) or SCCH) to the sidelink primary anchor carrier. In some examples, the configuration may support sidelink broadcasting (e.g., on SCCCH or SCCH) or groupcasting (e.g., on a sidelink groupcast control channel (SGCCH) or SCCH) of messages carried on PSSCH.

In other aspects, the UE 805 or the UE 810 may use the sidelink primary anchor carrier for control information (e.g., PC5 MAC-CE) in the sidelink control plane. For example, the sidelink primary anchor carrier may support (e.g., carry or transport) control elements (e.g., a MAC PDU including MAC-CE).

In accordance with various aspects of the present disclosure, at 815, the UE 805 may establish (reestablish) a sidelink control connection (e.g., PC5 RRC connection) between the UE 805 and the UE 810 using a sidelink primary anchor carrier or a sidelink primary anchor carrier component (PACC). The sidelink control connection may support carrier aggregation using multiple sidelink carriers (e.g., including the first sidelink anchor carrier).

In some examples, the UE 805 may establish the sidelink control connection (e.g., PC5 RRC connection) based on channel parameters associated with candidate sidelink carriers for the sidelink control connection. For example, the UE 805 may measure the channel parameters of candidate sidelink carriers and determine a PACC for PC5 RRC connection. The UE 805 may select the PACC based on a set of parameters or criteria.

For example, the UE 805 may select, as the PACC from a list of sidelink anchor carriers. In an example, the UE 805 may select, as the PACC, a sidelink anchor carrier having the lowest channel busy ratio (CBR) measurement averaged over a selection window or monitoring window. In another example, the UE 805 may select, as the PACC, a sidelink anchor a sidelink anchor carrier having the lowest sidelink RSRP or RSSI measurement averaged over a selection window or monitoring window. In some examples, the UE 805 may select, as the PACC, a sidelink anchor having the lowest radio frequency. In some other examples, the UE 805 may select, as the PACC, a sidelink anchor having the lowest index or the highest priority on the candidate sidelink anchor carrier component list (e.g., sl-acc-list). In some aspects, the UE 805 may select, as the PACC, a sidelink anchor having the lowest measurements (e.g., which may reflects a relatively low congestion).

In some aspects, the UE 805 may use a sidelink secondary anchor carrier component (SACC) for fallback of a PACC. For example, the UE 805 may use a SACC as the fallback to replace a PACC to mitigate potential delays or disruption which may otherwise result from a PC5 RLF failure associated with the PACC. In some aspects, the UE 805 may select an SACC based on the same parameters or criteria used for selecting a PACC.

In some examples, the UE 805 may select an SACC based on a portion of the parameters or criteria. In an example, the UE 805 may select an SACC after a PACC has been selected. For example, the UE 805 may select an SACC before or after a sidelink control connection (e.g., PC5 RRC connection) has been established (reestablished) between the UE 805 and the UE 810 using a PACC.

In some examples, the UE 805 may use an SACC for duplication of a PACC. In an example, duplicating a PACC may include duplicating PDCP packets of the PACC. In some aspects, duplicating a PACC may include mapping the same sidelink control channel (e.g., SCCH or SCCCH) to both the PACC and the SACC.

In some aspects, duplicating a PACC may include duplicating sidelink system information. For example, duplicating a PACC may include mapping a sidelink broadcast control channel (SBCCH) or SCCCH or SCCH to both PACC and SACC. In an example, the UE 805 may be preconfigured by a higher layer, configured with a candidate sidelink anchor carrier component list (e.g., sl-acc-list), or configured with a PACC and SACC (e.g., by an RRC configuration message from a base station, such as base station 105 (as shown in FIG. 1) or base station 611 (as shown in FIG. 6)). In some examples, a PACC or SACC may be activated or deactivated by a MAC-CE from base station 611 or activated or deactivated by a UE (e.g., UE 805 or 810) with a sidelink control element (e.g., sidelink MAC-CE). In some aspects, the SACC may be configured and activated as a fall back or a duplication of the PACC, which may provide for a more reliable sidelink control connection (e.g., PC5 RRC connection).

At 820, the UE 805 and the UE 810 may communicate (e.g., exchange) sidelink control messages. For example, the UE 805 and the UE 810 may communicate (e.g., exchange) additional sidelink control messages using a PACC or SACC or both as configured or activated. The UE 805 and the UE 810 may support implicit or explicit indications for switching between the PACC and the SACC or selecting both.

For example, at 825, the UE 805 may detect for a PC5 RLF or a potential PC5 RLF on the PACC. In some aspects, the PC5 RLF may include a failure of the PACC in which, for example, the UE 805 does not receive a feedback message (e.g., ACK/NACK, CSI report, etc.) for a communication previously transmitted using the PACC. In some aspects, the PC5 RLF may include a failure of the PACC in which, for example, a measured CBR, RSRP, or RSSI of the PACC (e.g., as measured by the UE 805) is above a threshold preconfigured from an upper layer or configured by the base station 611. In some aspects, the UE 805 may determine to switch from the PACC to the SACC, and in some examples, drop the PACC.

In some aspects, the UE 805 may provide an implicit indication for switching to the SACC. For example, at 830, the UE 805 may transmit, to the UE 810, a sidelink control message over the SACC. In some examples, the sidelink control message may be a sidelink RRC message (e.g., RRCReconfigurationSidelink) indicating an updated set of candidate sidelink anchor carrier components (e.g., an updated sl-acc-list1) of the UE 805 or may be a sidelink MAC-CE deactivating the PACC or activating the SACC with an updated set of candidate sidelink carriers (e.g., an updated sl-acc-list1).

At 835, the UE 805 may receive a sidelink control message which may be sidelink RRC reconfiguration complete message (e.g., RRCReconfigurationCompleteSidelink) or which may be a sidelink ACK or NACK to the MAC-CE from the UE 810 over the SACC. In some examples, the reconfiguration complete message may indicate an updated set of candidate sidelink carriers (e.g., an updated sl-acc-list2) of the UE 810. Based on the sidelink control message and the reconfiguration complete message, the UE 805 and the UE 810 may continue the sidelink control connection between the UE 805 and the UE 810 using the SACC.

In another example, at 840, the UE 810 may determine to drop (e.g., release) the PACC. For example, the UE 810 may determine to continue the sidelink control connection between the UE 805 and the UE 810 using an SACC. In an example, the UE 810 may determine to remap the sidelink control connection between the UE 805 and the UE 810 based on measured signal parameters associated with the PACC. For example, the UE 810 may measure the CBR, RSRP or RSSI of the PACC. The UE 810 may determine to drop (e.g., release) the PACC based on the measured CBR, RSRP or RSSI being more than a threshold. In some aspects, the threshold may be preconfigured by higher layer or configured by the base station 611.

At 845, the UE 810 may provide an explicit indication for switching to the an SACC. For example, at 840, the UE 810 may transmit, to the UE 805, a sidelink control message over the PACC. In some examples, the sidelink control message may be a sidelink RRC message (e.g., RRCReconfigurationSidelink) to indicate an SACC as the anchor carrier or may be a MAC-CE to deactivate the PACC or activate an SACC as the anchor carrier. In some examples, the sidelink control message may indicate an updated set of candidate sidelink carriers (e.g., an updated sl-acc-list2) of the UE 810. In some aspects, the updated set of candidate sidelink carriers (e.g., an updated sl-acc-list2) may include the SACC.

At 850, the UE 810 may receive sidelink control message which may be sidelink RRC reconfiguration complete message (e.g., RRCReconfigurationCompleteSidelink) or which may be a sidelink ACK or NACK to the MAC-CE from the UE 805 over the PACC or SACC. In some examples, the reconfiguration complete message may indicate an updated set of candidate sidelink carriers (e.g., an updated sl-acc-list1) of the UE 805. Based on the sidelink control message and the reconfiguration complete message, the UE 805 and the UE 810 may continue the sidelink control connection between the UE 805 and the UE 810 using the SACC.

Figure 9:
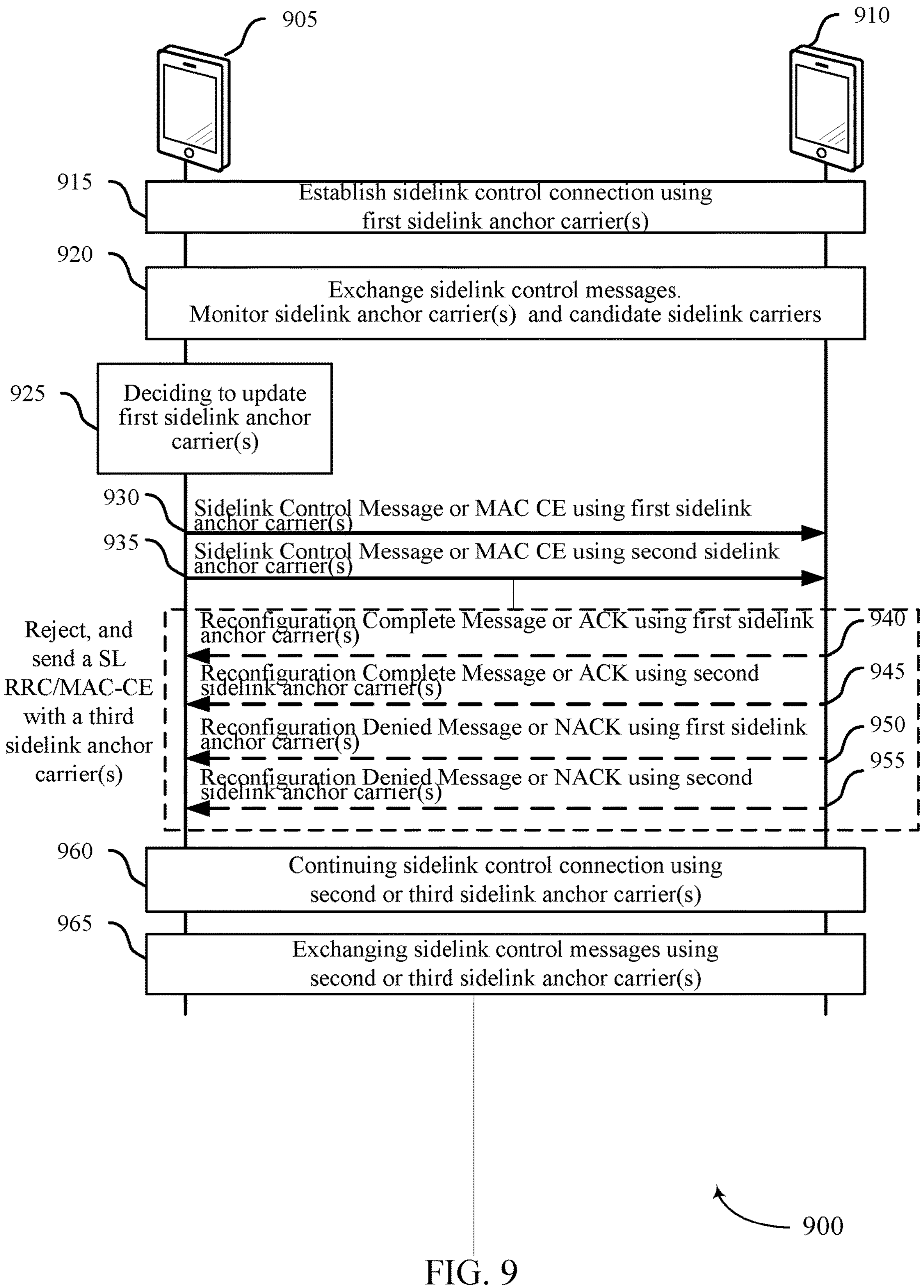

FIG. 9 illustrates an example of a process flow 900 that supports techniques for sidelink control connection with carrier aggregation in accordance with aspects of the present disclosure. In some examples, process flow 900 may implement aspects of wireless communications systems 100 through 300, process flow 400, process flow 500, process flow 600, process flow 700, or process flow 800 described with reference to FIGS. 1 through 8. Process flow 900 may be implemented by a UE 905 and UE 910, which may be examples of a UE 115 described with reference to FIG. 1. The UE 905 may be an example of a UE 115 described with reference to FIG. 1, the UE 205 described with reference to FIG. 2, the UE 305 described with reference to FIG. 3, the UE 405 described with reference to FIG. 4, the UE 505 described with reference to FIG. 5, the UE 605 described with reference to FIG. 6, the UE 705 described with reference to FIG. 7, or the UE 805 described with reference to FIG. 8. The UE 910 may be an example of the UE 116 (or another UE 115) described with reference to FIG. 1, the UE 210 described with reference to FIG. 2, the UE 310 described with reference to FIG. 3, the UE 410 described with reference to FIG. 4, the UE 510 described with reference to FIG. 5, the UE 610 described with reference to FIG. 6, the UE 710 described with reference to FIG. 7, or the UE 810 described with reference to FIG. 8.

Process flow 900 illustrates an example of monitoring and recovery of an established sidelink control connection (e.g., PC5 RRC connection) without releasing and reestablishing radio bearers (e.g., SRBs, DRBs).

In the following description of the process flow 900, the operations between the UE 905 and the UE 910 may be transmitted in a different order than the order shown, or the operations performed by the UE 905 and the UE 910 may be performed in different orders or at different times. Certain operations may also be left out of the process flow 900, or other operations may be added to the process flow 900. It is to be understood that while the UE 905 and the UE 910 are shown performing a number of the operations of process flow 900, any wireless device may perform the operations shown.

In accordance with various aspects of the present disclosure, at 915, the UE 905 may establish a sidelink control connection (e.g., PC5 RRC connection) between the UE 905 and the UE 910 using a first sidelink anchor carrier component (SL ACC) (e.g., sl-acc1) which may be a first sidelink primary anchor carrier component (PACC). In some examples, the UE 905 may establish the sidelink control connection using a first set of SL ACCs (e.g., sl-acc-list1) which may be a first sidelink primary anchor carrier component (PACC) and a first sidelink secondary anchor carrier component (SACC). The sidelink control connection may support carrier aggregation using multiple sidelink carriers.

At 920, the UE 905 and the UE 910 may communicate (e.g., exchange) sidelink control messages. For example, the UE 905 and the UE 910 may communicate (e.g., exchange) additional sidelink control messages using the first SL ACC(s) which may be the first sidelink PACC or the first sidelink SACC.

Additionally, at 920, the UE 905 may monitor channel parameters of the SL ACC (e.g., sl-acc1) or SL ACCs (e.g., sl-acc-list1). In some aspects, the UE 905 may monitor channel parameters of a set of candidate sidelink carrier components (SL CCs) (e.g., sl-cc-list), which may be a joint set of candidate sidelink carrier components (e.g., sl-cc-list 1 shown in FIG. 6 and FIG. 7) of the UE 905 and candidate sidelink carrier components (e.g., sl-cc-list 2 shown in FIG. 6 and FIG. 7) of the UE 910. In some examples, the UE 905 may monitor the channel parameters based on a monitoring window (e.g., duration) determined by the UE 905. Additionally, at 920, the UE 905 may measure the channel parameters within the monitoring window.

In an example, the UE 905 may measure CBR, RSRP, or RSSI of the candidate sidelink carriers (e.g., sl-cc-list). In some examples, the UE 905 may measure sidelink RSRP values associated with the demodulation reference signal (DMRS) of physical sidelink shared channel (PSSCH) for sidelink data transmissions received from the UE 910. In some aspects, the UE 905 may measure sidelink RSRP values associated with the DMRS of the physical sidelink control channel (PSCCH) transmissions. In some other aspects, the UE 905 may measure sidelink RSRP values associated with sidelink CSI-RS transmissions. In some examples aspects, the UE 905 may measure sidelink RSRP values associated with sidelink synchronization signal block (SL SSB) transmissions. In some examples aspects, the UE 905 may measure sidelink received signal energy or strength such as RSSI, In some examples, the UE 905 may determine (e.g., count) a quantity of feedback messages (e.g., ACK, NACK) received on a sidelink feedback channel (e.g., a physical sidelink feedback channel (PSFCH)) or CSI report on PSSCH.

At 925, the UE 905 may determine whether to update the first sidelink anchor carrier component(s) (e.g., sl-acc1 with the first PACC, or sl-acc-list1 with the first PACC and the first SACC) with a second sidelink anchor carrier component(s) (e.g., sl-acc2 with a second PACC, or sl-acc-list2 with a second PACC and a second SACC). For example, the UE 905 may determine to update the first sidelink anchor carrier(s) with the second sidelink anchor carrier(s) based on the channel measurements of the candidate sidelink carriers (e.g., sl-cc-list). In an example, the UE 905 may select a candidate sidelink carrier component or carrier components as the second sidelink anchor carrier component (e.g., sl-acc2) or the second sidelink anchor carrier components (e.g., sl-acc-list2) for continuing the sidelink control connection (e.g., PC5 RRC connection) between the UE 905 and the UE 910.

In some aspects, the UE 905 may determine the updates according to a priority order of the candidate sidelink carriers. For example, the UE 905 may determine the updates in an order corresponding to respective priorities of the candidate sidelink carriers. In an example, the UE 905 may determine the updates based on the measured CBR values of the candidate sidelink carriers. In another example, the UE 905 may determine the updates based on the measured sidelink RSRP or RSSI values.

At 925, the UE 905 may determine to update the first sidelink anchor carrier(s) with a candidate sidelink carrier(s) based on the measurements. In an example, the UE 905 may determine to update the first sidelink anchor carrier(s) when the CBR for the first sidelink anchor carrier(s) exceeds a CBR threshold. In another example, the UE 905 may determine to update the first sidelink anchor carrier(s) when the sidelink RSRP or RSSI for the sidelink anchor carrier(s) is above a sidelink RSRP or RSSI threshold.

In some other examples, the UE 905 may determine to update the first sidelink anchor carrier(s) when the UE 905 has transmitted a sidelink transmission using the first sidelink anchor carrier(s), and a duration has expired for receiving a feedback message (e.g., ACK, NACK) for the sidelink transmission. In some aspects, the thresholds (e.g., CBR threshold, RSRP threshold, RSSI threshold, or duration for receiving a feedback message) may be different from thresholds at which the UE 905 would be unable to establish or maintain a sidelink connection to UE 910. For example, the CBR threshold based on which the UE 905 determines to update the sidelink anchor carrier may be different from (e.g., less than) a CBR threshold corresponding to PC5 RLF using the sidelink anchor carrier. In another example, the RSRP or RSSI threshold based on which the UE 905 determines to update the sidelink anchor carrier may be different from (e.g., lower than) a RSRP or RSSI threshold corresponding to PC5 RLF using the sidelink anchor carrier.

The UE 905 may transmit, to the UE 910, a sidelink control message (e.g., RRCReconfigurationSidelink) for indicating or a sidelink MAC-CE for activating a selected sidelink candidate carrier(s) as the second sidelink anchor carrier(s) for continuing the sidelink control connection. In an example, the sidelink control message or sidelink MAC-CE may indicate the second sidelink anchor carrier component (e.g., sl-acc2 which may be the second PACC) or the second sidelink anchor carrier components (e.g., sl-acc-list2 which may be the second PACC and the second SACC) selected by the UE 905 and the updated candidate sidelink carriers (e.g., sl-cc-list). In some aspects, at 930, the UE 905 may transmit the sidelink control message or sidelink MAC-CE using the first sidelink anchor carrier component (e.g., sl-acc1 with the first PACC) or first sidelink anchor carrier components (e.g., sl-acc-list1 with first PACC and first SACC).

Additionally, or alternatively, at 935, the UE 905 may transmit the sidelink control message or sidelink MAC-CE using the second sidelink anchor carrier component (e.g., sl-acc2) or the second sidelink anchor carrier components (e.g., sl-acc-list2) selected by the UE 905. For example, the second sidelink anchor carrier component (e.g., sl-acc2) selected by the UE 905 may be a second PACC. For example, the second sidelink anchor carrier components (e.g., sl-acc-list2) selected by the UE 905 may be a second PACC and a second SACC. In some aspects, the sidelink control message may indicate the second sidelink anchor carrier (e.g., sl-acc2) or the second sidelink anchor carriers (e.g., sl-acc-list2). In some other aspects, the sidelink control message may indicate an updated candidate sidelink carriers (e.g., sl-cc-list) by UE910.

In some aspects, the UE 910 may accept or reject the configuration of the second sidelink anchor carrier(s) (e.g., sl-acc2 or sl-acc-list2) for continuing the sidelink control connection. For example, the UE 910 may transmit a reconfiguration complete message (e.g., RRCReconfigurationCompleteSidelink) or ACK to MAC-CE for confirming using the second sidelink anchor carrier(s) (e.g., sl-acc2 or sl-acc-list2) for the sidelink control connection. In an example, at 940, the UE 910 may transmit the reconfiguration complete message or ACK to MAC-CE over the first sidelink anchor carrier(s) (e.g., sl-acc1 or sl-acc-list1) used for establishing the sidelink control connection at 915. In another example, at 945, the UE 910 may transmit a reconfiguration complete message or ACK to MAC-CE over the second sidelink anchor carrier(s) (e.g., sl-acc2 or sl-acc-list2).

In another example, at 950, the UE 910 may transmit a reconfiguration denied message (e.g., RRCReconfigurationFailureSidelink) or NACK to MAC-CE over the first sidelink anchor carrier(s) used for establishing the sidelink control connection at 915. In other examples, at 955, the UE 910 may transmit the reconfiguration denied message or NACK to MAC-CE over the second sidelink anchor carrier(s). In some aspects, the reconfiguration denied message (e.g., RRCReconfigurationFailureSidelink) may indicate an third sidelink anchor carrier(s) (e.g., sl-acc3 or sl-acc-list3) selected by the UE 910 as a third sidelink anchor carrier(s) (e.g., including a preference or priority indicated by the UE 910). In some aspects, the sidelink control message may indicate the third sidelink anchor carrier(s) (e.g., sl-acc3 or sl-acc-list3). In some other aspects, the sidelink control message may indicate an updated candidate sidelink carriers (e.g., sl-cc-list). Additionally, or alternatively, the UE 910 may transmit, to UE 905, a sidelink control message for indicating the third sidelink carrier or a sidelink MAC-CE for activating the third sidelink carrier for the sidelink control connection between the first UE and the second UE.

At 960, the UE 910 may continue (e.g., maintain) the sidelink control connection between the UE 905 and the UE 910. For example, the UE 905 may continue the sidelink control connection between the UE 905 and the UE 910 using the second sidelink anchor carrier(s) (e.g., sl-acc2 or sl-acc-list2) selected by the UE 905. In another example, the UE 905 may continue (e.g., maintain) the sidelink control connection between the UE 905 and the UE 910 using the third sidelink anchor carrier(s) (e.g., sl-acc3 or sl-acc-list3) selected by the UE 910 (e.g., as indicated in the reconfiguration denied message). In some aspects, the UE 905 may continue (e.g., maintain) the sidelink control connection between the UE 905 and the UE 910 without releasing and reestablishing associated radio bearers (e.g., SRBs, DRBs).

At 965, the UE 905 and the UE 910 may communicate (e.g., exchange) sidelink control messages. For example, the UE 905 and the UE 910 may communicate (e.g., exchange) additional sidelink control messages using the second sidelink anchor carriers (e.g., sl-acc2 or sl-acc-list2) selected by UE 905. In another example, the UE 905 and the UE 910 may communicate (e.g., exchange) additional sidelink control messages using the third sidelink anchor carrier(s) (e.g., sl-acc3 or sl-acc-list3) selected by the UE 910 (e.g., as indicated in the reconfiguration denied message).

Figure 10:
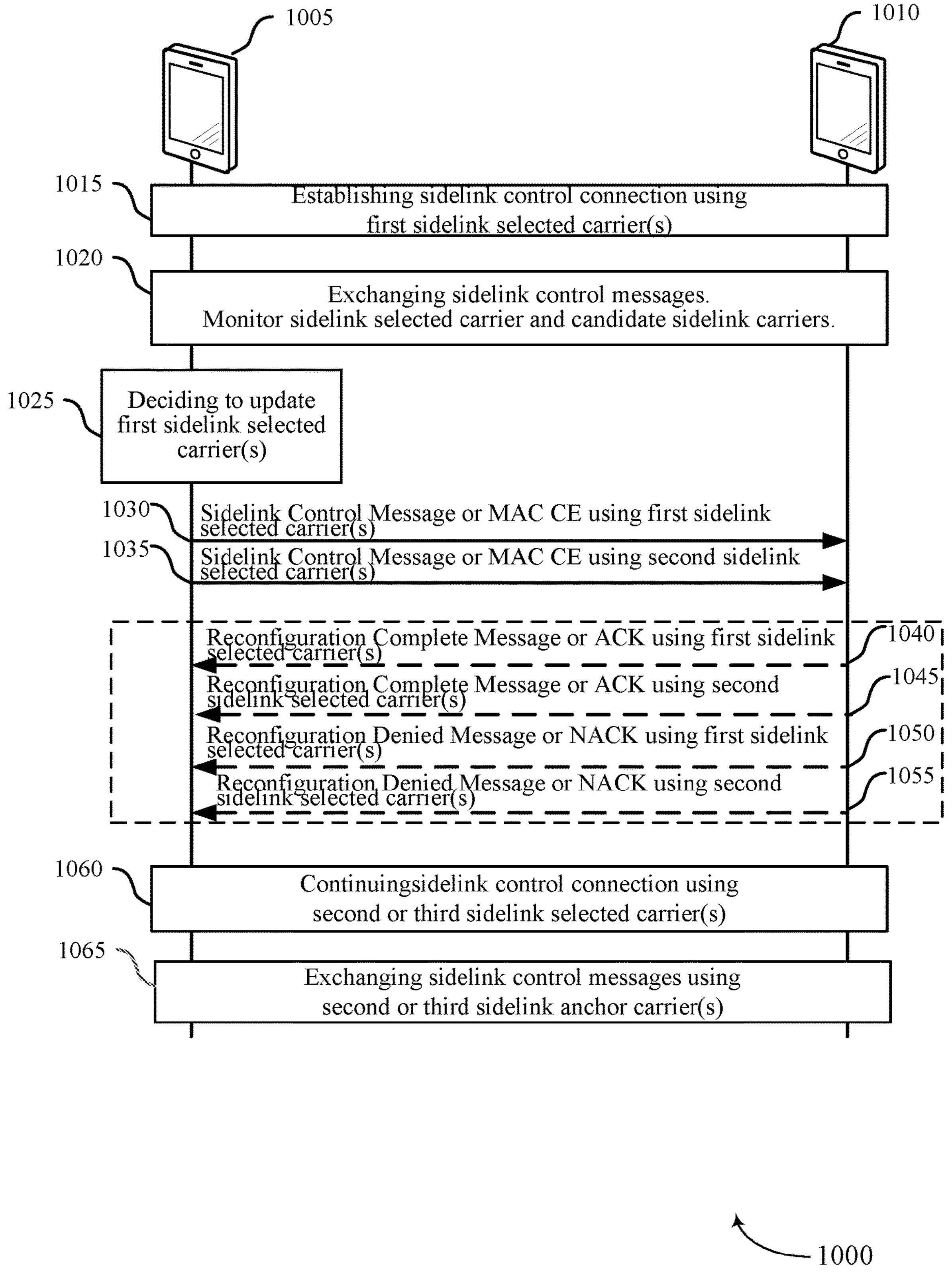

FIG. 10 illustrates an example of a process flow 1000 that supports techniques for sidelink control connection with carrier aggregation in accordance with aspects of the present disclosure. In some examples, process flow 1000 may implement aspects of wireless communications systems 100 through 300, process flow 400, process flow 500, process flow 600, process flow 700, process flow 800, or process flow 900 described with reference to FIGS. 1 through 9.

Process flow 1000 may be implemented by a UE 1005 and UE 1010, which may be examples of a UE 115 described with reference to FIG. 1. The UE 1005 may be an example of a UE 115 described with reference to FIG. 1, the UE 205 described with reference to FIG. 2, the UE 305 described with reference to FIG. 3, the UE 405 described with reference to FIG. 4, the UE 505 described with reference to FIG. 5, the UE 605 described with reference to FIG. 6, the UE 705 described with reference to FIG. 7, the UE 805 described with reference to FIG. 8, or the UE 905 described with reference to FIG. 9. The UE 1010 may be an example of the UE 116 (or another UE 115) described with reference to FIG. 1, the UE 210 described with reference to FIG. 2, the UE 310 described with reference to FIG. 3, the UE 410 described with reference to FIG. 4, the UE 510 described with reference to FIG. 5, the UE 610 described with reference to FIG. 6, the UE 710 described with reference to FIG. 7, the UE 810 described with reference to FIG. 8, or the UE 910 described with reference to FIG. 9.

Process flow 1000 illustrates an example of monitoring and recovery of an established sidelink control connection (e.g., PC5 RRC connection) without releasing and reestablishing radio bearers (e.g., SRBs, DRB s).

In the following description of the process flow 1000, the operations between the UE 1005 and the UE 1010 may be transmitted in a different order than the order shown, or the operations performed by the UE 1005 and the UE 1010 may be performed in different orders or at different times. Certain operations may also be left out of the process flow 1000, or other operations may be added to the process flow 1000. It is to be understood that while the UE 1005 and the UE 1010 are shown performing a number of the operations of process flow 1000, any wireless device may perform the operations shown.

In accordance with various aspects of the present disclosure, at 1015, the UE 1005 may establish a sidelink control connection (e.g., PC5 RRC connection) between the UE 1005 and the UE 1010 using a first sidelink selected carrier component(s) (e.g., sl-scc1 or sl-scc-list1). The sidelink control connection may support carrier aggregation using multiple sidelink carriers.

At 1020, the UE 1005 and the UE 1010 may communicate (e.g., exchange) sidelink control messages. For example, the UE 1005 and the UE 1010 may communicate (e.g., exchange) additional sidelink control messages using the first sidelink selected carrier(s). Additionally, at 1020, the UE 1005 may monitor channel parameters of the selected sidelink carrier(s) (e.g., sl-scc1 or sl-scc-list1). In some aspects, the UE 1005 may monitor channel parameters of a set of candidate sidelink carrier components (SL CCs) (e.g., sl-cc-list) which may be a joint set of candidate sidelink carrier components (e.g., sl-cc-list 1 shown in FIG. 6 and FIG. 7) of the UE 1005 and candidate sidelink carrier components (e.g., sl-cc-list 2 shown in FIG. 6 and FIG. 7) of the UE 1010. In some examples, the UE 1005 may monitor the channel parameters based on a monitoring window (e.g., duration) determined by the UE 1005. Additionally, at 1020, the UE 1005 may measure the channel parameters within the monitoring window.

In an example, the UE 1005 may measure CBR values of the candidate sidelink carriers. In some examples, the UE 1005 may measure sidelink RSRP values associated with the demodulation reference signal (DMRS) of physical sidelink shared channel (PSSCH) for sidelink data transmissions received from the UE 1010. In some aspects, the UE 1005 may measure sidelink RSRP values associated with the DMRS of the physical sidelink control channel (PSCCH) transmissions. In some other aspects, the UE 1005 may measure sidelink RSRP values associated with sidelink CSI-RSs transmissions. In some examples aspects, the UE 1005 may measure sidelink RSRP values associated with sidelink synchronization signal block (SL SSB)transmissions. In some examples, the UE 1005 may determine (e.g., count) a quantity of feedback messages (e.g., ACK, NACK) received on a sidelink feedback channel (e.g., a physical sidelink feedback channel (PSFCH)) or CSI report on PSSCH.

At 1025, the UE 1005 may determine whether to update the first sidelink selected carrier component(s) (e.g., sl-scc1 or sl-scc-list1) with a second sidelink selected carrier component(s) (e.g., sl-scc2 or sl-scc-list2). For example, the UE 1005 may determine to update a first sidelink selected carrier(s) with a second sidelink selected carrier(s) based on the channel measurements of the candidate sidelink carriers. In an example, the UE 1005 may select a candidate sidelink carrier(s) as the secondary sidelink selected carriers (e.g., sl-scc2 or sl-scc-list2) for continuing the sidelink control connection (e.g., PC5 RRC connection) between the UE 1005 and the UE 1010. In some aspects, the secondary sidelink selected carrier(s) (e.g., sl-scc2 or sl-scc-list2) may be a dynamically selected carriers. In an example, the secondary sidelink selected carrier(s) (e.g., sl-scc2 or sl-scc-list2) may be an FR2 carrier for FR2 intra-band carrier aggregation or an unlicensed carrier for unlicensed intra-band carrier aggregation.

In some aspects, the UE 1005 may determine the updates according to a priority order of the candidate sidelink carriers. For example, the UE 1005 may determine the updates in an order corresponding to respective priorities of the candidate sidelink carriers. In an example, the UE 1005 may determine the updates based on the measured CBR values of the candidate sidelink carriers. In another example, the UE 1005 may determine the updates based on based on the measured sidelink RSRP or RSSI values.

At 1025, the UE 1005 may determine to update the first sidelink selected carrier(s) with a candidate sidelink carrier(s) based on the measurements. In an example, the UE 1005 may determine to update the first sidelink selected carrier(s) when the CBR for the first sidelink selected carrier(s) exceeds a CBR threshold. In another example, the UE 1005 may determine to update the first sidelink selected carrier(s) when the sidelink RSRP or RSSI for the first sidelink selected carrier is above a sidelink RSRP or RSSI threshold.

In some other examples, the UE 1005 may determine to update the first sidelink selected carrier(s) when the UE 1005 has transmitted a sidelink transmission using the first sidelink selected carrier(s), and a duration has expired for receiving a feedback message (e.g., ACK, NACK) for the sidelink transmission. In some aspects, the thresholds (e.g., CBR threshold, RSRP threshold, RSSI threshold, duration for receiving a feedback message) may be different from thresholds at which the UE 1005 would be unable to establish or maintain a sidelink connection to UE 1010. For example, the CBR threshold based on which the UE 1005 determines to update the sidelink carrier may be different from (e.g., less than) a CBR threshold corresponding to PC5 RLF using the sidelink carrier. In another example, the RSRP or RSSI threshold based on which the UE 1005 determines to update the sidelink carrier may be different from (e.g., higher than) a RSRP or RSSI threshold corresponding to PC5 RLF using the sidelink carrier.

The UE 1005 may transmit, to the UE 1010, a sidelink control message (e.g., RRCReconfigurationSidelink) for indicating or a sidelink MAC-CE for activating a selected sidelink candidate carrier(s) as the second sidelink selected carrier(s) for continuing the sidelink control connection. In an example, the sidelink control message or sidelink MAC-CE may indicate the second sidelink selected carrier(s) (e.g., sl-scc2 or sl-scc-list2) selected by the UE 1005 and the updated candidate sidelink carriers (e.g., sl-cc-list). In some aspects, at 1030, the UE 1005 may transmit the sidelink control message or sidelink MAC-CE using the first sidelink selected carrier(s) (e.g., sl-scc1 or sl-scc-list1), and the sidelink control message or sidelink MAC-CE may indicate the second sidelink selected carrier(s) (e.g., sl-scc2 or sl-scc-list2) and the updated candidate sidelink carriers (e.g., sl-cc-list). Additionally, or alternatively, at 1035, the UE 1005 may transmit the sidelink control message using the second sidelink selected carrier(s) (e.g., sl-scc2), and the sidelink control message or MAC-CE may indicate the second sidelink carrier(s) (e.g., sl-scc2 or sl-scc-list2) or the updated candidate sidelink carriers (e.g., sl-cc-list).

In some aspects, the UE 1010 may accept or reject the configuration of the second sidelink carrier(s) (e.g., sl-scc2 or sl-scc-list2) for the sidelink control connection. For example, the UE 1010 may transmit a reconfiguration complete message (e.g., RRCReconfigurationCompleteSidelink) or ACK to MAC-CE for confirming using the second sidelink carrier(s) for the sidelink control connection. In an example, at 1040, the UE 1010 may transmit the reconfiguration complete message or ACK to MAC-CE over the first sidelink selected carrier(s) (e.g., sl-scc1 or sl-scc-list1). In an example, at 1045, the UE 1010 may transmit the reconfiguration complete message or ACK to MAC-CE over the second sidelink selected carrier(s) (e.g., sl-scc2 or sl-scc-list2)

In another example, at 1050, the UE 1010 may transmit a reconfiguration denied message (e.g., RRCReconfigurationFailureSidelink) or NACK to MAC-CE over the first sidelink selected carrier(s) (e.g., sl-scc1 or sl-scc-list1). In some aspects, the reconfiguration denied message (e.g., RRCReconfigurationFailureSidelink) may indicate a third sidelink carrier(s) (e.g., sl-scc3 or sl-scc-list3) selected by the UE 1010 as a third sidelink selected carrier(s) (e.g., including a preference or priority indicated by the UE 1010). In other examples, at 1055, the UE 1010 may transmit the reconfiguration denied message or NACK to MAC-CE over the second sidelink selected carrier (e.g., sl-scc2 or sl-scc-list2). In some aspects, the reconfiguration denied message may indicate the third sidelink carrier(s) (e.g., sl-scc3 or sl-scc-list3), and updated candidate sidelink carriers (e.g., sl-cc-list) by UE1010. Additionally, or alternatively, the UE 1010 may transmit, to UE 1005, a sidelink control message for indicating the third sidelink carrier or a sidelink MAC-CE for activating the third sidelink carrier for the sidelink control connection between the first UE and the second UE.

At 1060, the UE 1010 may continue the sidelink control connection between the UE 1005 and the UE 1010. For example, the UE 1005 may continue the sidelink control connection between the UE 1005 and the UE 1010 using the second sidelink selected carrier(s) (e.g., sl-scc2 or sl-scc-list2) selected by the UE 1005. In another example, the UE 1005 may continue the sidelink control connection between the UE 1005 and the UE 1010 using the third sidelink selected carrier(s) (e.g., sl-scc3 or sl-scc-list3) selected by the UE 1010 (e.g., as indicated in the reconfiguration denied message). In some aspects, the UE 1005 may continue the sidelink control connection between the UE 1005 and the UE 1010 without releasing and reestablishing associated radio bearers (e.g., SRBs, DRBs).

At 1065, the UE 1005 and the UE 1010 may communicate (e.g., exchange) sidelink control messages. For example, the UE 1005 and the UE 1010 may communicate (e.g., exchange) additional sidelink control messages using the second sidelink carrier(s) (e.g., sl-scc2 or sl-scc-list2). In another example, the UE 1005 and the UE 1010 may communicate (e.g., exchange) additional sidelink control messages using the third sidelink carrier(s) (e.g., sl-scc3 or sl-scc-list3) selected by the UE 1010 (e.g., as indicated in the reconfiguration denied message).

Figure 11:
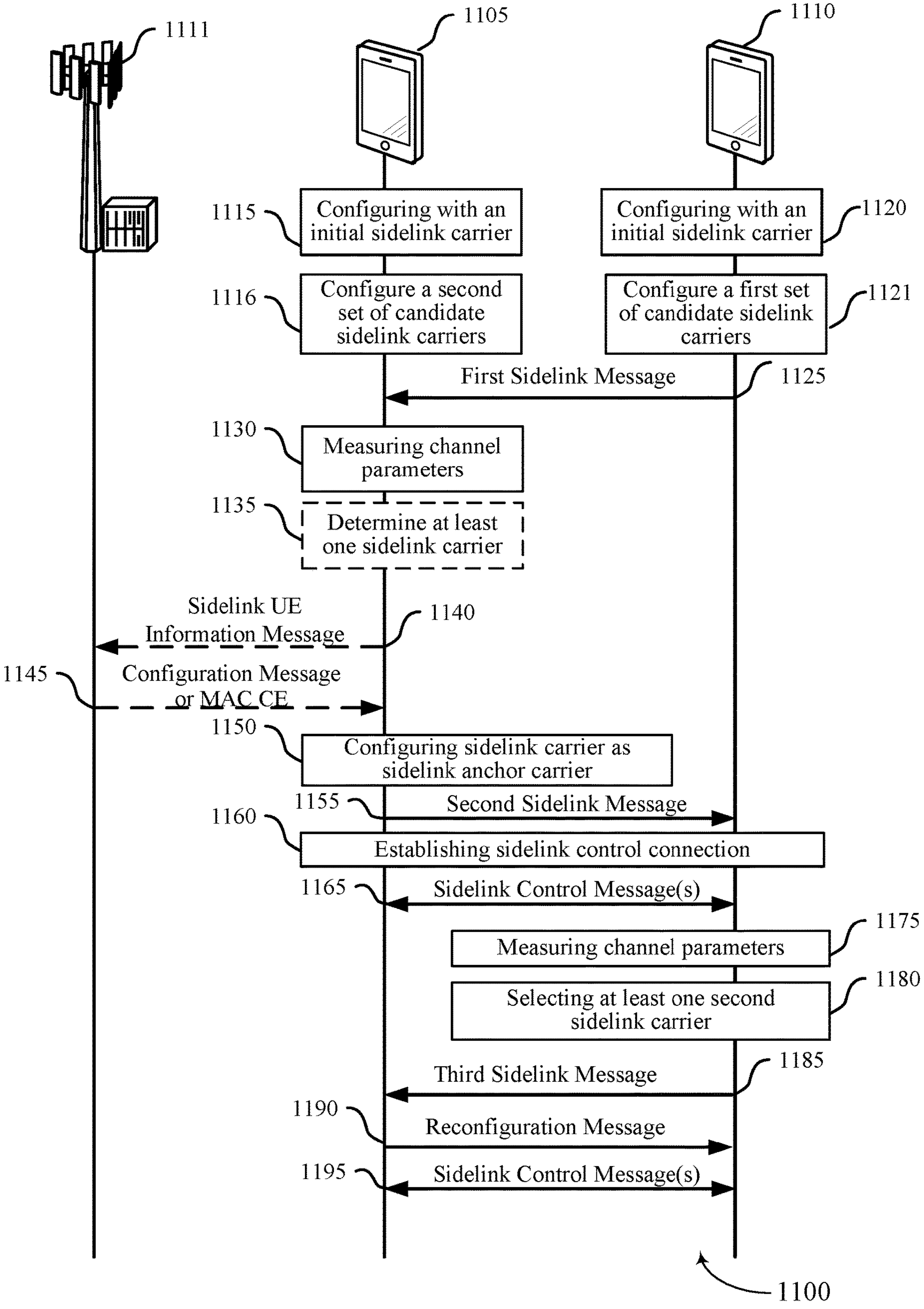

FIG. 11 illustrates an example of a process flow 1100 that supports techniques for sidelink control connection with carrier aggregation in accordance with aspects of the present disclosure. In some examples, process flow 1100 may implement aspects of wireless communications systems 100 through 300 or process flow 400 through process flow 700 described with reference to FIGS. 1 through 7.

Process flow 1100 may be implemented by a UE 1105 and UE 1110, which may be examples of a UE 115 described with reference to FIG. 1, and a base station 1111, which may be an example of a base station 105 described with reference to FIG. 1. The UE 1105 may be an example of a UE 115 described with reference to FIG. 1, the UE 205 described with reference to FIG. 2, the UE 305 described with reference to FIG. 3, the UE 405 described with reference to FIG. 4, the UE 505 described with reference to FIG. 5, the UE 605 described with reference to FIG. 6, or the UE 705 described with reference to FIG. 7. The UE 1110 may be an example of the UE 116 (or another UE 115) described with reference to FIG. 1, the UE 210 described with reference to FIG. 2, the UE 310 described with reference to FIG. 3, the UE 410 described with reference to FIG. 4, the UE 510 described with reference to FIG. 5, the UE 610 described with reference to FIG. 6, or the UE 710 described with reference to FIG. 7.

At 1115, the UE 1105 may be preconfigured by higher layer or configured by base station 1111 with an initial sidelink carrier for sidelink messaging between the UE 1105 and the UE 1110 before establishing the sidelink control connection. In some examples, the initial sidelink carrier may include a configured sidelink carrier, a preconfigured sidelink carrier, or a default sidelink carrier.

At 1116, the UE 1105 may be preconfigured by higher layer or configured by base station 1111 with a second set of candidate sidelink carriers for the UE 1105.

At 1120, the UE 1110 may be preconfigured by higher layer or configured by base station 1111 with the initial sidelink carrier for sidelink messaging between the UE 1105 and the UE 1110 before establishing the sidelink control connection.

At 1121, the UE 1110 may be preconfigured by higher layer or configured by base station 1111 with a first set of candidate sidelink carriers for the second UE. At 1121, the UE 1110 may configure the first set of candidate sidelink carriers for the UE 1110.

At 1125, the UE 1105 may receive a first sidelink message from a UE 1110, the first sidelink message indicating a first set of candidate sidelink carriers of the UE 1110.

At 1130, the UE 1105 may measure one or more channel parameters of at least one candidate sidelink carrier of the first set of candidate sidelink carriers. In some examples, measuring the one or more channel parameters of the at least one candidate sidelink carrier may include determining the at least one candidate sidelink carrier from a set of common candidate sidelink carriers. In some aspects, the set of common candidate sidelink carriers may include one or more carriers common to the first set of candidate sidelink carriers and a second set of candidate sidelink carriers of the UE 1105. In some aspects, the UE 1105 may measure each of common candidate sidelink carriers based on a priority associated with the first set of common candidate sidelink carriers. In some examples, measuring the one or more channel parameters of the at least one candidate sidelink carrier may include measure a channel busy ratio (CBR) of the at least one candidate sidelink carrier.

At 1135, the UE 1105 may determine at least one sidelink carrier of the first set of candidate sidelink carriers based on the measured one or more channel parameters, the at least one sidelink carrier for establishing a sidelink control connection that supports carrier aggregation using multiple sidelink carriers. In some aspects, the UE 1105 may select the at least one sidelink carrier based on the one or more channel parameters satisfying a threshold.

Additionally, or alternatively, at 1135, the UE 1105 may determine the at least one candidate sidelink carrier as a sidelink anchor carrier.

At 1140, the UE 1105 may transmit a sidelink UE information message to a base station, the sidelink UE information message indicating at least the measured one or more channel parameters with the associated sidelink carriers, or the common candidate sidelink carriers.

At 1145, the UE 1105 may receive, from the base station, a configuration message indicating the sidelink carrier or a MAC-CE activating the sidelink carrier for establishing the sidelink control connection, where the configuration message indicates or MAC-CE activates the sidelink carrier as a sidelink anchor carrier.

At 1150, the UE 1105 may set the at least one sidelink carrier as a sidelink anchor carrier for the sidelink control connection. In some examples, the UE 1105 may map a logic channel for sidelink control messaging to the sidelink anchor carrier.

For example, at 1155, the UE 1105 may transmit, to the UE 1110, a second sidelink message indicating or activating the at least one sidelink carrier for establishing the sidelink control connection. In some aspects, the UE 1105 may transmit the second sidelink message using the at least one sidelink carrier. In some examples, the UE 1105 may transmit the second sidelink message over a configured sidelink carrier, a preconfigured sidelink carrier, or a default sidelink carrier. In some examples, the second sidelink message indicates the at least one sidelink carrier as a sidelink anchor carrier. In an example, the UE 1105 may transmit a sidelink control message (e.g., the second sidelink message) on the sidelink anchor carrier.

At 1160, the UE 1105 may establish the sidelink control connection between the UE 1105 and the UE 1110 using the at least one sidelink carrier based on the second sidelink message.

At 1165, the UE 1105 may communicate one or more additional sidelink control messages with the UE 1110 using the sidelink anchor carrier.

At 1175, the UE 1110 may measure one or more channel parameters of at least one candidate sidelink carrier of the first set of candidate sidelink carriers of the UE 1110.

At 1180, the UE 1110 may select at least a second sidelink carrier for the sidelink control connection based on the one or more channel parameters satisfying a threshold.

At 1185, the UE 1105 may receive, from the UE 1110, a third sidelink message indicating (e.g., where the third sidelink message is a sidelink configuration message) or activating (e.g., where the third sidelink message is a sidelink MAC-CE) at least a second sidelink carrier determined by the UE 1110 for the sidelink control connection.

At 1190, the UE 1105 may transmit, to the UE 1110, a sidelink reconfiguration message or sidelink MAC-CE for remapping the sidelink control connection between the UE 1105 and the UE 1110 to at least the second sidelink carrier as a second sidelink anchor carrier based on receive the third sidelink message.

At 1195, the UE 1105 may communicate one or more additional sidelink control messages with the UE 1110 using the second sidelink anchor carrier after mapping the sidelink control connection to the second sidelink anchor carrier. In some examples, the UE 1105 may communicate one or more additional sidelink control messages with the UE 1110 using the second sidelink anchor carrier after reconfiguring the sidelink control connection.

Figure 12:
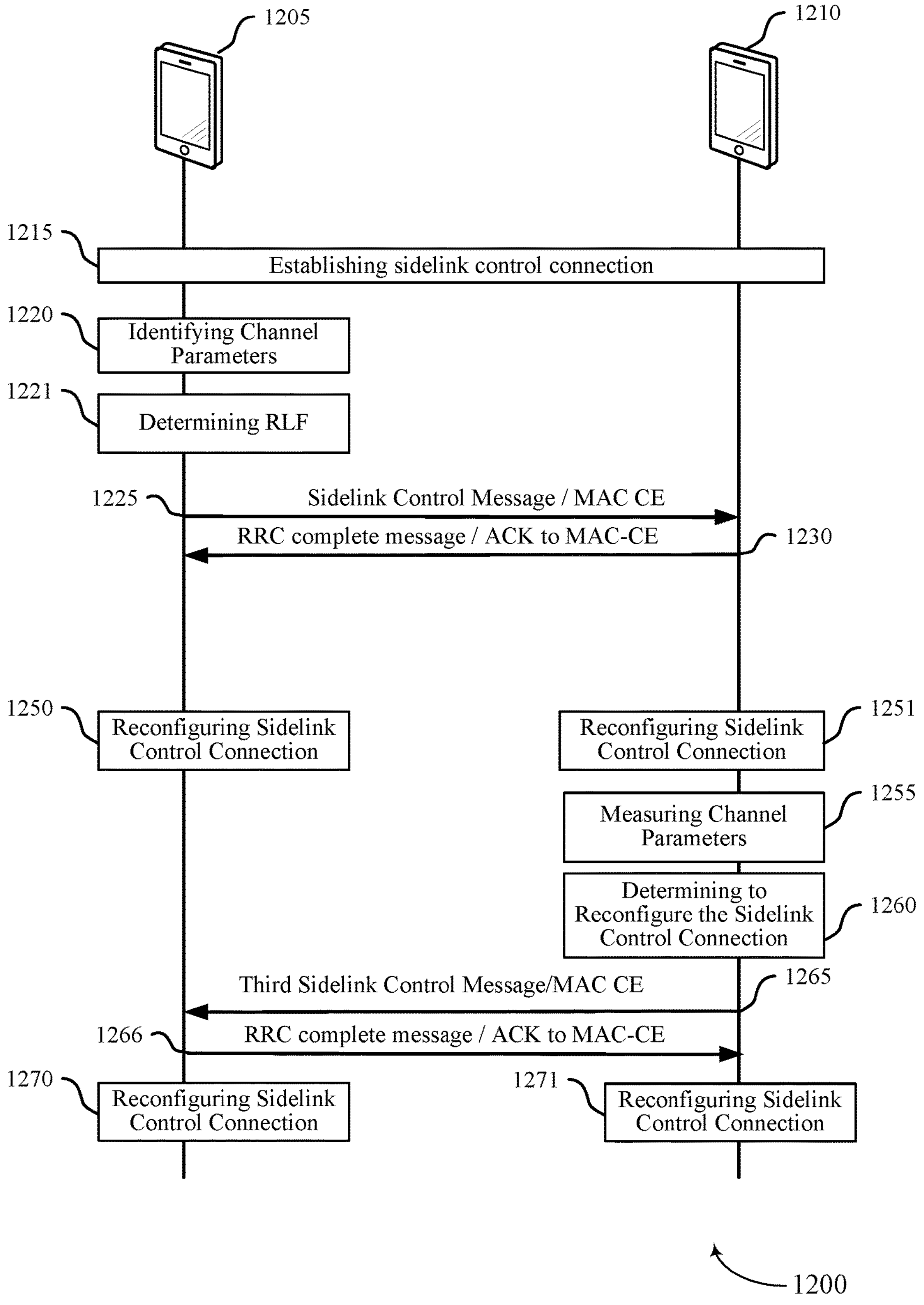

FIG. 12 illustrates an example of a process flow 1200 that supports techniques for sidelink control connection with carrier aggregation in accordance with aspects of the present disclosure. In some examples, process flow 1200 may implement aspects of wireless communications systems 100 through 300 or process flow 800 described with reference to FIGS. 1, 2, 3, and 8.

Process flow 1200 may be implemented by a UE 1205 and UE 1210, which may be examples of a UE 115 described with reference to FIG. 1. The UE 1205 may be an example of a UE 115 described with reference to FIG. 1, the UE 205 described with reference to FIG. 2, the UE 305 described with reference to FIG. 3, or the UE 805 described with reference to FIG. 8. The UE 1210 may be an example of the UE 116 (or another UE 115) described with reference to FIG. 1, the UE 210 described with reference to FIG. 2, the UE 310 described with reference to FIG. 3, or the UE 810 described with reference to FIG. 8.

At 1215, the UE 1205 may establish a sidelink control connection between the UE 1205 and a the UE 1210 using a first sidelink anchor carrier for the sidelink control connection, the sidelink control connection supporting carrier aggregation using multiple sidelink carriers including the first sidelink anchor carrier. In some examples, the UE 1205 may determine a mapping between a logic channel for a sidelink broadcast control channel and the first sidelink anchor carrier, where transmitting the sidelink control message is based on the mapping. In some aspects, the UE 1205 may measure a set of channel parameters associated with a set of candidate sidelink carriers for the sidelink control connection, and the UE 1205 may determine the first sidelink anchor carrier from the set of candidate sidelink carriers based on one or more of the set of channel parameters satisfying a threshold.

At 1220, the UE 1205 may identify one or more channel parameters of one or more candidate sidelink carriers for the sidelink control connection.

At 1221, the UE 1205 may determine a radio link failure associated with the first sidelink anchor carrier.

At 1225, the UE 1205 may transmit, to the UE 1210, a sidelink control message for indicating a sidelink carrier or a sidelink MAC-CE for activating the sidelink carrier of the one or more candidate sidelink carriers as a second sidelink anchor carrier for the sidelink control connection based on the one or more channel parameters, the second sidelink anchor carrier configured for fallback of the first sidelink anchor carrier or duplication of the first sidelink anchor carrier. In some aspects, the UE 1205 may determine the sidelink carrier of the one or more candidate sidelink carriers as the second sidelink anchor carrier based on one or more the one or more channel parameters satisfying a threshold.

In some aspects, configuring the sidelink carrier of the one or more candidate sidelink carriers as the second sidelink anchor carrier for the sidelink control connection may include mapping a logical channel for sidelink control messaging to either or both the first sidelink anchor carrier and the second sidelink anchor carrier. In some examples, configuring the sidelink carrier of the one or more candidate sidelink carriers as the second sidelink anchor carrier for the sidelink control connection may include: mapping a sidelink broadcast control channel or a sidelink common control channel or a sidelink control channel for sidelink control messaging to either or both the first sidelink anchor carrier and the second sidelink anchor carrier.

In some examples, transmitting the sidelink control message may include broadcasting the sidelink control message using a sidelink control channel mapped to the first and/or the second sidelink anchor carrier, a sidelink broadcast control channel mapped to the first and/or the second sidelink anchor carrier, a sidelink common control channel mapped to the first and/or the second sidelink anchor carrier, a sidelink group control channel mapped to the first and/or the second sidelink anchor carrier, or a sidelink control channel mapped to the first and/or the second sidelink anchor carrier. In some examples, transmitting the sidelink control message may include broadcasting the sidelink control message over a sidelink data channel mapped to the first and/or the second sidelink anchor carrier, where the sidelink control message may include a set of sidelink system information blocks (SIBs).

At 1230, the UE 1205 may receive a sidelink RRC message or a sidelink ACK to MAC-CE that activates or deactivates the second sidelink anchor carrier as one of fallback of the first sidelink anchor carrier or duplication of the first sidelink anchor carrier.

At 1250, the UE 1205 may continue the sidelink control connection between the UE 1205 and the UE 1210 using the second sidelink anchor carrier based on the second sidelink control message. For example, at 1250, the UE 1205 may continue (e.g., maintain) the sidelink control connection between the UE 1205 and the UE 1210 using the second sidelink anchor carrier, based on the radio link failure, the second sidelink control message, or both. For example, at 1250, the UE 1205 may remap (e.g., reconfigure) the sidelink control connection between the UE 1205 and the UE 1210 using the second sidelink anchor carrier based on the reconfiguration complete message or ACK to MAC-CE. In an example, at 1250, the UE 1205 may remap (e.g., reconfigure) the sidelink control connection between the UE 1205 and the UE 1210 using the second sidelink anchor carrier based on transmitting the reconfiguration message.

At 1251, the UE 1210 may continue (e.g., maintain) the sidelink control connection between the UE 1205 and the UE 1210 using the second sidelink anchor carrier based on the second sidelink control message.

At 1255, the UE 1210 may measure one or more channel parameters of the second sidelink anchor carrier.

At 1260, the UE 1210 may determine to reconfigure the sidelink control connection between the UE 1205 and the UE 1210 using a third sidelink anchor carrier based on the one or more channel parameters of the second sidelink anchor carrier failing a threshold or the third sidelink anchor carrier satisfying a threshold.

At 1265, the UE 1205 may receive a third sidelink control message or sidelink MAC-CE from the UE 1210 over the second sidelink anchor carrier, the second sidelink control message indicating the third sidelink anchor carrier and an updated set of candidate sidelink carriers at the UE 1210.

At 1266, the UE 1205 may transmit a sidelink RRC complete message or a sidelink ACK to MAC-CE that activates or deactivates the third sidelink anchor carrier as one of fallback of the second sidelink anchor carrier or a duplication of the first sidelink anchor carrier.

At 1270, the UE 1205 may continue the sidelink control connection between the UE 1205 and the UE 1210 using the third sidelink anchor carrier, based on receiving the third sidelink control message or MAC-CE, the sidelink control connection supporting carrier aggregation using multiple sidelink carriers including the second sidelink anchor carrier.

At 1271, the UE 1210 may continue the sidelink control connection between the UE 1205 and the UE 1210 using the third sidelink anchor carrier, based on receiving the sidelink RRC complete message or the sidelink ACK to MAC-CE, the sidelink control connection supporting carrier aggregation using multiple sidelink carriers including the second sidelink anchor carrier.

Figure 13:
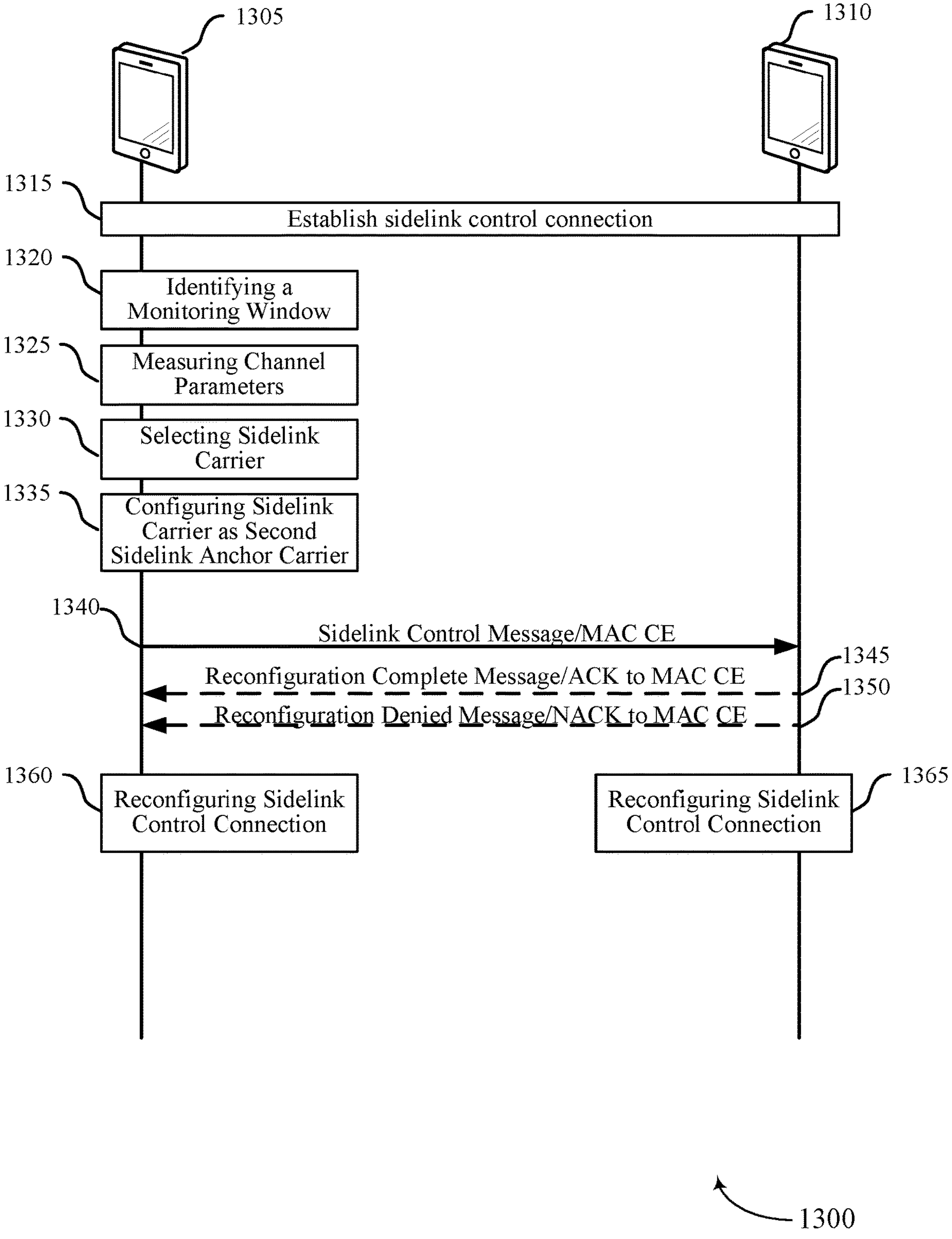

FIG. 13 illustrates an example of a process flow 1300 that supports techniques for sidelink control connection with carrier aggregation in accordance with aspects of the present disclosure. In some examples, process flow 1300 may implement aspects of wireless communications systems 100 through 300, process flow 900, or process flow 1000 described with reference to FIGS. 1, 2, 3, 9, and 10.

Process flow 1300 may be implemented by a UE 1305 and UE 1310, which may be examples of a UE 115 described with reference to FIG. 1. The UE 1305 may be an example of a UE 115 described with reference to FIG. 1, the UE 205 described with reference to FIG. 2, the UE 305 described with reference to FIG. 3, the UE 905 described with reference to FIG. 9, or the UE 1005 described with reference to FIG. 10. The UE 1310 may be an example of the UE 116 (or another UE 115) described with reference to FIG. 1, the UE 210 described with reference to FIG. 2, the UE 310 described with reference to FIG. 3, the UE 910 described with reference to FIG. 9, or the UE 1010 described with reference to FIG. 10.

At 1315, the UE 1305 may establish a sidelink control connection between the UE 1305 and a UE 1310 using a sidelink anchor carrier for the sidelink control connection, the sidelink control connection supporting carrier aggregation using multiple sidelink carriers including the sidelink anchor carrier.

At 1320, the UE 1305 may identify a monitoring window for measure the sidelink anchor carrier, a set of candidate sidelink carriers, or a combination thereof.

At 1325, the UE 1305 may measure, within the monitoring window, one or more channel parameters of the sidelink anchor carrier, the set of candidate sidelink carriers, or a combination thereof. In some examples, measuring the one or more channel parameters of the sidelink anchor carrier, the set of candidate sidelink carriers, or the combination thereof may include measuring the CBR, RSRP, or RSSI of the sidelink anchor carrier, the set of candidate sidelink carriers, or the combination thereof, where the sidelink carrier for the sidelink control connection may be selected based on the measured CBR, RSRP or RSSI associated with the sidelink anchor carrier satisfying a CBR, RSRP or RSSI threshold respectively.

At 1330, the UE 1305 may select, based on the one or more channel parameters, a sidelink carrier of the set of candidate sidelink carriers for the sidelink control connection, where a measured parameter associated with the sidelink carrier satisfies a threshold.

At 1335, the UE 1305 may set the sidelink carrier as a second sidelink anchor carrier for the sidelink control connection between the UE 1305 and the UE 1310 based on the selecting.

At 1340, the UE 1305 may transmit, to the UE 1310, a sidelink control message for indicating or a sidelink MAC-CE for activating the sidelink carrier for the sidelink control connection between the UE 1305 and the UE 1310.

At 1345, the UE 1310 may transmit, to the UE 1305, a reconfiguration complete message or an ACK to MAC-CE confirming the configure of the sidelink carrier for the sidelink control connection.

Additionally, or alternatively, at 1350, the UE 1310 may transmit, to the UE 1305, a reconfiguration denied message or a NACK to MAC-CE rejecting the configuration of the sidelink carrier for the sidelink control connection, the reconfiguration denied message including a third sidelink carrier for the sidelink control connection, and/or updated set of candidate sidelink carriers for the sidelink control connection between the UE 1305 and the UE 1310. Alternatively, the UE 1310 may transmit, to UE 1305, a sidelink control message for indicating the third sidelink carrier or a sidelink MAC-CE for activating the third sidelink carrier for the sidelink control connection between the UE 1305 and the UE 1310.

At 1355, the UE 1305 may continue the sidelink control connection between the UE 1305 and a UE 1310 using the third sidelink anchor carrier.

At 1365, the UE 1310 may continue the sidelink control connection between the UE 1305 and a UE 1310 using the third sidelink anchor carrier.

Figure 14:
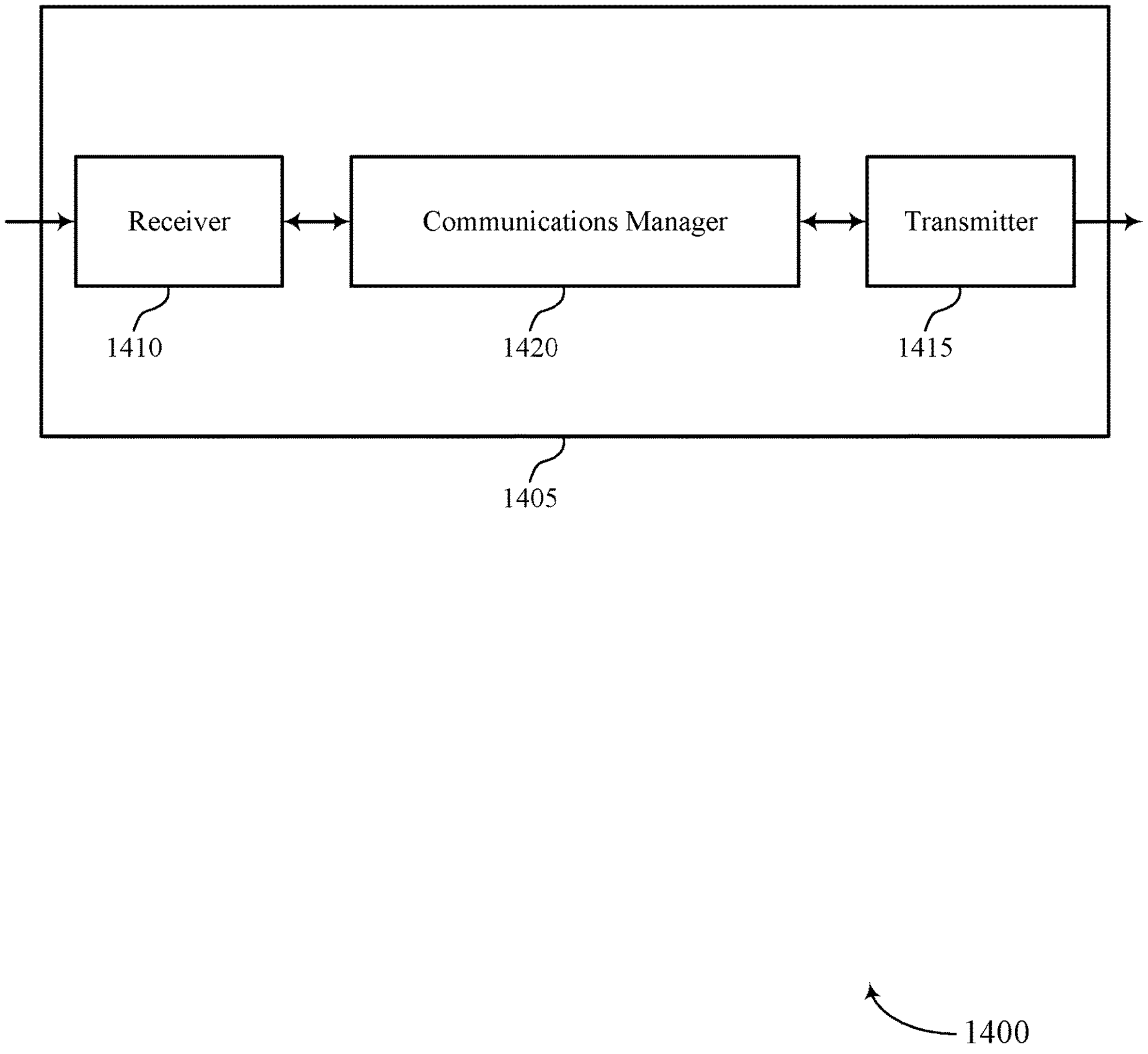
FIGS. 14 and 15 show block diagrams of devices that support techniques for sidelink control connection with carrier aggregation in accordance with aspects of the present disclosure.

FIG. 14 shows a block diagram 1400 of a device 1405 that supports techniques for sidelink control connection with carrier aggregation in accordance with aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for sidelink control connection with carrier aggregation). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for sidelink control connection with carrier aggregation). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for sidelink control connection with carrier aggregation as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first UE in accordance with examples as disclosed herein. For example, the communications manager 1420 may be configured as or otherwise support a means for receiving a first sidelink message from a second UE, the first sidelink message indicating a first set of candidate sidelink carriers of the second UE. The communications manager 1420 may be configured as or otherwise support a means for measuring one or more channel parameters of at least one candidate sidelink carrier of the first set of candidate sidelink carriers. The communications manager 1420 may be configured as or otherwise support a means for determining at least one sidelink carrier of the first set of candidate sidelink carriers based on the measured one or more channel parameters, the at least one sidelink carrier for establishing a sidelink control connection that supports carrier aggregation using multiple sidelink carriers. The communications manager 1420 may be configured as or otherwise support a means for transmitting, to the second UE, a second sidelink message indicating the at least one sidelink carrier for establishing the sidelink control connection. The communications manager 1420 may be configured as or otherwise support a means for establishing the sidelink control connection between the first UE and the second UE using the at least one sidelink carrier based on the second sidelink message.

Additionally or alternatively, the communications manager 1420 may support wireless communication at a second UE in accordance with examples as disclosed herein. For example, the communications manager 1420 may be configured as or otherwise support a means for transmitting a first sidelink message to a first UE, the first sidelink message indicating a first set of candidate sidelink carriers of the second UE for a sidelink control connection that supports carrier aggregation using multiple sidelink carriers. The communications manager 1420 may be configured as or otherwise support a means for receiving, from the first UE, a second sidelink message indicating at least one sidelink carrier of the first set of candidate sidelink carriers for establishing the sidelink control connection. The communications manager 1420 may be configured as or otherwise support a means for establishing the sidelink control connection between the first UE and the second UE using the at least one sidelink carrier based on the second sidelink message.

Additionally or alternatively, the communications manager 1420 may support wireless communication at a first UE in accordance with examples as disclosed herein. For example, the communications manager 1420 may be configured as or otherwise support a means for establishing a sidelink control connection between the first UE and a second UE using a first sidelink anchor carrier for the sidelink control connection, the sidelink control connection supporting carrier aggregation using multiple sidelink carriers including the first sidelink anchor carrier. The communications manager 1420 may be configured as or otherwise support a means for identifying one or more channel parameters of one or more candidate sidelink carriers for the sidelink control connection. The communications manager 1420 may be configured as or otherwise support a means for transmitting, to the second UE, a sidelink control message for configuring a sidelink carrier of the one or more candidate sidelink carriers as a second sidelink anchor carrier for the sidelink control connection based on the one or more channel parameters, the second sidelink anchor carrier configured for fallback of the first sidelink anchor carrier or duplication of the first sidelink anchor carrier.

Additionally or alternatively, the communications manager 1420 may support wireless communication at a second UE in accordance with examples as disclosed herein. For example, the communications manager 1420 may be configured as or otherwise support a means for establishing a sidelink control connection between a first UE and the second UE using a first sidelink anchor carrier for the sidelink control connection, the sidelink control connection supporting carrier aggregation using multiple sidelink carriers including the first sidelink anchor carrier. The communications manager 1420 may be configured as or otherwise support a means for receiving, from the first UE, a sidelink control message for configuring a sidelink carrier of one or more candidate sidelink carriers as a second sidelink anchor carrier for the sidelink control connection, the second sidelink anchor carrier configured for fallback of the first sidelink anchor carrier or duplication of the first sidelink anchor carrier.

Additionally or alternatively, the communications manager 1420 may support wireless communication at a first UE in accordance with examples as disclosed herein. For example, the communications manager 1420 may be configured as or otherwise support a means for establishing a sidelink control connection between the first UE and a second UE using a sidelink anchor carrier for the sidelink control connection, the sidelink control connection supporting carrier aggregation using multiple sidelink carriers including the sidelink anchor carrier. The communications manager 1420 may be configured as or otherwise support a means for identifying a monitoring window for measuring the sidelink anchor carrier, a set of candidate sidelink carriers, or a combination thereof. The communications manager 1420 may be configured as or otherwise support a means for measuring, within the monitoring window, one or more channel parameters of the sidelink anchor carrier, the set of candidate sidelink carriers, or a combination thereof. The communications manager 1420 may be configured as or otherwise support a means for selecting, based on the one or more channel parameters, a sidelink carrier of the set of candidate sidelink carriers for the sidelink control connection, where a measured parameter associated with the sidelink carrier satisfies a threshold. The communications manager 1420 may be configured as or otherwise support a means for transmitting, to the second UE, a sidelink control message for configuring the sidelink carrier for the sidelink control connection between the first UE and the second UE.

Additionally or alternatively, the communications manager 1420 may support wireless communication at a second UE in accordance with examples as disclosed herein. For example, the communications manager 1420 may be configured as or otherwise support a means for establishing a sidelink control connection between a first UE and the second UE using a sidelink anchor carrier for the sidelink control connection, the sidelink control connection supporting carrier aggregation using multiple sidelink carriers including the sidelink anchor carrier. The communications manager 1420 may be configured as or otherwise support a means for identifying a monitoring window for measuring the sidelink anchor carrier, a set of candidate sidelink carriers, or a combination thereof. The communications manager 1420 may be configured as or otherwise support a means for measuring, within the monitoring window, one or more channel parameters of the sidelink anchor carrier, the set of candidate sidelink carriers, or a combination thereof. The communications manager 1420 may be configured as or otherwise support a means for receiving, from the first UE, a sidelink control message for configuring a sidelink carrier for the sidelink control connection between the first UE and the second UE.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing, reduced power consumption, more efficient utilization of communication resources, decreasing signaling overhead, improving reliability, increased connection efficiency, and reduced latency.

Figure 15:
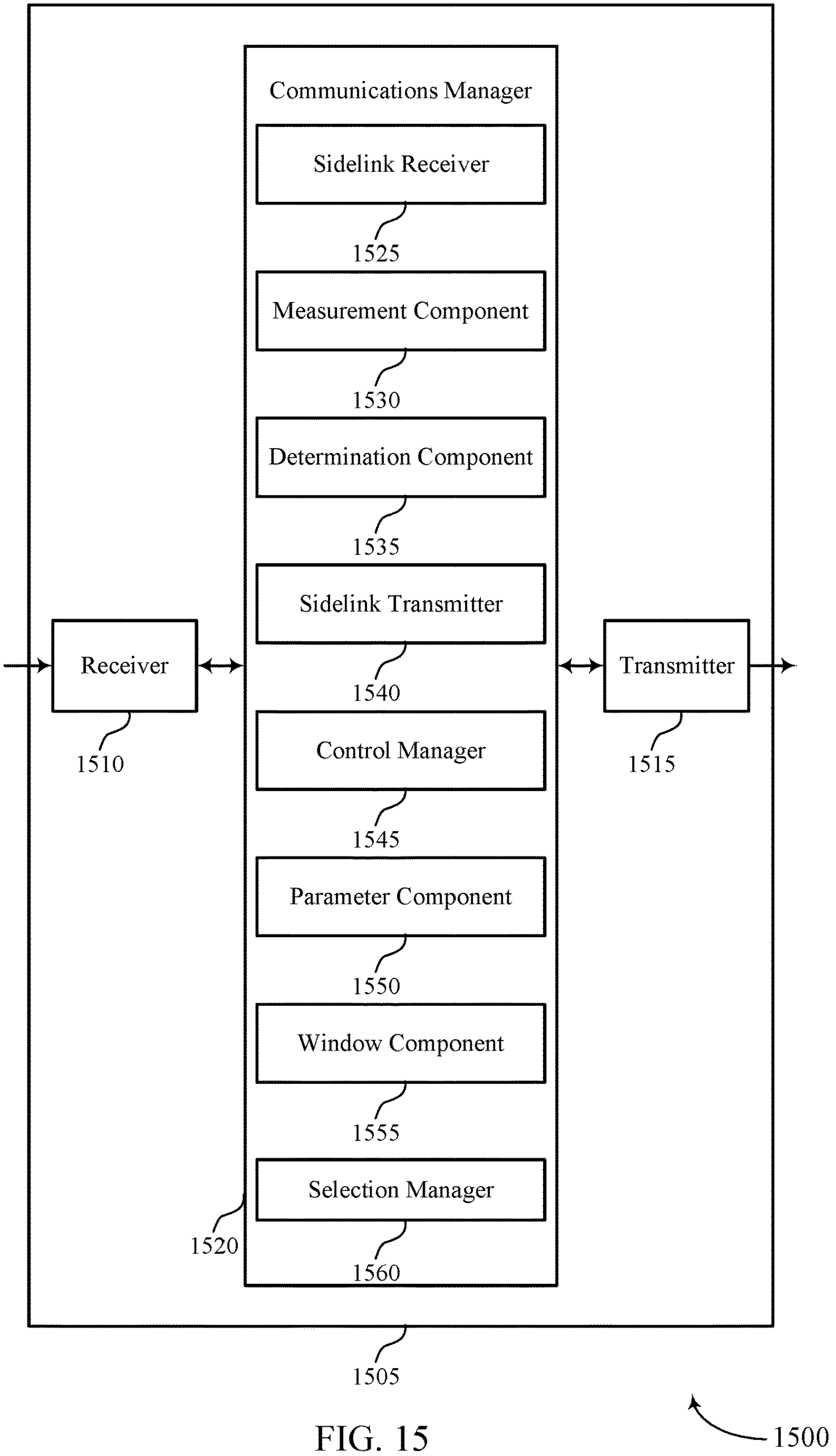

FIG. 15 shows a block diagram 1500 of a device 1505 that supports techniques for sidelink control connection with carrier aggregation in accordance with aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for sidelink control connection with carrier aggregation). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for sidelink control connection with carrier aggregation). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for sidelink control connection with carrier aggregation as described herein. For example, the communications manager 1520 may include a sidelink receiver 1525, a measurement component 1530, a determination component 1535, a sidelink transmitter 1540, a control manager 1545, a parameter component 1550, a window component 1555, a selection manager 1560, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a first UE in accordance with examples as disclosed herein. The sidelink receiver 1525 may be configured as or otherwise support a means for receiving a first sidelink message from a second UE, the first sidelink message indicating a first set of candidate sidelink carriers of the second UE. The measurement component 1530 may be configured as or otherwise support a means for measuring one or more channel parameters of at least one candidate sidelink carrier of the first set of candidate sidelink carriers. The determination component 1535 may be configured as or otherwise support a means for determining at least one sidelink carrier of the first set of candidate sidelink carriers based on the measured one or more channel parameters, the at least one sidelink carrier for establishing a sidelink control connection that supports carrier aggregation using multiple sidelink carriers. The sidelink transmitter 1540 may be configured as or otherwise support a means for transmitting, to the second UE, a second sidelink message indicating the at least one sidelink carrier for establishing the sidelink control connection. The control manager 1545 may be configured as or otherwise support a means for establishing the sidelink control connection between the first UE and the second UE using the at least one sidelink carrier based on the second sidelink message.

Additionally or alternatively, the communications manager 1520 may support wireless communication at a second UE in accordance with examples as disclosed herein. The sidelink transmitter 1540 may be configured as or otherwise support a means for transmitting a first sidelink message to a first UE, the first sidelink message indicating a first set of candidate sidelink carriers of the second UE for a sidelink control connection that supports carrier aggregation using multiple sidelink carriers. The sidelink receiver 1525 may be configured as or otherwise support a means for receiving, from the first UE, a second sidelink message indicating at least one sidelink carrier of the first set of candidate sidelink carriers for establishing the sidelink control connection. The control manager 1545 may be configured as or otherwise support a means for establishing the sidelink control connection between the first UE and the second UE using the at least one sidelink carrier based on the second sidelink message.

Additionally or alternatively, the communications manager 1520 may support wireless communication at a first UE in accordance with examples as disclosed herein. The control manager 1545 may be configured as or otherwise support a means for establishing a sidelink control connection between the first UE and a second UE using a first sidelink anchor carrier for the sidelink control connection, the sidelink control connection supporting carrier aggregation using multiple sidelink carriers including the first sidelink anchor carrier. The parameter component 1550 may be configured as or otherwise support a means for identifying one or more channel parameters of one or more candidate sidelink carriers for the sidelink control connection. The sidelink transmitter 1540 may be configured as or otherwise support a means for transmitting, to the second UE, a sidelink control message for configuring a sidelink carrier of the one or more candidate sidelink carriers as a second sidelink anchor carrier for the sidelink control connection based on the one or more channel parameters, the second sidelink anchor carrier configured for fallback of the first sidelink anchor carrier or duplication of the first sidelink anchor carrier.

Additionally or alternatively, the communications manager 1520 may support wireless communication at a second UE in accordance with examples as disclosed herein. The control manager 1545 may be configured as or otherwise support a means for establishing a sidelink control connection between a first UE and the second UE using a first sidelink anchor carrier for the sidelink control connection, the sidelink control connection supporting carrier aggregation using multiple sidelink carriers including the first sidelink anchor carrier. The sidelink receiver 1525 may be configured as or otherwise support a means for receiving, from the first UE, a sidelink control message for configuring a sidelink carrier of one or more candidate sidelink carriers as a second sidelink anchor carrier for the sidelink control connection, the second sidelink anchor carrier configured for fallback of the first sidelink anchor carrier or duplication of the first sidelink anchor carrier.

Additionally or alternatively, the communications manager 1520 may support wireless communication at a first UE in accordance with examples as disclosed herein. The control manager 1545 may be configured as or otherwise support a means for establishing a sidelink control connection between the first UE and a second UE using a sidelink anchor carrier for the sidelink control connection, the sidelink control connection supporting carrier aggregation using multiple sidelink carriers including the sidelink anchor carrier. The window component 1555 may be configured as or otherwise support a means for identifying a monitoring window for measuring the sidelink anchor carrier, a set of candidate sidelink carriers, or a combination thereof. The measurement component 1530 may be configured as or otherwise support a means for measuring, within the monitoring window, one or more channel parameters of the sidelink anchor carrier, the set of candidate sidelink carriers, or a combination thereof. The selection manager 1560 may be configured as or otherwise support a means for selecting, based on the one or more channel parameters, a sidelink carrier of the set of candidate sidelink carriers for the sidelink control connection, where a measured parameter associated with the sidelink carrier satisfies a threshold. The sidelink transmitter 1540 may be configured as or otherwise support a means for transmitting, to the second UE, a sidelink control message for configuring the sidelink carrier for the sidelink control connection between the first UE and the second UE.

Additionally or alternatively, the communications manager 1520 may support wireless communication at a second UE in accordance with examples as disclosed herein. The control manager 1545 may be configured as or otherwise support a means for establishing a sidelink control connection between a first UE and the second UE using a sidelink anchor carrier for the sidelink control connection, the sidelink control connection supporting carrier aggregation using multiple sidelink carriers including the sidelink anchor carrier. The window component 1555 may be configured as or otherwise support a means for identifying a monitoring window for measuring the sidelink anchor carrier, a set of candidate sidelink carriers, or a combination thereof. The measurement component 1530 may be configured as or otherwise support a means for measuring, within the monitoring window, one or more channel parameters of the sidelink anchor carrier, the set of candidate sidelink carriers, or a combination thereof. The sidelink receiver 1525 may be configured as or otherwise support a means for receiving, from the first UE, a sidelink control message for configuring a sidelink carrier for the sidelink control connection between the first UE and the second UE.

Figure 16:
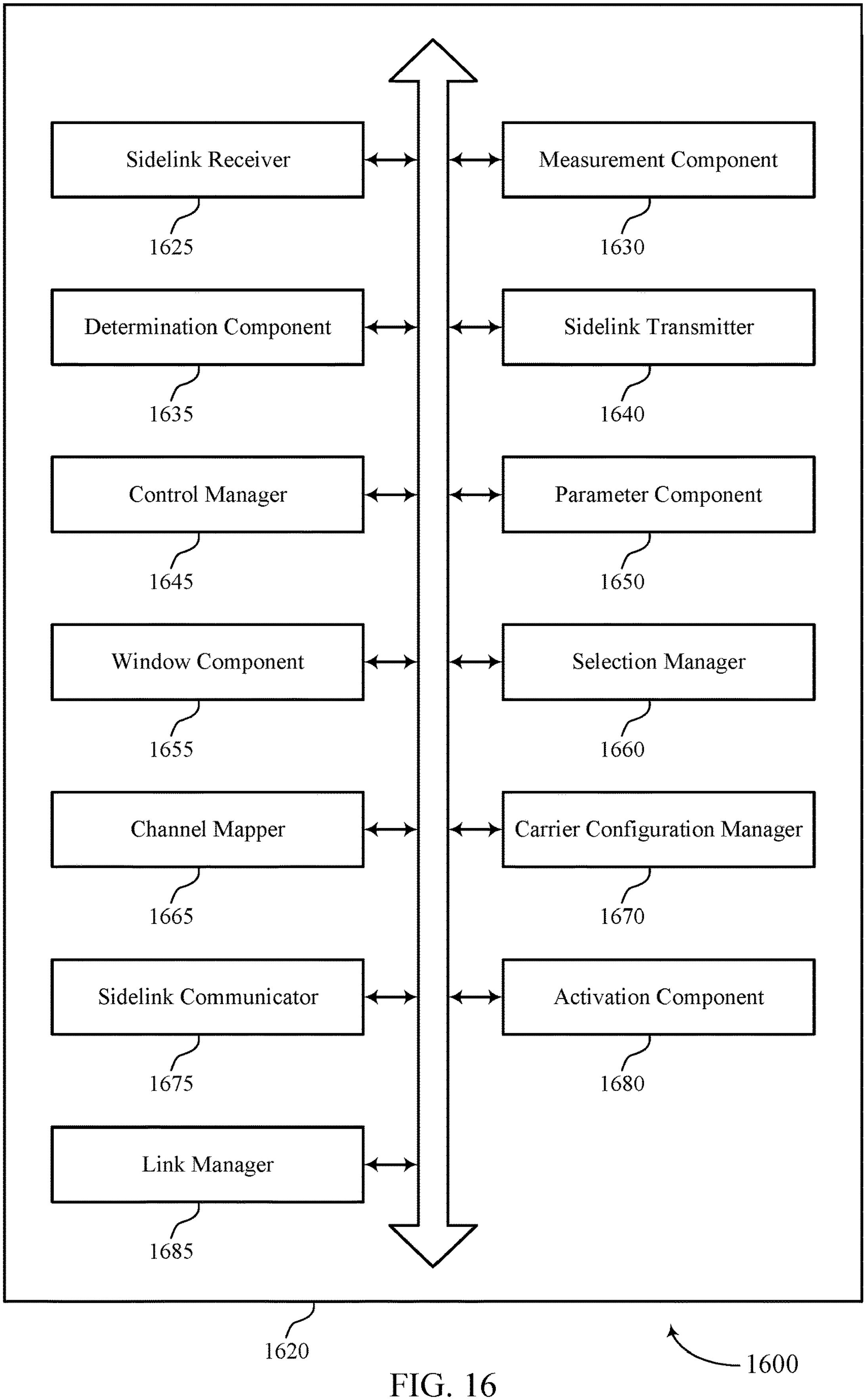
FIG. 16 shows a block diagram of a communications manager that supports techniques for sidelink control connection with carrier aggregation in accordance with aspects of the present disclosure.

FIG. 16 shows a block diagram 1600 of a communications manager 1620 that supports techniques for sidelink control connection with carrier aggregation in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of techniques for sidelink control connection with carrier aggregation as described herein. For example, the communications manager 1620 may include a sidelink receiver 1625, a measurement component 1630, a determination component 1635, a sidelink transmitter 1640, a control manager 1645, a parameter component 1650, a window component 1655, a selection manager 1660, a channel mapper 1665, a carrier configuration manager 1670, a sidelink communicator 1675, an activation component 1680, a link manager 1685, or any combination thereof. Each of these components may communicate, directly or indirectly, with one another (e.g., via one or more buses).

The communications manager 1620 may support wireless communication at a first UE in accordance with examples as disclosed herein. The sidelink receiver 1625 may be configured as or otherwise support a means for receiving a first sidelink message from a second UE, the first sidelink message indicating a first set of candidate sidelink carriers of the second UE. The measurement component 1630 may be configured as or otherwise support a means for measuring one or more channel parameters of at least one candidate sidelink carrier of the first set of candidate sidelink carriers. The determination component 1635 may be configured as or otherwise support a means for determining at least one sidelink carrier of the first set of candidate sidelink carriers based on the measured one or more channel parameters, the at least one sidelink carrier for establishing a sidelink control connection that supports carrier aggregation using multiple sidelink carriers. The sidelink transmitter 1640 may be configured as or otherwise support a means for transmitting, to the second UE, a second sidelink message indicating the at least one sidelink carrier for establishing the sidelink control connection. The control manager 1645 may be configured as or otherwise support a means for establishing the sidelink control connection between the first UE and the second UE using the at least one sidelink carrier based on the second sidelink message.

In some examples, the second sidelink message indicates the at least one sidelink carrier as the sidelink anchor carrier.

In some examples, the channel mapper 1665 may be configured as or otherwise support a means for mapping a logic channel for sidelink control messaging to the sidelink anchor carrier. In some examples, the sidelink transmitter 1640 may be configured as or otherwise support a means for transmitting a sidelink control message on the sidelink anchor carrier.

In some examples, the channel mapper 1665 may be configured as or otherwise support a means for mapping the logic channel for sidelink control messaging to the at least one sidelink carrier. In some examples, the sidelink transmitter 1640 may be configured as or otherwise support a means for transmitting a sidelink control message on the at least one sidelink carrier.

In some examples, the carrier configuration manager 1670 may be configured as or otherwise support a means for configuring the first UE with an initial sidelink carrier for sidelink messaging between the first UE and the second UE before establishing the sidelink control connection.

In some examples, the initial sidelink carrier includes a configured sidelink carrier, a preconfigured sidelink carrier, or a default sidelink carrier.

In some examples, to support measuring the one or more channel parameters of the at least one candidate sidelink carrier, the measurement component 1630 may be configured as or otherwise support a means for determining the at least one candidate sidelink carrier from a first set of common candidate sidelink carriers, the first set of common candidate sidelink carriers including one or more carriers common to the first set of candidate sidelink carriers and a second set of candidate sidelink carriers of the first UE.

In some examples, the measurement component 1630 may be configured as or otherwise support a means for measuring each of the first set of common candidate sidelink carriers based on a priority associated with the first set of common candidate sidelink carriers.

In some examples, the carrier configuration manager 1670 may be configured as or otherwise support a means for selecting the at least one sidelink carrier based on the one or more channel parameters satisfying a threshold.

In some examples, to support measuring the one or more channel parameters of the at least one candidate sidelink carrier, the measurement component 1630 may be configured as or otherwise support a means for measuring a channel busy ratio (CBR) of the at least one candidate sidelink carrier.

In some examples, the carrier configuration manager 1670 may be configured as or otherwise support a means for selecting the at least one sidelink carrier based on the measured one or more channel parameters of the at least one candidate sidelink carrier satisfying a threshold.

In some examples, to support transmitting the second sidelink message, the sidelink transmitter 1640 may be configured as or otherwise support a means for transmitting the second sidelink message over a configured sidelink carrier, a preconfigured sidelink carrier, or a default sidelink carrier.

In some examples, the carrier configuration manager 1670 may be configured as or otherwise support a means for configuring the at least one sidelink carrier as a sidelink anchor carrier for the sidelink control connection based on the second sidelink message. In some examples, the sidelink communicator 1675 may be configured as or otherwise support a means for communicating one or more additional sidelink control messages with the second UE using the sidelink anchor carrier.

In some examples, the sidelink receiver 1625 may be configured as or otherwise support a means for receiving, from the second UE, a third sidelink message indicating at least a second sidelink carrier determined by the second UE for the sidelink control connection. In some examples, the sidelink transmitter 1640 may be configured as or otherwise support a means for transmitting, to the second UE, a reconfiguration message for mapping the sidelink control connection between the first UE and the second UE to at least the second sidelink carrier as a second sidelink anchor carrier based on receiving the third sidelink message.

In some examples, the sidelink communicator 1675 may be configured as or otherwise support a means for communicating one or more additional sidelink control messages with the second UE using the second sidelink anchor carrier after mapping the sidelink control connection to the second sidelink anchor carrier.

In some examples, to support transmitting the second sidelink message, the sidelink transmitter 1640 may be configured as or otherwise support a means for transmitting the second sidelink message using the at least one sidelink carrier.

In some examples, the carrier configuration manager 1670 may be configured as or otherwise support a means for configuring a second set of candidate sidelink carriers for the first UE. In some examples, the carrier configuration manager 1670 may be configured as or otherwise support a means for determining the at least one candidate sidelink carrier from a second set of common candidate sidelink carriers, the second set of common candidate sidelink carriers including one or more carrier common to the first set of candidate sidelink carriers and the second set of candidate sidelink carriers. In some examples, the sidelink transmitter 1640 may be configured as or otherwise support a means for transmitting a sidelink information message to a base station, the sidelink information message indicating the measured one or more channel parameters, the second set of common candidate sidelink carriers, or both. In some examples, the sidelink receiver 1625 may be configured as or otherwise support a means for receiving, from the base station, a configuration message indicating the sidelink carrier for establishing the sidelink control connection, where the configuration message indicates a configuration of the sidelink carrier as a sidelink anchor carrier.

In some examples, the at least one sidelink carrier includes a primary sidelink anchor carrier and a secondary sidelink anchor carrier for the sidelink control connection based on the second sidelink message. In some examples, the second sidelink message indicates a configuration of the at least one sidelink carrier for establishing the sidelink carrier as a primary sidelink anchor carrier and a secondary sidelink anchor carrier.

Additionally or alternatively, the communications manager 1620 may support wireless communication at a second UE in accordance with examples as disclosed herein. In some examples, the sidelink transmitter 1640 may be configured as or otherwise support a means for transmitting a first sidelink message to a first UE, the first sidelink message indicating a first set of candidate sidelink carriers of the second UE for a sidelink control connection that supports carrier aggregation using multiple sidelink carriers. In some examples, the sidelink receiver 1625 may be configured as or otherwise support a means for receiving, from the first UE, a second sidelink message indicating at least one sidelink carrier of the first set of candidate sidelink carriers for establishing the sidelink control connection. In some examples, the control manager 1645 may be configured as or otherwise support a means for establishing the sidelink control connection between the first UE and the second UE using the at least one sidelink carrier based on the second sidelink message.

In some examples, the second sidelink message indicates a configuration of the at least one sidelink carrier for establishing the sidelink carrier as a sidelink anchor carrier, and the carrier configuration manager 1670 may be configured as or otherwise support a means for configuring the at least one sidelink carrier as the sidelink anchor carrier for the sidelink control connection based on the second sidelink message.

In some examples, the sidelink receiver 1625 may be configured as or otherwise support a means for receiving a sidelink control message using a logic channel for sidelink control messaging based on a mapping of the logic channel to the sidelink anchor carrier.

In some examples, the sidelink receiver 1625 may be configured as or otherwise support a means for receiving a sidelink control message using the logic channel for sidelink control messaging based on a mapping of the logic channel to the at least one sidelink carrier.

In some examples, the carrier configuration manager 1670 may be configured as or otherwise support a means for configuring the second UE with an initial sidelink carrier for sidelink control messaging between the first UE and the second UE.

In some examples, the initial sidelink carrier includes a configured sidelink carrier, a preconfigured sidelink carrier, or a default sidelink carrier.

In some examples, the at least one sidelink carrier is in a joint set of candidate sidelink carriers determined based on the first set of candidate sidelink carriers and a second set of candidate sidelink carriers of the first UE, and the at least one sidelink carrier is common to the first set of candidate sidelink carriers and the second set of candidate sidelink carriers.

In some examples, the second sidelink message indicates the at least one sidelink carrier for establishing the sidelink control connection, the at least one sidelink carrier including a set of sidelink anchor carriers for establishing the sidelink control connection.

In some examples, the sidelink receiver 1625 may be configured as or otherwise support a means for receiving the second sidelink message over a configured sidelink carrier, a preconfigured sidelink carrier, or a default sidelink carrier.

In some examples, the carrier configuration manager 1670 may be configured as or otherwise support a means for configuring the at least one sidelink carrier as a sidelink anchor carrier for the sidelink control connection based on the second sidelink message. In some examples, the sidelink communicator 1675 may be configured as or otherwise support a means for communicating one or more additional sidelink control messages with the first UE using the sidelink anchor carrier.

In some examples, the measurement component 1630 may be configured as or otherwise support a means for measuring one or more channel parameters of at least one candidate sidelink carrier of the first set of candidate sidelink carriers of the second UE. In some examples, the determination component 1635 may be configured as or otherwise support a means for selecting at least a second sidelink carrier for reconfiguring the sidelink control connection based on the one or more channel parameters satisfying a threshold. In some examples, the sidelink transmitter 1640 may be configured as or otherwise support a means for transmitting, to the first UE, a third sidelink message indicating the at least the second sidelink carrier. In some examples, the sidelink receiver 1625 may be configured as or otherwise support a means for receiving, from the first UE, a reconfiguration message for reconfiguring the sidelink control connection between the first UE and the second UE using the at least the second sidelink carrier as a second sidelink anchor carrier based on transmitting the second sidelink control message.

In some examples, the sidelink communicator 1675 may be configured as or otherwise support a means for communicating one or more additional sidelink control messages with the second UE using the second sidelink anchor carrier after reconfiguring the sidelink control connection.

Additionally or alternatively, the communications manager 1620 may support wireless communication at a first UE in accordance with examples as disclosed herein. In some examples, the control manager 1645 may be configured as or otherwise support a means for establishing a sidelink control connection between the first UE and a second UE using a first sidelink anchor carrier for the sidelink control connection, the sidelink control connection supporting carrier aggregation using multiple sidelink carriers including the first sidelink anchor carrier. The parameter component 1650 may be configured as or otherwise support a means for identifying one or more channel parameters of one or more candidate sidelink carriers for the sidelink control connection. In some examples, the sidelink transmitter 1640 may be configured as or otherwise support a means for transmitting, to the second UE, a sidelink control message for configuring a sidelink carrier of the one or more candidate sidelink carriers as a second sidelink anchor carrier for the sidelink control connection based on the one or more channel parameters, the second sidelink anchor carrier configured for fallback of the first sidelink anchor carrier or duplication of the first sidelink anchor carrier.

In some examples, the sidelink transmitter 1640 may be configured as or otherwise support a means for transmitting a second sidelink control message to the second UE over the second sidelink anchor carrier, the second sidelink control message indicating an updated set of candidate sidelink carriers at the first UE, the updated set of candidate sidelink carriers including at least one of the one or more candidate sidelink carriers. In some examples, the control manager 1645 may be configured as or otherwise support a means for reconfiguring the sidelink control connection between the first UE and the second UE using the second sidelink anchor carrier based on the second sidelink control message.

In some examples, receiving a reconfiguration complete message from the second UE over the second sidelink anchor carrier, the reconfiguration complete message indicating a second updated set of candidate sidelink carriers at the second UE. In some examples, reconfiguring the sidelink control connection between the first UE and the second UE using the second sidelink anchor carrier based on the reconfiguration complete message.

In some examples, the sidelink receiver 1625 may be configured as or otherwise support a means for receiving a second sidelink control message from the second UE over the first sidelink anchor carrier, the second sidelink control message indicating an updated set of candidate sidelink carriers at the second UE. In some examples, the control manager 1645 may be configured as or otherwise support a means for reconfiguring the sidelink control connection between the first UE and the second UE using the second sidelink anchor carrier, based on receiving the second sidelink control message.

In some examples, transmitting a reconfiguration message to the second UE over the second sidelink anchor carrier, the reconfiguration message indicating a second updated set of candidate sidelink carriers at the first UE. In some examples, reconfiguring the sidelink control connection between the first UE and the second UE using the second sidelink anchor carrier based on transmitting the reconfiguration message.

In some examples, to support configuring the sidelink carrier of the one or more candidate sidelink carriers as the second sidelink anchor carrier for the sidelink control connection, the channel mapper 1665 may be configured as or otherwise support a means for mapping a logical channel for sidelink control messaging to both the first sidelink anchor carrier and the second sidelink anchor carrier.

In some examples, to support configuring the sidelink carrier of the one or more candidate sidelink carriers as the second sidelink anchor carrier for the sidelink control connection, the channel mapper 1665 may be configured as or otherwise support a means for mapping a sidelink broadcast control channel or a sidelink common control channel for sidelink control messaging to both the first sidelink anchor carrier and the second sidelink anchor carrier.

In some examples, the activation component 1680 may be configured as or otherwise support a means for receiving an RRC message or a MAC control element (MAC-CE) that activates or deactivates a configuration for the second sidelink anchor carrier as one of fallback of the first sidelink anchor carrier or duplication of the first sidelink anchor carrier.

In some examples, the link manager 1685 may be configured as or otherwise support a means for determining a radio link failure associated with the first sidelink anchor carrier. In some examples, the sidelink communicator 1675 may be configured as or otherwise support a means for transmitting or receiving a second sidelink control message based on determining the radio link failure, the second sidelink control message indicating an updated set of candidate sidelink carriers. In some examples, the control manager 1645 may be configured as or otherwise support a means for reconfiguring the sidelink control connection between the first UE and the second UE using the second sidelink anchor carrier, based on the radio link failure, the second sidelink control message, or both.

In some examples, to support transmitting the sidelink control message, the sidelink transmitter 1640 may be configured as or otherwise support a means for broadcasting the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

In some examples, to support transmitting the sidelink control message, the sidelink transmitter 1640 may be configured as or otherwise support a means for broadcasting the sidelink control message over a sidelink data channel mapped to the first sidelink anchor carrier, where the sidelink control message includes a set of sidelink system information blocks (SIBs).

In some examples, the channel mapper 1665 may be configured as or otherwise support a means for determining a mapping between a logic channel for a sidelink broadcast control channel and the first sidelink anchor carrier, where transmitting the sidelink control message is based on the mapping.

In some examples, the measurement component 1630 may be configured as or otherwise support a means for measuring a set of channel parameters associated with a set of candidate sidelink carriers for the sidelink control connection. In some examples, the determination component 1635 may be configured as or otherwise support a means for determining the first sidelink anchor carrier from the set of candidate sidelink carriers based on one or more of the set of channel parameters satisfying a threshold.

In some examples, the determination component 1635 may be configured as or otherwise support a means for determining the sidelink carrier of the one or more candidate sidelink carriers as the second sidelink anchor carrier based on one or more the one or more channel parameters satisfying a threshold.

Additionally or alternatively, the communications manager 1620 may support wireless communication at a second UE in accordance with examples as disclosed herein. In some examples, the control manager 1645 may be configured as or otherwise support a means for establishing a sidelink control connection between a first UE and the second UE using a first sidelink anchor carrier for the sidelink control connection, the sidelink control connection supporting carrier aggregation using multiple sidelink carriers including the first sidelink anchor carrier. In some examples, the sidelink receiver 1625 may be configured as or otherwise support a means for receiving, from the first UE, a sidelink control message for configuring a sidelink carrier of one or more candidate sidelink carriers as a second sidelink anchor carrier for the sidelink control connection, the second sidelink anchor carrier configured for fallback of the first sidelink anchor carrier or duplication of the first sidelink anchor carrier.

In some examples, the sidelink receiver 1625 may be configured as or otherwise support a means for receiving a second sidelink control message from the first UE over the second sidelink anchor carrier, the second sidelink control message indicating an updated set of candidate sidelink carriers at the first UE, the updated set of candidate sidelink carriers including at least one of the one or more candidate sidelink carriers. In some examples, the control manager 1645 may be configured as or otherwise support a means for reconfiguring the sidelink control connection between the first UE and the second UE using the second sidelink anchor carrier based on the second sidelink control message.

In some examples, transmitting a reconfiguration complete message the first UE over the second sidelink anchor carrier, the reconfiguration complete message indicating a second updated set of candidate sidelink carriers at the second UE. In some examples, reconfiguring the sidelink control connection between the first UE and the second UE using the second sidelink anchor carrier based on the reconfiguration complete message.

In some examples, the sidelink transmitter 1640 may be configured as or otherwise support a means for transmitting a second sidelink control message the first UE over the first sidelink anchor carrier, the second sidelink control message indicating an updated set of candidate sidelink carriers at the second UE. In some examples, the control manager 1645 may be configured as or otherwise support a means for reconfiguring the sidelink control connection between the first UE and the second UE using the second sidelink anchor carrier, based on transmitting the second sidelink control message, the sidelink control connection supporting carrier aggregation using multiple sidelink carriers including the second sidelink anchor carrier.

In some examples, the control manager 1645 may be configured as or otherwise support a means for receiving a reconfiguration message from the first UE over the second sidelink anchor carrier, the reconfiguration message indicating a second updated set of candidate sidelink carriers at the first UE. In some examples, the control manager 1645 may be configured as or otherwise support a means for reconfiguring the sidelink control connection between the first UE and the second UE using the second sidelink anchor carrier, based on receiving the reconfiguration message.

In some examples, the control manager 1645 may be configured as or otherwise support a means for configuring the sidelink carrier of the one or more candidate sidelink carriers as the second sidelink anchor carrier for the sidelink control connection. In some examples, the channel mapper 1665 may be configured as or otherwise support a means for mapping a logical channel for sidelink control messaging to both the first sidelink anchor carrier and the second sidelink anchor carrier.

In some examples, configuring the sidelink carrier of the one or more candidate sidelink carriers as the second sidelink anchor carrier for the sidelink control connection. In some examples, mapping a sidelink broadcast control channel or a sidelink common control channel for sidelink control messaging to both the first sidelink anchor carrier and the second sidelink anchor carrier.

In some examples, the activation component 1680 may be configured as or otherwise support a means for transmitting an RRC message or a MAC control element (MAC-CE) that activates or deactivates a configuration for the second sidelink anchor carrier as one of fallback of the first sidelink anchor carrier or duplication of the first sidelink anchor carrier.

In some examples, the sidelink communicator 1675 may be configured as or otherwise support a means for transmitting or receiving a second sidelink control message indicating an updated set of candidate sidelink carriers. In some examples, the control manager 1645 may be configured as or otherwise support a means for reconfiguring the sidelink control connection between the first UE and the second UE using the second sidelink anchor carrier, based on the second sidelink control message.

In some examples, to support receiving the sidelink control message, the sidelink receiver 1625 may be configured as or otherwise support a means for receiving the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

In some examples, to support receiving the sidelink control message, the sidelink receiver 1625 may be configured as or otherwise support a means for receiving the sidelink control message over a sidelink data channel mapped to the first sidelink anchor carrier, where the sidelink control message includes a set of sidelink system information blocks (SIBs).

In some examples, the determination component 1635 may be configured as or otherwise support a means for determining the sidelink carrier of the one or more candidate sidelink carriers as the second sidelink anchor carrier based on one or more channel parameters satisfying a threshold.

In some examples, the measurement component 1630 may be configured as or otherwise support a means for measuring one or more channel parameters of the first sidelink anchor carrier. In some examples, the determination component 1635 may be configured as or otherwise support a means for determining to reconfigure the sidelink control connection between the first UE and the second UE using the second sidelink anchor carrier based on the one or more channel parameters of the first sidelink anchor carrier satisfying a threshold. In some examples, the sidelink transmitter 1640 may be configured as or otherwise support a means for transmitting, to the first UE, a sidelink reconfiguration message for reconfiguring the sidelink carrier of the one or more candidate sidelink carriers as the second sidelink anchor carrier for the sidelink control connection based on the one or more channel parameters. In some examples, the control manager 1645 may be configured as or otherwise support a means for reconfiguring the sidelink control connection between the first UE and the second UE using the second sidelink anchor carrier based on the sidelink reconfiguration message.

In some examples, the sidelink control message for configuring the sidelink carrier is received based on a measurement of one or more channel parameters.

Additionally or alternatively, the communications manager 1620 may support wireless communication at a first UE in accordance with examples as disclosed herein. In some examples, the control manager 1645 may be configured as or otherwise support a means for establishing a sidelink control connection between the first UE and a second UE using a sidelink anchor carrier for the sidelink control connection, the sidelink control connection supporting carrier aggregation using multiple sidelink carriers including the sidelink anchor carrier. The window component 1655 may be configured as or otherwise support a means for identifying a monitoring window for measuring the sidelink anchor carrier, a set of candidate sidelink carriers, or a combination thereof. In some examples, the measurement component 1630 may be configured as or otherwise support a means for measuring, within the monitoring window, one or more channel parameters of the sidelink anchor carrier, the set of candidate sidelink carriers, or a combination thereof. The selection manager 1660 may be configured as or otherwise support a means for selecting, based on the one or more channel parameters, a sidelink carrier of the set of candidate sidelink carriers for the sidelink control connection, where a measured parameter associated with the sidelink carrier satisfies a threshold. In some examples, the sidelink transmitter 1640 may be configured as or otherwise support a means for transmitting, to the second UE, a sidelink control message for configuring the sidelink carrier for the sidelink control connection between the first UE and the second UE.

In some examples, the carrier configuration manager 1670 may be configured as or otherwise support a means for configuring the sidelink carrier as a second sidelink anchor carrier for the sidelink control connection between the first UE and the second UE based on the selecting. In some examples, the control manager 1645 may be configured as or otherwise support a means for reconfiguring the sidelink control connection between the first UE and a second UE using the second sidelink anchor carrier.

In some examples, to support measuring the one or more channel parameters of the sidelink anchor carrier, the set of candidate sidelink carriers, or the combination thereof, the measurement component 1630 may be configured as or otherwise support a means for measuring a channel busy ratio (CBR) of the sidelink anchor carrier, the set of candidate sidelink carriers, or the combination thereof, where the sidelink carrier for the sidelink control connection is selected based on the measured CBR, RSRP or RSSI associated with the sidelink anchor carrier satisfying a threshold.

In some examples, the carrier configuration manager 1670 may be configured as or otherwise support a means for configuring the sidelink carrier as a second sidelink carrier for the sidelink control connection between the first UE and the second UE based on the selecting. In some examples, the control manager 1645 may be configured as or otherwise support a means for reconfiguring the sidelink control connection between the first UE and a second UE using the second sidelink carrier.

Additionally or alternatively, the communications manager 1620 may support wireless communication at a second UE in accordance with examples as disclosed herein. In some examples, the control manager 1645 may be configured as or otherwise support a means for establishing a sidelink control connection between a first UE and the second UE using a sidelink anchor carrier for the sidelink control connection, the sidelink control connection supporting carrier aggregation using multiple sidelink carriers including the sidelink anchor carrier. In some examples, the window component 1655 may be configured as or otherwise support a means for identifying a monitoring window for measuring the sidelink anchor carrier, a set of candidate sidelink carriers, or a combination thereof. In some examples, the measurement component 1630 may be configured as or otherwise support a means for measuring, within the monitoring window, one or more channel parameters of the sidelink anchor carrier, the set of candidate sidelink carriers, or a combination thereof. In some examples, the sidelink receiver 1625 may be configured as or otherwise support a means for receiving, from the first UE, a sidelink control message for configuring a sidelink carrier for the sidelink control connection between the first UE and the second UE.

In some examples, the carrier configuration manager 1670 may be configured as or otherwise support a means for configuring the sidelink carrier as a second sidelink anchor carrier for the sidelink control connection between the first UE and the second UE based on the sidelink control message. In some examples, the control manager 1645 may be configured as or otherwise support a means for reconfiguring the sidelink control connection between the first UE and a second UE using the second sidelink anchor carrier.

In some examples, the carrier configuration manager 1670 may be configured as or otherwise support a means for configuring the sidelink carrier as a second sidelink carrier for the sidelink control connection between the first UE and the second UE based on the sidelink control message. In some examples, the control manager 1645 may be configured as or otherwise support a means for reconfiguring the sidelink control connection between the first UE and a second UE using the second sidelink carrier.

In some examples, the sidelink transmitter 1640 may be configured as or otherwise support a means for transmitting, to the first UE, a reconfiguration complete message confirming the configuring of the sidelink carrier for the sidelink control connection.

In some examples, the sidelink transmitter 1640 may be configured as or otherwise support a means for transmitting, to the first UE, a reconfiguration denied message rejecting the configuring of the sidelink carrier for the sidelink control connection, the reconfiguration denied message including a second set of candidate sidelink carriers for the sidelink control connection between the first UE and the second UE.

Figure 17:
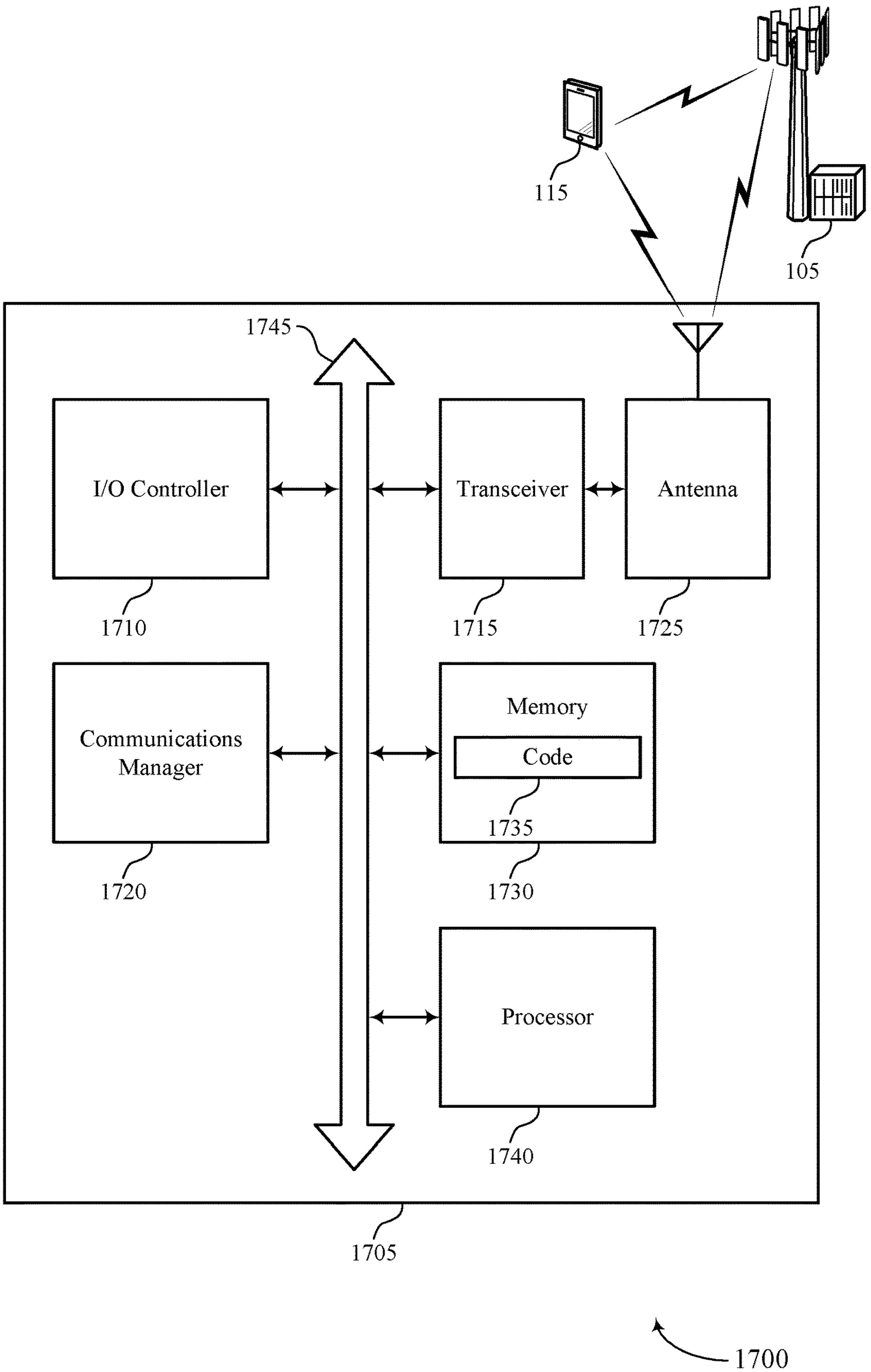
FIG. 17 shows a diagram of a system including a device that supports techniques for sidelink control connection with carrier aggregation in accordance with aspects of the present disclosure.

FIG. 17 shows a diagram of a system 1700 including a device 1705 that supports techniques for sidelink control connection with carrier aggregation in accordance with aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for sidelink control connection with carrier aggregation). For example, the device 1705 or a component of the device 1705 may include a processor 1740 and memory 1730 coupled to the processor 1740, the processor 1740 and memory 1730 configured to perform various functions described herein.

The communications manager 1720 may support wireless communication at a first UE in accordance with examples as disclosed herein. For example, the communications manager 1720 may be configured as or otherwise support a means for receiving a first sidelink message from a second UE, the first sidelink message indicating a first set of candidate sidelink carriers of the second UE. The communications manager 1720 may be configured as or otherwise support a means for measuring one or more channel parameters of at least one candidate sidelink carrier of the first set of candidate sidelink carriers. The communications manager 1720 may be configured as or otherwise support a means for determining at least one sidelink carrier of the first set of candidate sidelink carriers based on the measured one or more channel parameters, the at least one sidelink carrier for establishing a sidelink control connection that supports carrier aggregation using multiple sidelink carriers. The communications manager 1720 may be configured as or otherwise support a means for transmitting, to the second UE, a second sidelink message indicating the at least one sidelink carrier for establishing the sidelink control connection. The communications manager 1720 may be configured as or otherwise support a means for establishing the sidelink control connection between the first UE and the second UE using the at least one sidelink carrier based on the second sidelink message.

Additionally or alternatively, the communications manager 1720 may support wireless communication at a second UE in accordance with examples as disclosed herein. For example, the communications manager 1720 may be configured as or otherwise support a means for transmitting a first sidelink message to a first UE, the first sidelink message indicating a first set of candidate sidelink carriers of the second UE for a sidelink control connection that supports carrier aggregation using multiple sidelink carriers. The communications manager 1720 may be configured as or otherwise support a means for receiving, from the first UE, a second sidelink message indicating at least one sidelink carrier of the first set of candidate sidelink carriers for establishing the sidelink control connection. The communications manager 1720 may be configured as or otherwise support a means for establishing the sidelink control connection between the first UE and the second UE using the at least one sidelink carrier based on the second sidelink message.

Additionally or alternatively, the communications manager 1720 may support wireless communication at a first UE in accordance with examples as disclosed herein. For example, the communications manager 1720 may be configured as or otherwise support a means for establishing a sidelink control connection between the first UE and a second UE using a first sidelink anchor carrier for the sidelink control connection, the sidelink control connection supporting carrier aggregation using multiple sidelink carriers including the first sidelink anchor carrier. The communications manager 1720 may be configured as or otherwise support a means for identifying one or more channel parameters of one or more candidate sidelink carriers for the sidelink control connection. The communications manager 1720 may be configured as or otherwise support a means for transmitting, to the second UE, a sidelink control message for configuring a sidelink carrier of the one or more candidate sidelink carriers as a second sidelink anchor carrier for the sidelink control connection based on the one or more channel parameters, the second sidelink anchor carrier configured for fallback of the first sidelink anchor carrier or duplication of the first sidelink anchor carrier.

Additionally or alternatively, the communications manager 1720 may support wireless communication at a second UE in accordance with examples as disclosed herein. For example, the communications manager 1720 may be configured as or otherwise support a means for establishing a sidelink control connection between a first UE and the second UE using a first sidelink anchor carrier for the sidelink control connection, the sidelink control connection supporting carrier aggregation using multiple sidelink carriers including the first sidelink anchor carrier. The communications manager 1720 may be configured as or otherwise support a means for receiving, from the first UE, a sidelink control message for configuring a sidelink carrier of one or more candidate sidelink carriers as a second sidelink anchor carrier for the sidelink control connection, the second sidelink anchor carrier configured for fallback of the first sidelink anchor carrier or duplication of the first sidelink anchor carrier.

Additionally or alternatively, the communications manager 1720 may support wireless communication at a first UE in accordance with examples as disclosed herein. For example, the communications manager 1720 may be configured as or otherwise support a means for establishing a sidelink control connection between the first UE and a second UE using a sidelink anchor carrier for the sidelink control connection, the sidelink control connection supporting carrier aggregation using multiple sidelink carriers including the sidelink anchor carrier. The communications manager 1720 may be configured as or otherwise support a means for identifying a monitoring window for measuring the sidelink anchor carrier, a set of candidate sidelink carriers, or a combination thereof. The communications manager 1720 may be configured as or otherwise support a means for measuring, within the monitoring window, one or more channel parameters of the sidelink anchor carrier, the set of candidate sidelink carriers, or a combination thereof. The communications manager 1720 may be configured as or otherwise support a means for selecting, based on the one or more channel parameters, a sidelink carrier of the set of candidate sidelink carriers for the sidelink control connection, where a measured parameter associated with the sidelink carrier satisfies a threshold. The communications manager 1720 may be configured as or otherwise support a means for transmitting, to the second UE, a sidelink control message for configuring the sidelink carrier for the sidelink control connection between the first UE and the second UE.

Additionally or alternatively, the communications manager 1720 may support wireless communication at a second UE in accordance with examples as disclosed herein. For example, the communications manager 1720 may be configured as or otherwise support a means for establishing a sidelink control connection between a first UE and the second UE using a sidelink anchor carrier for the sidelink control connection, the sidelink control connection supporting carrier aggregation using multiple sidelink carriers including the sidelink anchor carrier. The communications manager 1720 may be configured as or otherwise support a means for identifying a monitoring window for measuring the sidelink anchor carrier, a set of candidate sidelink carriers, or a combination thereof. The communications manager 1720 may be configured as or otherwise support a means for measuring, within the monitoring window, one or more channel parameters of the sidelink anchor carrier, the set of candidate sidelink carriers, or a combination thereof. The communications manager 1720 may be configured as or otherwise support a means for receiving, from the first UE, a sidelink control message for configuring a sidelink carrier for the sidelink control connection between the first UE and the second UE.

By including or configuring the communications manager 1720 in accordance with examples as described herein, the device 1705 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for sidelink control connection with carrier aggregation as described herein, or the processor 1740 and the memory 1730 may be otherwise configured to perform or support such operations.

Figure 18:
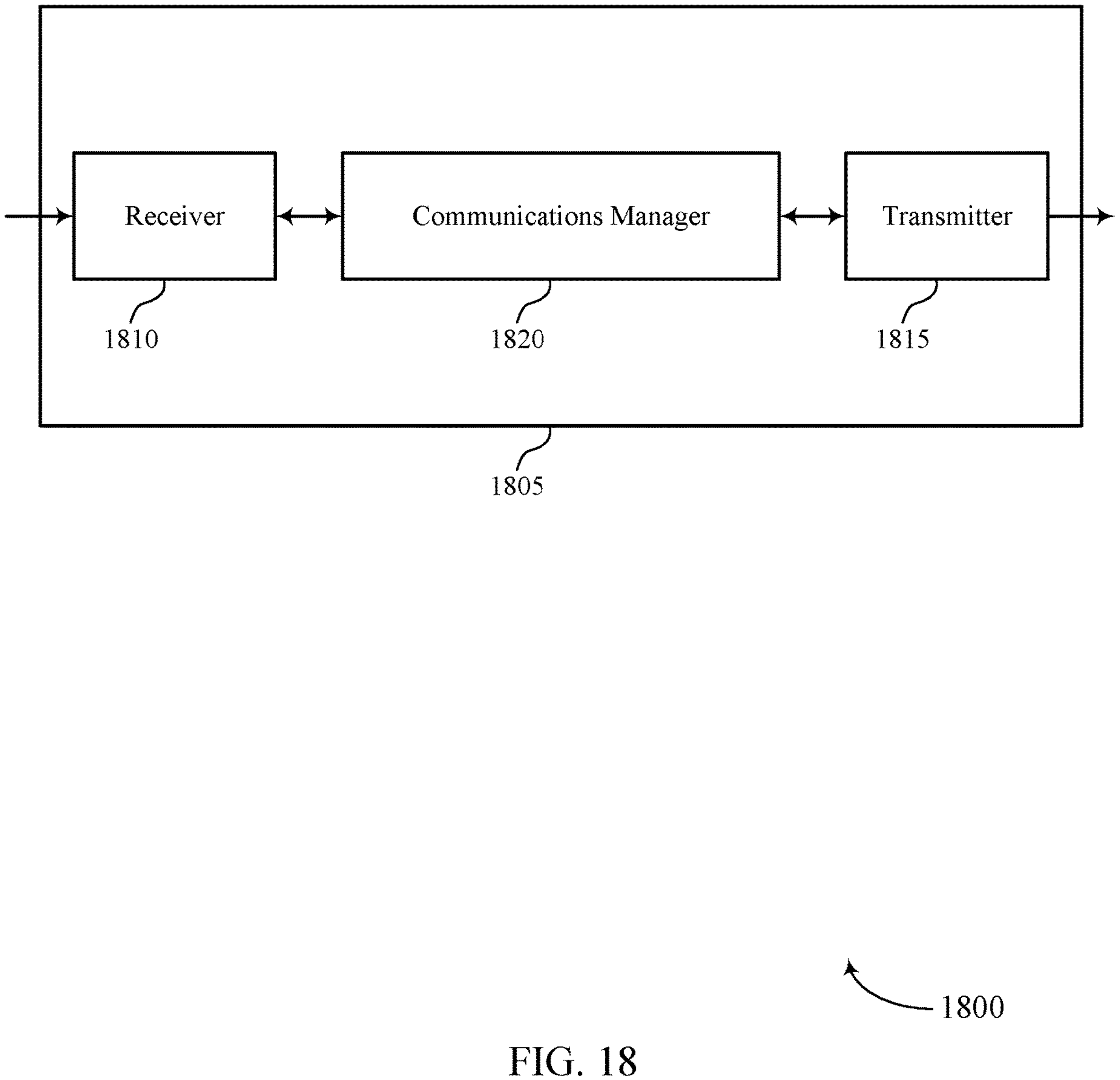
FIGS. 18 and 19 show block diagrams of devices that support techniques for sidelink control connection with carrier aggregation in accordance with aspects of the present disclosure.

FIG. 18 shows a block diagram 1800 of a device 1805 that supports techniques for sidelink control connection with carrier aggregation in accordance with aspects of the present disclosure. The device 1805 may be an example of aspects of a base station 105 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to techniques for sidelink control connection with carrier aggregation). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to techniques for sidelink control connection with carrier aggregation). In some examples, the transmitter 1815 may be co-located with a receiver 1810 in a transceiver module. The transmitter 1815 may utilize a single antenna or a set of multiple antennas.

The communications manager 1820, the receiver 1810, the transmitter 1815, or various combinations thereof or various components thereof may be examples of means for performing various aspects of techniques for sidelink control connection with carrier aggregation as described herein. For example, the communications manager 1820, the receiver 1810, the transmitter 1815, or various combinations or components thereof may support a method for performing one or more of the functions described herein.

In some examples, the communications manager 1820, the receiver 1810, the transmitter 1815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1820, the receiver 1810, the transmitter 1815, or various combinations or components thereof may be implemented in code (e.g., as communications management software or firmware) executed by a processor. If implemented in code executed by a processor, the functions of the communications manager 1820, the receiver 1810, the transmitter 1815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1820 may be configured to perform various operations (e.g., receiving, monitoring, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to receive information, transmit information, or perform various other operations as described herein.

The communications manager 1820 may support wireless communication at a base station in accordance with examples as disclosed herein. For example, the communications manager 1820 may be configured as or otherwise support a means for receiving a sidelink information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE. The communications manager 1820 may be configured as or otherwise support a means for selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers. The communications manager 1820 may be configured as or otherwise support a means for transmitting, to the first UE, a configuration message indicating the at least one sidelink carrier selected for the sidelink control connection between the first UE and the second UE.

By including or configuring the communications manager 1820 in accordance with examples as described herein, the device 1805 (e.g., a processor controlling or otherwise coupled to the receiver 1810, the transmitter 1815, the communications manager 1820, or a combination thereof) may support techniques for reduced processing, reduced power consumption, more efficient utilization of communication resources.

Figure 19:
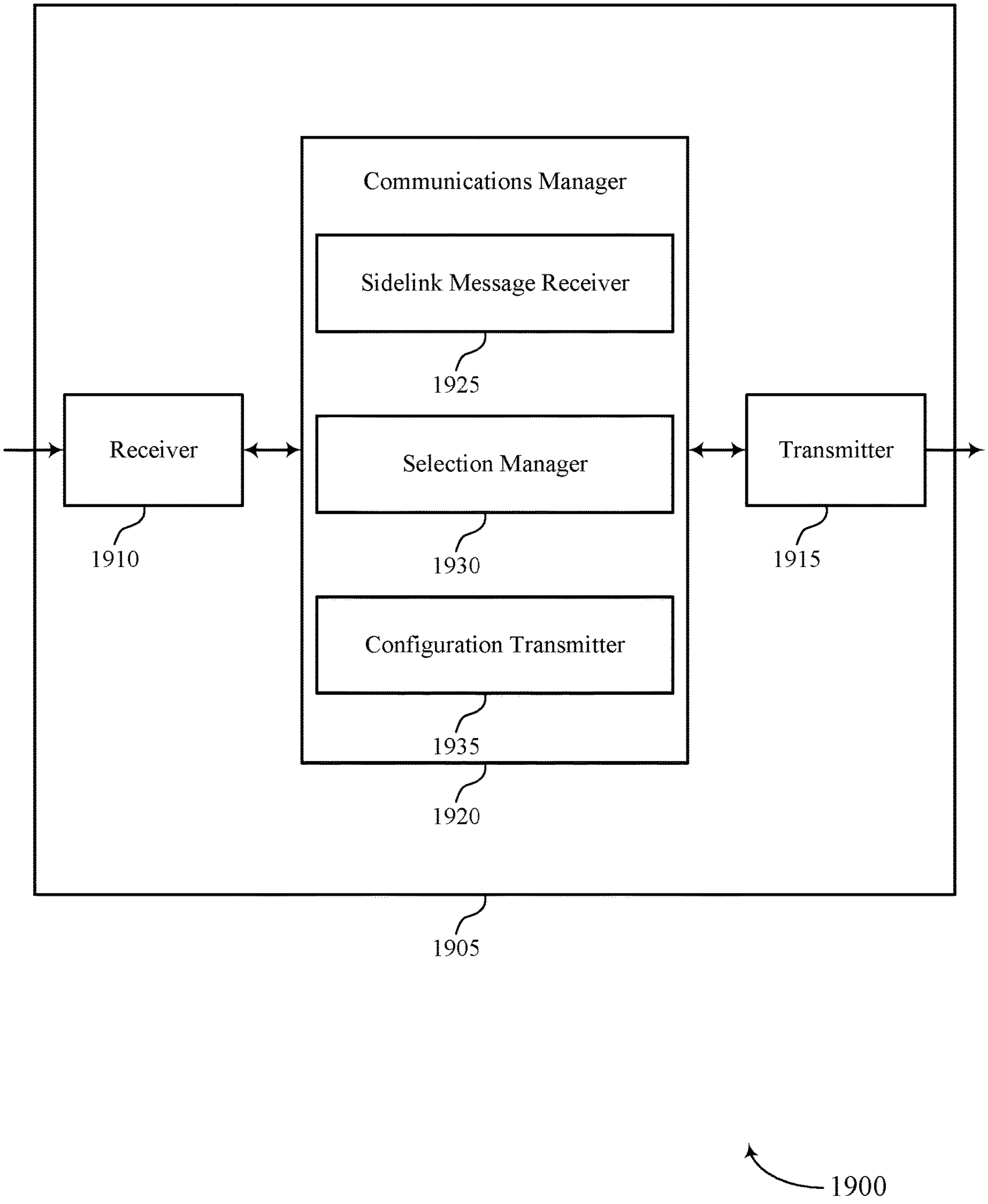

FIG. 19 shows a block diagram 1900 of a device 1905 that supports techniques for sidelink control connection with carrier aggregation in accordance with aspects of the present disclosure. The device 1905 may be an example of aspects of a device 1805 or a base station 105 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to techniques for sidelink control connection with carrier aggregation). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to techniques for sidelink control connection with carrier aggregation). In some examples, the transmitter 1915 may be co-located with a receiver 1910 in a transceiver module. The transmitter 1915 may utilize a single antenna or a set of multiple antennas.

The device 1905, or various components thereof, may be an example of means for performing various aspects of techniques for sidelink control connection with carrier aggregation as described herein. For example, the communications manager 1920 may include a sidelink message receiver 1925, a selection manager 1930, a configuration transmitter 1935, or any combination thereof. The communications manager 1920 may be an example of aspects of a communications manager 1820 as described herein. In some examples, the communications manager 1920, or various components thereof, may be configured to perform various operations (e.g., receiving, monitoring, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to receive information, transmit information, or perform various other operations as described herein.

The communications manager 1920 may support wireless communication at a base station in accordance with examples as disclosed herein. The sidelink message receiver 1925 may be configured as or otherwise support a means for receiving a sidelink information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE. The selection manager 1930 may be configured as or otherwise support a means for selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers. The configuration transmitter 1935 may be configured as or otherwise support a means for transmitting, to the first UE, a configuration message indicating the at least one sidelink carrier selected for the sidelink control connection between the first UE and the second UE.

Figure 20:
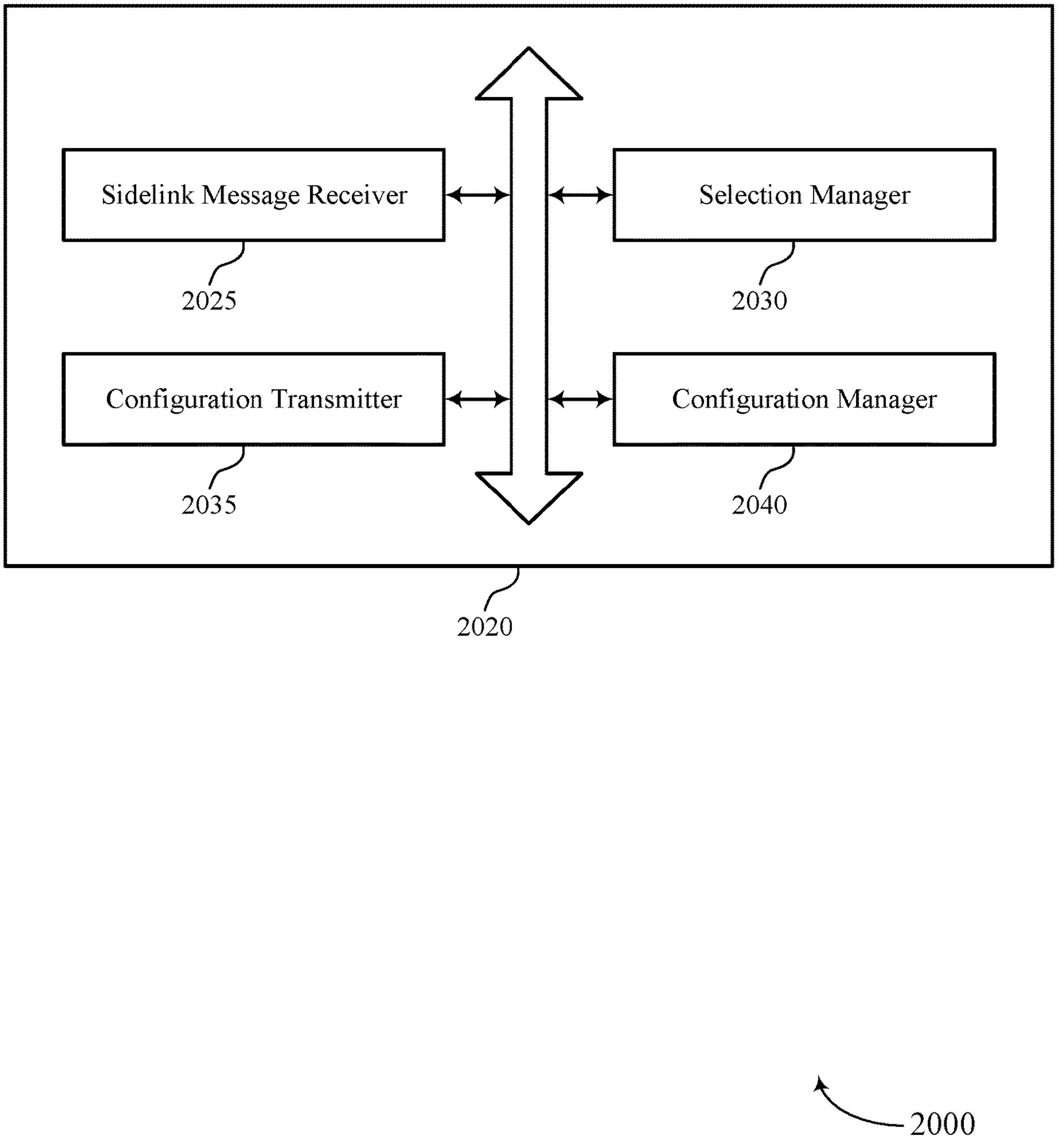
FIG. 20 shows a block diagram of a communications manager that supports techniques for sidelink control connection with carrier aggregation in accordance with aspects of the present disclosure.

FIG. 20 shows a block diagram 2000 of a communications manager 2020 that supports techniques for sidelink control connection with carrier aggregation in accordance with aspects of the present disclosure. The communications manager 2020 may be an example of aspects of a communications manager 1820, a communications manager 1920, or both, as described herein. The communications manager 2020, or various components thereof, may be an example of means for performing various aspects of techniques for sidelink control connection with carrier aggregation as described herein. For example, the communications manager 2020 may include a sidelink message receiver 2025, a selection manager 2030, a configuration transmitter 2035, a configuration manager 2040, or any combination thereof. Each of these components may communicate, directly or indirectly, with one another (e.g., via one or more buses).

The communications manager 2020 may support wireless communication at a base station in accordance with examples as disclosed herein. The sidelink message receiver 2025 may be configured as or otherwise support a means for receiving a sidelink information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE. The selection manager 2030 may be configured as or otherwise support a means for selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers. The configuration transmitter 2035 may be configured as or otherwise support a means for transmitting, to the first UE, a configuration message indicating the at least one sidelink carrier selected for the sidelink control connection between the first UE and the second UE.

In some examples, the configuration manager 2040 may be configured as or otherwise support a means for configuring the at least one sidelink carrier as a sidelink anchor carrier for the sidelink control connection based on the sidelink information message, where the configuration message indicates a configuration of the sidelink carrier for establishing the sidelink carrier as the sidelink anchor carrier.

In some examples, the configuration message indicates a set of sidelink carriers of the set of common candidate sidelink carriers for establishing the sidelink control connection.

Figure 21:
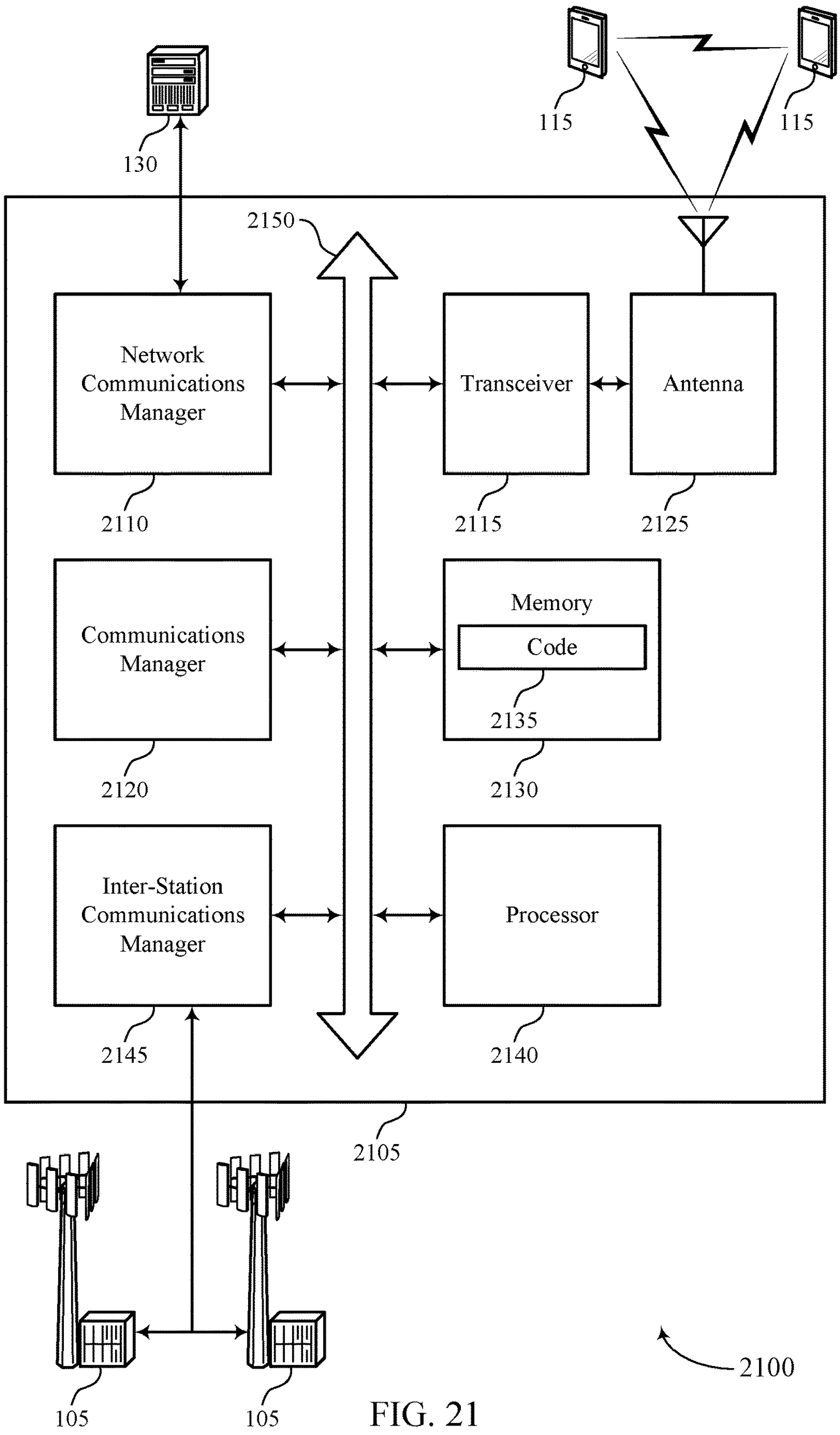
FIG. 21 shows a diagram of a system including a device that supports techniques for sidelink control connection with carrier aggregation in accordance with aspects of the present disclosure.

FIG. 21 shows a diagram of a system 2100 including a device 2105 that supports techniques for sidelink control connection with carrier aggregation in accordance with aspects of the present disclosure. The device 2105 may be an example of or include the components of a device 1805, a device 1905, or a base station 105 as described herein. The device 2105 may communicate wirelessly with one or more base stations 105, UEs 115, or any combination thereof. The device 2105 may include components for bi-directional voice and data communications including components for transmitting and receiving communications, such as a communications manager 2120, a network communications manager 2110, a transceiver 2115, an antenna 2125, a memory 2130, code 2135, a processor 2140, and an inter-station communications manager 2145. These components may be in electronic communication or otherwise coupled (e.g., operatively, communicatively, functionally, electronically, electrically) via one or more buses (e.g., a bus 2150).

The network communications manager 2110 may manage communications with a core network 130 (e.g., via one or more wired backhaul links). For example, the network communications manager 2110 may manage the transfer of data communications for client devices, such as one or more UEs 115.

In some cases, the device 2105 may include a single antenna 2125. However, in some other cases the device 2105 may have more than one antenna 2125, which may be capable of concurrently transmitting or receiving multiple wireless transmissions. The transceiver 2115 may communicate bi-directionally, via the one or more antennas 2125, wired, or wireless links as described herein. For example, the transceiver 2115 may represent a wireless transceiver and may communicate bi-directionally with another wireless transceiver. The transceiver 2115 may also include a modem to modulate the packets, to provide the modulated packets to one or more antennas 2125 for transmission, and to demodulate packets received from the one or more antennas 2125. The transceiver 2115, or the transceiver 2115 and one or more antennas 2125, may be an example of a transmitter 1815, a transmitter 1915, a receiver 1810, a receiver 1910, or any combination thereof or component thereof, as described herein.

The memory 2130 may include RAM and ROM. The memory 2130 may store computer-readable, computer-executable code 2135 including instructions that, when executed by the processor 2140, cause the device 2105 to perform various functions described herein. The code 2135 may be stored in a non-transitory computer-readable medium such as system memory or another type of memory. In some cases, the code 2135 may not be directly executable by the processor 2140 but may cause a computer (e.g., when compiled and executed) to perform functions described herein. In some cases, the memory 2130 may contain, among other things, a BIOS which may control basic hardware or software operation such as the interaction with peripheral components or devices.

The processor 2140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some other cases, a memory controller may be integrated into the processor 2140. The processor 2140 may be configured to execute computer-readable instructions stored in a memory (e.g., the memory 2130) to cause the device 2105 to perform various functions (e.g., functions or tasks supporting techniques for sidelink control connection with carrier aggregation). For example, the device 2105 or a component of the device 2105 may include a processor 2140 and memory 2130 coupled to the processor 2140, the processor 2140 and memory 2130 configured to perform various functions described herein.

The inter-station communications manager 2145 may manage communications with other base stations 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communications network technology to provide communication between base stations 105.

The communications manager 2120 may support wireless communication at a base station in accordance with examples as disclosed herein. For example, the communications manager 2120 may be configured as or otherwise support a means for receiving a sidelink information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE. The communications manager 2120 may be configured as or otherwise support a means for selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers. The communications manager 2120 may be configured as or otherwise support a means for transmitting, to the first UE, a configuration message indicating the at least one sidelink carrier selected for the sidelink control connection between the first UE and the second UE.

By including or configuring the communications manager 2120 in accordance with examples as described herein, the device 2105 may support techniques for improved communication reliability, reduced latency, improved user experience related to reduced processing, reduced power consumption, more efficient utilization of communication resources, improved coordination between devices, longer battery life, improved utilization of processing capability, decreasing signaling overhead, improving reliability, increased connection efficiency, and reduced latency.

In some examples, the communications manager 2120 may be configured to perform various operations (e.g., receiving, monitoring, transmitting) using or otherwise in cooperation with the transceiver 2115, the one or more antennas 2125, or any combination thereof. Although the communications manager 2120 is illustrated as a separate component, in some examples, one or more functions described with reference to the communications manager 2120 may be supported by or performed by the processor 2140, the memory 2130, the code 2135, or any combination thereof. For example, the code 2135 may include instructions executable by the processor 2140 to cause the device 2105 to perform various aspects of techniques for sidelink control connection with carrier aggregation as described herein, or the processor 2140 and the memory 2130 may be otherwise configured to perform or support such operations.

Figure 22:
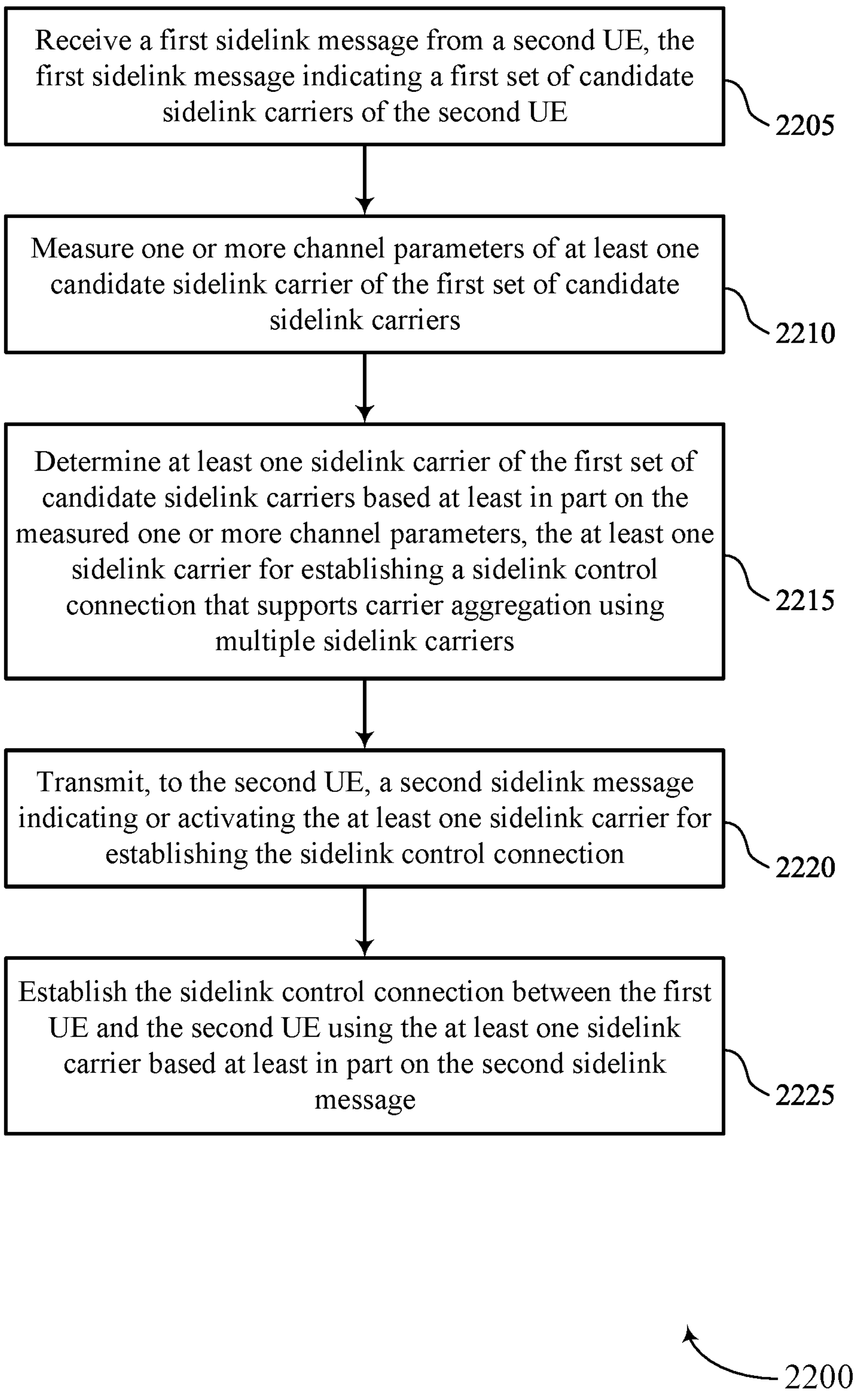
FIGS. 22 through 37 show flowcharts illustrating methods that support techniques for sidelink control connection with carrier aggregation in accordance with aspects of the present disclosure.

FIG. 22 shows a flowchart illustrating a method 2200 that supports techniques for sidelink control connection with carrier aggregation in accordance with aspects of the present disclosure. The operations of the method 2200 may be implemented by a UE or its components as described herein. For example, the operations of the method 2200 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2205, the method may include receiving a first sidelink message from a second UE, the first sidelink message indicating a first set of candidate sidelink carriers of the second UE. The operations of 2205 may be performed in accordance with examples as disclosed herein. In some examples, aspects of the operations of 2205 may be performed by a sidelink receiver 1625 as described with reference to FIG. 16.

At 2210, the method may include measuring one or more channel parameters of at least one candidate sidelink carrier of the first set of candidate sidelink carriers. The operations of 2210 may be performed in accordance with examples as disclosed herein. In some examples, aspects of the operations of 2210 may be performed by a measurement component 1630 as described with reference to FIG. 16.

At 2215, the method may include determining at least one sidelink carrier of the first set of candidate sidelink carriers based on the measured one or more channel parameters, the at least one sidelink carrier for establishing a sidelink control connection that supports carrier aggregation using multiple sidelink carriers. The operations of 2215 may be performed in accordance with examples as disclosed herein. In some examples, aspects of the operations of 2215 may be performed by a determination component 1635 as described with reference to FIG. 16.

At 2220, the method may include transmitting, to the second UE, a second sidelink message indicating or activating the at least one sidelink carrier for establishing the sidelink control connection. In some examples, the second sidelink message may include an RRC message or a MAC-CE. The operations of 2220 may be performed in accordance with examples as disclosed herein. In some examples, aspects of the operations of 2220 may be performed by a sidelink transmitter 1640 as described with reference to FIG. 16.

At 2225, the method may include establishing the sidelink control connection between the first UE and the second UE using the at least one sidelink carrier based on the second sidelink message. The operations of 2225 may be performed in accordance with examples as disclosed herein. In some examples, aspects of the operations of 2225 may be performed by a control manager 1645 as described with reference to FIG. 16.

Figure 23:
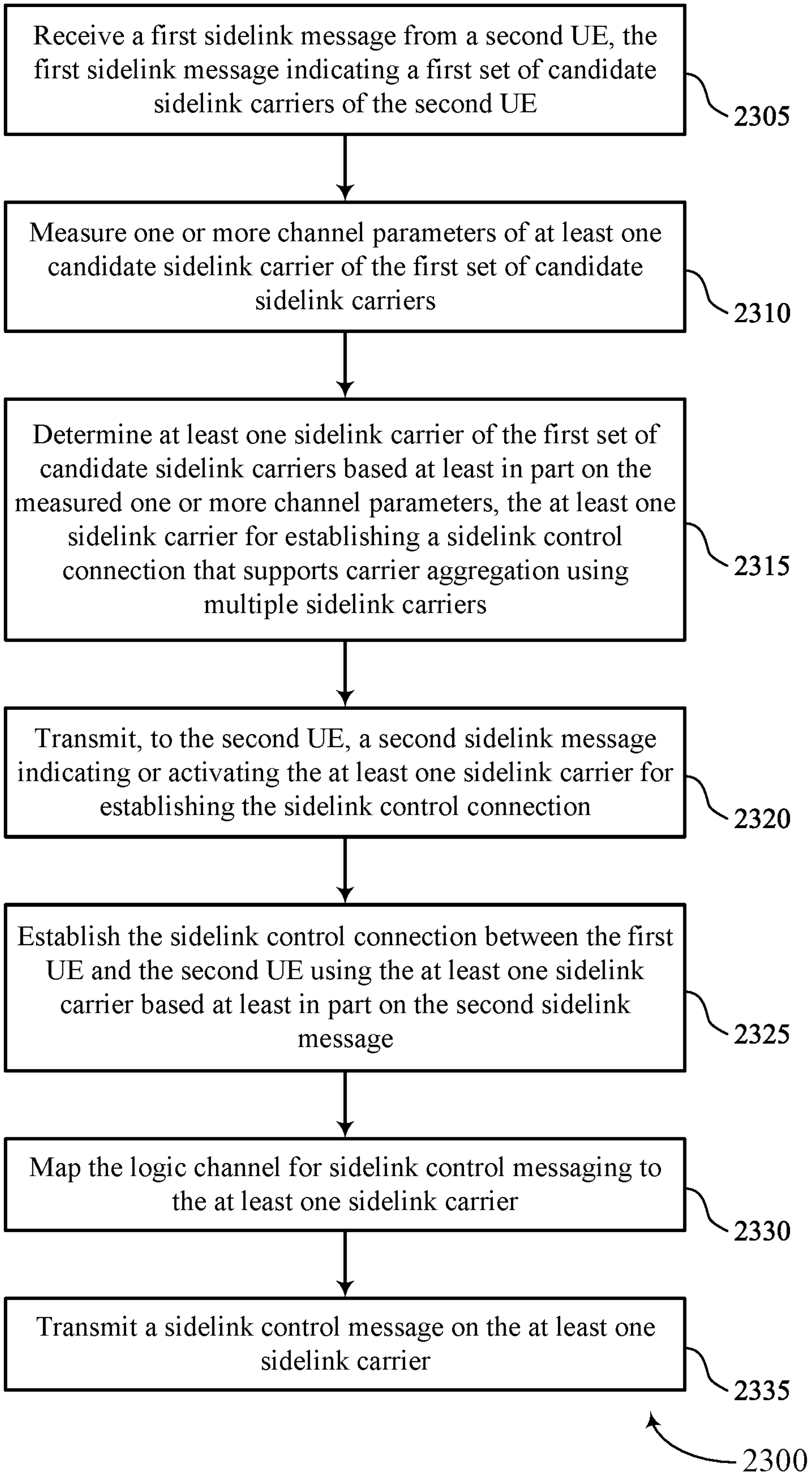

FIG. 23 shows a flowchart illustrating a method 2300 that supports techniques for sidelink control connection with carrier aggregation in accordance with aspects of the present disclosure. The operations of the method 2300 may be implemented by a UE or its components as described herein. For example, the operations of the method 2300 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2305, the method may include receiving a first sidelink message from a second UE, the first sidelink message indicating a first set of candidate sidelink carriers of the second UE. The operations of 2305 may be performed in accordance with examples as disclosed herein. In some examples, aspects of the operations of 2305 may be performed by a sidelink receiver 1625 as described with reference to FIG. 16.

At 2310, the method may include measuring one or more channel parameters of at least one candidate sidelink carrier of the first set of candidate sidelink carriers. The operations of 2310 may be performed in accordance with examples as disclosed herein. In some examples, aspects of the operations of 2310 may be performed by a measurement component 1630 as described with reference to FIG. 16.

At 2315, the method may include determining at least one sidelink carrier of the first set of candidate sidelink carriers based on the measured one or more channel parameters, the at least one sidelink carrier for establishing a sidelink control connection that supports carrier aggregation using multiple sidelink carriers. The operations of 2315 may be performed in accordance with examples as disclosed herein. In some examples, aspects of the operations of 2315 may be performed by a determination component 1635 as described with reference to FIG. 16.

At 2320, the method may include transmitting, to the second UE, a second sidelink message indicating or activating the at least one sidelink carrier for establishing the sidelink control connection. The operations of 2320 may be performed in accordance with examples as disclosed herein. In some examples, aspects of the operations of 2320 may be performed by a sidelink transmitter 1640 as described with reference to FIG. 16.

At 2325, the method may include establishing the sidelink control connection between the first UE and the second UE using the at least one sidelink carrier based on the second sidelink message. The operations of 2325 may be performed in accordance with examples as disclosed herein. In some examples, aspects of the operations of 2325 may be performed by a control manager 1645 as described with reference to FIG. 16.

At 2330, the method may include mapping the logic channel for sidelink control messaging to the at least one sidelink carrier. The operations of 2330 may be performed in accordance with examples as disclosed herein. In some examples, aspects of the operations of 2330 may be performed by a channel mapper 1665 as described with reference to FIG. 16.

At 2335, the method may include transmitting a sidelink control message on the at least one sidelink carrier. The operations of 2335 may be performed in accordance with examples as disclosed herein. In some examples, aspects of the operations of 2335 may be performed by a sidelink transmitter 1640 as described with reference to FIG. 16.

Figure 24:
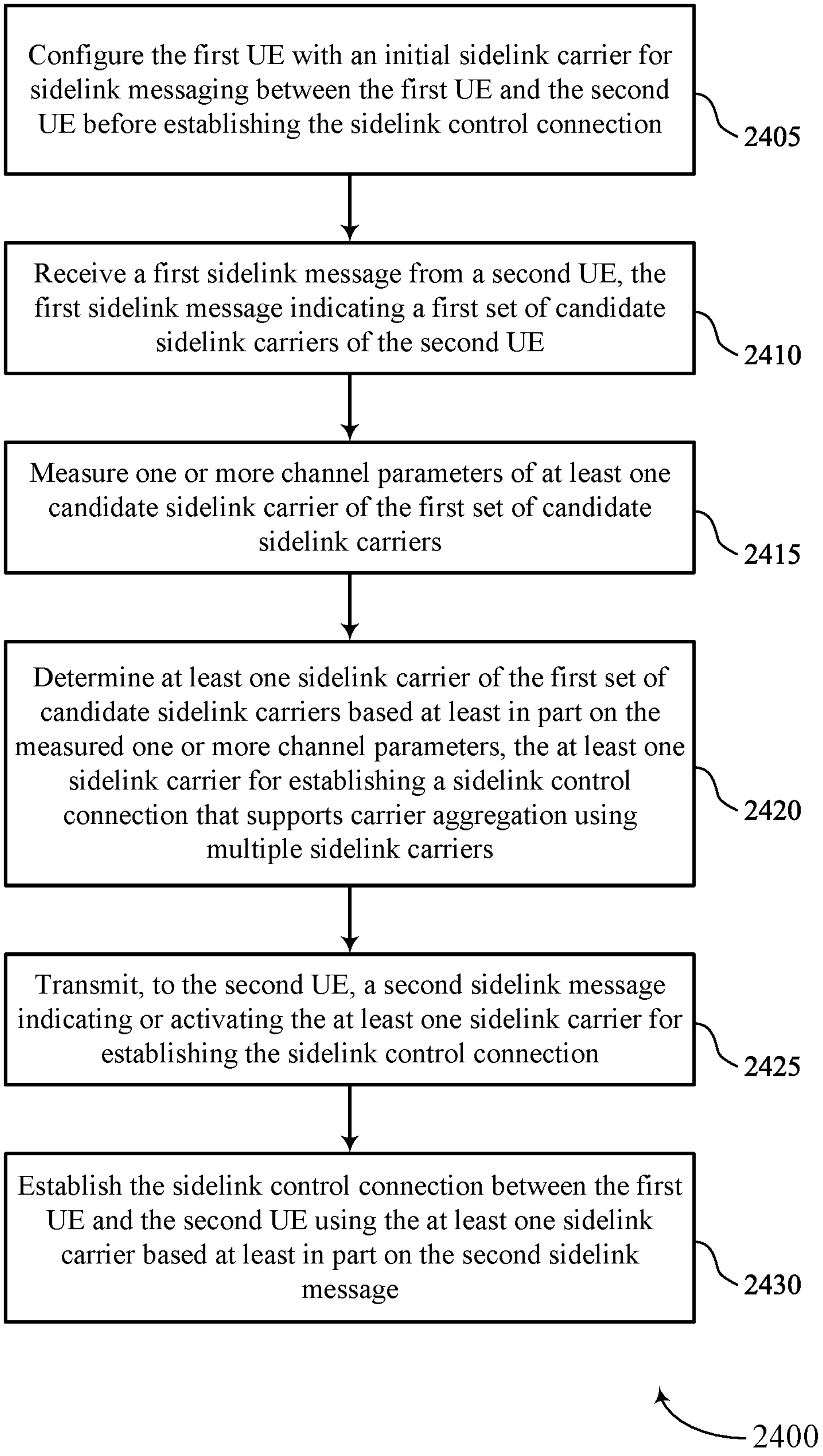

FIG. 24 shows a flowchart illustrating a method 2400 that supports techniques for sidelink control connection with carrier aggregation in accordance with aspects of the present disclosure. The operations of the method 2400 may be implemented by a UE or its components as described herein. For example, the operations of the method 2400 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2405, the method may include configuring the first UE with an initial sidelink carrier for sidelink messaging between the first UE and the second UE before establishing the sidelink control connection. The operations of 2405 may be performed in accordance with examples as disclosed herein. In some examples, aspects of the operations of 2405 may be performed by a carrier configuration manager 1670 as described with reference to FIG. 16.

At 2410, the method may include receiving a first sidelink message from a second UE, the first sidelink message indicating a first set of candidate sidelink carriers of the second UE. The operations of 2410 may be performed in accordance with examples as disclosed herein. In some examples, aspects of the operations of 2410 may be performed by a sidelink receiver 1625 as described with reference to FIG. 16.

At 2415, the method may include measuring one or more channel parameters of at least one candidate sidelink carrier of the first set of candidate sidelink carriers. The operations of 2415 may be performed in accordance with examples as disclosed herein. In some examples, aspects of the operations of 2415 may be performed by a measurement component 1630 as described with reference to FIG. 16.

At 2420, the method may include determining at least one sidelink carrier of the first set of candidate sidelink carriers based on the measured one or more channel parameters, the at least one sidelink carrier for establishing a sidelink control connection that supports carrier aggregation using multiple sidelink carriers. The operations of 2420 may be performed in accordance with examples as disclosed herein. In some examples, aspects of the operations of 2420 may be performed by a determination component 1635 as described with reference to FIG. 16.

At 2425, the method may include transmitting, to the second UE, a second sidelink message indicating or activating the at least one sidelink carrier for establishing the sidelink control connection. The operations of 2425 may be performed in accordance with examples as disclosed herein. In some examples, aspects of the operations of 2425 may be performed by a sidelink transmitter 1640 as described with reference to FIG. 16.

At 2430, the method may include establishing the sidelink control connection between the first UE and the second UE using the at least one sidelink carrier based on the second sidelink message. The operations of 2430 may be performed in accordance with examples as disclosed herein. In some examples, aspects of the operations of 2430 may be performed by a control manager 1645 as described with reference to FIG. 16.

Figure 25:
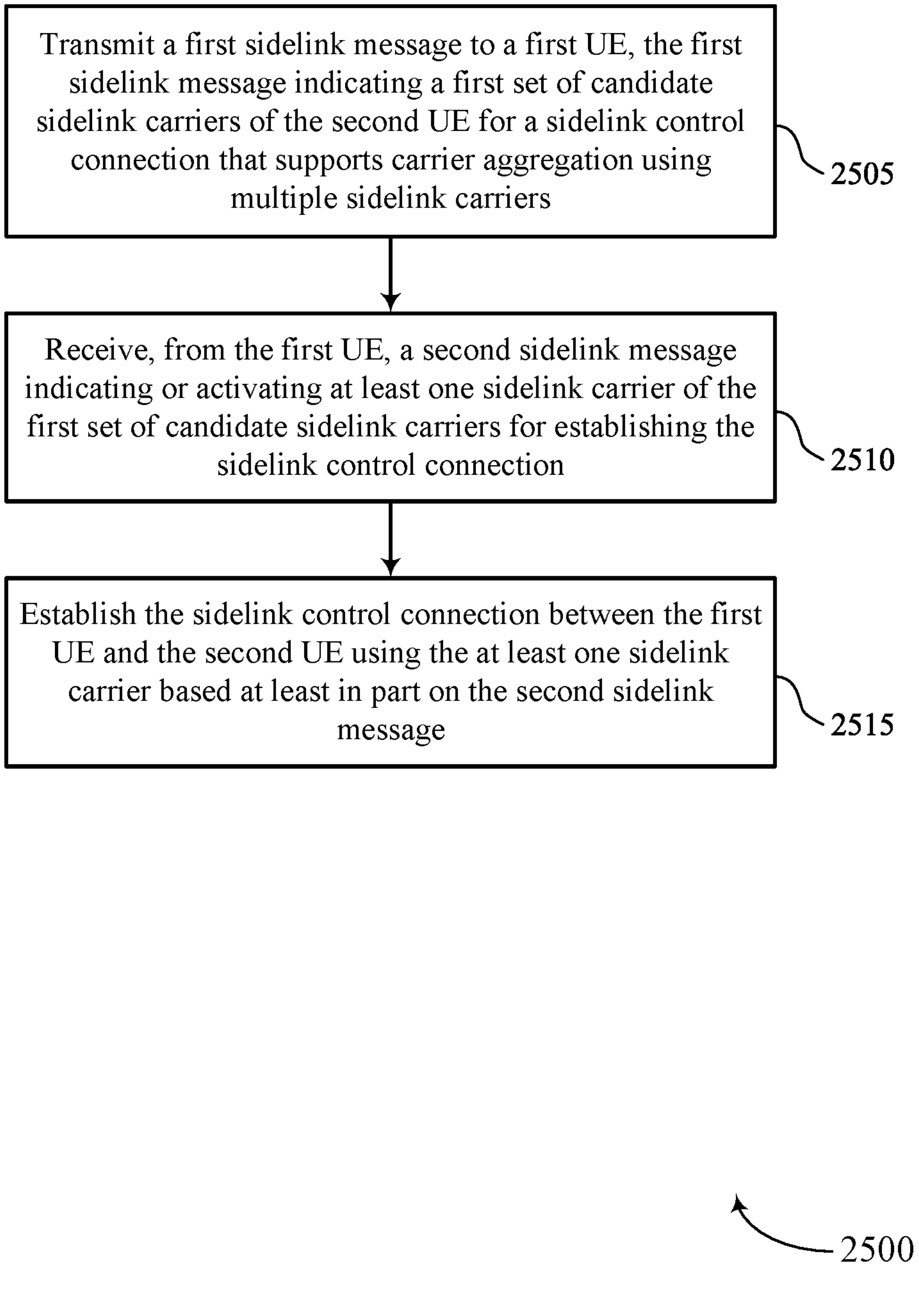

FIG. 25 shows a flowchart illustrating a method 2500 that supports techniques for sidelink control connection with carrier aggregation in accordance with aspects of the present disclosure. The operations of the method 2500 may be implemented by a UE or its components as described herein. For example, the operations of the method 2500 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2505, the method may include transmitting a first sidelink message to a first UE, the first sidelink message indicating a first set of candidate sidelink carriers of the second UE for a sidelink control connection that supports carrier aggregation using multiple sidelink carriers. The operations of 2505 may be performed in accordance with examples as disclosed herein. In some examples, aspects of the operations of 2505 may be performed by a sidelink transmitter 1640 as described with reference to FIG. 16.

At 2510, the method may include receiving, from the first UE, a second sidelink message indicating or activating at least one sidelink carrier of the first set of candidate sidelink carriers for establishing the sidelink control connection. In some examples, the second sidelink message may include an RRC message or a MAC-CE. The operations of 2510 may be performed in accordance with examples as disclosed herein. In some examples, aspects of the operations of 2510 may be performed by a sidelink receiver 1625 as described with reference to FIG. 16.

At 2515, the method may include establishing the sidelink control connection between the first UE and the second UE using the at least one sidelink carrier based on the second sidelink message. The operations of 2515 may be performed in accordance with examples as disclosed herein. In some examples, aspects of the operations of 2515 may be performed by a control manager 1645 as described with reference to FIG. 16.

Figure 26:
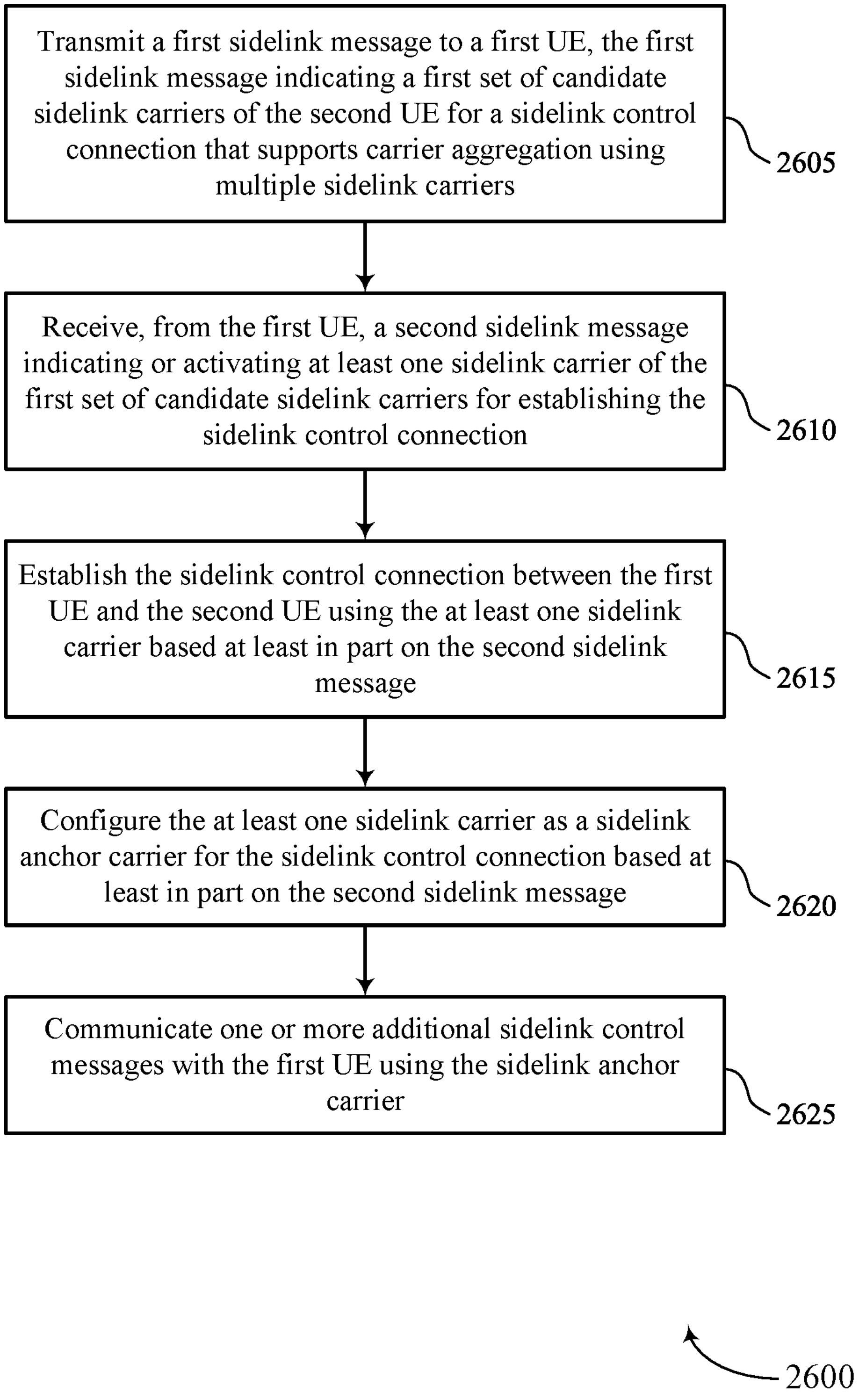

FIG. 26 shows a flowchart illustrating a method 2600 that supports techniques for sidelink control connection with carrier aggregation in accordance with aspects of the present disclosure. The operations of the method 2600 may be implemented by a UE or its components as described herein. For example, the operations of the method 2600 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2605, the method may include transmitting a first sidelink message to a first UE, the first sidelink message indicating a first set of candidate sidelink carriers of the second UE for a sidelink control connection that supports carrier aggregation using multiple sidelink carriers. The operations of 2605 may be performed in accordance with examples as disclosed herein. In some examples, aspects of the operations of 2605 may be performed by a sidelink transmitter 1640 as described with reference to FIG. 16.

At 2610, the method may include receiving, from the first UE, a second sidelink message indicating or activating at least one sidelink carrier of the first set of candidate sidelink carriers for establishing the sidelink control connection. The operations of 2610 may be performed in accordance with examples as disclosed herein. In some examples, aspects of the operations of 2610 may be performed by a sidelink receiver 1625 as described with reference to FIG. 16.

At 2615, the method may include establishing the sidelink control connection between the first UE and the second UE using the at least one sidelink carrier based on the second sidelink message. The operations of 2615 may be performed in accordance with examples as disclosed herein. In some examples, aspects of the operations of 2615 may be performed by a control manager 1645 as described with reference to FIG. 16.

At 2620, the method may include configuring the at least one sidelink carrier as a sidelink anchor carrier for the sidelink control connection based on the second sidelink message. The operations of 2620 may be performed in accordance with examples as disclosed herein. In some examples, aspects of the operations of 2620 may be performed by a carrier configuration manager 1670 as described with reference to FIG. 16.

At 2625, the method may include communicating one or more additional sidelink control messages with the first UE using the sidelink anchor carrier. The operations of 2625 may be performed in accordance with examples as disclosed herein. In some examples, aspects of the operations of 2625 may be performed by a sidelink communicator 1675 as described with reference to FIG. 16.

Figure 27:
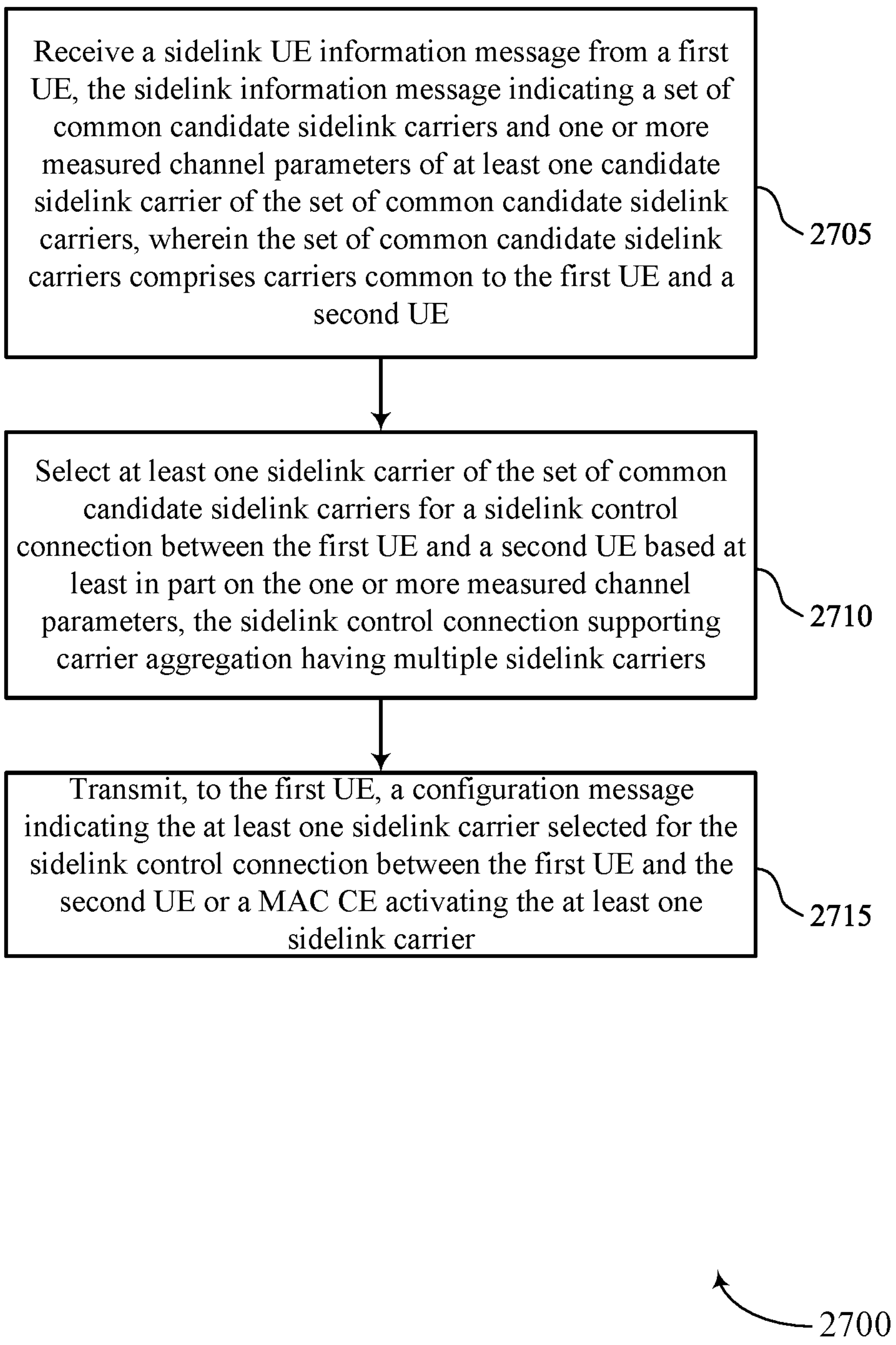

FIG. 27 shows a flowchart illustrating a method 2700 that supports techniques for sidelink control connection with carrier aggregation in accordance with aspects of the present disclosure. The operations of the method 2700 may be implemented by a base station or its components as described herein. For example, the operations of the method 2700 may be performed by a base station 105 as described with reference to FIGS. 1 through 13 and 18 through 21. In some examples, a base station may execute a set of instructions to control the functional elements of the base station to perform the described functions. Additionally or alternatively, the base station may perform aspects of the described functions using special-purpose hardware.

At 2705, the method may include receiving a sidelink UE information message from a first UE, the sidelink information message indicating a set of common candidate sidelink carriers and one or more measured channel parameters of at least one candidate sidelink carrier of the set of common candidate sidelink carriers, where the set of common candidate sidelink carriers includes carriers common to the first UE and a second UE. The operations of 2705 may be performed in accordance with examples as disclosed herein. In some examples, aspects of the operations of 2705 may be performed by a sidelink message receiver 2025 as described with reference to FIG. 20.

At 2710, the method may include selecting at least one sidelink carrier of the set of common candidate sidelink carriers for a sidelink control connection between the first UE and a second UE based on the one or more measured channel parameters, the sidelink control connection supporting carrier aggregation having multiple sidelink carriers. The operations of 2710 may be performed in accordance with examples as disclosed herein. In some examples, aspects of the operations of 2710 may be performed by a selection manager 2030 as described with reference to FIG. 20.

At 2715, the method may include transmitting, to the first UE, a configuration message indicating the at least one sidelink carrier selected for the sidelink control connection between the first UE and the second UE or a MAC-CE activating the at least one sidelink carrier. The operations of 2715 may be performed in accordance with examples as disclosed herein. In some examples, aspects of the operations of 2715 may be performed by a configuration transmitter 2035 as described with reference to FIG. 20.

Figure 28:
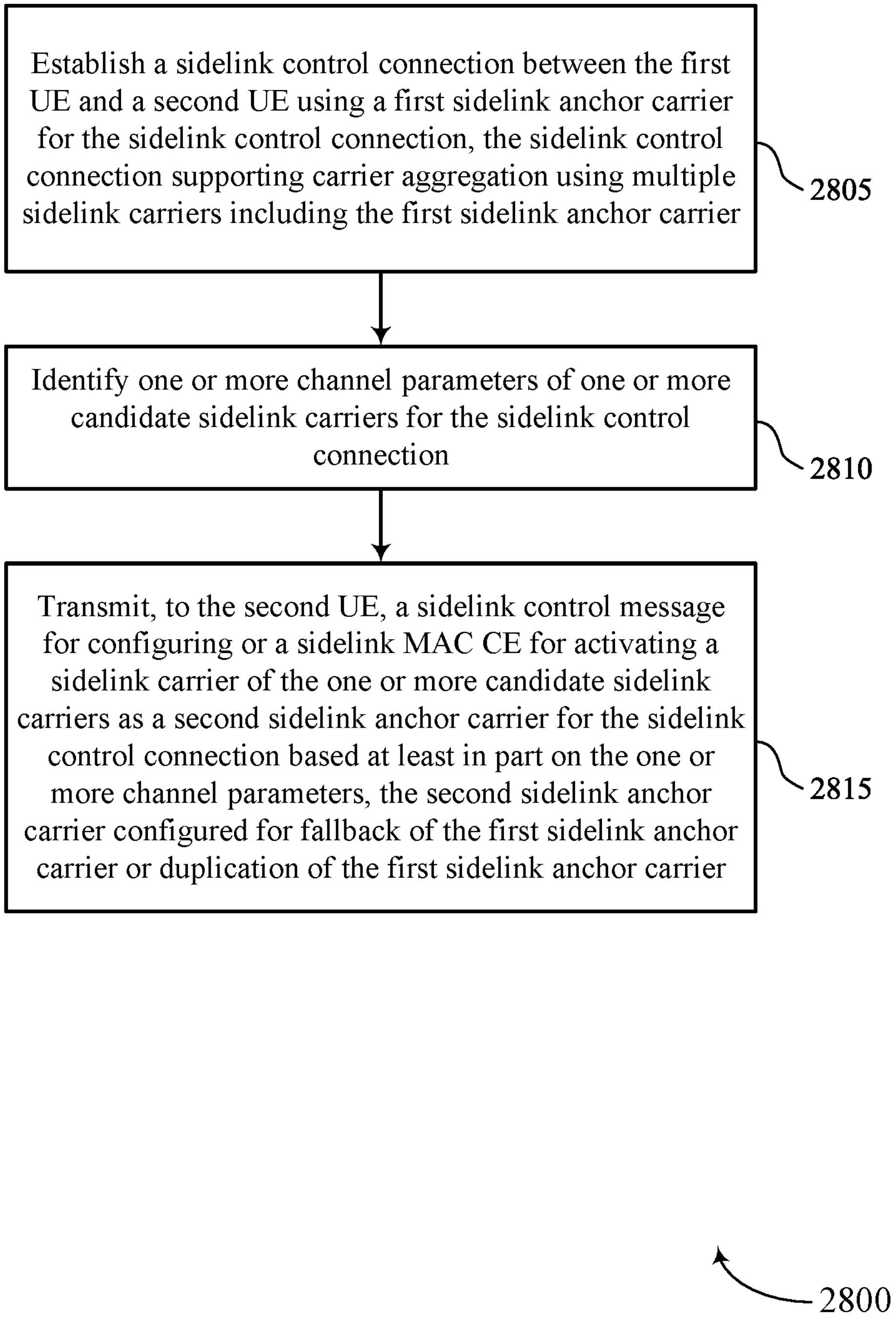

FIG. 28 shows a flowchart illustrating a method 2800 that supports techniques for sidelink control connection with carrier aggregation in accordance with aspects of the present disclosure. The operations of the method 2800 may be implemented by a UE or its components as described herein. For example, the operations of the method 2800 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2805, the method may include establishing a sidelink control connection between the first UE and a second UE using a first sidelink anchor carrier for the sidelink control connection, the sidelink control connection supporting carrier aggregation using multiple sidelink carriers including the first sidelink anchor carrier. The operations of 2805 may be performed in accordance with examples as disclosed herein. In some examples, aspects of the operations of 2805 may be performed by a control manager 1645 as described with reference to FIG. 16.

At 2810, the method may include identifying one or more channel parameters of one or more candidate sidelink carriers for the sidelink control connection. The operations of 2810 may be performed in accordance with examples as disclosed herein. In some examples, aspects of the operations of 2810 may be performed by a parameter component 1650 as described with reference to FIG. 16.

At 2815, the method may include transmitting, to the second UE, a sidelink control message for configuring a sidelink carrier of the one or more candidate sidelink carriers as a second sidelink anchor carrier for the sidelink control connection based on the one or more channel parameters, or a sidelink MAC-CE for activating the sidelink carrier as the sidelink anchor carrier, the second sidelink anchor carrier configured for fallback of the first sidelink anchor carrier or duplication of the first sidelink anchor carrier. The operations of 2815 may be performed in accordance with examples as disclosed herein. In some examples, aspects of the operations of 2815 may be performed by a sidelink transmitter 1640 as described with reference to FIG. 16.

Figure 29:
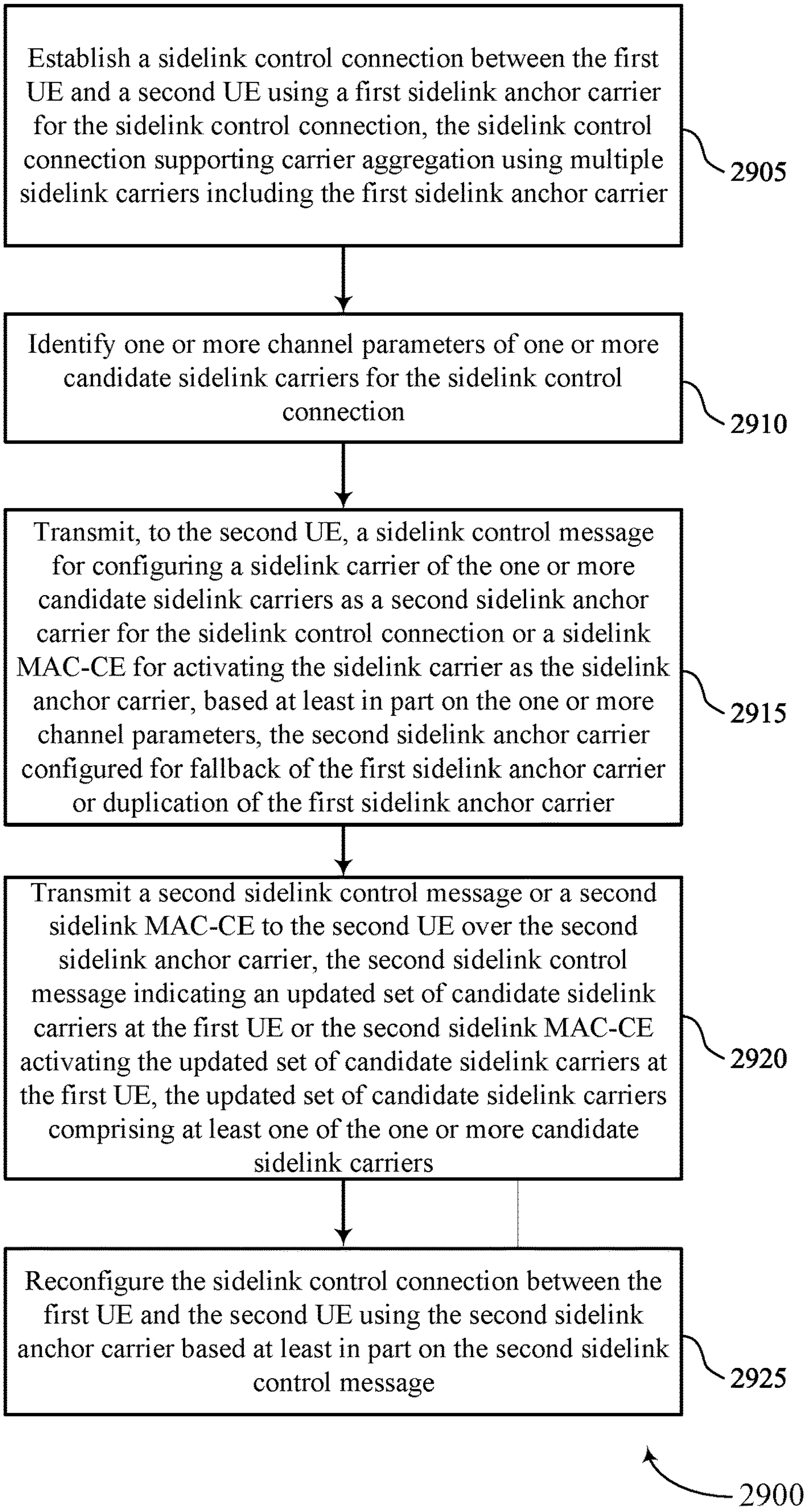

FIG. 29 shows a flowchart illustrating a method 2900 that supports techniques for sidelink control connection with carrier aggregation in accordance with aspects of the present disclosure. The operations of the method 2900 may be implemented by a UE or its components as described herein. For example, the operations of the method 2900 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 2905, the method may include establishing a sidelink control connection between the first UE and a second UE using a first sidelink anchor carrier for the sidelink control connection, the sidelink control connection supporting carrier aggregation using multiple sidelink carriers including the first sidelink anchor carrier. The operations of 2905 may be performed in accordance with examples as disclosed herein. In some examples, aspects of the operations of 2905 may be performed by a control manager 1645 as described with reference to FIG. 16.

At 2910, the method may include identifying one or more channel parameters of one or more candidate sidelink carriers for the sidelink control connection. The operations of 2910 may be performed in accordance with examples as disclosed herein. In some examples, aspects of the operations of 2910 may be performed by a parameter component 1650 as described with reference to FIG. 16.

At 2915, the method may include transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the sidelink anchor carrier, based on the one or more channel parameters, the second sidelink anchor carrier configured for fallback of the first sidelink anchor carrier or duplication of the first sidelink anchor carrier. The operations of 2915 may be performed in accordance with examples as disclosed herein. In some examples, aspects of the operations of 2915 may be performed by a sidelink transmitter 1640 as described with reference to FIG. 16.

At 2920, the method may include transmitting a second sidelink control message or a second sidelink MAC-CE to the second UE over the second sidelink anchor carrier, the second sidelink control message indicating an updated set of candidate sidelink carriers at the first UE or the second sidelink MAC-CE activating the updated set of candidate sidelink carriers at the first UE, the updated set of candidate sidelink carriers including at least one of the one or more candidate sidelink carriers. The operations of 2920 may be performed in accordance with examples as disclosed herein. In some examples, aspects of the operations of 2920 may be performed by a sidelink transmitter 1640 as described with reference to FIG. 16.

At 2925, the method may include reconfiguring the sidelink control connection between the first UE and the second UE using the second sidelink anchor carrier based on the second sidelink control message. The operations of 2925 may be performed in accordance with examples as disclosed herein. In some examples, aspects of the operations of 2925 may be performed by a control manager 1645 as described with reference to FIG. 16.

Figure 30:
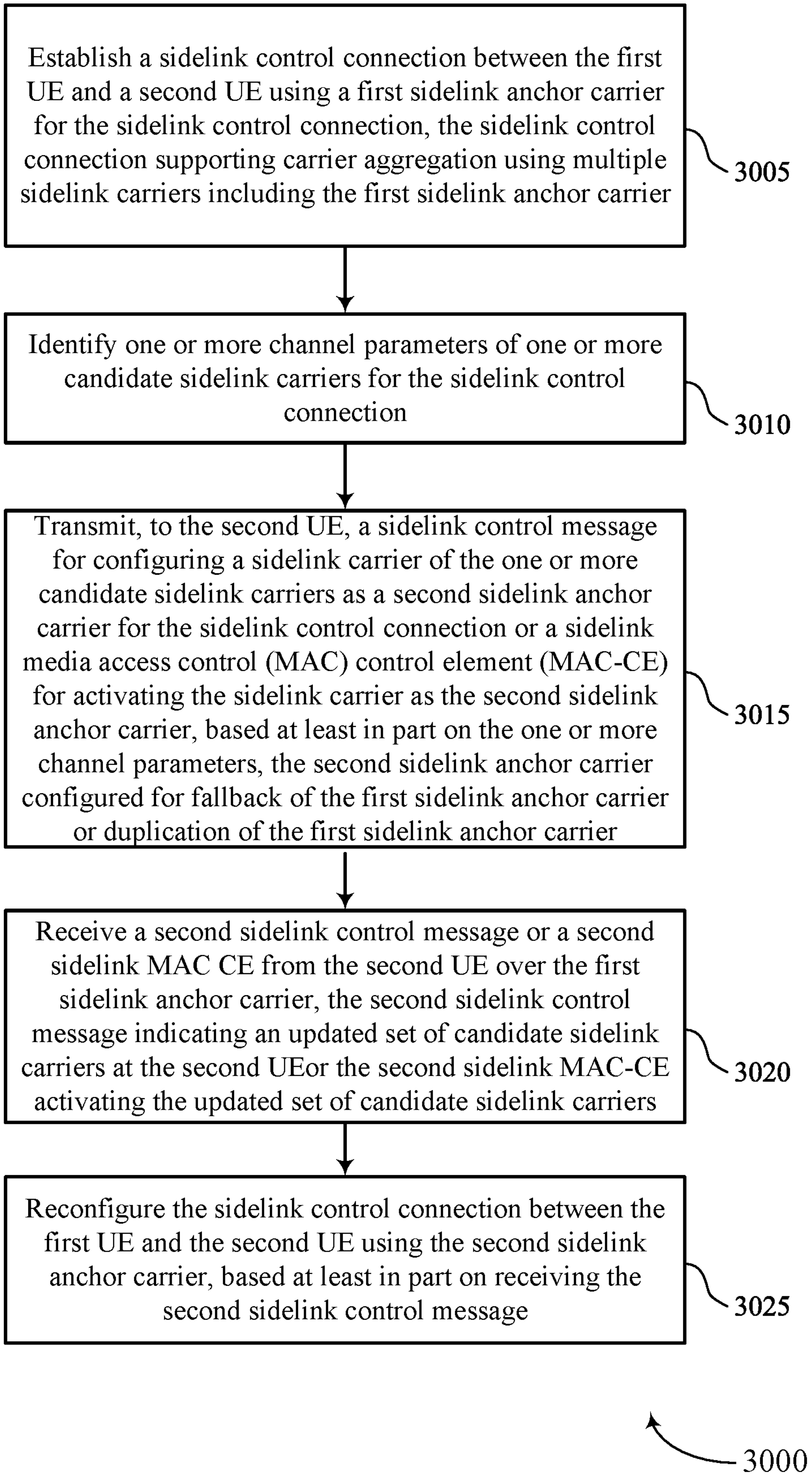

FIG. 30 shows a flowchart illustrating a method 3000 that supports techniques for sidelink control connection with carrier aggregation in accordance with aspects of the present disclosure. The operations of the method 3000 may be implemented by a UE or its components as described herein. For example, the operations of the method 3000 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3005, the method may include establishing a sidelink control connection between the first UE and a second UE using a first sidelink anchor carrier for the sidelink control connection, the sidelink control connection supporting carrier aggregation using multiple sidelink carriers including the first sidelink anchor carrier. The operations of 3005 may be performed in accordance with examples as disclosed herein. In some examples, aspects of the operations of 3005 may be performed by a control manager 1645 as described with reference to FIG. 16.

At 3010, the method may include identifying one or more channel parameters of one or more candidate sidelink carriers for the sidelink control connection. The operations of 3010 may be performed in accordance with examples as disclosed herein. In some examples, aspects of the operations of 3010 may be performed by a parameter component 1650 as described with reference to FIG. 16.

At 3015, the method may include transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier. The operations of 3015 may be performed in accordance with examples as disclosed herein. In some examples, aspects of the operations of 3015 may be performed by a sidelink transmitter 1640 as described with reference to FIG. 16.

At 3020, the method may include receiving a second sidelink control message or a second sidelink MAC-CE from the second UE over the first sidelink anchor carrier, the second sidelink control message indicating an updated set of candidate sidelink carriers at the second UE or the second sidelink MAC-CE activating the updated set of candidate sidelink carriers. The operations of 3020 may be performed in accordance with examples as disclosed herein. In some examples, aspects of the operations of 3020 may be performed by a sidelink receiver 1625 as described with reference to FIG. 16.

At 3025, the method may include reconfiguring the sidelink control connection between the first UE and the second UE using the second sidelink anchor carrier, based on receiving the second sidelink control message. The operations of 3025 may be performed in accordance with examples as disclosed herein. In some examples, aspects of the operations of 3025 may be performed by a control manager 1645 as described with reference to FIG. 16.

Figure 31:
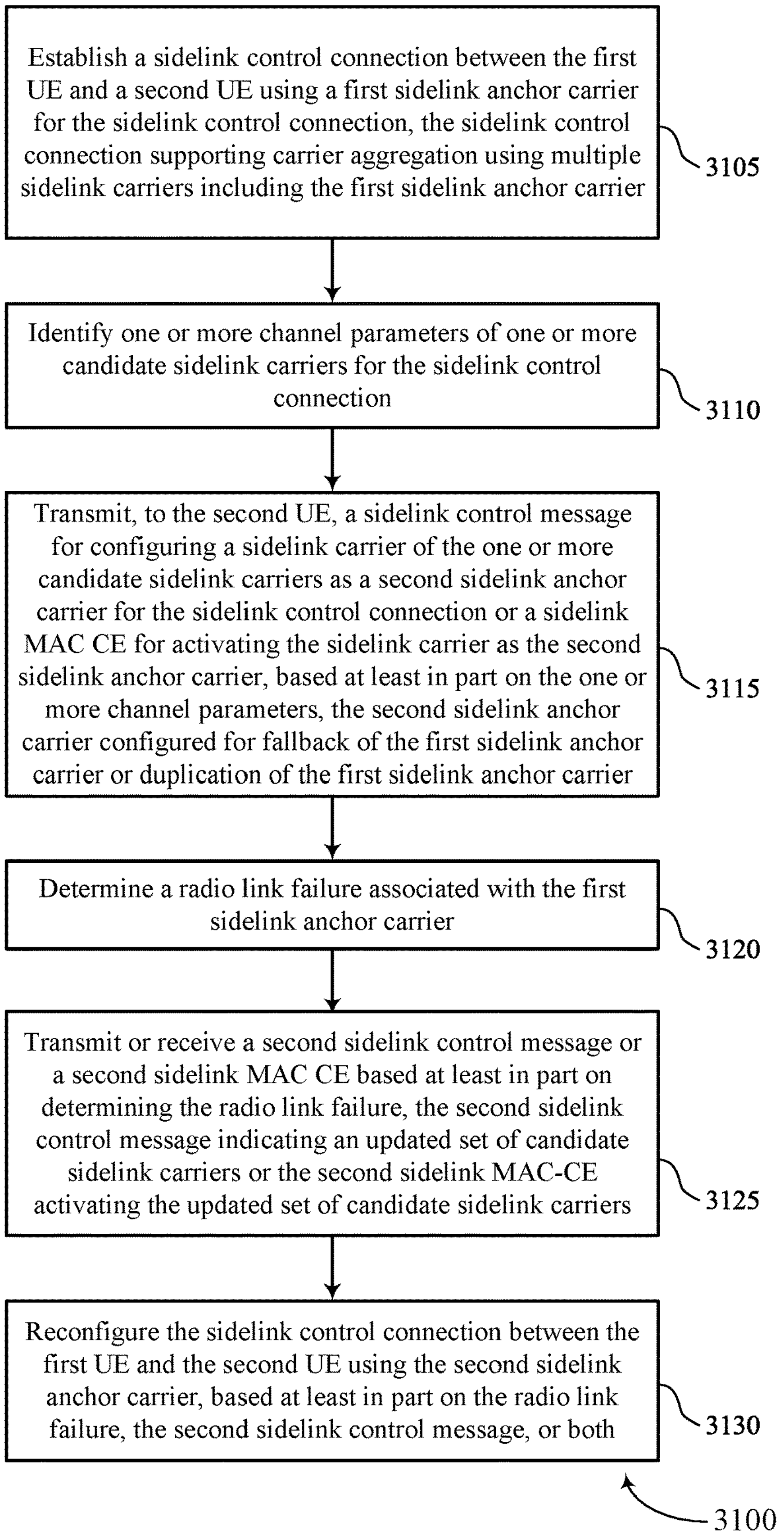

FIG. 31 shows a flowchart illustrating a method 3100 that supports techniques for sidelink control connection with carrier aggregation in accordance with aspects of the present disclosure. The operations of the method 3100 may be implemented by a UE or its components as described herein. For example, the operations of the method 3100 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3105, the method may include establishing a sidelink control connection between the first UE and a second UE using a first sidelink anchor carrier for the sidelink control connection, the sidelink control connection supporting carrier aggregation using multiple sidelink carriers including the first sidelink anchor carrier. The operations of 3105 may be performed in accordance with examples as disclosed herein. In some examples, aspects of the operations of 3105 may be performed by a control manager 1645 as described with reference to FIG. 16.

At 3110, the method may include identifying one or more channel parameters of one or more candidate sidelink carriers for the sidelink control connection. The operations of 3110 may be performed in accordance with examples as disclosed herein. In some examples, aspects of the operations of 3110 may be performed by a parameter component 1650 as described with reference to FIG. 16.

At 3115, the method may include transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based on the one or more channel parameters, the second sidelink anchor carrier configured for fallback of the first sidelink anchor carrier or duplication of the first sidelink anchor carrier. The operations of 3115 may be performed in accordance with examples as disclosed herein. In some examples, aspects of the operations of 3115 may be performed by a sidelink transmitter 1640 as described with reference to FIG. 16.

At 3120, the method may include determining a radio link failure associated with the first sidelink anchor carrier. The operations of 3120 may be performed in accordance with examples as disclosed herein. In some examples, aspects of the operations of 3120 may be performed by a link manager 1685 as described with reference to FIG. 16.

At 3125, the method may include transmitting or receiving a second sidelink control message or a second sidelink MAC-CE based on determining the radio link failure, the second sidelink control message indicating an updated set of candidate sidelink carriers or the second sidelink MAC-CE activating the updated set of candidate sidelink carriers. The operations of 3125 may be performed in accordance with examples as disclosed herein. In some examples, aspects of the operations of 3125 may be performed by a sidelink communicator 1675 as described with reference to FIG. 16.

At 3130, the method may include reconfiguring the sidelink control connection between the first UE and the second UE using the second sidelink anchor carrier, based on the radio link failure, the second sidelink control message, or both. The operations of 3130 may be performed in accordance with examples as disclosed herein. In some examples, aspects of the operations of 3130 may be performed by a control manager 1645 as described with reference to FIG. 16.

Figure 32:
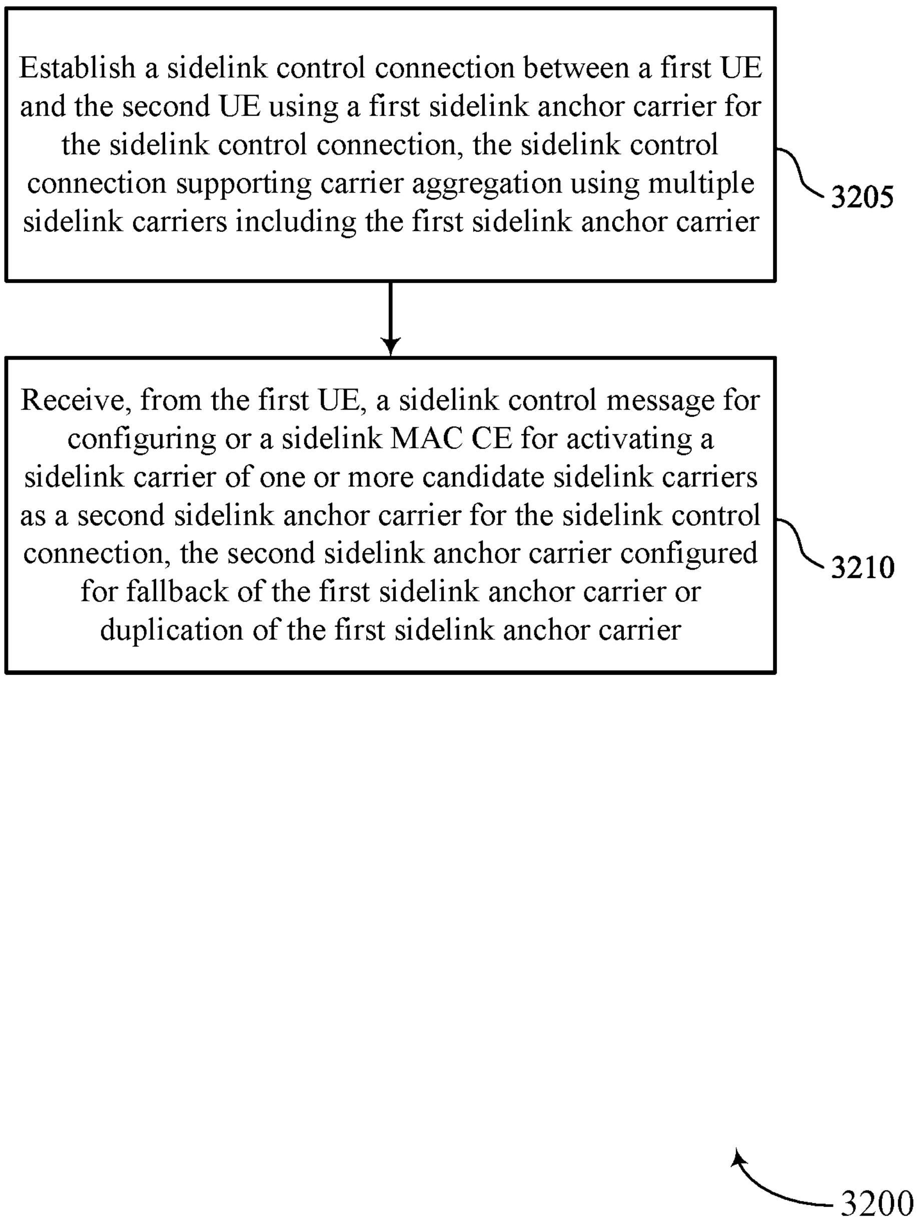

FIG. 32 shows a flowchart illustrating a method 3200 that supports techniques for sidelink control connection with carrier aggregation in accordance with aspects of the present disclosure. The operations of the method 3200 may be implemented by a UE or its components as described herein. For example, the operations of the method 3200 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3205, the method may include establishing a sidelink control connection between a first UE and the second UE using a first sidelink anchor carrier for the sidelink control connection, the sidelink control connection supporting carrier aggregation using multiple sidelink carriers including the first sidelink anchor carrier. The operations of 3205 may be performed in accordance with examples as disclosed herein. In some examples, aspects of the operations of 3205 may be performed by a control manager 1645 as described with reference to FIG. 16.

At 3210, the method may include receiving, from the first UE, a sidelink control message for configuring a sidelink carrier of one or more candidate sidelink carriers as a second sidelink anchor carrier for the sidelink control connection or a MAC-CE for activating the sidelink carrier as the second sidelink anchor carrier, the second sidelink anchor carrier configured for fallback of the first sidelink anchor carrier or duplication of the first sidelink anchor carrier. The operations of 3210 may be performed in accordance with examples as disclosed herein. In some examples, aspects of the operations of 3210 may be performed by a sidelink receiver 1625 as described with reference to FIG. 16.

Figure 33:
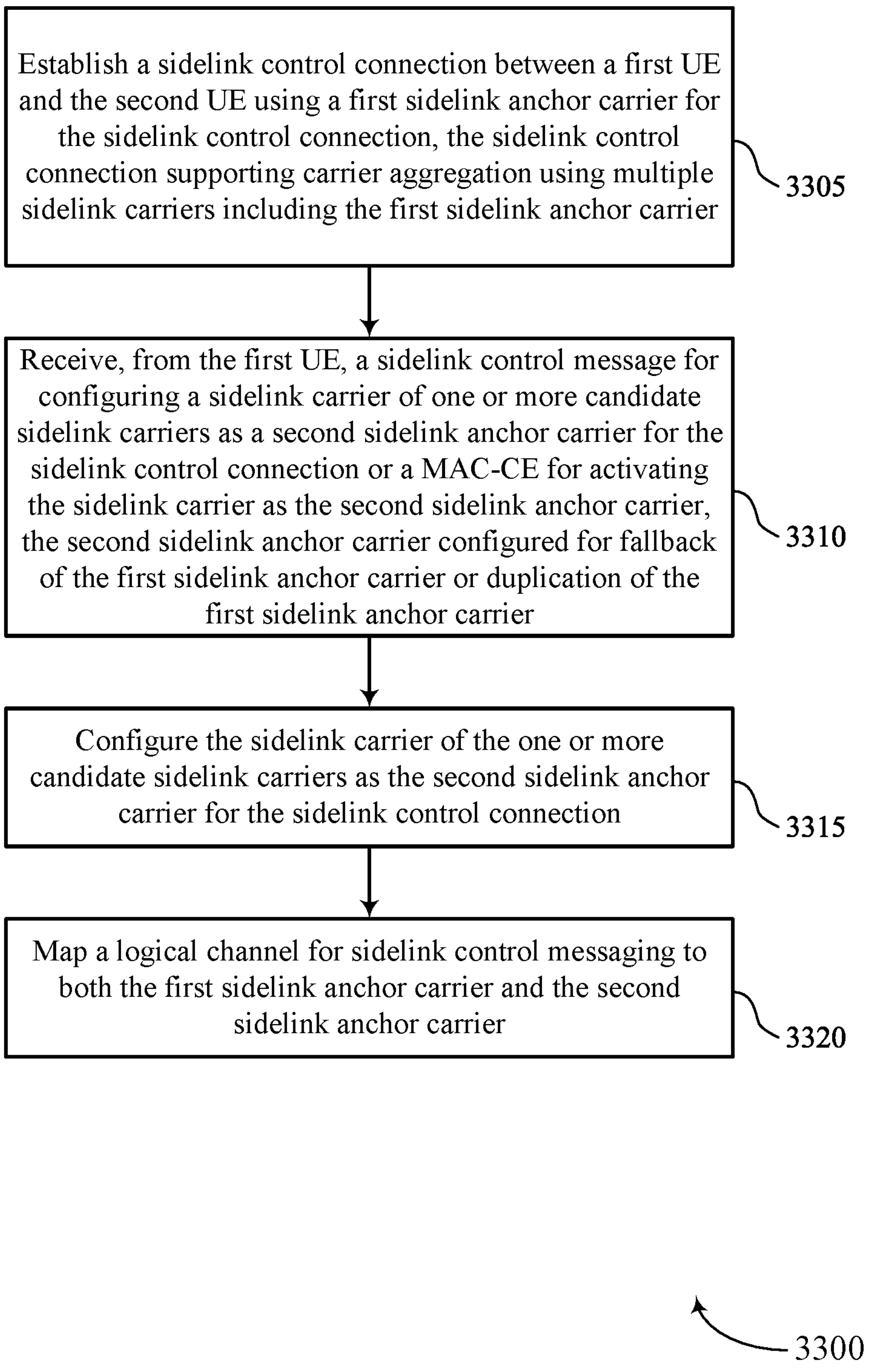

FIG. 33 shows a flowchart illustrating a method 3300 that supports techniques for sidelink control connection with carrier aggregation in accordance with aspects of the present disclosure. The operations of the method 3300 may be implemented by a UE or its components as described herein. For example, the operations of the method 3300 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3305, the method may include establishing a sidelink control connection between a first UE and the second UE using a first sidelink anchor carrier for the sidelink control connection, the sidelink control connection supporting carrier aggregation using multiple sidelink carriers including the first sidelink anchor carrier. The operations of 3305 may be performed in accordance with examples as disclosed herein. In some examples, aspects of the operations of 3305 may be performed by a control manager 1645 as described with reference to FIG. 16.

At 3310, the method may include receiving, from the first UE, a sidelink control message for configuring a sidelink carrier of one or more candidate sidelink carriers as a second sidelink anchor carrier for the sidelink control connection or a MAC-CE for activating the sidelink carrier as the second sidelink anchor carrier, the second sidelink anchor carrier configured for fallback of the first sidelink anchor carrier or duplication of the first sidelink anchor carrier. The operations of 3310 may be performed in accordance with examples as disclosed herein. In some examples, aspects of the operations of 3310 may be performed by a sidelink receiver 1625 as described with reference to FIG. 16.

At 3315, the method may include configuring the sidelink carrier of the one or more candidate sidelink carriers as the second sidelink anchor carrier for the sidelink control connection. The operations of 3315 may be performed in accordance with examples as disclosed herein. In some examples, aspects of the operations of 3315 may be performed by a control manager 1645 as described with reference to FIG. 16.

At 3320, the method may include mapping a logical channel for sidelink control messaging to both the first sidelink anchor carrier and the second sidelink anchor carrier. The operations of 3320 may be performed in accordance with examples as disclosed herein. In some examples, aspects of the operations of 3320 may be performed by a channel mapper 1665 as described with reference to FIG. 16.

Figure 34:
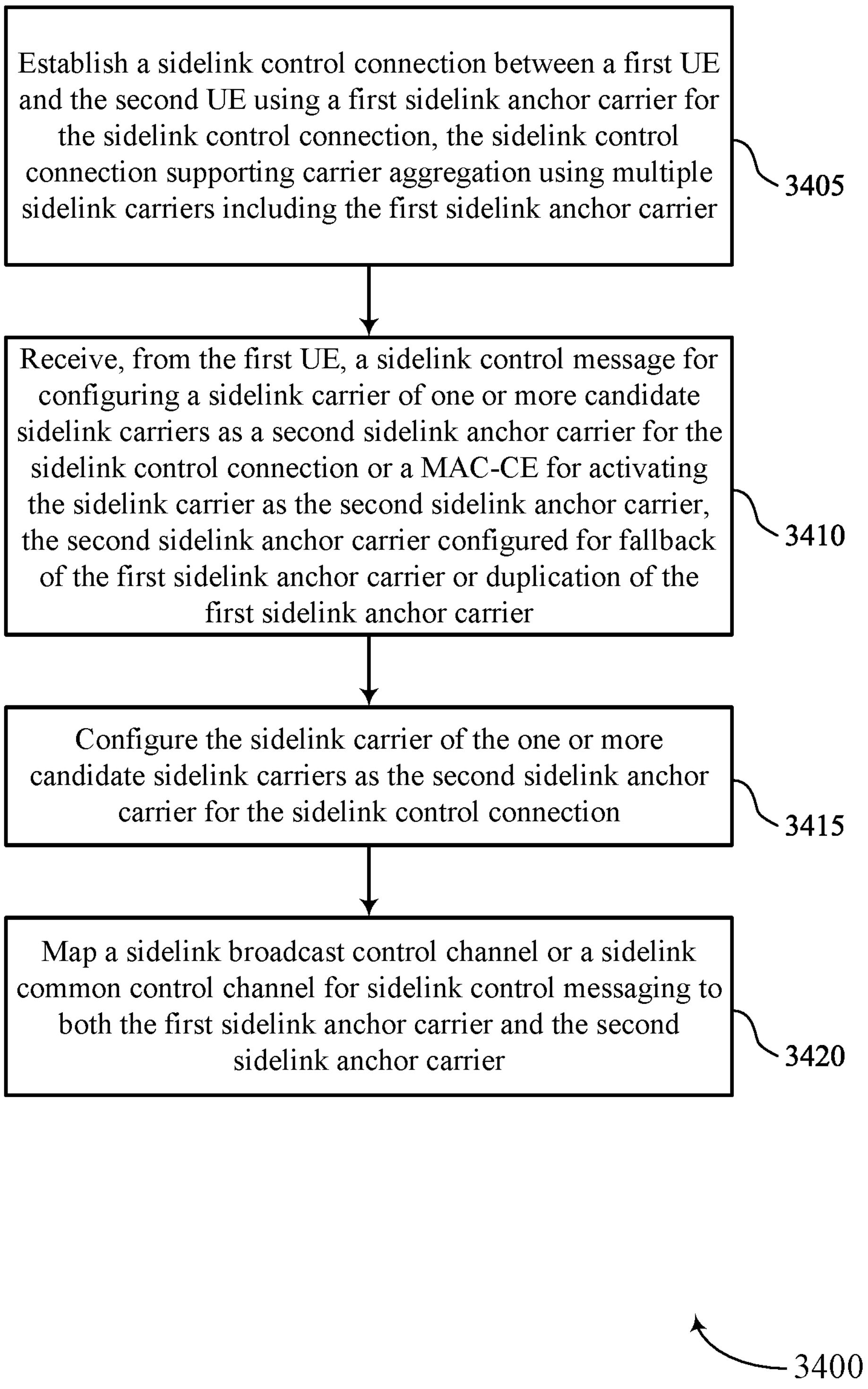

FIG. 34 shows a flowchart illustrating a method 3400 that supports techniques for sidelink control connection with carrier aggregation in accordance with aspects of the present disclosure. The operations of the method 3400 may be implemented by a UE or its components as described herein. For example, the operations of the method 3400 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3405, the method may include establishing a sidelink control connection between a first UE and the second UE using a first sidelink anchor carrier for the sidelink control connection, the sidelink control connection supporting carrier aggregation using multiple sidelink carriers including the first sidelink anchor carrier. The operations of 3405 may be performed in accordance with examples as disclosed herein. In some examples, aspects of the operations of 3405 may be performed by a control manager 1645 as described with reference to FIG. 16.

At 3410, the method may include receiving, from the first UE, a sidelink control message for configuring a sidelink carrier of one or more candidate sidelink carriers as a second sidelink anchor carrier for the sidelink control connection or a MAC-CE for activating the sidelink carrier as the second sidelink anchor carrier, the second sidelink anchor carrier configured for fallback of the first sidelink anchor carrier or duplication of the first sidelink anchor carrier. The operations of 3410 may be performed in accordance with examples as disclosed herein. In some examples, aspects of the operations of 3410 may be performed by a sidelink receiver 1625 as described with reference to FIG. 16.

At 3415, the method may include configuring the sidelink carrier of the one or more candidate sidelink carriers as the second sidelink anchor carrier for the sidelink control connection. The operations of 3415 may be performed in accordance with examples as disclosed herein. In some examples, aspects of the operations of 3415 may be performed by a control manager 1645 as described with reference to FIG. 16.

At 3420, the method may include mapping a sidelink broadcast control channel or a sidelink common control channel for sidelink control messaging to both the first sidelink anchor carrier and the second sidelink anchor carrier. The operations of 3420 may be performed in accordance with examples as disclosed herein. In some examples, aspects of the operations of 3420 may be performed by a channel mapper 1665 as described with reference to FIG. 16.

Figure 35:
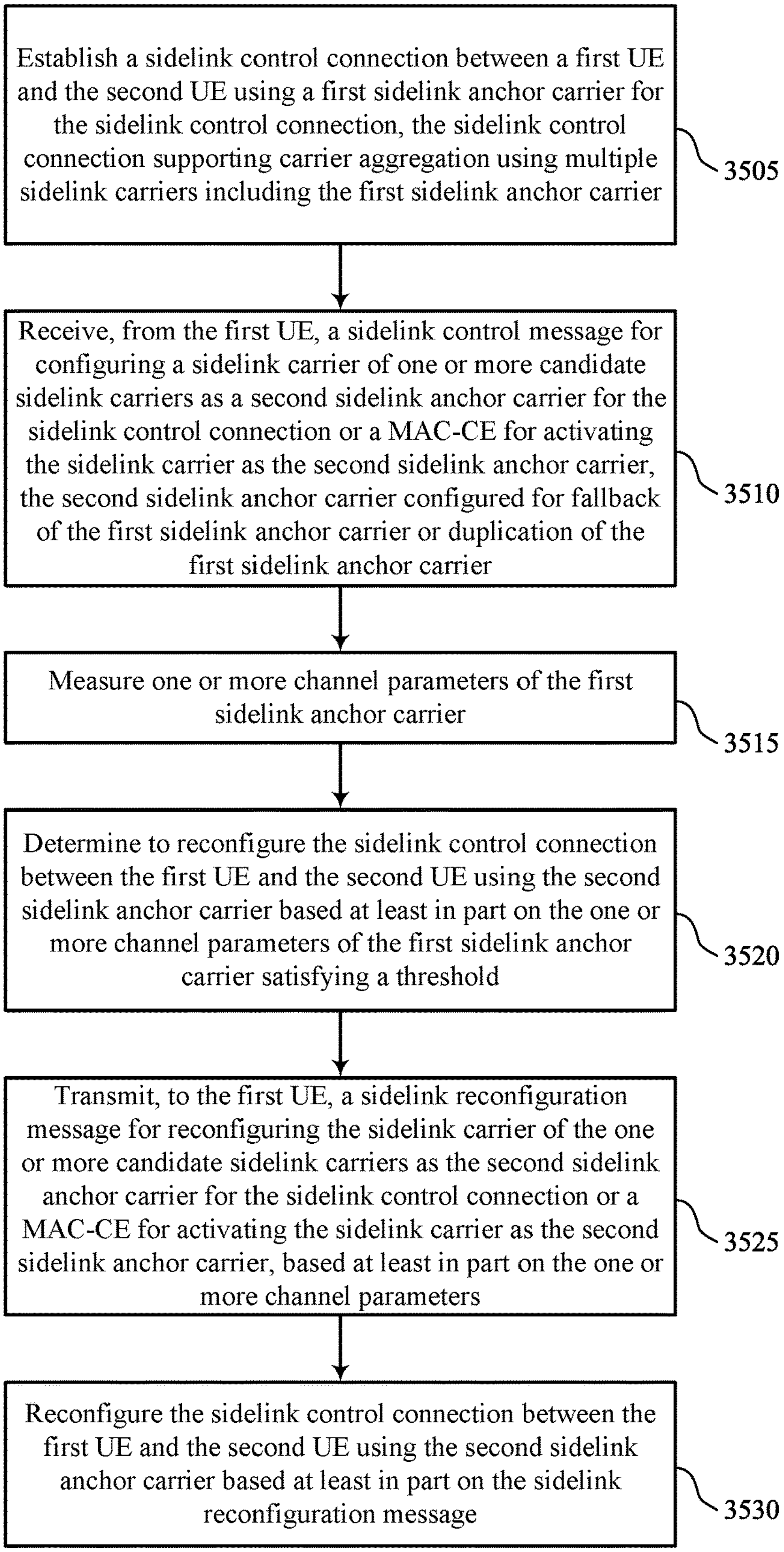

FIG. 35 shows a flowchart illustrating a method 3500 that supports techniques for sidelink control connection with carrier aggregation in accordance with aspects of the present disclosure. The operations of the method 3500 may be implemented by a UE or its components as described herein. For example, the operations of the method 3500 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3505, the method may include establishing a sidelink control connection between a first UE and the second UE using a first sidelink anchor carrier for the sidelink control connection, the sidelink control connection supporting carrier aggregation using multiple sidelink carriers including the first sidelink anchor carrier. The operations of 3505 may be performed in accordance with examples as disclosed herein. In some examples, aspects of the operations of 3505 may be performed by a control manager 1645 as described with reference to FIG. 16.

At 3510, the method may include receiving, from the first UE, a sidelink control message for configuring a sidelink carrier of one or more candidate sidelink carriers as a second sidelink anchor carrier for the sidelink control connection or a MAC-CE for activating the sidelink carrier as the second sidelink anchor carrier, the second sidelink anchor carrier configured for fallback of the first sidelink anchor carrier or duplication of the first sidelink anchor carrier. The operations of 3510 may be performed in accordance with examples as disclosed herein. In some examples, aspects of the operations of 3510 may be performed by a sidelink receiver 1625 as described with reference to FIG. 16.

At 3515, the method may include measuring one or more channel parameters of the first sidelink anchor carrier. The operations of 3515 may be performed in accordance with examples as disclosed herein. In some examples, aspects of the operations of 3515 may be performed by a measurement component 1630 as described with reference to FIG. 16.

At 3520, the method may include determining to reconfigure the sidelink control connection between the first UE and the second UE using the second sidelink anchor carrier based on the one or more channel parameters of the first sidelink anchor carrier satisfying a threshold. The operations of 3520 may be performed in accordance with examples as disclosed herein. In some examples, aspects of the operations of 3520 may be performed by a determination component 1635 as described with reference to FIG. 16.

At 3525, the method may include transmitting, to the first UE, a sidelink reconfiguration message for reconfiguring the sidelink carrier of the one or more candidate sidelink carriers as the second sidelink anchor carrier for the sidelink control connection or a sidelink MAC-CE for activating the sidelink carrier as the second sidelink anchor carrier, based on the one or more channel parameters. The operations of 3525 may be performed in accordance with examples as disclosed herein. In some examples, aspects of the operations of 3525 may be performed by a sidelink transmitter 1640 as described with reference to FIG. 16.

At 3530, the method may include reconfiguring the sidelink control connection between the first UE and the second UE using the second sidelink anchor carrier based on the sidelink reconfiguration message. The operations of 3530 may be performed in accordance with examples as disclosed herein. In some examples, aspects of the operations of 3530 may be performed by a control manager 1645 as described with reference to FIG. 16.

Figure 36:
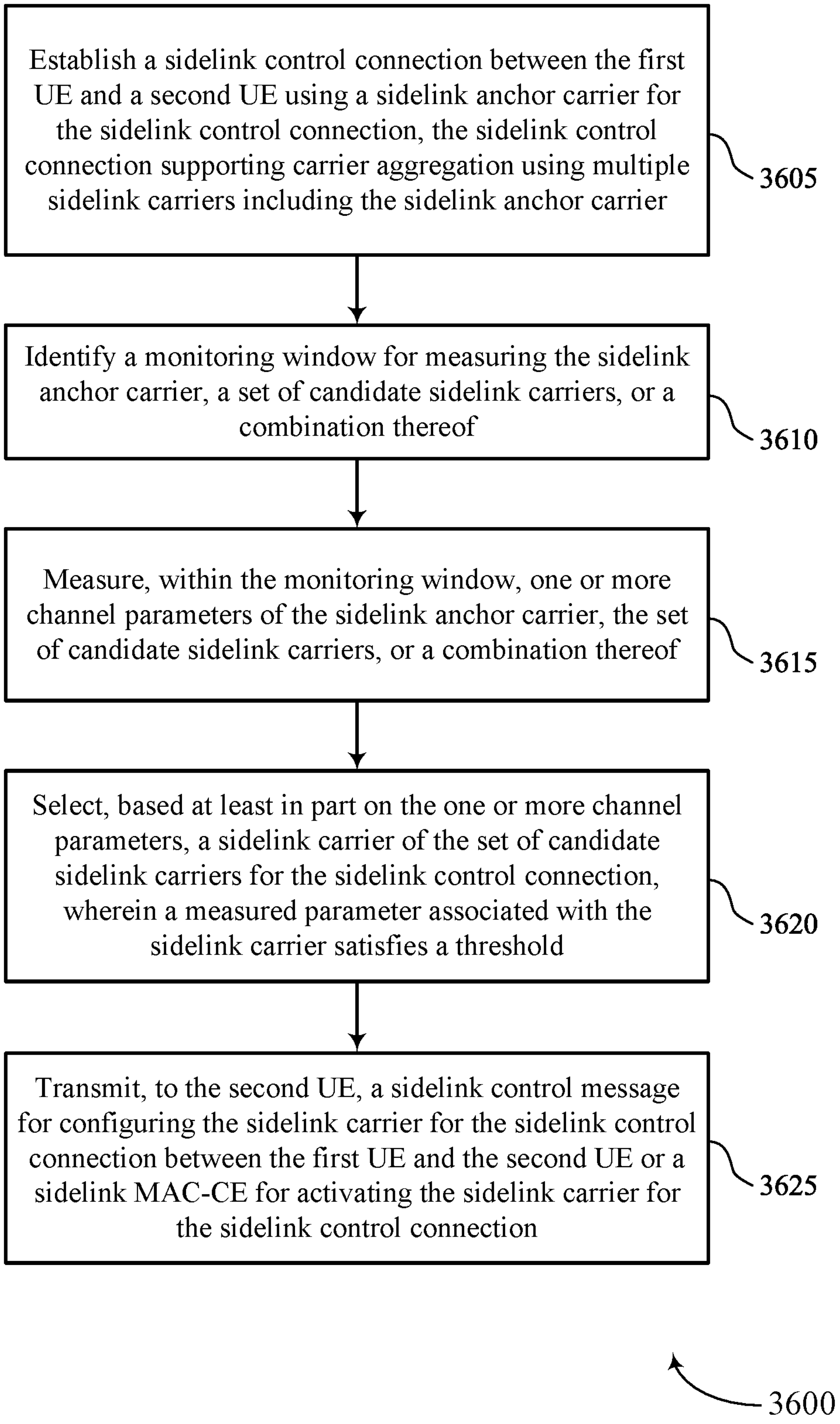

FIG. 36 shows a flowchart illustrating a method 3600 that supports techniques for sidelink control connection with carrier aggregation in accordance with aspects of the present disclosure. The operations of the method 3600 may be implemented by a UE or its components as described herein. For example, the operations of the method 3600 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3605, the method may include establishing a sidelink control connection between the first UE and a second UE using a sidelink anchor carrier for the sidelink control connection, the sidelink control connection supporting carrier aggregation using multiple sidelink carriers including the sidelink anchor carrier. The operations of 3605 may be performed in accordance with examples as disclosed herein. In some examples, aspects of the operations of 3605 may be performed by a control manager 1645 as described with reference to FIG. 16.

At 3610, the method may include identifying a monitoring window for measuring the sidelink anchor carrier, a set of candidate sidelink carriers, or a combination thereof. The operations of 3610 may be performed in accordance with examples as disclosed herein. In some examples, aspects of the operations of 3610 may be performed by a window component 1655 as described with reference to FIG. 16.

At 3615, the method may include measuring, within the monitoring window, one or more channel parameters of the sidelink anchor carrier, the set of candidate sidelink carriers, or a combination thereof. The operations of 3615 may be performed in accordance with examples as disclosed herein. In some examples, aspects of the operations of 3615 may be performed by a measurement component 1630 as described with reference to FIG. 16.

At 3620, the method may include selecting, based on the one or more channel parameters, a sidelink carrier of the set of candidate sidelink carriers for the sidelink control connection, where a measured parameter associated with the sidelink carrier satisfies a threshold. The operations of 3620 may be performed in accordance with examples as disclosed herein. In some examples, aspects of the operations of 3620 may be performed by a selection manager 1660 as described with reference to FIG. 16.

At 3625, the method may include transmitting, to the second UE, a sidelink control message for configuring the sidelink carrier for the sidelink control connection between the first UE and the second UE or a sidelink MAC-CE for activating the sidelink carrier for the sidelink control connection. The operations of 3625 may be performed in accordance with examples as disclosed herein. In some examples, aspects of the operations of 3625 may be performed by a sidelink transmitter 1640 as described with reference to FIG. 16.

Figure 37:
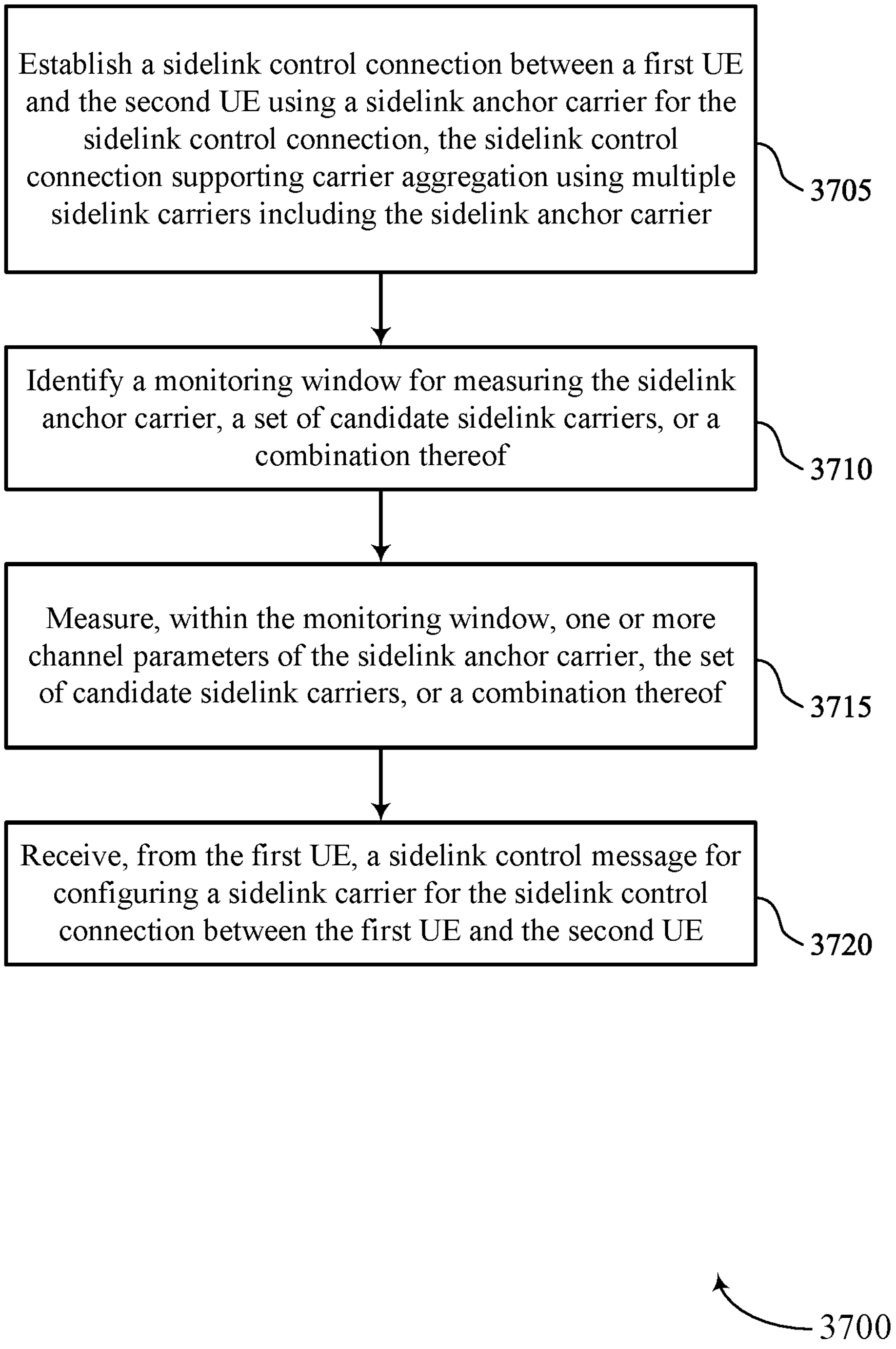

FIG. 37 shows a flowchart illustrating a method 3700 that supports techniques for sidelink control connection with carrier aggregation in accordance with aspects of the present disclosure. The operations of the method 3700 may be implemented by a UE or its components as described herein. For example, the operations of the method 3700 may be performed by a UE 115 as described with reference to FIGS. 1 through 17. In some examples, a UE may execute a set of instructions to control the functional elements of the UE to perform the described functions. Additionally or alternatively, the UE may perform aspects of the described functions using special-purpose hardware.

At 3705, the method may include establishing a sidelink control connection between a first UE and the second UE using a sidelink anchor carrier for the sidelink control connection, the sidelink control connection supporting carrier aggregation using multiple sidelink carriers including the sidelink anchor carrier. The operations of 3705 may be performed in accordance with examples as disclosed herein. In some examples, aspects of the operations of 3705 may be performed by a control manager 1645 as described with reference to FIG. 16.

At 3710, the method may include identifying a monitoring window for measuring the sidelink anchor carrier, a set of candidate sidelink carriers, or a combination thereof. The operations of 3710 may be performed in accordance with examples as disclosed herein. In some examples, aspects of the operations of 3710 may be performed by a window component 1655 as described with reference to FIG. 16.

At 3715, the method may include measuring, within the monitoring window, one or more channel parameters of the sidelink anchor carrier, the set of candidate sidelink carriers, or a combination thereof. The operations of 3715 may be performed in accordance with examples as disclosed herein. In some examples, aspects of the operations of 3715 may be performed by a measurement component 1630 as described with reference to FIG. 16.

At 3720, the method may include receiving, from the first UE, a sidelink control message for configuring a sidelink carrier for the sidelink control connection between the first UE and the second UE or a sidelink MAC-CE for activating the sidelink carrier for the sidelink control connection. The operations of 3720 may be performed in accordance with examples as disclosed herein. In some examples, aspects of the operations of 3720 may be performed by a sidelink receiver 1625 as described with reference to FIG. 16.

The following provides an overview of aspects of the present disclosure:

Aspect 1: A method for wireless communication at a first UE, comprising: receiving a first sidelink message from a second UE, the first sidelink message indicating a first set of candidate sidelink carriers of the second UE; measuring one or more channel parameters of at least one candidate sidelink carrier of the first set of candidate sidelink carriers; determining at least one sidelink carrier of the first set of candidate sidelink carriers based at least in part on the measured one or more channel parameters, the at least one sidelink carrier for establishing a sidelink control connection that supports carrier aggregation using multiple sidelink carriers; transmitting, to the second UE, a second sidelink message indicating or activating the at least one sidelink carrier for establishing the sidelink control connection; and establishing the sidelink control connection between the first UE and the second UE using the at least one sidelink carrier based at least in part on the second sidelink message.

Aspect 2: The method of aspect 1, wherein the second sidelink message indicates the at least one sidelink carrier as the sidelink anchor carrier.

Aspect 3: The method of aspect 2, further comprising: mapping a logic channel for sidelink control messaging to the sidelink anchor carrier; and transmitting a sidelink control message on the sidelink anchor carrier.

Aspect 4: The method of any of aspects 1 through 3, further comprising: mapping the logic channel for sidelink control messaging to the at least one sidelink carrier; and transmitting a sidelink control message on the at least one sidelink carrier.

Aspect 5: The method of any of aspects 1 through 4, further comprising: configuring the first UE with an initial sidelink carrier for sidelink messaging between the first UE and the second UE before establishing the sidelink control connection.

Aspect 6: The method of aspect 5, wherein the initial sidelink carrier comprises a configured sidelink carrier, a pre-configured sidelink carrier, or a default sidelink carrier.

Aspect 7: The method of any of aspects 1 through 6, wherein measuring the one or more channel parameters of the at least one candidate sidelink carrier comprises: determining the at least one candidate sidelink carrier from a first set of common candidate sidelink carriers, the first set of common candidate sidelink carriers comprising one or more carriers common to the first set of candidate sidelink carriers and a second set of candidate sidelink carriers of the first UE.

Aspect 8: The method of aspect 7, further comprising: measuring each of the first set of common candidate sidelink carriers based at least in part on a priority associated with the first set of common candidate sidelink carriers.

Aspect 9: The method of aspect 8, further comprising: selecting the at least one sidelink carrier based at least in part on the one or more channel parameters satisfying a threshold.

Aspect 10: The method of any of aspects 1 through 9, wherein measuring the one or more channel parameters of the at least one candidate sidelink carrier comprises: measuring a CBR of the at least one candidate sidelink carrier.

Aspect 11: The method of any of aspects 1 through 10, further comprising: selecting the at least one sidelink carrier based at least in part on the measured one or more channel parameters of the at least one candidate sidelink carrier satisfying a threshold.

Aspect 12: The method of any of aspects 1 through 11, wherein transmitting the second sidelink message comprises: transmitting the second sidelink message over a configured sidelink carrier, a pre-configured sidelink carrier, or a default sidelink carrier.

Aspect 13: The method of any of aspects 1 through 12, further comprising: configuring the at least one sidelink carrier as a sidelink anchor carrier for the sidelink control connection based at least in part on the second sidelink message; and communicating one or more additional sidelink control messages with the second UE using the sidelink anchor carrier.

Aspect 14: The method of any of aspects 1 through 13, further comprising: receiving, from the second UE, a third sidelink message indicating at least a second sidelink carrier determined by the second UE for the sidelink control connection; and transmitting, to the second UE, a reconfiguration message for mapping the sidelink control connection between the first UE and the second UE to at least the second sidelink carrier as a second sidelink anchor carrier based at least in part on receiving the third sidelink message.

Aspect 15: The method of aspect 14, further comprising: communicating one or more additional sidelink control messages with the second UE using the second sidelink anchor carrier after mapping the sidelink control connection to the second sidelink anchor carrier.

Aspect 16: The method of any of aspects 1 through 15, wherein transmitting the second sidelink message comprises: transmitting the second sidelink message using the at least one sidelink carrier.

Aspect 17: The method of any of aspects 1 through 16, further comprising: configuring a second set of candidate sidelink carriers for the first UE; determining the at least one candidate sidelink carrier from a second set of common candidate sidelink carriers, the second set of common candidate sidelink carriers comprising one or more carrier common to the first set of candidate sidelink carriers and the second set of candidate sidelink carriers; transmitting a sidelink information message to a base station, the sidelink information message indicating the measured one or more channel parameters, the second set of common candidate sidelink carriers, or both; and receiving, from the base station, a configuration message indicating the sidelink carrier for establishing the sidelink control connection, wherein the configuration message indicates a configuration of the sidelink carrier as a sidelink anchor carrier.

Aspect 18: The method of any of aspects 1 through 17, wherein the at least one sidelink carrier comprises a primary sidelink anchor carrier and a secondary sidelink anchor carrier for the sidelink control connection based at least in part on the second sidelink message; and the second sidelink message indicates a configuration of the at least one sidelink carrier for establishing the sidelink carrier as a primary sidelink anchor carrier and a secondary sidelink anchor carrier, the second sidelink message comprising an RRC message or a MAC-CE.

Aspect 19: A method for wireless communication at a second UE, comprising: transmitting a first sidelink message to a first UE, the first sidelink message indicating a first set of candidate sidelink carriers of the second UE for a sidelink control connection that supports carrier aggregation using multiple sidelink carriers; receiving, from the first UE, a second sidelink message indicating or activating at least one sidelink carrier of the first set of candidate sidelink carriers for establishing the sidelink control connection; and establishing the sidelink control connection between the first UE and the second UE using the at least one sidelink carrier based at least in part on the second sidelink message.

Aspect 20: The method of aspect 19, wherein the second sidelink message indicates a configuration of the at least one sidelink carrier for establishing the sidelink carrier as a sidelink anchor carrier, the second sidelink message comprising an RRC message or a MAC-CE, the method further comprising: configuring the at least one sidelink carrier as the sidelink anchor carrier for the sidelink control connection based at least in part on the second sidelink message.

Aspect 21: The method of aspect 20, further comprising: receiving a sidelink control message using a logic channel for sidelink control messaging based at least in part on a mapping of the logic channel to the sidelink anchor carrier.

Aspect 22: The method of any of aspects 19 through 21, further comprising: receiving a sidelink control message using the logic channel for sidelink control messaging based at least in part on a mapping of the logic channel to the at least one sidelink carrier.

Aspect 23: The method of any of aspects 19 through 22, further comprising: configuring the second UE with an initial sidelink carrier for sidelink control messaging between the first UE and the second UE.

Aspect 24: The method of aspect 23, wherein the initial sidelink carrier comprises a configured sidelink carrier, a pre-configured sidelink carrier, or a default sidelink carrier.

Aspect 25: The method of any of aspects 19 through 24, wherein the at least one sidelink carrier is in a joint set of candidate sidelink carriers determined based at least in part on the first set of candidate sidelink carriers and a second set of candidate sidelink carriers of the first UE, and the at least one sidelink carrier is common to the first set of candidate sidelink carriers and the second set of candidate sidelink carriers.

Aspect 26: The method of any of aspects 19 through 25, wherein the second sidelink message indicates the at least one sidelink carrier for establishing the sidelink control connection, the at least one sidelink carrier comprising a set of sidelink anchor carriers for establishing the sidelink control connection.

Aspect 27: The method of aspect 26, further comprising: receiving the second sidelink message over a configured sidelink carrier, a pre-configured sidelink carrier, or a default sidelink carrier.

Aspect 28: The method of any of aspects 19 through 27, further comprising: configuring the at least one sidelink carrier as a sidelink anchor carrier for the sidelink control connection based at least in part on the second sidelink message; and communicating one or more additional sidelink control messages with the first UE using the sidelink anchor carrier.

Aspect 29: The method of any of aspects 19 through 28, further comprising: measuring one or more channel parameters of at least one candidate sidelink carrier of the first set of candidate sidelink carriers of the second UE; selecting at least a second sidelink carrier for reconfiguring the sidelink control connection based at least in part on the one or more channel parameters satisfying a threshold; transmitting, to the first UE, a third sidelink message indicating the at least the second sidelink carrier; and receiving, from the first UE, a reconfiguration message for reconfiguring the sidelink control connection between the first UE and the second UE using the at least the second sidelink carrier as a second sidelink anchor carrier based at least in part on transmitting the second sidelink control message.

Aspect 30: The method of aspect 29, further comprising: communicating one or more additional sidelink control messages with the second UE using the second sidelink anchor carrier after reconfiguring the sidelink control connection.

Aspect 31: A method for wireless communication at a base station, comprising: receiving a sidelink UE information message from a first UE, the sidelink information message indicating a set of common candidate sidelink carriers and one or more measured channel parameters of at least one candidate sidelink carrier of the set of common candidate sidelink carriers, wherein the set of common candidate sidelink carriers comprises carriers common to the first UE and a second UE; selecting at least one sidelink carrier of the set of common candidate sidelink carriers for a sidelink control connection between the first UE and a second UE based at least in part on the one or more measured channel parameters, the sidelink control connection supporting carrier aggregation having multiple sidelink carriers; and transmitting, to the first UE, a configuration message indicating the at least one sidelink carrier selected for the sidelink control connection between the first UE and the second UE or a MAC-CE activating the at least one sidelink carrier.

Aspect 32: The method of aspect 31, further comprising: configuring the at least one sidelink carrier as a sidelink anchor carrier for the sidelink control connection based at least in part on the sidelink information message, wherein the configuration message indicates a configuration of the sidelink carrier for establishing the sidelink carrier as the sidelink anchor carrier.

Aspect 33: The method of any of aspects 31 through 32, wherein the configuration message indicates a set of sidelink carriers of the set of common candidate sidelink carriers for establishing the sidelink control connection, the second sidelink message comprising a MAC-CE.

Aspect 34: A method for wireless communication at a first UE, comprising: establishing a sidelink control connection between the first UE and a second UE using a first sidelink anchor carrier for the sidelink control connection, the sidelink control connection supporting carrier aggregation using multiple sidelink carriers including the first sidelink anchor carrier; identifying one or more channel parameters of one or more candidate sidelink carriers for the sidelink control connection; and transmitting, to the second UE, a sidelink control message for configuring a sidelink carrier of the one or more candidate sidelink carriers as a second sidelink anchor carrier for the sidelink control connection or a sidelink MAC-CE for activating the sidelink carrier as the second sidelink anchor carrier, based at least in part on the one or more channel parameters, the second sidelink anchor carrier configured for fallback of the first sidelink anchor carrier or duplication of the first sidelink anchor carrier.

Aspect 35: The method of aspect 34, further comprising: transmitting a second sidelink control message or a second sidelink MAC-CE to the second UE over the second sidelink anchor carrier, the second sidelink control message indicating an updated set of candidate sidelink carriers at the first UE or the second sidelink MAC-CE activating the updated set of candidate sidelink carriers at the first UE, the updated set of candidate sidelink carriers comprising at least one of the one or more candidate sidelink carriers; and reconfiguring the sidelink control connection between the first UE and the second UE using the second sidelink anchor carrier based at least in part on the second sidelink control message.

Aspect 36: The method of aspect 35, further comprising: receiving a reconfiguration complete message from the second UE over the second sidelink anchor carrier, the reconfiguration complete message indicating a second updated set of candidate sidelink carriers at the second UE; and reconfiguring the sidelink control connection between the first UE and the second UE using the second sidelink anchor carrier based at least in part on the reconfiguration complete message.

Aspect 37: The method of any of aspects 34 through 36, further comprising: receiving a second sidelink control message or a second sidelink MAC-CE from the second UE over the first sidelink anchor carrier, the second sidelink control message indicating an updated set of candidate sidelink carriers at the second UE or the second sidelink MAC-CE activating the updated set of candidate sidelink carriers; and reconfiguring the sidelink control connection between the first UE and the second UE using the second sidelink anchor carrier, based at least in part on receiving the second sidelink control message.

Aspect 38: The method of aspect 37, further comprising: transmitting a reconfiguration message to the second UE over the second sidelink anchor carrier, the reconfiguration message indicating a second updated set of candidate sidelink carriers at the first UE; and reconfiguring the sidelink control connection between the first UE and the second UE using the second sidelink anchor carrier based at least in part on transmitting the reconfiguration message.

Aspect 39: The method of any of aspects 34 through 38, wherein configuring the sidelink carrier of the one or more candidate sidelink carriers as the second sidelink anchor carrier for the sidelink control connection comprises: mapping a logical channel for sidelink control messaging to both the first sidelink anchor carrier and the second sidelink anchor carrier.

Aspect 40: The method of any of aspects 34 through 39, wherein configuring the sidelink carrier of the one or more candidate sidelink carriers as the second sidelink anchor carrier for the sidelink control connection comprises: mapping a sidelink broadcast control channel or a sidelink common control channel for sidelink control messaging to both the first sidelink anchor carrier and the second sidelink anchor carrier.

Aspect 41: The method of any of aspects 34 through 40, further comprising: receiving an RRC message or a MAC-CE that activates or deactivates a configuration for the second sidelink anchor carrier as one of fallback of the first sidelink anchor carrier or duplication of the first sidelink anchor carrier.

Aspect 42: The method of any of aspects 34 through 41, further comprising: determining a radio link failure associated with the first sidelink anchor carrier; transmitting or receiving a second sidelink control message or a second sidelink MAC-CE based at least in part on determining the radio link failure, the second sidelink control message indicating an updated set of candidate sidelink carriers or the second sidelink MAC-CE activating the updated set of candidate sidelink carriers; and reconfiguring the sidelink control connection between the first UE and the second UE using the second sidelink anchor carrier, based at least in part on the radio link failure, the second sidelink control message, or both.

Aspect 43: The method of any of aspects 34 through 42, wherein transmitting the sidelink control message comprises: broadcasting the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

Aspect 44: The method of any of aspects 34 through 43, wherein transmitting the sidelink control message comprises: broadcasting the sidelink control message over a sidelink data channel mapped to the first sidelink anchor carrier, wherein the sidelink control message comprises a set of SIBs.

Aspect 45: The method of any of aspects 34 through 44, further comprising: determining a mapping between a logic channel for a sidelink broadcast control channel and the first sidelink anchor carrier, wherein transmitting the sidelink control message is based at least in part on the mapping.

Aspect 46: The method of any of aspects 34 through 45, further comprising: measuring a set of channel parameters associated with a set of candidate sidelink carriers for the sidelink control connection; and determining the first sidelink anchor carrier from the set of candidate sidelink carriers based at least in part on one or more of the set of channel parameters satisfying a threshold.

Aspect 47: The method of any of aspects 34 through 46, further comprising: determining the sidelink carrier of the one or more candidate sidelink carriers as the second sidelink anchor carrier based at least in part on one or more the one or more channel parameters satisfying a threshold.

Aspect 48: A method for wireless communication at a second UE, comprising: establishing a sidelink control connection between a first UE and the second UE using a first sidelink anchor carrier for the sidelink control connection, the sidelink control connection supporting carrier aggregation using multiple sidelink carriers including the first sidelink anchor carrier; and receiving, from the first UE, a sidelink control message for configuring a sidelink carrier of one or more candidate sidelink carriers as a second sidelink anchor carrier for the sidelink control connection or a sidelink MAC-CE for activating the sidelink carrier as the second sidelink anchor carrier, the second sidelink anchor carrier configured for fallback of the first sidelink anchor carrier or duplication of the first sidelink anchor carrier.

Aspect 49: The method of aspect 48, further comprising: receiving a second sidelink control message from the first UE over the second sidelink anchor carrier, the second sidelink control message indicating an updated set of candidate sidelink carriers at the first UE, the updated set of candidate sidelink carriers comprising at least one of the one or more candidate sidelink carriers; and reconfiguring the sidelink control connection between the first UE and the second UE using the second sidelink anchor carrier based at least in part on the second sidelink control message.

Aspect 50: The method of aspect 49, further comprising: transmitting a reconfiguration complete message the first UE over the second sidelink anchor carrier, the reconfiguration complete message indicating a second updated set of candidate sidelink carriers at the second UE; and reconfiguring the sidelink control connection between the first UE and the second UE using the second sidelink anchor carrier based at least in part on the reconfiguration complete message.

Aspect 51: The method of any of aspects 48 through 50, further comprising: transmitting a second sidelink control message the first UE over the first sidelink anchor carrier, the second sidelink control message indicating an updated set of candidate sidelink carriers at the second UE; and reconfiguring the sidelink control connection between the first UE and the second UE using the second sidelink anchor carrier, based at least in part on transmitting the second sidelink control message, the sidelink control connection supporting carrier aggregation using multiple sidelink carriers including the second sidelink anchor carrier.

Aspect 52: The method of aspect 51, further comprising: receiving a reconfiguration message from the first UE over the second sidelink anchor carrier, the reconfiguration message indicating a second updated set of candidate sidelink carriers at the first UE; and reconfiguring the sidelink control connection between the first UE and the second UE using the second sidelink anchor carrier, based at least in part on receiving the reconfiguration message.

Aspect 53: The method of any of aspects 48 through 52, further comprising: configuring the sidelink carrier of the one or more candidate sidelink carriers as the second sidelink anchor carrier for the sidelink control connection; and mapping a logical channel for sidelink control messaging to both the first sidelink anchor carrier and the second sidelink anchor carrier.

Aspect 54: The method of any of aspects 48 through 53, further comprising: configuring the sidelink carrier of the one or more candidate sidelink carriers as the second sidelink anchor carrier for the sidelink control connection; and mapping a sidelink broadcast control channel or a sidelink common control channel for sidelink control messaging to both the first sidelink anchor carrier and the second sidelink anchor carrier.

Aspect 55: The method of any of aspects 48 through 54, further comprising: transmitting an RRC message or a MAC-CE that activates or deactivates a configuration for the second sidelink anchor carrier as one of fallback of the first sidelink anchor carrier or duplication of the first sidelink anchor carrier.

Aspect 56: The method of any of aspects 48 through 55, further comprising: transmitting or receiving a second sidelink control message indicating an updated set of candidate sidelink carriers; and reconfiguring the sidelink control connection between the first UE and the second UE using the second sidelink anchor carrier, based at least in part on the second sidelink control message.

Aspect 57: The method of any of aspects 48 through 56, wherein receiving the sidelink control message comprises: receiving the sidelink control message using a sidelink control channel mapped to the first sidelink anchor carrier, a sidelink broadcast control channel mapped to the first sidelink anchor carrier, a sidelink common control channel mapped to the first sidelink anchor carrier, or a sidelink group control channel.

Aspect 58: The method of any of aspects 48 through 57, wherein receiving the sidelink control message comprises: receiving the sidelink control message over a sidelink data channel mapped to the first sidelink anchor carrier, wherein the sidelink control message comprises a set of SIBs.

Aspect 59: The method of any of aspects 48 through 58, further comprising: determining the sidelink carrier of the one or more candidate sidelink carriers as the second sidelink anchor carrier based at least in part on one or more channel parameters satisfying a threshold.

Aspect 60: The method of any of aspects 48 through 59, further comprising: measuring one or more channel parameters of the first sidelink anchor carrier; determining to reconfigure the sidelink control connection between the first UE and the second UE using the second sidelink anchor carrier based at least in part on the one or more channel parameters of the first sidelink anchor carrier satisfying a threshold; transmitting, to the first UE, a sidelink reconfiguration message for reconfiguring the sidelink carrier of the one or more candidate sidelink carriers as the second sidelink anchor carrier for the sidelink control connection or a sidelink MAC-CE for activating the sidelink carrier as the second sidelink anchor carrier, based at least in part on the one or more channel parameters; and reconfiguring the sidelink control connection between the first UE and the second UE using the second sidelink anchor carrier based at least in part on the sidelink reconfiguration message.

Aspect 61: The method of any of aspects 48 through 60, wherein the sidelink control message for configuring the sidelink carrier is received based at least in part on a measurement of one or more channel parameters.

Aspect 62: A method for wireless communication at a first UE, comprising: establishing a sidelink control connection between the first UE and a second UE using a sidelink anchor carrier for the sidelink control connection, the sidelink control connection supporting carrier aggregation using multiple sidelink carriers including the sidelink anchor carrier; identifying a monitoring window for measuring the sidelink anchor carrier, a set of candidate sidelink carriers, or a combination thereof; measuring, within the monitoring window, one or more channel parameters of the sidelink anchor carrier, the set of candidate sidelink carriers, or a combination thereof; selecting, based at least in part on the one or more channel parameters, a sidelink carrier of the set of candidate sidelink carriers for the sidelink control connection, wherein a measured parameter associated with the sidelink carrier satisfies a threshold; and transmitting, to the second UE, a sidelink control message for configuring the sidelink carrier for the sidelink control connection between the first UE and the second UE or a sidelink MAC-CE for activating the sidelink carrier for the sidelink control connection.

Aspect 63: The method of aspect 62, further comprising: configuring the sidelink carrier as a second sidelink anchor carrier for the sidelink control connection between the first UE and the second UE based at least in part on the selecting; and reconfiguring the sidelink control connection between the first UE and a second UE using the second sidelink anchor carrier.

Aspect 64: The method of any of aspects 62 through 63, wherein measuring the one or more channel parameters of the sidelink anchor carrier, the set of candidate sidelink carriers, or the combination thereof comprises: measuring a CBR of the sidelink anchor carrier, the set of candidate sidelink carriers, or the combination thereof, wherein the sidelink carrier for the sidelink control connection is selected based at least in part on the measured CBR associated with the sidelink anchor carrier satisfying a CBR threshold.

Aspect 65: The method of any of aspects 62 through 64, further comprising: configuring the sidelink carrier as a second sidelink carrier for the sidelink control connection between the first UE and the second UE based at least in part on the selecting; and reconfiguring the sidelink control connection between the first UE and a second UE using the second sidelink carrier.

Aspect 66: A method for wireless communication at a second UE, comprising: establishing a sidelink control connection between a first UE and the second UE using a sidelink anchor carrier for the sidelink control connection, the sidelink control connection supporting carrier aggregation using multiple sidelink carriers including the sidelink anchor carrier; identifying a monitoring window for measuring the sidelink anchor carrier, a set of candidate sidelink carriers, or a combination thereof; measuring, within the monitoring window, one or more channel parameters of the sidelink anchor carrier, the set of candidate sidelink carriers, or a combination thereof; and receiving, from the first UE, a sidelink control message for configuring a sidelink carrier for the sidelink control connection between the first UE and the second UE or a sidelink MAC-CE for activating the sidelink carrier for the sidelink control connection.

Aspect 67: The method of aspect 66, further comprising: configuring the sidelink carrier as a second sidelink anchor carrier for the sidelink control connection between the first UE and the second UE based at least in part on the sidelink control message; and reconfiguring the sidelink control connection between the first UE and a second UE using the second sidelink anchor carrier.

Aspect 68: The method of any of aspects 66 through 67, further comprising: configuring the sidelink carrier as a second sidelink carrier for the sidelink control connection between the first UE and the second UE based at least in part on the sidelink control message; and reconfiguring the sidelink control connection between the first UE and a second UE using the second sidelink carrier.

Aspect 69: The method of any of aspects 66 through 68, further comprising: transmitting, to the first UE, a reconfiguration complete message confirming the configuring of the sidelink carrier for the sidelink control connection.

Aspect 70: The method of any of aspects 66 through 69, further comprising: transmitting, to the first UE, a reconfiguration denied message rejecting the configuring of the sidelink carrier for the sidelink control connection, the reconfiguration denied message comprising a second set of candidate sidelink carriers for the sidelink control connection between the first UE and the second UE.

Aspect 71: An apparatus for wireless communication at a first UE, comprising a processor; memory coupled with the processor; and instructions stored in the memory and executable by the processor to cause the apparatus to perform a method of any of aspects 1 through 18.

Aspect 72: An apparatus for wireless communication at a first UE, comprising at least one means for performing a method of any of aspects 1 through 18.

Aspect 73: A non-transitory computer-readable medium storing code for wireless communication at a first UE, the code comprising instructions executable by a processor to perform a method of any of aspects 1 through 18.

Aspect 74: An apparatus for wireless communication at a second UE, comprising a processor; memory coupled with the processor; and instructions stored in the memory and executable by the processor to cause the apparatus to perform a method of any of aspects 19 through 30.

Aspect 75: An apparatus for wireless communication at a second UE, comprising at least one means for performing a method of any of aspects 19 through 30.

Aspect 76: A non-transitory computer-readable medium storing code for wireless communication at a second UE, the code comprising instructions executable by a processor to perform a method of any of aspects 19 through 30.

Aspect 77: An apparatus for wireless communication at a base station, comprising a processor; memory coupled with the processor; and instructions stored in the memory and executable by the processor to cause the apparatus to perform a method of any of aspects 31 through 33.

Aspect 78: An apparatus for wireless communication at a base station, comprising at least one means for performing a method of any of aspects 31 through 33.

Aspect 79: A non-transitory computer-readable medium storing code for wireless communication at a base station, the code comprising instructions executable by a processor to perform a method of any of aspects 31 through 33.

Aspect 80: An apparatus for wireless communication at a first UE, comprising a processor; memory coupled with the processor; and instructions stored in the memory and executable by the processor to cause the apparatus to perform a method of any of aspects 34 through 47.

Aspect 81: An apparatus for wireless communication at a first UE, comprising at least one means for performing a method of any of aspects 34 through 47.

Aspect 82: A non-transitory computer-readable medium storing code for wireless communication at a first UE, the code comprising instructions executable by a processor to perform a method of any of aspects 34 through 47.

Aspect 83: An apparatus for wireless communication at a second UE, comprising a processor; memory coupled with the processor; and instructions stored in the memory and executable by the processor to cause the apparatus to perform a method of any of aspects 48 through 61.

Aspect 84: An apparatus for wireless communication at a second UE, comprising at least one means for performing a method of any of aspects 48 through 61.

Aspect 85: A non-transitory computer-readable medium storing code for wireless communication at a second UE, the code comprising instructions executable by a processor to perform a method of any of aspects 48 through 61.

Aspect 86: An apparatus for wireless communication at a first UE, comprising a processor; memory coupled with the processor; and instructions stored in the memory and executable by the processor to cause the apparatus to perform a method of any of aspects 62 through 65.

Aspect 87: An apparatus for wireless communication at a first UE, comprising at least one means for performing a method of any of aspects 62 through 65.

Aspect 88: A non-transitory computer-readable medium storing code for wireless communication at a first UE, the code comprising instructions executable by a processor to perform a method of any of aspects 62 through 65.

Aspect 89: An apparatus for wireless communication at a second UE, comprising a processor; memory coupled with the processor; and instructions stored in the memory and executable by the processor to cause the apparatus to perform a method of any of aspects 66 through 70.

Aspect 90: An apparatus for wireless communication at a second UE, comprising at least one means for performing a method of any of aspects 66 through 70.

Aspect 91: A non-transitory computer-readable medium storing code for wireless communication at a second UE, the code comprising instructions executable by a processor to perform a method of any of aspects 66 through 70.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:

a processor;

memory coupled with the processor; and instructions stored in the memory and executable by the processor to cause the apparatus to:

receive a first sidelink message from a second UE, the first sidelink message indicating a first set of candidate sidelink carriers of the second UE;

transmit, to a network device, a sidelink UE information message that is indicative of a second set of candidate sidelink carriers based at least in part on the first set of candidate sidelink carriers of the second UE indicated via the first sidelink message;

receive, based at least in part on transmission of the sidelink UE information message and from the network device, a configuration message indicating at least one sidelink carrier of the first set of candidate sidelink carriers;

transmit, based at least in part on reception of the configuration message and to the second UE, a second sidelink message indicating or activating the at least one sidelink carrier of the first set of candidate sidelink carriers, the at least one sidelink carrier for establishing a sidelink control connection that supports carrier aggregation using multiple sidelink carriers; and establish the sidelink control connection between the first UE and the second UE using the at least one sidelink carrier based at least in part on the second sidelink message.

2. The apparatus of claim 1, wherein the second sidelink message indicates the at least one sidelink carrier as a sidelink anchor carrier.

3. The apparatus of claim 2, wherein the instructions are further executable by the processor to cause the apparatus to:

map a logic channel for sidelink control messaging to the sidelink anchor carrier; and transmit a sidelink control message on the sidelink anchor carrier.

4. The apparatus of claim 1, wherein the instructions are further executable by the processor to cause the apparatus to:

map a logic channel for sidelink control messaging to the at least one sidelink carrier; and transmit a sidelink control message on the at least one sidelink carrier.

5. The apparatus of claim 1, wherein the instructions are further executable by the processor to cause the apparatus to:

configure the first UE with an initial sidelink carrier for sidelink messaging between the first UE and the second UE before establishing the sidelink control connection.

6. The apparatus of claim 5, wherein the initial sidelink carrier comprises a configured sidelink carrier, a preconfigured sidelink carrier, or a default sidelink carrier.

7. The apparatus of claim 1, wherein the instructions are further executable by the processor to cause the apparatus to:

determine at least one candidate sidelink carrier from the second set of candidate sidelink carriers, the second set of candidate sidelink carriers comprising one or more carriers common to the first set of candidate sidelink carriers and a third set of candidate sidelink carriers of the first UE; and measure one or more channel parameters of the at least one candidate sidelink carrier of the first set of candidate sidelink carriers.

8. The apparatus of claim 7, wherein the instructions are further executable by the processor to cause the apparatus to:

measure each of the second set of candidate sidelink carriers based at least in part on a priority associated with the second set of candidate sidelink carriers.

9. The apparatus of claim 8, wherein the instructions are further executable by the processor to cause the apparatus to:

select the at least one sidelink carrier based at least in part on the one or more channel parameters satisfying a threshold.

10. The apparatus of claim 1, wherein the instructions are further executable by the processor to cause the apparatus to:

measure a channel busy ratio (CBR) of at least one candidate sidelink carrier of the second set of candidate sidelink carriers, wherein the at least one sidelink carrier is determined based at least in part on the CBR.

11. The apparatus of claim 1, wherein the instructions are further executable by the processor to cause the apparatus to:

measure one or more channel parameters of at least one candidate sidelink carrier of the first set of candidate sidelink carriers; and select the at least one sidelink carrier based at least in part on the measured one or more channel parameters of the at least one candidate sidelink carrier satisfying a threshold.

12. The apparatus of claim 1, wherein the instructions to transmit the second sidelink message are executable by the processor to cause the apparatus to:

transmit the second sidelink message over a configured sidelink carrier, a preconfigured sidelink carrier, or a default sidelink carrier.

13. The apparatus of claim 1, wherein the instructions are further executable by the processor to cause the apparatus to:

configure the at least one sidelink carrier as a sidelink anchor carrier for the sidelink control connection based at least in part on the second sidelink message; and communicate one or more additional sidelink control messages with the second UE using the sidelink anchor carrier.

14. The apparatus of claim 1, wherein the instructions are further executable by the processor to cause the apparatus to:

receive, from the second UE, a third sidelink message indicating at least a second sidelink carrier determined by the second UE for the sidelink control connection; and transmit, to the second UE, a reconfiguration message for mapping the sidelink control connection between the first UE and the second UE to at least the second sidelink carrier as a second sidelink anchor carrier based at least in part on receiving the third sidelink message.

15. The apparatus of claim 14, wherein the instructions are further executable by the processor to cause the apparatus to:

communicate one or more additional sidelink control messages with the second UE using the second sidelink anchor carrier after mapping the sidelink control connection to the second sidelink anchor carrier.

16. The apparatus of claim 1, wherein the instructions are further executable by the processor to cause the apparatus to:

configure a third set of candidate sidelink carriers for the first UE;

determine at least one candidate sidelink carrier from the second set of candidate sidelink carriers, the second set of candidate sidelink carriers comprising one or more carriers common to the first set of candidate sidelink carriers and the third set of candidate sidelink carriers;

measure one or more channel parameters of the at least one candidate sidelink carrier of the first set of candidate sidelink carriers;

transmit the sidelink UE information message to the network device, the sidelink UE information message indicating the measured one or more channel parameters, the second set of candidate sidelink carriers, or both; and receive, from the network device, the configuration message indicating the at least one sidelink carrier for establishing the sidelink control connection, wherein the configuration message indicates a configuration of the at least one sidelink carrier as a sidelink anchor carrier.

17. The apparatus of claim 1, wherein:

the at least one sidelink carrier comprises a primary sidelink anchor carrier and a secondary sidelink anchor carrier for the sidelink control connection based at least in part on the second sidelink message; and the second sidelink message indicates a configuration of the at least one sidelink carrier for establishing the at least one sidelink carrier as the primary sidelink anchor carrier and the secondary sidelink anchor carrier, the second sidelink message comprising a radio resource control (RRC) message or a media access control (MAC) control element (MAC-CE).

18. A method for wireless communication at a first user equipment (UE), comprising:

receiving a first sidelink message from a second UE, the first sidelink message indicating a first set of candidate sidelink carriers of the second UE;

transmitting, to a network device, a sidelink UE information message that is indicative of a second set of candidate sidelink carriers based at least in part on the first set of candidate sidelink carriers of the second UE indicated via the first sidelink message;

receiving, based at least in part on transmission of the sidelink UE information message and from the network device, a configuration message indicating at least one sidelink carrier of the first set of candidate sidelink carriers;

transmitting, based at least in part on reception of the configuration message and to the second UE, a second sidelink message indicating or activating the at least one sidelink carrier of the first set of candidate sidelink carriers, the at least one sidelink carrier for establishing a sidelink control connection that supports carrier aggregation using multiple sidelink carriers; and establishing the sidelink control connection between the first UE and the second UE using the at least one sidelink carrier based at least in part on the second sidelink message.

* * * * *